(12) United States Patent
Blackadar et al.

(10) Patent No.: US 10,682,573 B2
(45) Date of Patent: Jun. 16, 2020

(54) ON-LINE MULTIPLAYER GAMING SYSTEM FOR REAL-WORLD ANGLING EVENTS

(71) Applicant: Angler Labs, Inc., Pittsburgh, PA (US)

(72) Inventors: Thomas Blackadar, Pembroke, MA (US); Nic Wilson, Allison Park, PA (US); Landon Bloomer, Swissvale, PA (US); Terrence Corbett, Pittsburgh, PA (US)

(73) Assignee: Angler Labs Inc., Pittsburgh, PA (US)

(*) Notice: Subject to any disclaimer, the term of this patent is extended or adjusted under 35 U.S.C. 154(b) by 0 days.

(21) Appl. No.: 16/013,208

(22) Filed: Jun. 20, 2018

(65) Prior Publication Data

US 2018/0361239 A1 Dec. 20, 2018

Related U.S. Application Data

(63) Continuation of application No. PCT/US2016/068035, filed on Dec. 21, 2016.
(Continued)

(51) Int. Cl.
*A63F 13/46* (2014.01)
*A01K 97/00* (2006.01)
(Continued)

(52) U.S. Cl.
CPC ............ *A63F 13/46* (2014.09); *A01K 87/007* (2013.01); *A01K 97/00* (2013.01); *A01K 97/125* (2013.01); *A01K 99/00* (2013.01); *A63F 13/65* (2014.09); *G05B 15/02* (2013.01); *G05B 19/042* (2013.01); *G06N 5/04* (2013.01); *G06Q 50/02* (2013.01);
(Continued)

(58) Field of Classification Search
None
See application file for complete search history.

(56) References Cited

U.S. PATENT DOCUMENTS

| 4,697,758 A | 10/1987 | Hirose et al. |
| 5,131,165 A | 7/1992 | Benson et al. |

(Continued)

FOREIGN PATENT DOCUMENTS

WO 2017112778 A1 6/2017

OTHER PUBLICATIONS

Bouckley, "The fishing rod that sends a message to your phone when you catch a fish", http://home.bt.com/tech-gadgets/future-tech/fishsentry-connected-fishing-rod-smartphone-11364033456471, Jan. 15, 2016, pp. 1-4.
(Continued)

*Primary Examiner* — Jason T Yen
(74) *Attorney, Agent, or Firm* — GTC Law Group PC & Affiliates

(57) ABSTRACT

Provided herein is an on-line multiplayer gaming system to score real-world angling events of multiple players. The system includes a first angling event sensing device, processor, and a gaming application on a first mobile device in communication with a recreation monitoring platform. The system further includes a second angling event sensing device, processor, and a second gaming application on a second mobile device in communication with the recreation monitoring platform. The recreation monitoring platform calculates scores for the first and second player based on data from their respective angling event sensing device.

11 Claims, 89 Drawing Sheets

Related U.S. Application Data

(60) Provisional application No. 62/270,383, filed on Dec. 21, 2015, provisional application No. 62/308,065, filed on Mar. 14, 2016, provisional application No. 62/416,124, filed on Nov. 1, 2016.

(51) Int. Cl.

| | | |
|---|---|---|
| *A01K 97/12* | (2006.01) | |
| *A01K 87/00* | (2006.01) | |
| *G05B 15/02* | (2006.01) | |
| *G06N 5/04* | (2006.01) | |
| *G05B 19/042* | (2006.01) | |
| *A01K 99/00* | (2006.01) | |
| *G06Q 50/02* | (2012.01) | |
| *G08B 5/22* | (2006.01) | |
| *G08B 21/20* | (2006.01) | |
| *H04L 29/08* | (2006.01) | |
| *H04W 4/02* | (2018.01) | |
| *A63F 13/65* | (2014.01) | |
| *G06N 20/00* | (2019.01) | |
| *H04W 4/21* | (2018.01) | |
| *G06Q 50/00* | (2012.01) | |
| *G06F 3/0484* | (2013.01) | |

(52) U.S. Cl.
CPC .............. *G08B 5/22* (2013.01); *G08B 21/20* (2013.01); *H04L 67/12* (2013.01); *H04L 67/22* (2013.01); *H04W 4/023* (2013.01); *G05B 2219/25257* (2013.01); *G06F 3/04847* (2013.01); *G06N 20/00* (2019.01); *G06Q 50/01* (2013.01); *H04W 4/21* (2018.02)

(56) References Cited

U.S. PATENT DOCUMENTS

| | | | |
|---|---|---|---|
| 5,228,228 A | 7/1993 | Meissner et al. | |
| 5,581,930 A | 12/1996 | Langer | |
| 5,782,033 A | 7/1998 | Park et al. | |
| 6,336,365 B1 | 1/2002 | Blackadar et al. | |
| 6,584,722 B1 * | 7/2003 | Walls ..................... | A01K 97/00 377/5 |
| 7,021,140 B2 | 4/2006 | Perkins | |
| 7,200,488 B2 | 4/2007 | Taboada | |
| 7,234,351 B2 | 6/2007 | Perkins | |
| 7,562,488 B1 | 7/2009 | Perkins et al. | |
| 7,669,360 B2 | 3/2010 | Davidson | |
| 7,934,338 B2 | 5/2011 | Hope | |
| 8,602,343 B2 | 12/2013 | Strohecker et al. | |
| 9,002,663 B2 | 4/2015 | Rayor et al. | |
| 9,524,515 B2 | 12/2016 | Persson et al. | |
| 9,609,856 B1 | 4/2017 | Little et al. | |
| 10,007,476 B1 * | 6/2018 | Glikmann ............ | G06F 3/1454 |
| 2004/0159039 A1 | 8/2004 | Yates et al. | |
| 2008/0000138 A1 | 1/2008 | Cummings | |
| 2008/0066367 A1 * | 3/2008 | Meeks ................. | A01K 97/125 43/17 |
| 2009/0158635 A1 | 6/2009 | Hope | |
| 2011/0034225 A1 * | 2/2011 | Butz, Jr. ................. | A63F 13/12 463/4 |
| 2013/0331969 A1 * | 12/2013 | Piercy ................ | A63B 71/0697 700/92 |
| 2014/0164375 A1 | 6/2014 | Persson et al. | |
| 2014/0358483 A1 | 12/2014 | Da Rosa | |
| 2015/0057968 A1 * | 2/2015 | Bailey .................... | G08C 17/02 702/150 |
| 2015/0113853 A1 | 4/2015 | McKeough et al. | |
| 2015/0342169 A1 | 12/2015 | Zeevi | |
| 2016/0353725 A1 | 12/2016 | Worley | |
| 2017/0109794 A1 | 4/2017 | Smith et al. | |
| 2017/0116225 A1 | 4/2017 | Persson et al. | |
| 2018/0055031 A1 | 3/2018 | Wachob | |
| 2018/0295826 A1 | 10/2018 | Blackadar et al. | |
| 2018/0295827 A1 | 10/2018 | Blackadar et al. | |
| 2018/0295828 A1 | 10/2018 | Blackadar et al. | |
| 2018/0295829 A1 | 10/2018 | Blackadar et al. | |
| 2018/0338485 A1 | 11/2018 | Blackadar et al. | |
| 2018/0338486 A1 | 11/2018 | Blackadar et al. | |

OTHER PUBLICATIONS

Jee, "New Fishing Rod Communicates with Mobile Device for a Truly Connected Fishing Experience", http://www.prweb.com/releases/2016/01/prweb13159412.htm, Jan. 12, 2016, pp. 1-2.

PCT/US2016/068035, "Application Serial No. PCT/US2016/068035, International Search Report and Written Opinion dated Mar. 13, 2017", Angler Labs Inc., 8 pages.

PCT/US2016/068035, "International Application Serial No. PCT/US2016/068035, International Preliminary Report on Patentability and Written Opinion dated Jul. 5, 2018", Angler Labs Inc., 8 Pages.

* cited by examiner

| Sporting event (e.g. an action) | Sensor | User input | Feedback | Method | Desired results |
|---|---|---|---|---|---|
| Precast | Accelerometer, gyro, | Fishing mode, | | Using the sum(Abs(dy/dt), Abs(dy/dt), Abs(dz/dt) and the sum(Abs(gx/dt), Abs(gy/dt), Abs(gz/dt) to pick off instantaneous point, and then use actual readings to determine angle. | # of precast swings and frequency, rod swing angle |
| Cast point | Accelerometer, Hall-effect, gyro, acoustic | rod type, reel type, line test, bait type | | Using the sum(Abs(dy/dt), Abs(dy/dt), Abs(dz/dt) and the sum(Abs(gx/dt), Abs(gy/dt), Abs(gz/dt) to pick off instantaneous point, and then use actual readings to determine angle and velocity of last reading after the sums go to zero. With respect to Hall-effect one waits until the reel starts to spin, and with acoustic when the reel starts to spin at a specific frequency. | Identifying when the cast happened, rod velocity |
| Flight Time | Accelerometer, Hall-effect, acoustic | rod type, reel type, line test, bait type | LCD/LED/Speaker | With Accelerometer it's a predictive calculation, and then when the Accelerometer sums go positive the lure has landed. Hall Effect the reel stops spinning as does the acoustic signature indicating end of flight. | Time of flight of lure from cast point to point at which lure strikes the water |
| Fish On | Accelerometer, gyro | rod type, reel type, line test, bait type | LED/LCD/Speaker/Vibration | Using the sum(Abs(dy/dt), Abs(dy/dt), Abs(dz/dt) and the sum(Abs(gx/dt), Abs(gy/dt), Abs(gz/dt)) will go above a threshold. | Identifying when there is a fish strike |

FIG. 8A

| Sporting event (e.g. an action) | Sensor | User input | Feedback | Method | Desired results |
|---|---|---|---|---|---|
| Snag | Accelerometer, gyro, | | LED/LCD/Speaker/Vibration | Using the sum(Abs(dx/dt), Abs(dy/dt), Abs(dz/dt)) and the sum(Abs(gx/dt), Abs(gy/dt), Abs(gz/dt)) will go above a threshold. Then the Accelerometer sums will go to zero and the Gyro will stay positive. | Identifying when the lure is snagged on structure or other object (not fish) |
| Reel In | Accelerometer, Hall-effect, acoustic | Button press for acoustic. | LED/LCD | Using the sum(Abs(dx/dt), Abs(dy/dt), Abs(dz/dt)) and the sum(Abs(gx/dt), Abs(gy/dt), Abs(gz/dt)) will go positive, but will be below a threshold and above another threshold. With respect to Hall-effect one times the reel in of the hall effect, and with acoustic one sums the acoustic signature times until a button is pressed. | |
| Revolutions/sec | Accelerometer, Hall-effect, acoustic | Reel type | LED/LCD | Using the Accelerometer as a speaker, and setting a notch filter around the acoustic signature of the reel one can time the frequency to understand the RPS. The Hall-effect is the revolutions. Multiple Magnets will give more resolution. | |

FIG. 8B

| Sporting event (e.g. an action) | Sensor | User input | Feedback | Method | Desired results |
|---|---|---|---|---|---|
| Release angle | Accelerometer, gyro. | | LED/LCD | Using the sum(Abs(dx/dt), Abs(dy/dt), Abs(dz/dt)) and the sum(Abs(gx/dt), Abs(gy/dt), Abs(gz/dt)) to pick off instantaneous point, and then use the average of the last three to five gyro readings to determine the angle of incidence upon release. | Identifying the coordinates for vertical angle of release (up-horizontal-downward) |
| Direction of flight | Accelerometer, gyro, magnometer | | LED/LCD | Using the sum(Abs(dx/dt), Abs(dy/dt), Abs(dz/dt)) and the sum(Abs(gx/dt), Abs(gy/dt), Abs(gz/dt)) to pick off instantaneous point, and then use the average of the last three to five magnometer readings to determine the compass heading of the rod. | Compass direction of cast |
| Event mark for starting trip, dropping a pin, indicating fish landed | Switch, capacitive touch Haptic input | | LED/LCD/Vibration | Button press, to double/triple tap on the housing, or simple swipe for capacitive touch. | To provide user input that something has happened to the RMP. |

FIG. 8C

| Post Cast Event | Sensor | User Input | Feedback | Method | Desired results |
|---|---|---|---|---|---|
| Reel Speed | Accelerometer >100 hz sampling, Hall effect | Bait type, rod type, line type, Reel type | LCD/LED/Speaker | Using the (dx/dt), (dy/dt), or (dz/dt) to determine the peak values of x,y,or z this is the rotational speed. Or simply counting the rotations via hall effect/magnet. | m/s or mph |
| Fish Bite | Accelerometer >100 hz | rod type, reel type, line test, bait type, location species/location | LCD/LED/Speaker | Using the (dx/dt), (dy/dt), or (dz/dt) to pick of any variations, looking for magnitude and directional components for any significant vibrational change, subtracting the dx/dt, dy/dt, or dz/dt of reel the speed looking for deviations beyond the reel in. The largest magnitude after filtering is the signature of the species | Identifying species |
| Fish-Fight Species detection | Accelerometer Gryo, Magnometer | rod type, reel type, line test, bait type, location species/location | LCD/LED/Speaker | Using the IMU in the Tracker to detect rod motion, looking for angle of rod w/respect to water surface, looking for magnetic direction (east/west,north,south) | Identify the fight pattern Of a particular species |

FIG. 8D

Level 1

Level 2

Level 2

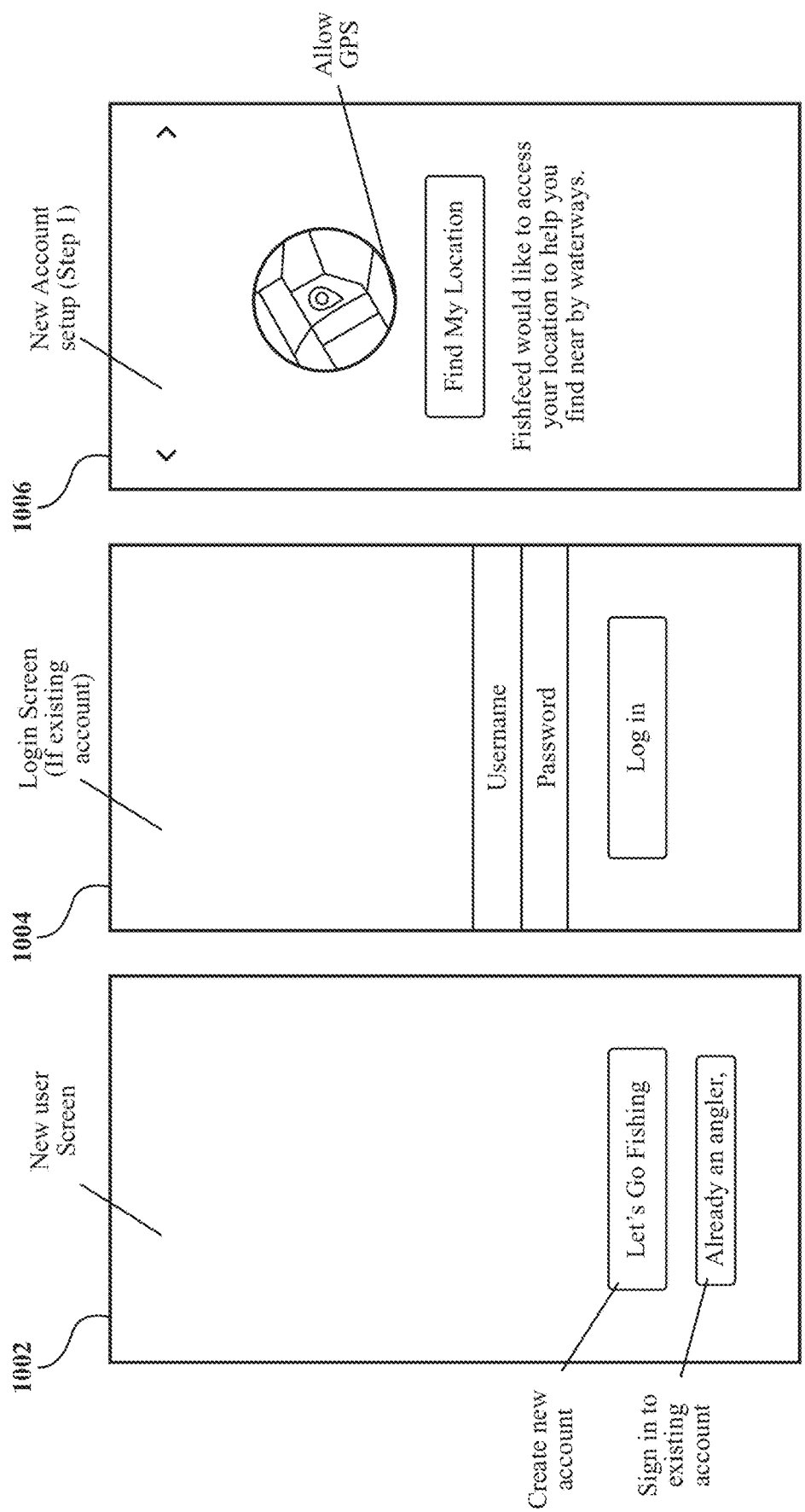

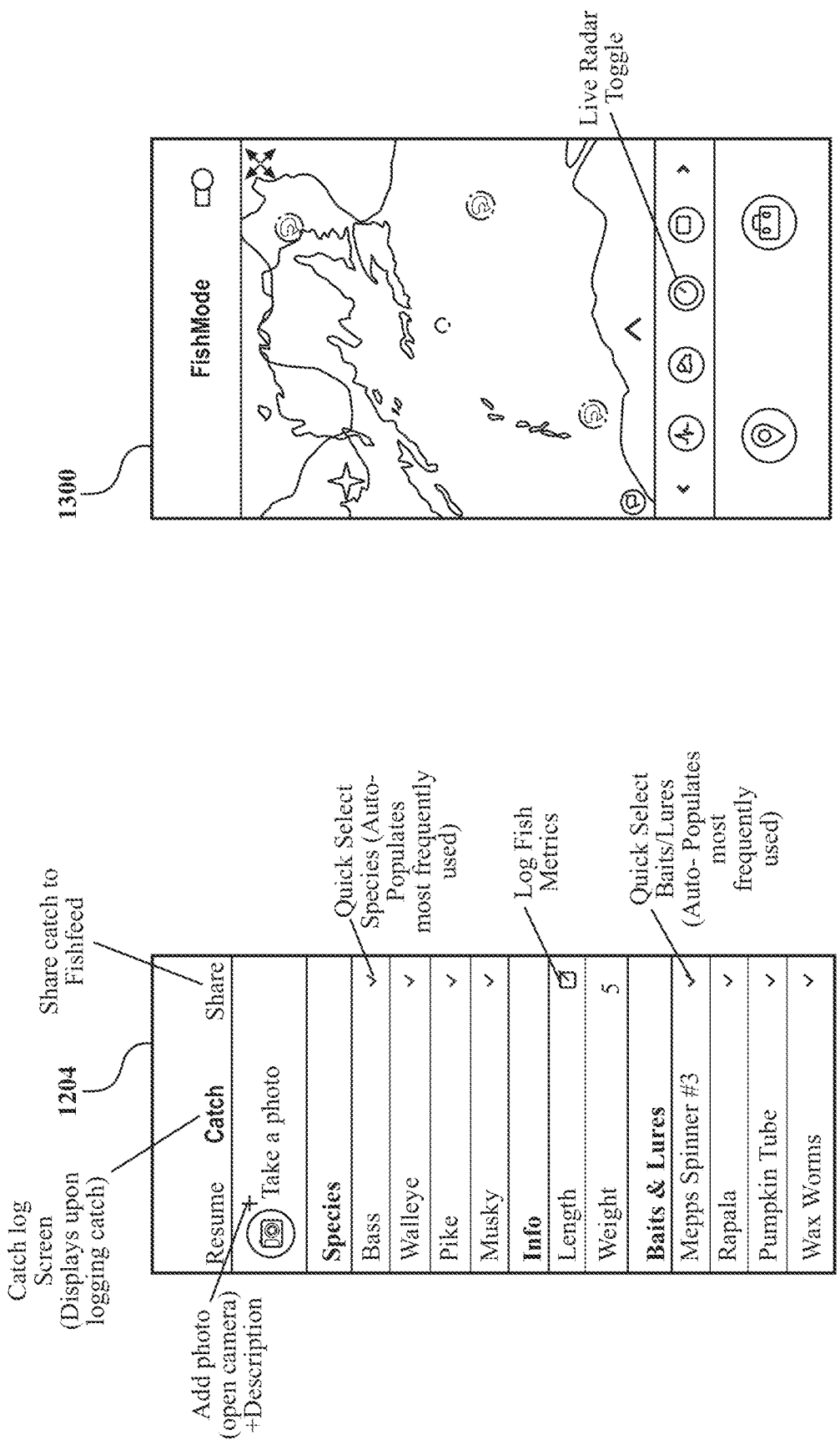

FIG. 15C

Edit Rods Screen (Displays upon selecting EDIT under RODS) Also Accessible in Profile where pre-set Virtual Tackle Box is set by user Save Changes Add photo of Rod (open camera) + Description Favorite Rod Edit Rod Setting

1506

| Resume | Rods | Save |
|---|---|---|

+ Add/Take a photo       ★

Edit
- ☑ Name — St. Croix
- ☑ Series — Mojo Bass
- ☑ Length — 6ft 8in
- ☑ Power — Medium
- ☑ Line Weight Keyboard: Q W E R T Y U I O P / A S D F G H J K L ⌫ / 123 🌐 Z X C V B N M / space Search

Fish Mode | Tackle Box | Edit

Rods | Lures | Bait | Files

Spinning
| St. Croix | 65% |
| Ugly Stick | 54% |
| Browning Air | 48% |
| Abu Garcia Veritas 2.0 | 30% |

Quick Select from pre-set options

Casting
| Daiwa Tatula | 28% |
| Browning SilaFlex | 22% |

Fly
| Orvis Clearwater | |
| Fenwick | |

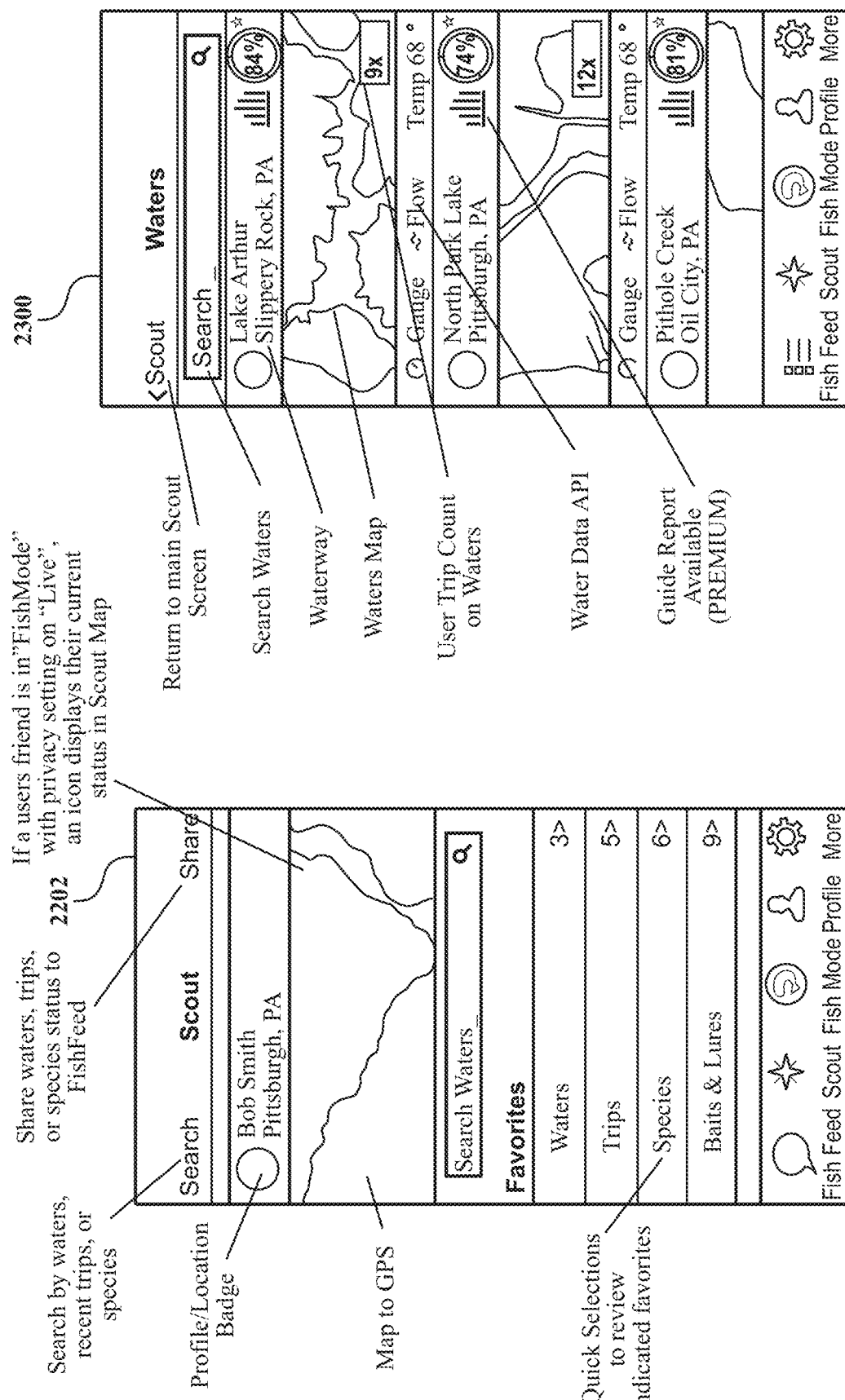

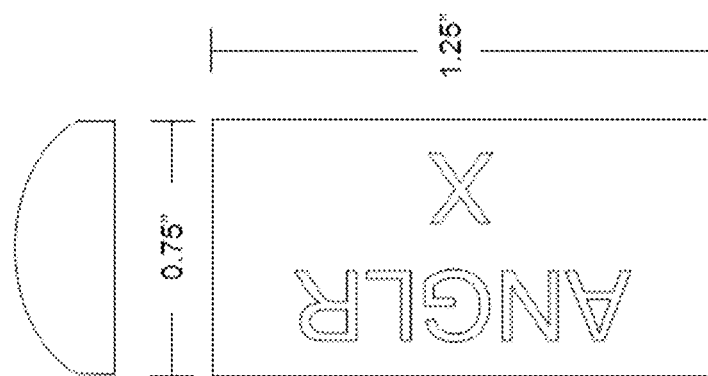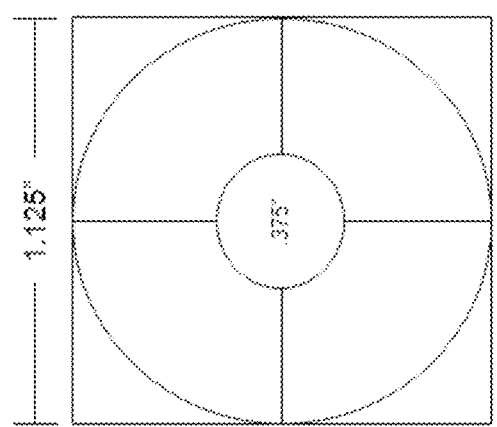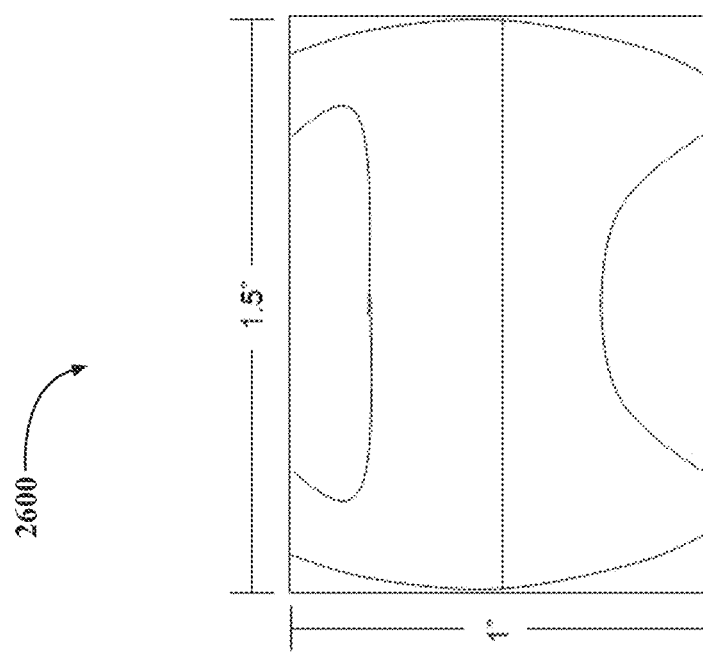
FIG. 26

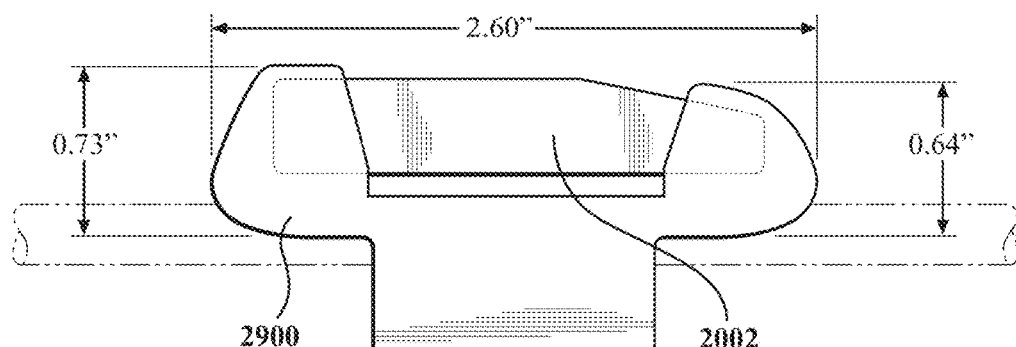
FIG. 28A
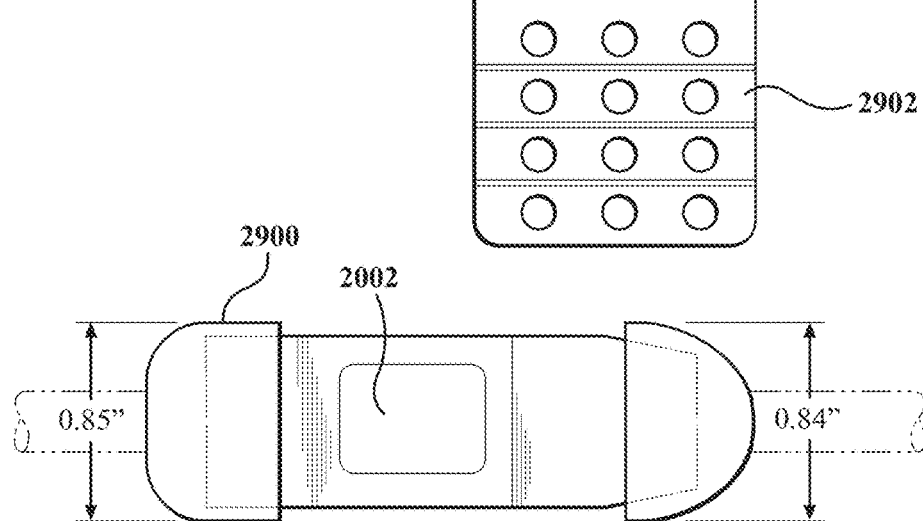
FIG. 28B
FIG. 28D
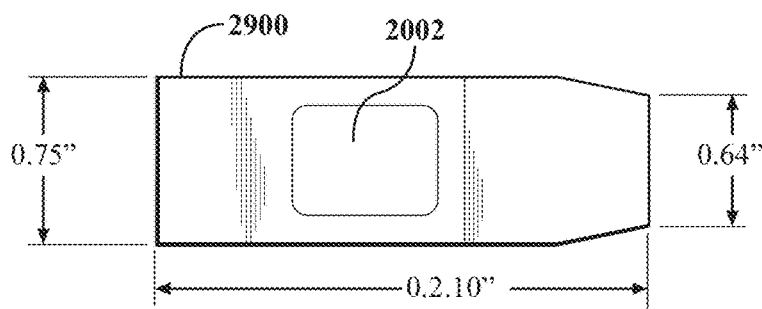
FIG. 28C

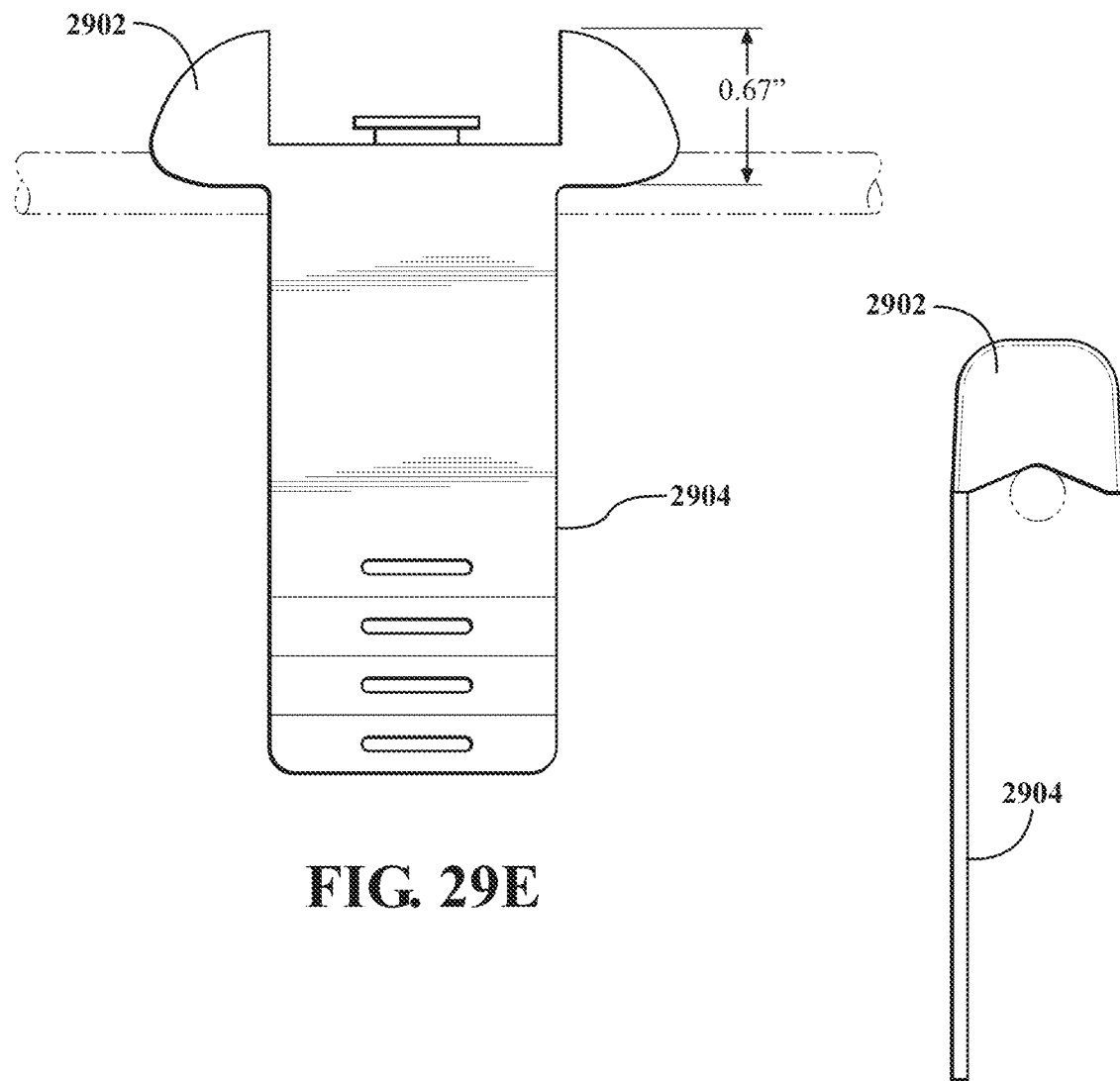
FIG. 29E
FIG. 29G
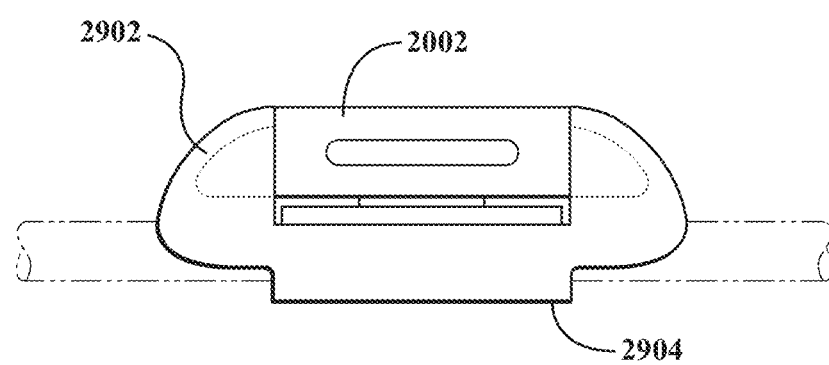
FIG. 29F

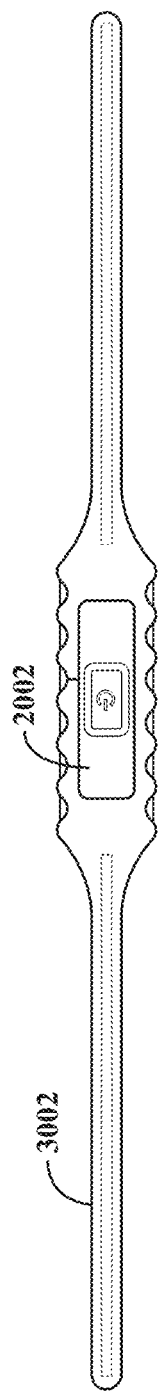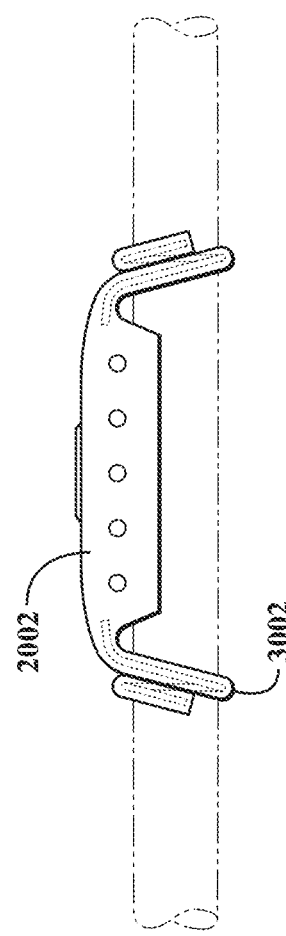
FIG. 30A
FIG. 30B

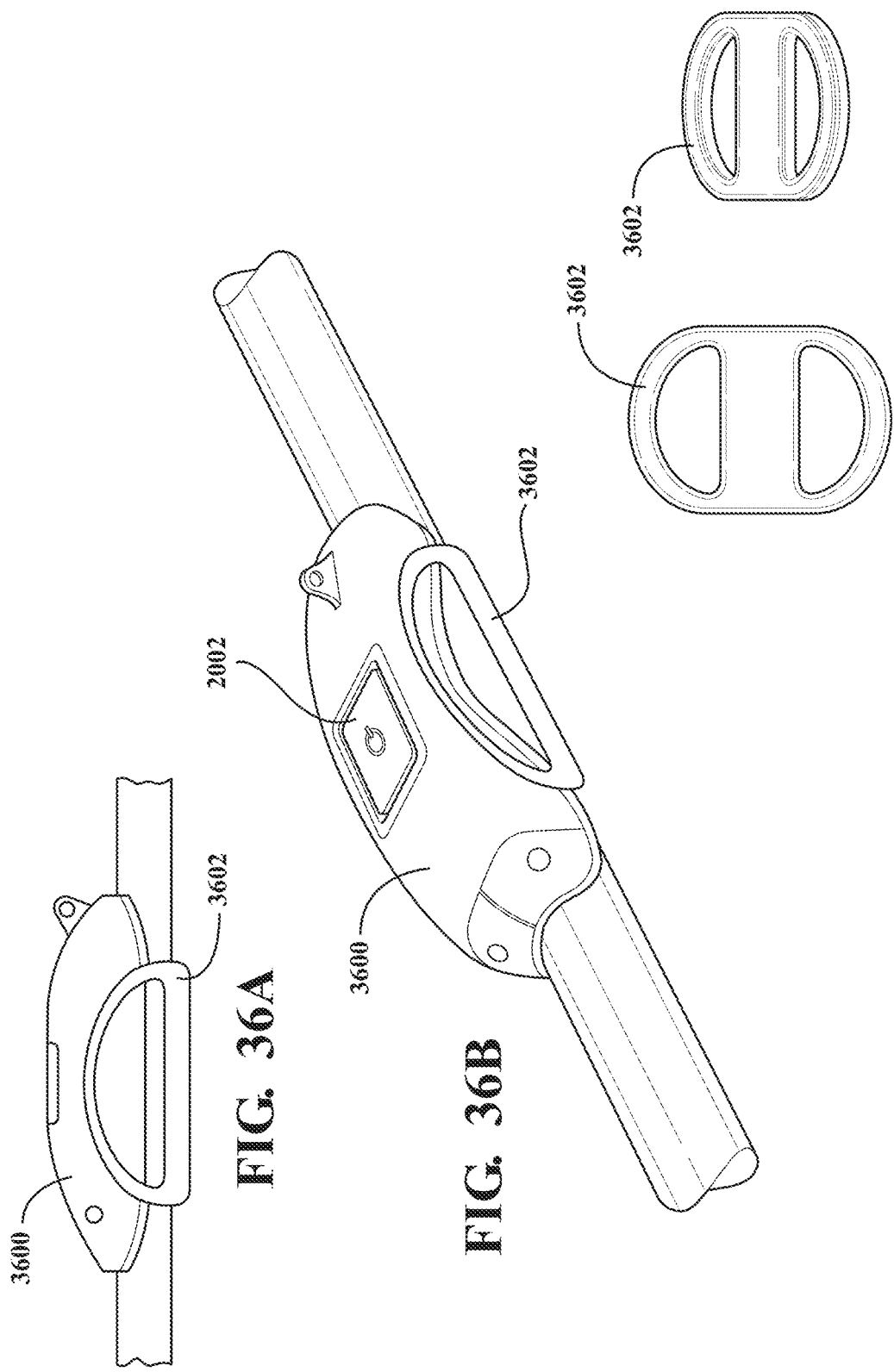

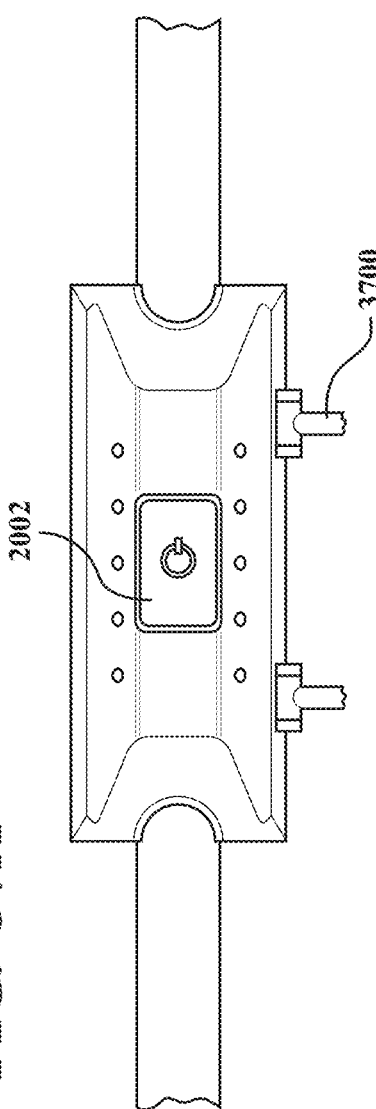
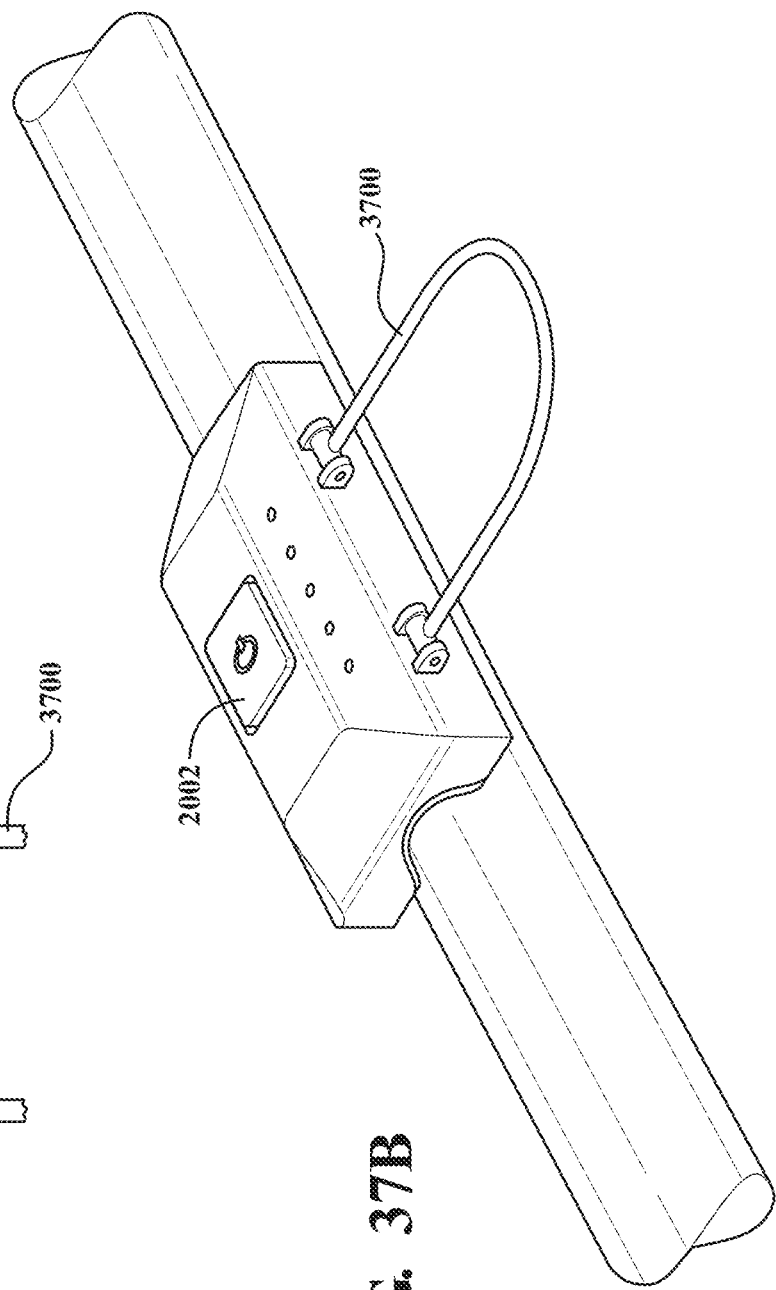
FIG. 37A
FIG. 37B

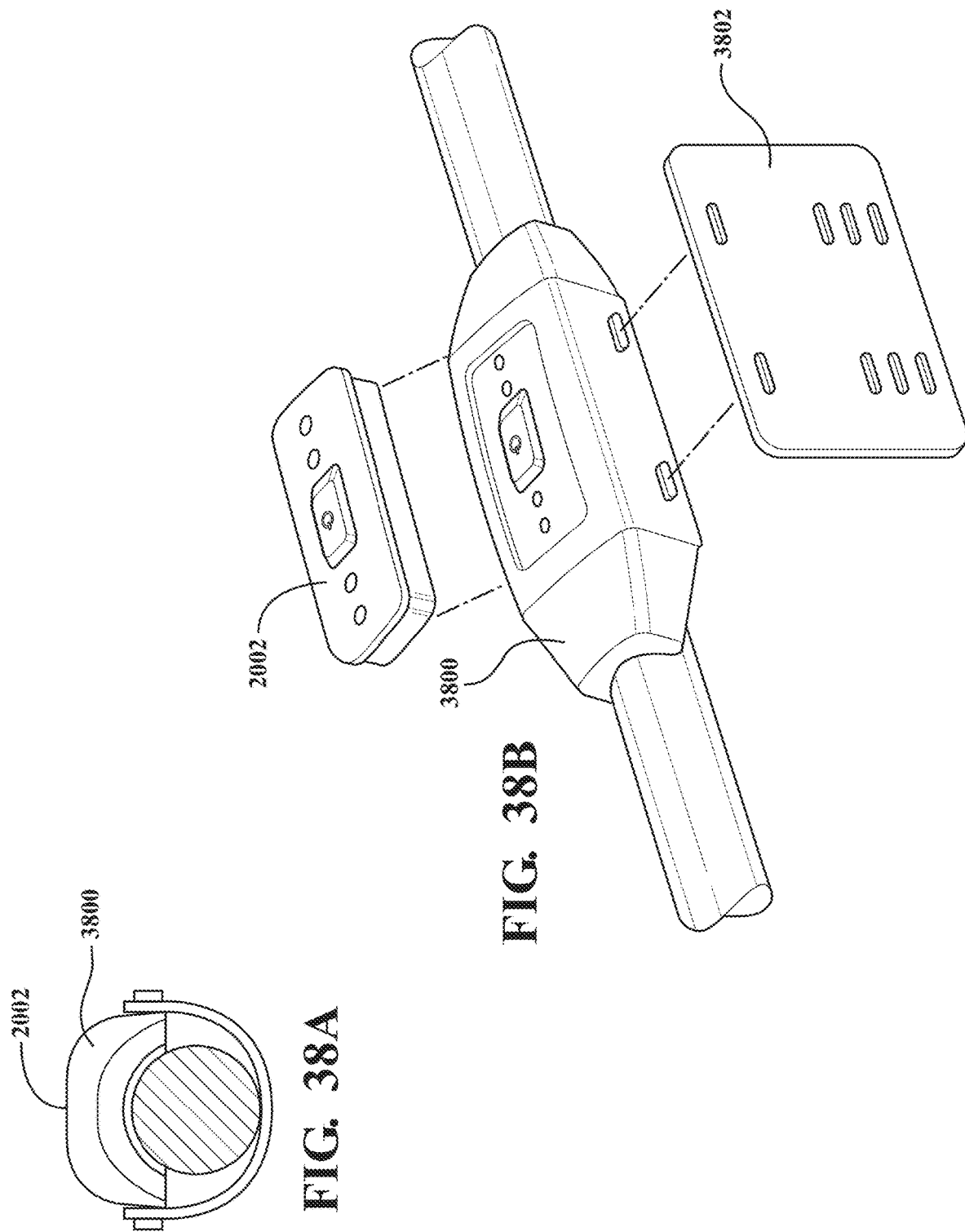

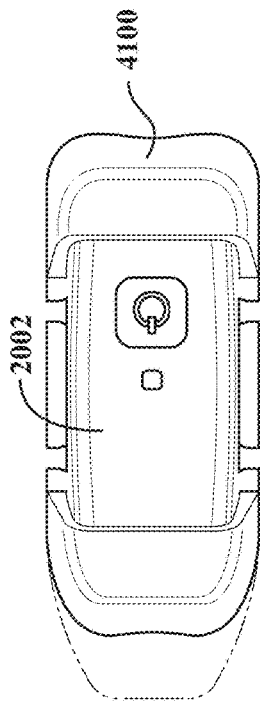
FIG. 41A
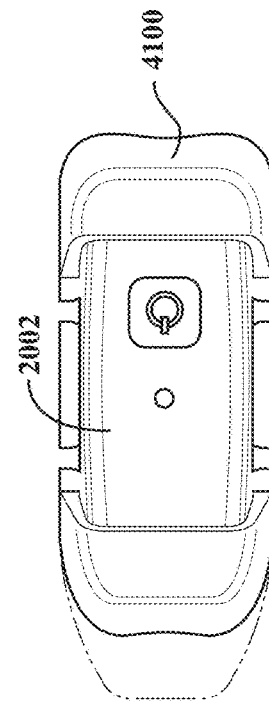
FIG. 41C
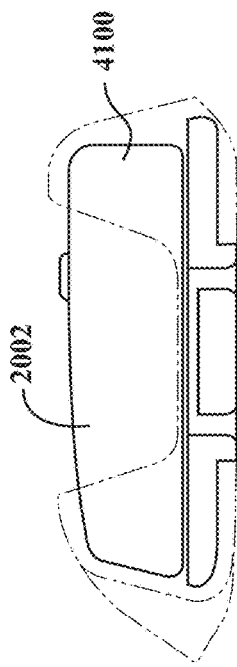
FIG. 41E
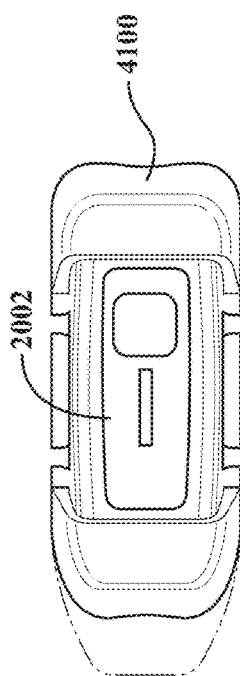
FIG. 41B
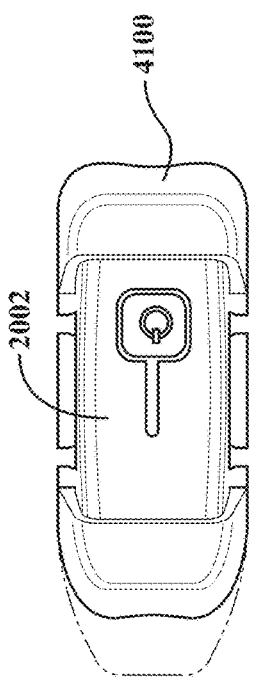
FIG. 41D
FIG. 41F

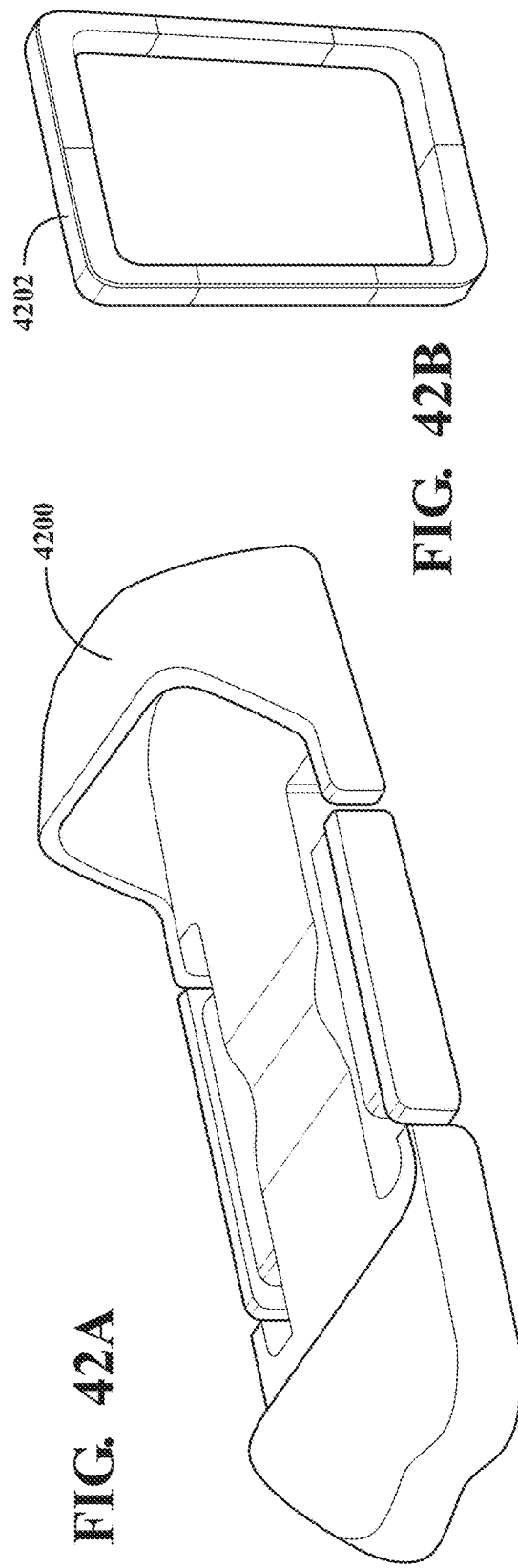
FIG. 42A
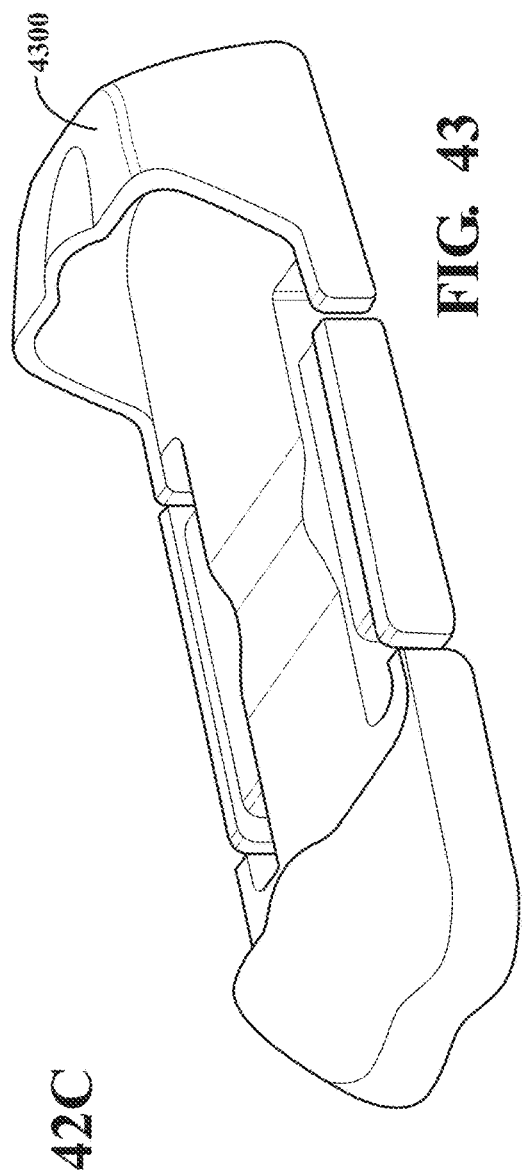
FIG. 42B
FIG. 43
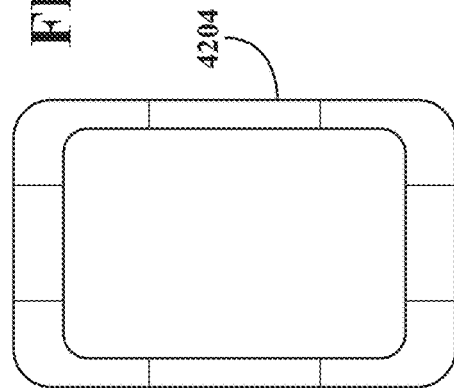
FIG. 42C

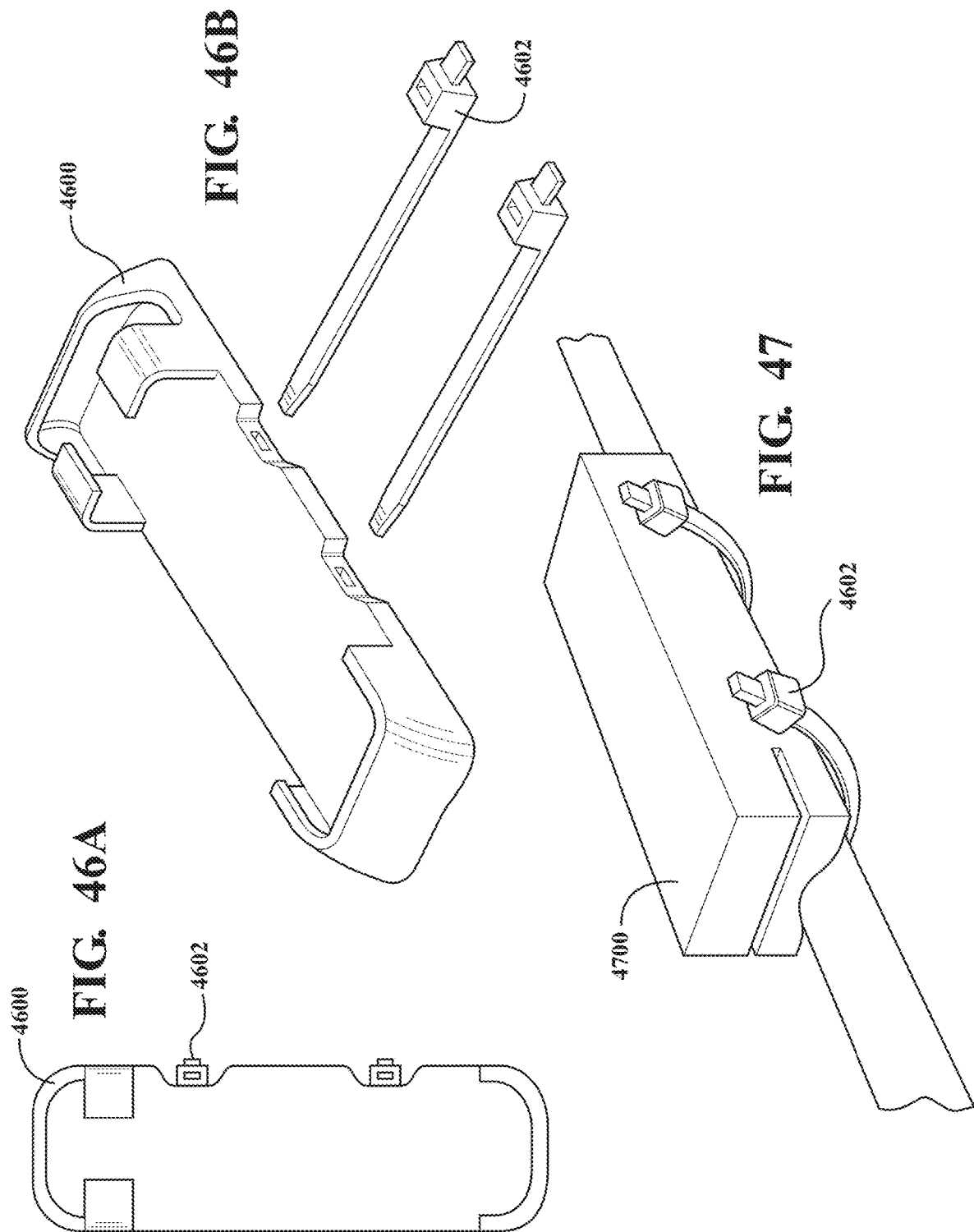

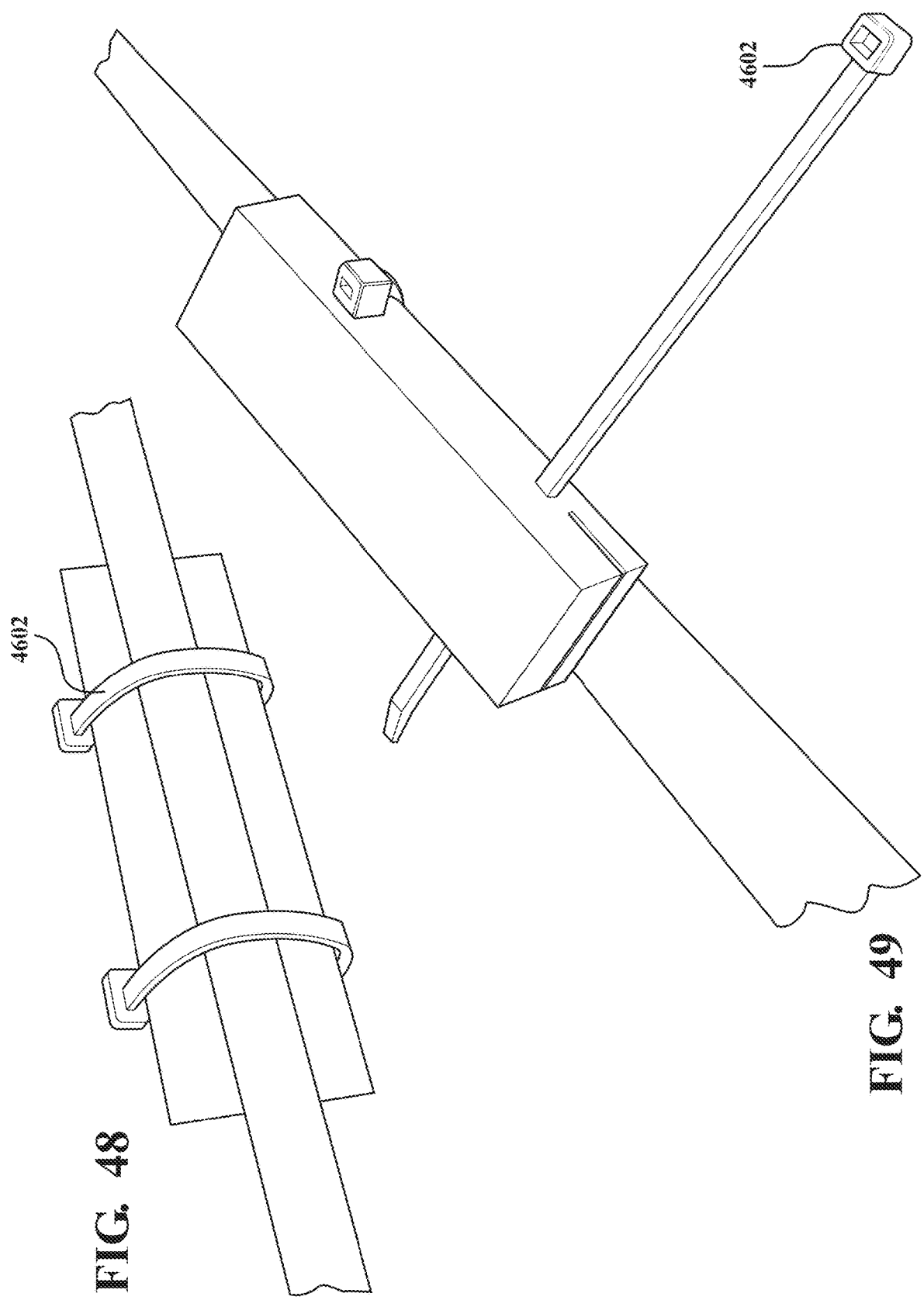

Power Modes Block Diagram

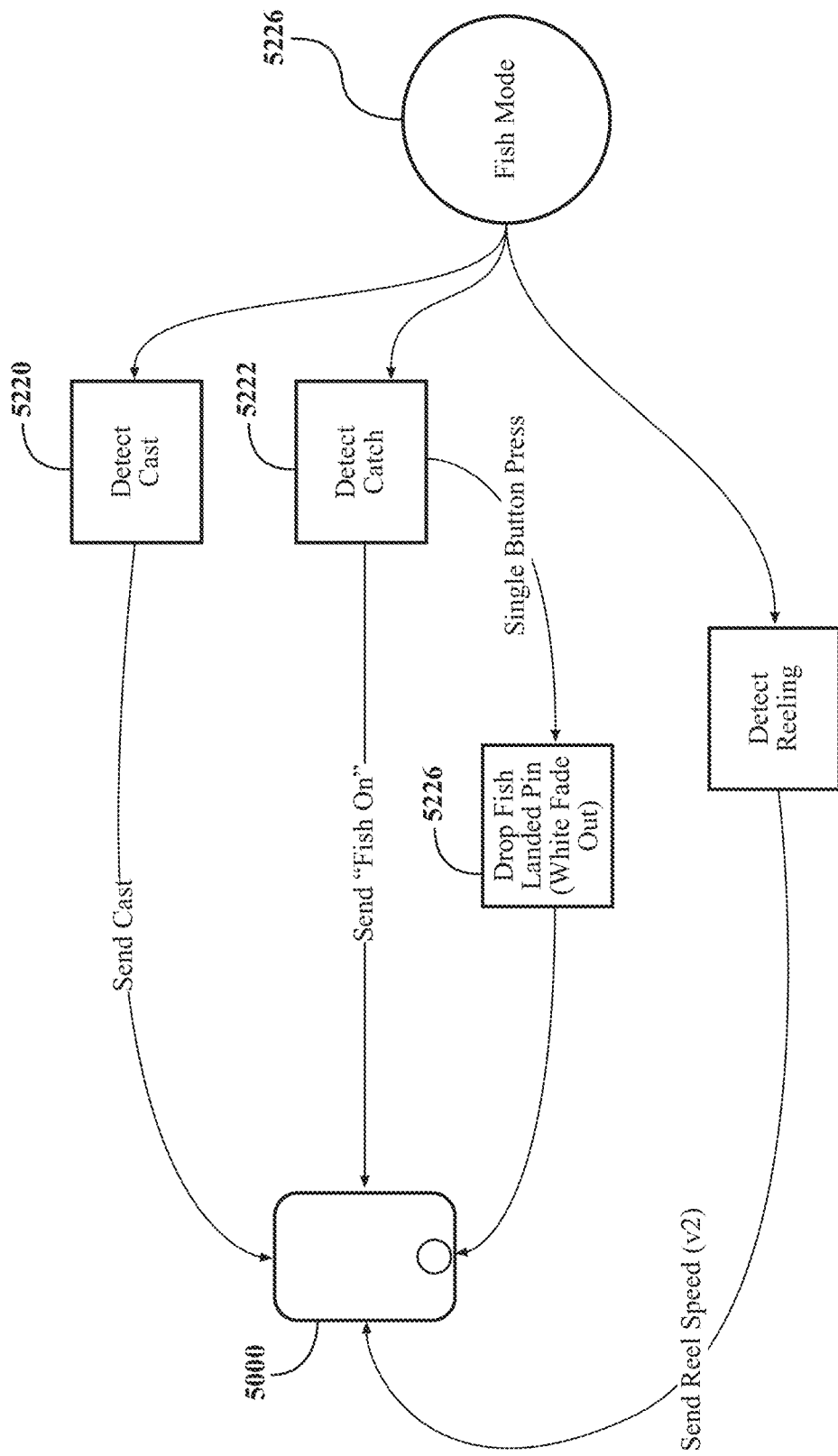
FIG. 53B UX Block Diagram

ON-LINE MULTIPLAYER GAMING SYSTEM FOR REAL-WORLD ANGLING EVENTS

CLAIM TO PRIORITY

This application is a bypass continuation of International Application PCT/US2016/068035, filed Dec. 21, 2016.

International Application PCT/US2016/068035 claims the benefit of the following Unites States Provisional Applications:

U.S. Patent Application Ser. No. 62/270,383, filed Dec. 21, 2015, U.S. Patent Application Ser. No. 62/308,065, filed Mar. 14, 2016, and U.S. Patent Application Ser. No. 62/416,124, filed Nov. 1, 2016.

All of the above-mentioned patent applications and/or patents are hereby incorporated by reference in their entirety as if fully set forth herein.

FIELD OF THE INVENTION

The disclosure generally relates to methods and systems for measuring, inferring, recording, storing and sharing experiential and environmental data related to a sporting good and/or event, such as angling.

BACKGROUND OF THE INVENTION

Current wearable devices, such as fitness devices, often consist of sensors for monitoring activities and health states, for example, the number of steps taken by a person, heart rate, and the like. The existing devices are typically devoted to measuring human health states, as opposed to developing an understanding of events that are experienced via sporting equipment, such as "fish caught". Devices that do measure data related to a sporting good typically are limited to simple parameters and do not contain the intelligence required to make meaningful conclusion about the sporting activity or meaningful conclusions that could enhance the sporting experience. Therefore, a need exists for improved methods and systems for measuring, inferring, recording, storing and sharing data relating to a sporting good, activities occurring on a sporting good, and environmental data from the vicinity in which a sporting good is used, all of which can be used to inform and enhance the sporting experience.

SUMMARY

Provided herein are methods and systems for a recreation monitoring platform. The recreation monitoring platform provides methods and systems for detecting, recording, transmitting, storing, analyzing, predicting and/or presenting data related to sporting events and actions and environmental conditions associated with a sporting event. A sporting event sensing device may be affixed to, and/or associated with, a sporting good. The sensing device, or plurality of sensing devices may be further associated with the recreation monitoring platform. The recreation monitoring platform may communicate with a plurality of sensing devices, including but not limited to receiving and sending data, data summaries, analytics, or some other type of information. The recreation monitoring platform may be further associated with, and in communication with a computing environment, such as a distributed computing environment, and mobile devices utilizing cloud-based servers, and remote databases. A sporting good may include, but is not limited to, a fishing rod, bow, crossbow, arrow, spear, gun, golf club, tennis racket, or some other type of sporting good. In embodiments, the sensing device may comprise, contain, or be in communication with, sensors that may be internal to the sensing device, affixed to the sensing device, and/or external to the sensing device. Sensors may be adapted to monitor, detect, record, generate, compute, store, and send data associated with the use of a sporting good and/or the environment in proximity to the sporting good, or the environment in which use of the sporting good is anticipated. Sensors may include, but are not limited to, motion sensors, optical sensors, sound sensors, piezo-electric sensors, strain or flex sensors, magnetometers, gyros, accelerometers, GPS, still cameras, video cameras, infrared cameras, and the like. With more particular reference to sensors, these sensors are external to the sensing device and include environmental sensors that may generate data indicative of an environmental parameter in proximity to the sensing device or an environmental parameter of a location where a sensing device is anticipated to be used, such as in the case of the sport of angling, the conditions of a body of water. Environmental sensors may include, but are not limited to, UV sensors, thermometers, barometric pressure sensors, conductivity sensors, pH sensors, and water gauges. Embodiments related to certain sports will be described below along with descriptions of the relevant sporting events to be detected and/or identified, sensors, and any other information or components related to those embodiments. The recreation monitoring platform may include, but is not limited to, an angling apparatus to identify angling events, the apparatus comprising a fishing rod and a reel adapted to be secured to the fishing rod, an angling event sensing device adapted to be secured to the fishing rod and comprising at least one sensor to generate data indicative of a parameter of the rod or reel when the rod or reel is in use, and at least one processor in communication with the angling event sensing device programmed to identify an angling event based on the data indicative of a parameter of the rod or reel.

In embodiments, the at least one processor may be remotely located from the angling event sensing device.

In embodiments, the identified angling event may be at least one of a strike of a fish, a strike of a certain species of fish, a cast, drag, stripping, bale click, initiation of a cast, flight time for lure, snag, fish bump, lure position, line position, retrieve, or flight time.

In embodiments, the angling event sensing device may comprise an output facility. The output facility may be a display, a speaker or some other facility. The output facility may be in communication with the angling event sensing device.

In embodiments, the processor may be further programmed to cause the identified angling event to be communicated to a user via the output facility, for example, to a user's mobile device.

In embodiments, a second sensor may be mounted to the rod, for example at the tip or base of the rod. Sensors may detect a strike of a fish, a strike of a certain species of fish, a cast, drag, stripping, bale click, initiation of a cast, flight time for lure, snag, fish bump, lure position, line position, retrieve, or flight time.

In embodiments, at least one processor may be in communication with at least one remote sensing device. A remote sensing device may generate data indicative of an environmental parameter in proximity to the angling event sensing device.

In embodiments, the processor may be further programmed to identify the angling event based on the data related to an environmental parameter. The processor may obtain data related to an environmental parameter in proximity to the angling event sensing device and/or be further programmed to identify the angling event based on the data related to an environmental parameter.

In embodiments, the recreation monitoring platform may include a system for recording and reporting angling-related information, the system comprising: a fishing rod, a reel adapted to be secured to the fishing rod, and an angling event sensing device adapted to be secured to the fishing rod and comprising at least one sensor to generate data indicative of a parameter of the rod or reel when the rod or reel is in use.

At least one processor may be in communication with the angling event sensing device, the at least one processor programmed to identify an angling event based on the data indicative of a parameter of the rod or reel, and a remote sensor may be in communication with the at least one processor, the remote sensor generating data indicative of an environmental parameter in proximity to the angling event sensing device. At least one database may be in communication with the at least one processor.

In embodiments, the at least one processor may be further programmed to time stamp an angling event identified by the at least one processor. The processor may be further programmed to time stamp the data indicative of an environmental parameter in proximity to the angling event sensing device. The processor may be further programmed to cause the time-stamped angling event and the time-stamped data indicative of an environmental parameter in the database. The processor may be further programmed to associate the time-stamped angling event and the time-stamped data indicative of an environmental parameter. The processor may be further programmed to cause the associated time-stamped data in the database.

In embodiments, the angling sensing device may be in communication with a location detection device generating data indicative of the location of the angling sensing device, and at least one processor may be further programmed to associate the time-stamped angling event and the time-stamped data indicative of an environmental parameter with the data indicative of the location of the angling sensing device.

In embodiments, the processor may be further programmed to generate a recommendation, including, but not limited to (i) location to fish, (ii) fish species to target, (iii) fishing lure to use, or (iv) bait to use.

In embodiments, an input device may be in communication with the at least one processor, the input device or the at least one processor programmed to enable the user to input data related to angling events. The report may further comprise characteristics or specifications of the rod or reel. The processor may be further programmed to automatically generate a report comprising identified angling events, corresponding environmental conditions, and inputted data related to angling events. The input data related to angling events may comprise one of a lure, bait, line property. The input data related to angling events may comprise one of a caught fish species, a caught fish size, a number of caught fish.

In embodiments, the processor may be further programmed to automatically generate a report comprising identified angling events and corresponding environmental conditions.

In embodiments, the recreation monitoring platform may include a system for recording and reporting angling-related information, the system comprising: a fishing rod and reel adapted to be secured to the fishing rod, an angling event sensing device adapted to be secured to the fishing rod and comprising at least one sensor to generate data indicative of a parameter of the rod or reel when the rod or reel is in use, at least one processor in communication with the angling event sensing device, the at least one processor programmed to identify an angling event based on the data indicative of a parameter of the rod or reel, a location detection device generating data indicative of the location of the angling event sensing device, a remote sensor in communication with the at least one processor, the remote sensor generating data indicative of an environmental parameter in proximity to the angling event sensing device, and at least one database in communication with the at least one processor and with a plurality of other angling event sensing devices, wherein the other of said angling event sensing devices each (i) are adapted to be secured to a corresponding fishing rod, (ii) comprise at least one sensor to generate data indicative of a parameter of the corresponding fishing rod or a reel affixed to the corresponding fishing rod, (iii) comprise at least one processor programmed to identify an angling event based on a parameter of the corresponding rod or reel attached to the corresponding rod, and (iv) are in communication with a location detection device generating data indicative of the corresponding angling event sensing device.

In embodiments, the processor may be programmed to generate a recommendation comprising one or more of (i) location to fish, (ii) fish species to target, (iii) fishing lure to use, or (iv) bait to use, the recommendation based on angling related events identified by the angling event sensing device and the plurality of angling event sensing devices and environmental parameters and locations associated with each identified angling event.

Particulars and variations of the above embodiments along with other embodiments will be described below.

BRIEF DESCRIPTION OF THE DRAWINGS

The accompanying figures and the detailed description below are incorporated in and form part of the specification, serving to further illustrate various embodiments and to explain various principles and advantages in accordance with the systems and methods disclosed herein.

FIGS. 8A through 8C present example embodiments of casting events and related measures and outcomes.

FIG. 8D presents example cast events and related data and methods.

FIGS. 10A through 10C depict login screens of the recreation monitoring platform presented to a mobile device.

FIGS. 12A through 12C depict sample embodiments of the user interface of the recreation monitoring platform presented during tracking a fishing trip.

FIGS. 13A and 13B depict a radar screen of the recreation monitoring platform.

FIGS. 14A and 14B depict a statistical summary screen of the recreation monitoring platform.

FIGS. 15A through 15C depict a virtual tackle box screen of the recreation monitoring platform.

FIG. 22 depicts a search functionality of the recreation monitoring platform.

FIGS. 23A and 23B depict water body summary features of the recreation monitoring platform.

FIG. 26 depicts dimensions of a sample embodiment of an angling event sensing device.

FIG. 28A depicts a side view of a sample configuration of an embodiment of an angling event sensing device, associated mount and band with sample measurements.

FIG. 28B depicts a top view of a sample configuration of an embodiment of an angling event sensing device and associated mount with sample measurements.

FIG. 28C depicts a top view of an embodiment of an angling event sensing device with sample measurements.

FIG. 28D depicts a side view of an embodiment of angling event sensing device with sample measurements.

FIG. 29E depicts a side view of an embodiment of a mount and band for an angling event sensing device with sample measurements.

FIG. 29F depicts a side view of an embodiment of a mount and angling event sensing device.

FIG. 29G depicts an edge view of an embodiment of a mount and band for an angling event sensing device.

FIGS. 30A and 30B depict a top view and a side view of a worm mount configuration of an angling event sensing device.

FIG. 36A depicts a side view a fish tail configuration of an angling event sensing device.

FIG. 36B depicts a perspective view of a fish tail configuration of an angling event sensing device.

FIG. 36C depicts a top down view of mount attachment for a fish tail configuration of an angling event sensing device.

FIG. 36D depicts a perspective view of a mount attachment for a fish tail configuration of an angling event sensing device.

FIGS. 37A and 37B depict a top view and a perspective view of an integrated band configuration of an angling event sensing device.

FIGS. 38A and 38B depict a perspective edge view of a strap mount configuration of an angling event sensing device.

FIGS. 41A through 41E depict top views of different embodiments of lighting elements within an angling event sensing device.

FIG. 41F depicts a side view of an embodiment of an angling event sensing device and mount.

FIG. 42A depicts a mount and an o-ring slot for an angling event sensing device.

FIGS. 42B through 42C depict o-rings for an angling event sensing device.

FIG. 43 depicts finger tabs of an angling event sensing device for sensor insertion.

FIGS. 46A and 46B depict a zip-tie mount configuration of an angling event sensing device.

FIG. 47 depicts a perspective view and a partially exploded view of an embodiment of a zip-tie mount configuration of an angling event sensing device.

FIG. 48 depicts a zip-tie mount configuration of an angling event sensing device.

FIG. 49 depicts a zip-tie mount configuration of an angling event sensing device.

FIGS. 53A and 53B depict block diagrams of the processing associated with selected angling event sensing device functionalities.

DETAILED DESCRIPTION

Figure 1:
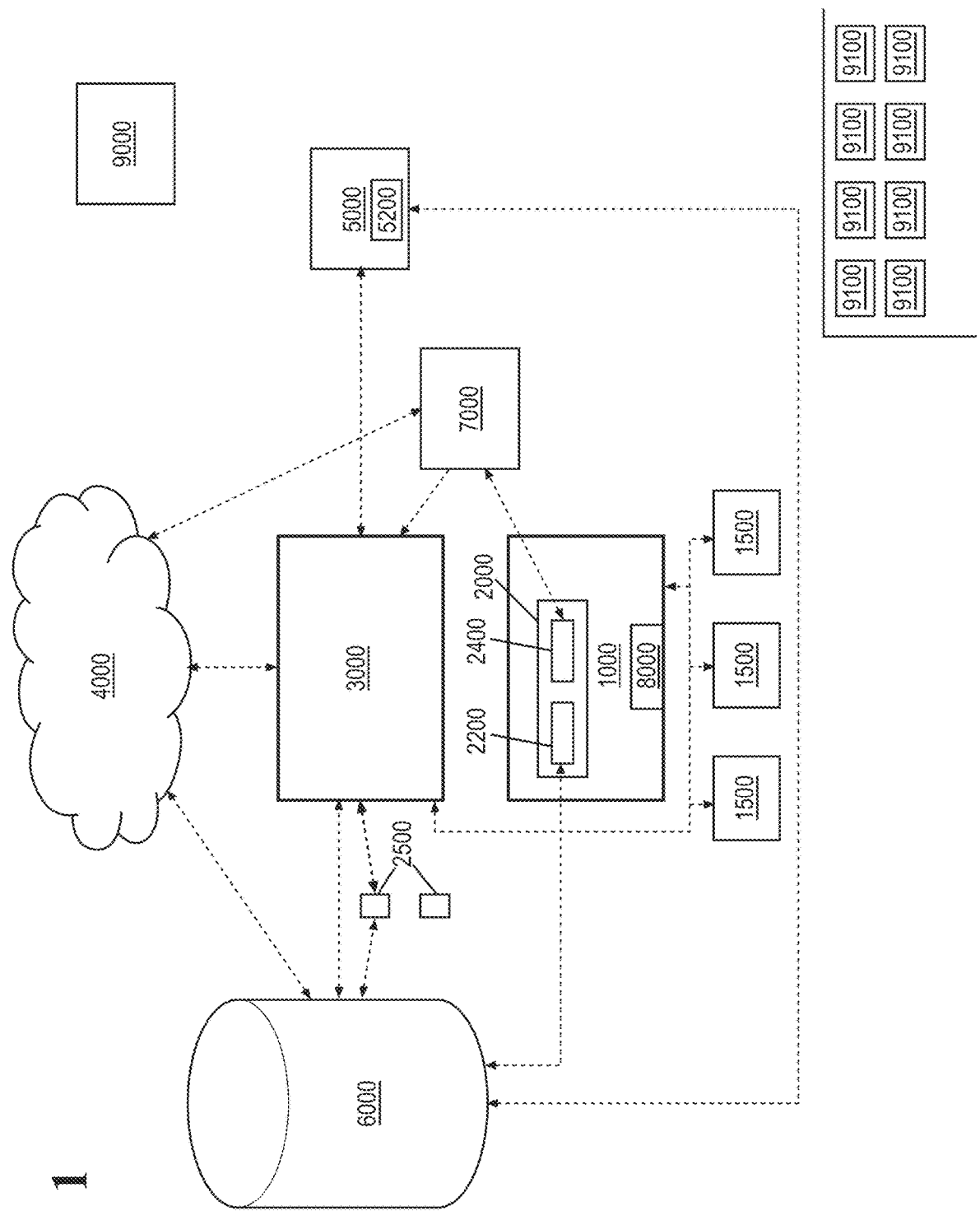
FIG. 1 illustrates a simplified view of the recreation monitoring platform.

In embodiments of the present disclosure, as depicted in FIG. 1, a sporting event sensing device (SESD) 2000 may be affixed to, and/or associated with, a sporting good 1000. The SESD 2000, and plurality of SESDs may be further associated with a recreation monitoring platform (RMP). The RMP may communicate with a plurality of SESDs, including but not limited to receiving and sending data, data summaries, analytics, or some other type of information. The RMP may be further associated with, and in communication with a computing environment, such as a distributed computing environment, as described herein, and mobile devices 5000 utilizing cloud-based servers 4000, as described herein, and remote databases 6000. "Sporting good" 1000 as the term is used herein may include, but is not limited to, a fishing rod, bow, crossbow, arrow, spear, gun, golf club, tennis racket, or some other type of sporting good. The SESD 2000 may also be referred to herein as a "sensing device," and in this manner, the name of the SESD 2000 may change throughout this disclosure. In embodiments, the SESD 2000 may comprise, contain, or be in communication with, sensors 2200 that may be internal to the SESD 2000, affixed to the SESD 2000, and/or external to the SESD 2000. Sensors 2200 and 2500 may be adapted to monitor, detect, record, generate, compute, store, and send data associated with the use of a sporting good and/or the environment in proximity to the sporting good, or the environment in which use of the sporting good is anticipated. Sensors 2200 and 2500 may include, but are not limited to, motion sensors, optical sensors, sound sensors, piezo-electric sensors, strain or flex sensors, magnetometers, gyros, accelerometers, GPS, still cameras, video cameras, infrared cameras, and the like. With more particular reference to sensors 2500, these sensors are external to the SESD 2000 and include environmental sensors that may generate data indicative of an environmental parameter in proximity to the SESD 2000 or an environmental parameter of a location where a SESD is anticipated to be used, such as in the case of the sport of angling, the conditions of a body of water. Environmental sensors 2500 may include, but are not limited to, UV sensors, thermometers, barometric pressure sensors, conductivity sensors, pH sensors, and water gauges. Embodiments related to certain sports will be described below along with descriptions of the relevant sporting events to be detected and/or identified, sensors, and any other information or components related to those embodiments. Embodiments of the system will use either sensors 2200, sensors 2500 external to an SESD 2000, or both, depending on the application.

"Sporting event" as used herein means an event, occurrence or condition related to the use of a sporting good 1000. The following description will also refer to a "parameter of" the sporting good or the SESD, which refers to any parameter that can be measured from, with, about, or otherwise in relation to the sporting good 1000, and in embodiments it will mean any parameter that can be measured from, with, about, or otherwise in relation to the sporting good 1000 while the sporting good is in use. Identification of specific sporting events with respect to specific sports will be discussed below, but as an example, a sporting event could be and "angling event" if the sport the user is participating in is angling. When referring to the detection identification of angling-related events, an angling related event could be the strike of a fish, the strike of a certain species of fish, the length (e.g., based on the number of reel revolutions) and or direction of a cast from a fishing rod, drag, different types of cast, mending the line, stripping, bale click, time of or initiation of cast, flight time for lure, snag, retrieve (distance or speed), flight time, fish caught, fish lost, fish released, or some other type of event.

Sporting events will be discussed more fully herein in relation to the embodiments for the applicable sport, though it is to be understood that a sporting event mentioned in relation to one sport may be an event in relation to another sport and the discussion of a sporting event in relation to a specific sport will not preclude that sporting event to be used in, or otherwise applicable to, embodiments related to other sports. Returning to the example of the SESD 2000 in an angling setting, the SESD 2000 may be referred to as an "angling event sensing device" 2002 or "AESD", and a sensor 2200 referred to as an "angling sensor" 2220, but note that AESD 2002 and SESD 2000 may be used interchangeably to describe an SESD 2000 in an angling application.

Referring to FIG. 1, accessories 1500 to a sporting good are shown, and may comprise other sporting goods, and or peripherals to a sporting good, used in conjunction with a sporting good 1000 in the performance of the chosen sport. Examples of other sporting goods and peripherals in the angling context may include, but are not, limited to, fishing nets, gaffs, fishing lures, weights, floatation devices, depth sensors, "fish-finders," or some other type of sporting good or peripheral device accessory. Sensors 2200, 2500 may be affixed or otherwise associated with accessories 1500 (though not shown in FIG. 1) and be in communication with other SESD's. For example, an accessory 1500 that is a flotation device, such as a bobber, comprises a sensor that is in communication with the processor 3000 of an SESD. Moreover, in embodiments, the accessory itself may comprise a processor (not shown) that is in communication with sensors within of affixed to the accessory, sensors 2200 in the SESD 2000, sensors 2500, or processor 3000 of the SESD.

The SESD 2000 may comprise, contain, or be in communication with, at least one processor, represented schematically in FIG. 1 as a single component 3000. The representation of the at least one processor as a single component is not meant to suggest that multiple processors performing the processing functionality described herein must be restricted to a single processor. For purposes of this disclosure, the at least one processor will be referred to simply as "processor", which is meant to encompass one or more processors. The processor 3000 may be in electronic communication (electronic communication is represented by dashed arrows in FIG. 1 with the SESD 2000, sensors 2200 and sensors 2500, and one or more of the accessories 1500.

In FIG. 1 all dotted two-way arrows indicate communication between or among components of the system. For readability of FIG. 1, not all communication pathways are shown. The absence of a dotted line between two components does not indicate the inability of the components to communicate with one another, or a lack of association. Thus, data exchanged in the embodiments described herein has a plurality of paths, both direct and indirect. Also, all references to "communicate" including any roots, nominalizations, and conjugations thereof are meant to encompass both two-way and one-way communication. The communication may be direct or indirect via an intermediate device, such as for example, a cloud server 4000 (described below).

In embodiments, the RMP may include a cloud server 4000, such as that within or associated with a distributed computing environment (also referred to herein as "cloud" or "cloud computing environment"). Cloud server 4000 may also be in electronic communication with processor 3000. In embodiments, cloud server 4000 may perform part of, or all of, the processing functionality described herein in connection with processor 3000. Therefore, even if a function is described herein as being performed by the at least one processor 3000 it should be understood that such function can be either fully or partially performed by cloud server 4000. In embodiments, cloud server 4000 is associated with a distributed computing architecture or hybrid cloud computing network or cloud computing environment and may include features of software as a service (SaaS), platform as a service (PaaS), and/or infrastructure as a service (IaaS). In embodiments, cloud server 4000 may also establish communications with other components of the system described herein, including sensors 2200, 2500, accessories 1500, mobile device 5000, sensor device 2000, applications 2400, 5200, location sensing device 7000, and database 6000.

In embodiments, a database 6000 may be associated with the RMP and may communicate with processor 3000, sensor device 2000, sensors 2200, 2500, mobile device 5000, and/or a location sensing device 7000. "Database" as the term is used herein may include, but is not limited to relational databases, operational databases, database warehouses, data marts, end user databases, distributed databases, or some other type of electronic data storage. Distributed databases, such as those that may be deployed within a cloud computing environment that is associated with the RMP, may allow for management of large amounts of structured, semi-structured, and unstructured data across multiple data center and cloud sites, and populated with data from a plurality of SESDs 2000, or third party data sources, for example parties unaffiliated with the RMP having environmental, commercial product, advertising, or other data types.

In embodiments, a mobile device 5000 may communicate with the components of the RMP, including processor 3000, sensing device 2000, sensors 2200, 2500, location sensing device 7000, cloud server 4000, accessories 1500, and database 6000. "Mobile device" as used herein may refer to a smart phone, smart watch, tablet, cellular phone, laptop, personal computer, networked computer, or some other type of mobile device. The mobile device may act as an input device for the user 9000 to input data into the RMP that may be used for the various functionalities described herein in more detail below. An application 5200 operating on a mobile device 5000, such as a smart phone or other device, as described herein, may communicate with the RMP and facilities associated with the RMP such as SESDs and/or sensors 2200, 2500, accessories 1500, etc. In an example, a mobile device 5000, such as a smart phone may operate an application 5200 that is capable of communicating with the RMP to identify a user account and SESD identifier that is associated with the user's account and a sporting good 1000, such as a SESD 2000 for use with the user's fishing rod. The application 5200 may send a request to the RMP for a current status of the SESD 2000, such as a current location. Upon receiving the request, the RMP may detect the current location (e.g., GPS coordinates) of the SESD and send a status update for display on the smart phone. Continuing the example, the SESD 2000 may also have an application 2400 capable of communicating with the RMP. This application 2400 may collect and store data prior to transmission to the RMP. For example, continuing the GPS location embodiment, the SESD application 2400 may have periodically collected GPS data according to predefined time intervals (e.g., hourly) and stored this information. Upon receiving the request from the RMP for location status, the SESD application 2400 may send not only the current status of the SESD 2000, but also the historical location data that was collected hourly. Such longitudinal information may then be processed by the RMP and displayed on the mobile device 5000, for example in the form of a graphic map that depicts the movement (or lack thereof) of the SESD 2000 over time.

In embodiments, a user's SESD 2000 and/or mobile device 5000 may be tracked by the RMP so that the RMP knows from global positioning system (GPS) coordinates where the user, user's sporting good and/or SESD 2000 are located. While described with reference to the use of GPS to determine a location, the present disclosure is drawn broadly to incorporate all means of determining an approximate location. For example, cell tower triangulation and associating predetermined location information with a Wi-Fi network (e.g., using IP address) are additional examples of methodologies that may be employed to determine the location of an SESD 2000 and/or mobile device 5000. In general, methodologies for determining a location may include network-based and handset-based technologies, SIM-based, Wi-Fi and hybrid systems. In accordance with various exemplary and non-limiting embodiments, data transmission protocols that may be employed as part of the platform may include, but are not limited to Long-term Evolution (LTE), 3G, 4G, 5G and successive generations of mobile telecommunications technology. A user and/or SESD 2000 may also be identified by a system identifier (ID), QR code, near field communication (NFC), Bluetooth, beacon technology or Android Beam.

In embodiments, the input and/or identified sporting events from a plurality of users 9100 may be utilized by the processor 3000, cloud server 4000, or both to perform functions described herein.

In embodiments, an SESD 2000 may comprise a camera 8000 that is capable of communicating with a processor 3000. Embodiments utilizing the camera will be discussed in more detail below.

Figure 2:
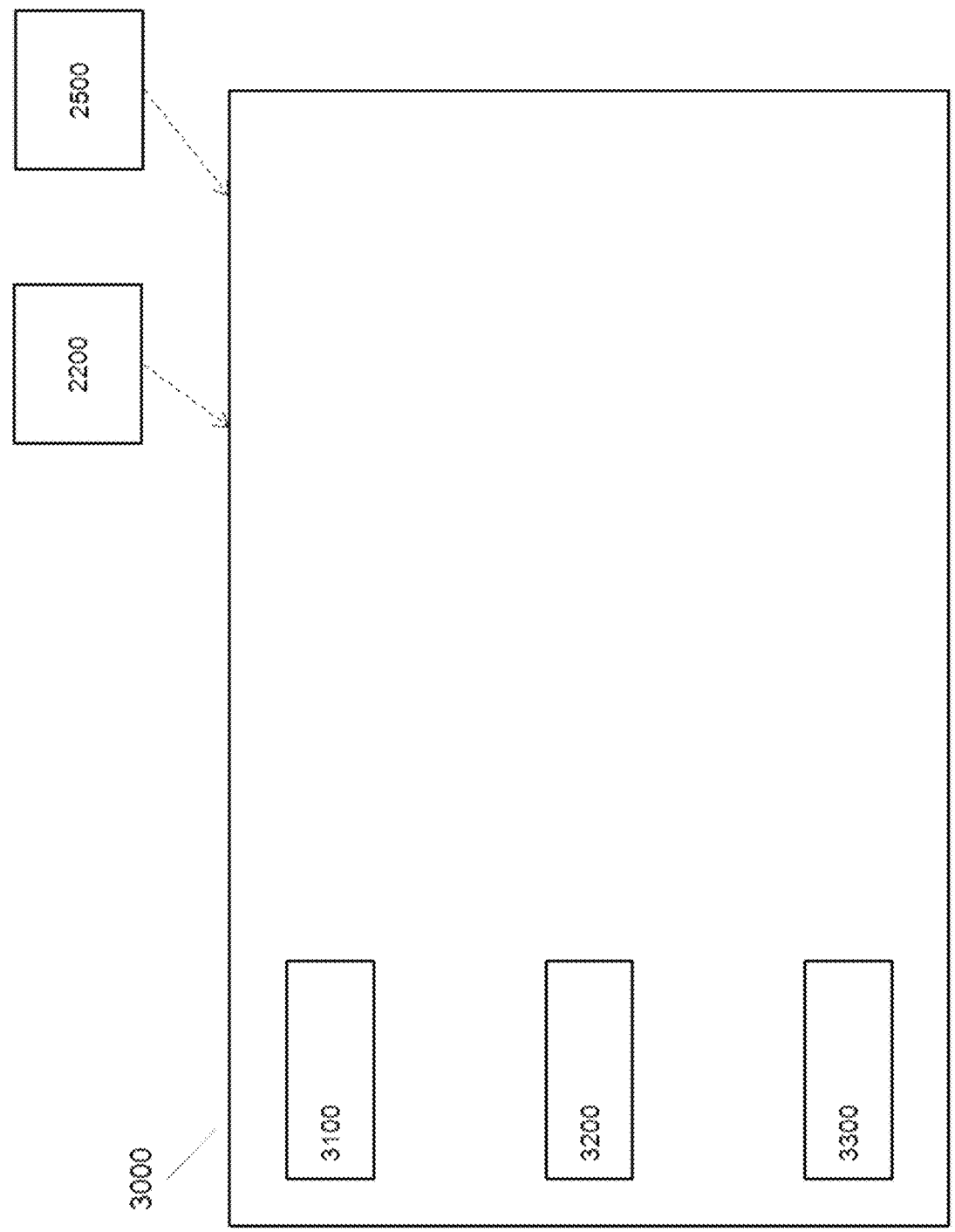
FIG. 2 diagrams the associations among sensors and processor of the recreation-monitoring platform.
Figure 3A:
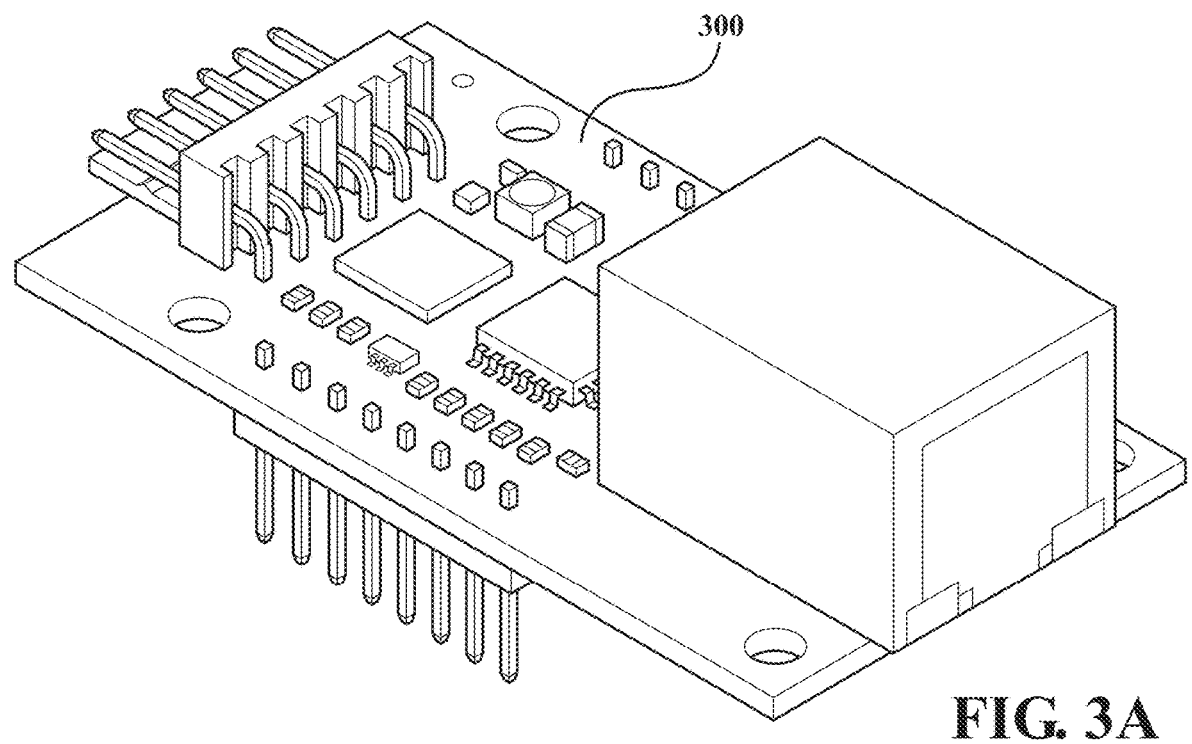
FIGS. 3A through 3D depict an example embodiment of a PC Board module that may be used as part of an angling event sensing device.
Figure 3B:
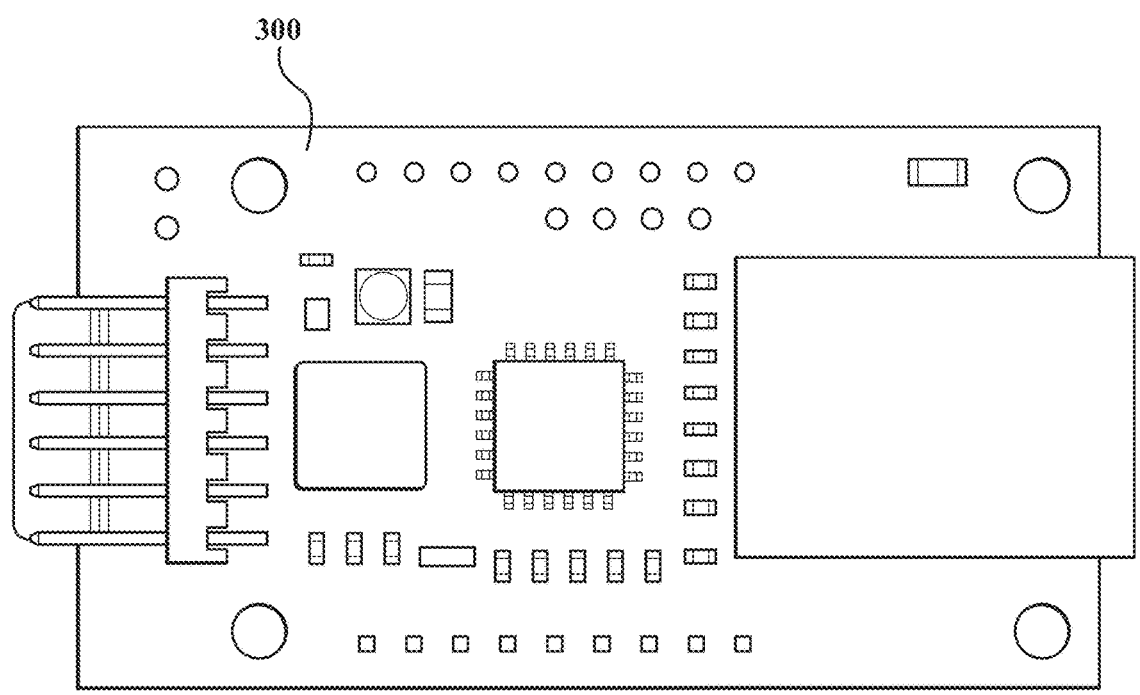
Figure 3C:
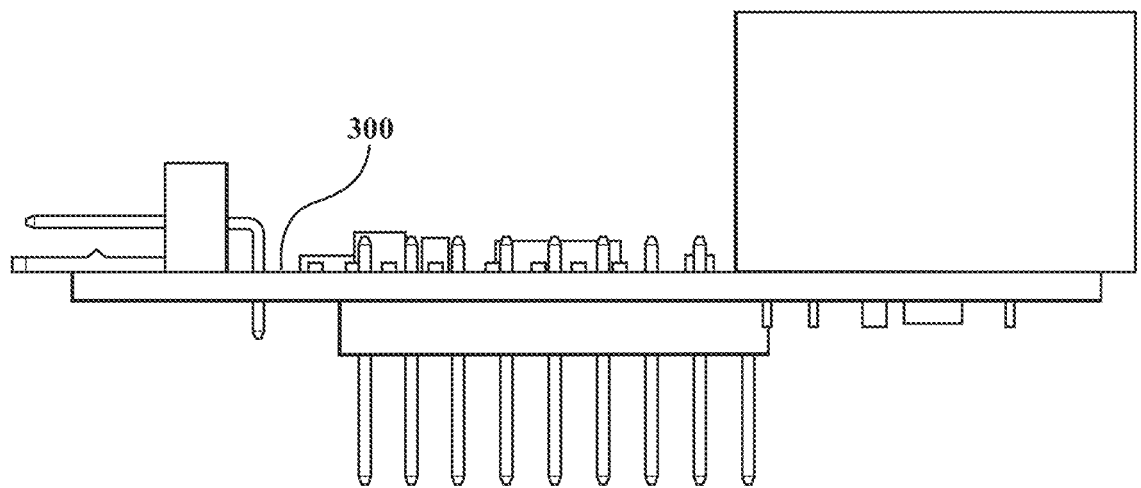
Figure 3D:
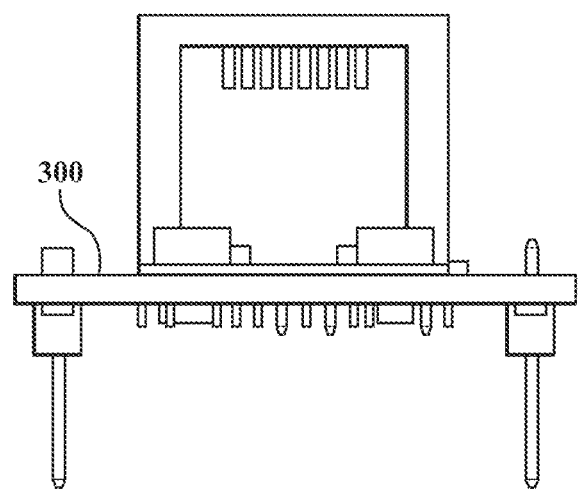

Referring to FIG. 2, in embodiments the at least one processor 3000 is configured to determine or identify sporting events 3100, to develop recommendations 3200, and to generate in the presentations 3300, each of which will be discussed in more detail below with reference to embodiments.

The identification of sporting events 3100 may involve the processor 3000 receiving data from sensors 2200, 2500 and/or receiving data originating from a user 9100 inputting data into the application 5200 operating on a mobile device 5000. The data received from sensors 2200, 2500 may be data indicative of a parameter of the sporting good 1000 during use. The processor may contain programming and/or algorithms able to distinguish or identify certain sporting events based on the data received from sensors 2200. Embodiments related to specific sports, which involve specific sporting goods 1000, will be discussed herein.

The processor 3000 may provide recommendations 3200 to participants in sporting events using the device. In an example, recommendations may be generated on the basis of one or more of sensor data from sensors 2200, 2500, data of other users (which will be more fully discussed below), environmental data obtained from third-party sources, and the data then input into the RMP (which will be more fully discussed below) (which in embodiments is via application 5200. A recommendation engine associated with the RMP may be able to assist users with selecting, for example, days, locations, lures, flies, baits, and/or equipment that are ideal for catching fish based on current conditions detected by sensors based on historical data relating to those conditions and the locations of interest. In another example, recommendations may be provided to a user regarding the types of tackle that, historically, and according to the data collected and analyzed by the system, have been successful in a given environmental condition and/or location.

In an example embodiment of an AESD 2002 that may be used as part of the RMP, an AESD 2002 may work in conjunction with a mobile device to enhance an angler's fishing experience, better log the number of casts, flight times, fish strikes, snags, fight times, reel times, or some other data. The AESD 2002 may communicate via Bluetooth LE 4.1 (and higher) protocol and be compatible with most Android, iOS (and Windows 10) devices. The AESD 2002 may consist of a Bosch six axis Accelerometer/gyro, Bosch 3 axis Magnetometer, three tri-colored LED indicators, a LI-Polymer battery, a microcontroller and an Inductive "QI" charging system and a switch. The AESD 2002 electronics package may be secured to a fishing rod via a rod adapter. As described herein, the AESD 2002 may monitor and/or identify angling events including fishing activity, cast, cast-time, reel-in, reel-in time, fish-strike, fish-on, snag, fight time, or some other data related to fishing, a fishing trip and/or environment in which fishing is taking place or is planned to take place. The AESD 2002 may be capable of two-way communication, such as that to and from an application 5200, and be interactively queried or configured via a mobile device. Interfaces include, but are not limited to, iOS and Android.

Continuing the example, in the inactive state an angling AESD 2002 may have all the peripherals off, and wait for a button push or a pairing or start fishing command from a mobile device to begin an active state. In the inactive state, the AESD 2002 may keep accurate time, for example by sending RF beacons (e.g., at 32 khz). When the AESD 2002 leaves the inactive state from the button press, it may start a time period that is defined as a discrete fishing trip. Trip information may be collected as an undocumented trip and stored for offload by a mobile device. The mobile device may start a new trip in "fish mode" which may terminate the undocumented fishing trip and offload all prior data.

In this example, the AESD 2002 may contain the following components:
6-Axis MEMS accelerometer
3 Axis MEMS Magnetometer
Combined Microcontroller and RF Transceiver
LI-POLYMER Battery
LED indicators
Switch
QI Recharging circuit
Temperature sensor or micro-controller
Test and control pads for factory test and diagnostics.
Communications may include:
Bluetooth LE protocol
Advertising rate: once per second
Advertises once per X minutes for 10 seconds when user is inactive
Advertising beacon contains product identification information
Connection rate: once per second for beacon notifications and sync, 30 ms for offload
Configurable with tackle and weather information
Configurable date, time and time zone
Mobile device can offload some or all records In embodiments, the AESD 2002 has a rechargeable battery. In embodiments, the AESD 2002 is waterproof and capable of floating in water. The AESD 2002 may flash LEDs when detecting floating motion in the water. The AESD 2002 may support mobile (BLE) offload.

FIGS. 3A through 3D depict an example embodiment of a PC Board module 300 that may be used as part of an AESD 2002. An example boot sequence may include, but is not limited to: Bootloader, runs first after a reset and provides the over-the-air reprogramming capability after a predetermined time the device will continue on to operational mode. This allows for flexible manufacturing where the operational code for the ASED may be programmed after functional test of the ASED. It may enter inactive state/shelf mode. The AESD when in active mode may be reprogrammed from the RMP.

The following are illustrative clauses demonstrating non-limiting embodiments of the disclosure described herein:

An apparatus to identify sporting events, the apparatus comprising:
a sporting event sensing device adapted to be secured to a sporting good and comprising at least one sensor to generate data indicative of a parameter of the sporting good when the sporting good is in use; and at least one processor in communication with the sporting event sensing device programmed to identify a sporting event based on the data indicative of a parameter of the sporting good.

The apparatus of the preceding clause, wherein the at least one processor is remotely located from the sporting event sensing device.

The apparatus of any of the preceding clauses, wherein the sensor is at least one of a motion sensor, optical sensor, sound sensor, piezo-electric sensor, strain or flex sensor, magnetometer, gyro, accelerometer, GPS, UV sensor, thermometer, barometric pressure sensor, conductivity sensor, or pH sensor.

The apparatus of any of the preceding clauses, wherein the sensor is a plurality of sensors.

The apparatus of any of the preceding clauses, wherein the sporting event sensing device comprises an output facility.

The apparatus of any of the preceding clauses, wherein the output facility is a display.

The apparatus of any of the preceding clauses, wherein the output facility is a speaker.

The apparatus of any of the preceding clauses, further comprising an output facility in communication with the sporting event sensing device.

The apparatus of any of the preceding clauses, wherein the output facility is a display.

The apparatus of any of the preceding clauses, wherein the output facility is a speaker.

The apparatus of any of the preceding clauses, wherein the processor is further programmed to cause the identified sporting event to be communicated to a user via the output facility.

The apparatus of any of the preceding clauses, wherein the processor is further programmed to cause the identified sporting event to be communicated to a mobile device.

The apparatus of any of the preceding clauses, further comprising a second sensor mounted to the sporting good.

The apparatus of any of the preceding clauses, wherein the second sensor is mounted within the sporting good.

The apparatus of any of the preceding clauses, wherein the second sensor is a motion sensor.

The apparatus of any of the preceding clauses, wherein the second sensor detects movement of the sporting good.

The apparatus of any of the preceding clauses, wherein the second sensor detects location of the sporting good.

The apparatus of any of the preceding clauses, wherein the at least one processor is in communication with at least one remote sensing device.

The apparatus of any of the preceding clauses, wherein the at least one remote sensing device generates data indicative of an environmental parameter in proximity to the sporting event sensing device.

The apparatus of any of the preceding clauses, wherein the at least one processor is further programmed to identify the angling event based on the data related to an environmental parameter.

The apparatus of any of the preceding clauses, wherein the at least one processor obtains data related to an environmental parameter in proximity to the sporting event sensing device.

The apparatus of any of the preceding clauses, wherein the at least one processor is further programmed to identify the sporting event based on the data related to an environmental parameter.

A system for recording and reporting sport-related information from sporting good and from user input, the system comprising:
a sporting event sensing device adapted to be secured to the sporting good and comprising at least one sensor to generate data indicative of a parameter of the sporting good when the sporting good is in use;
at least one processor in communication with the sporting event sensing device, the at least one processor programmed to identify a sporting event based on the data indicative of a parameter of the sporting good;
a remote sensor in communication with the at least one processor, the remote sensor generating data indicative of an environmental parameter in proximity to the sporting event sensing device; and
at least one database in communication with the at least one processor.

The system of the proceeding clause, wherein the at least one processor is further programmed to time stamp a sporting event identified by the at least one processor.

The system of any of the preceding clauses, wherein the at least one processor is further programmed to time stamp the data indicative of an environmental parameter in proximity to the sporting event sensing device.

The system of any of the preceding clauses, wherein the at least one processor is further programmed to cause the time-stamped sporting event and the time-stamped data indicative of an environmental parameter in the database.

The system of any of the preceding clauses, wherein the at least one processor is further programmed to associate the time-stamped sporting event and the time-stamped data indicative of an environmental parameter.

The system of any of the preceding clauses, wherein the at least one processor is further programmed to cause the associated time-stamped data to be stored in the database.

The system of any of the preceding clauses, wherein the sporting sensing device is in communication with a location detection device generating data indicative of the location of the sporting event sensing device.

The system of any of the preceding clauses, wherein the at least one processor is further programmed to associate the time-stamped sporting event and the time-stamped data indicative of an environmental parameter with the data indicative of the location of the sporting event sensing device.

The system of any of the preceding clauses, wherein the at least one processor is further programmed to generate a recommendation.

The system of any of the preceding clauses, wherein the recommendation is one of (i) sporting equipment condition, (ii) sporting equipment suggested use, or (iii) recommended sporting equipment change.

The system of any of the preceding clauses, further comprising an input device in communication with the at least one processor, the input device or the at least one processor programmed to enable the user to input data related to sporting events.

The system of any of the preceding clauses, wherein the at least one processor is further programmed to automatically generate a report comprising identified sporting events, corresponding environmental conditions, and inputted data related to sporting events.

The system of any of the preceding clauses, wherein the input data related to sporting events comprises a sporting equipment property.

The system of any of the preceding clauses, wherein the input data related to sporting events comprises one of a type, or duration of sporting equipment usage.

The system of any of the preceding clauses, wherein the report further comprises characteristics or specifications of the sporting good.

The system of any of the preceding clauses, wherein the at least one processor is further programmed to automatically generate a report comprising identified sporting events and corresponding environmental conditions.

The system of any of the preceding clauses, wherein the report further comprises characteristics or specifications of the sporting good.

The system of any of the preceding clauses, further comprising an output facility in communication with the at least one processor.

The system of any of the preceding clauses, wherein the at least one processor is further programmed to cause the output facility to communicate the report to the user.

A system to generate sporting event recommendations comprising:

a. a sporting event sensing device adapted to be mounted to a sporting good having at least one sensor to generate parameters indicative of the sporting good;
b. a processor unit; and
c. a mobile device running an application in communication with the sporting event sensing device in communication with the processing unit or the at least one sensor,
wherein the processor or the application is operable to determine at least one sporting event from data received from the at least one sensor Embodiments related to the sport of angling will now be described. While aspects of the angling related embodiments may be described in the context of angling, certain aspects and functionalities may also apply to other sporting events and sporting goods as well, and the description of an aspect and/or functionality in the context of angling is not meant (unless otherwise expressly indicated or apparent) to limit applications of such aspects to angling only and thus may apply to other sporting events or sporting goods.

Figure 4:
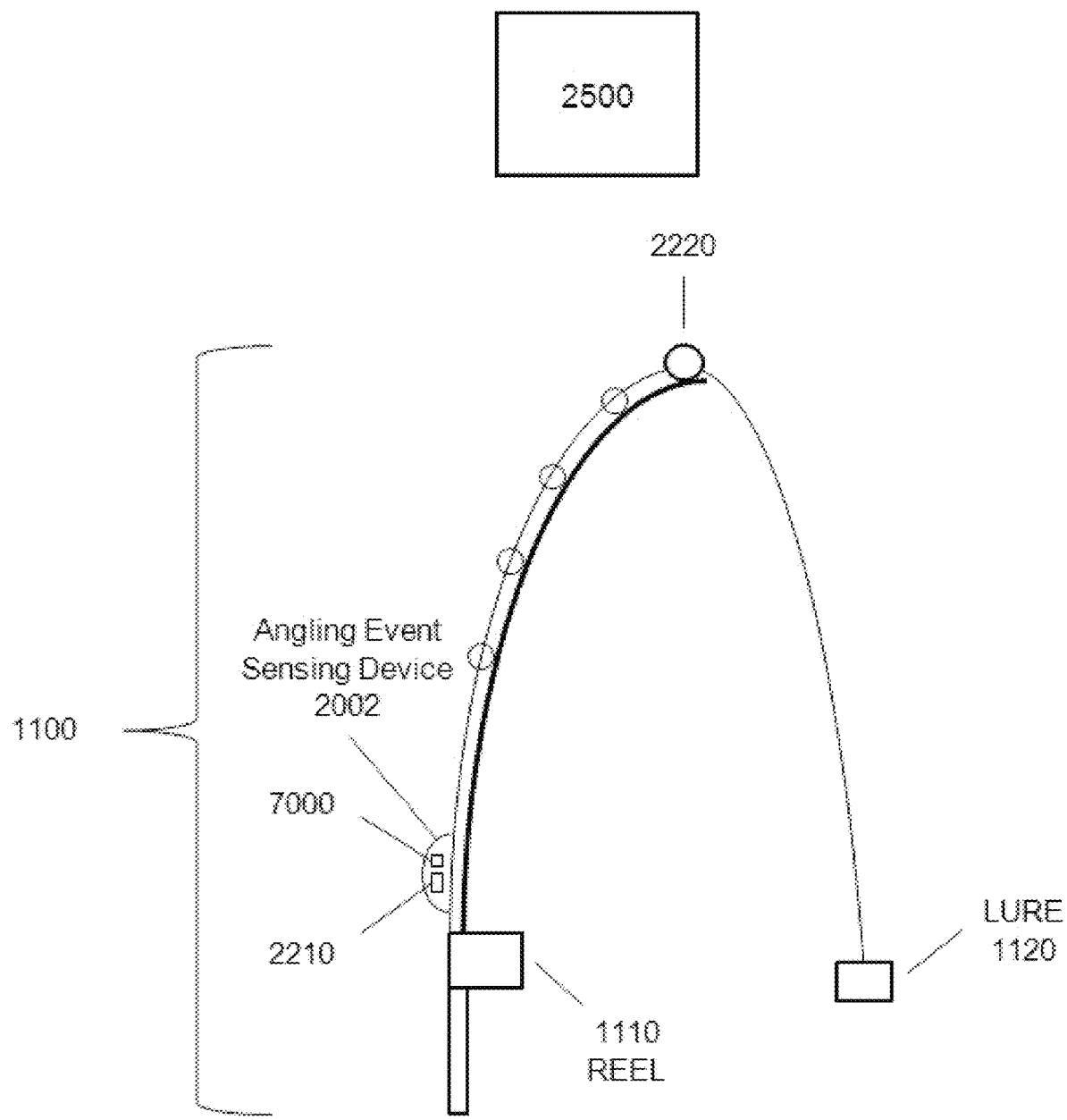
FIG. 4 illustrates a simplified view of an angling event sensing device.

In embodiments related to angling, the SESD 2000 will be described as the AESD 2002 as shown in FIG. 4. An AESD 2002 may be adapted to affix to a fishing rod 1100, with reel 1110 that is connected to a lure 1120 via fishing line. In embodiments, the AESD 2002 may comprise an angling sensor 2210. The angling sensor 2210 may be a sensor detecting motion related events. In embodiments where an angling sensor 2210, 2220 is detecting motion, the angling sensor 2210 may be an accelerometer, gyro, magnetometer, and the like. An angling sensor 2210 may also include a light sensor including, optical sensors, and/or UV sensors. An angling sensor 2210 may also include a sound sensor, including, but not limited to, a microphone, and/or a decibel meter. An angling sensor 2210 may also include environmental sensors such as a thermometer, location sensor, barometer, or some other type of environmental sensor. A location-sensing device 7000 and external sensor 2500 may also be associated with the rod 1100.

Figure 5:
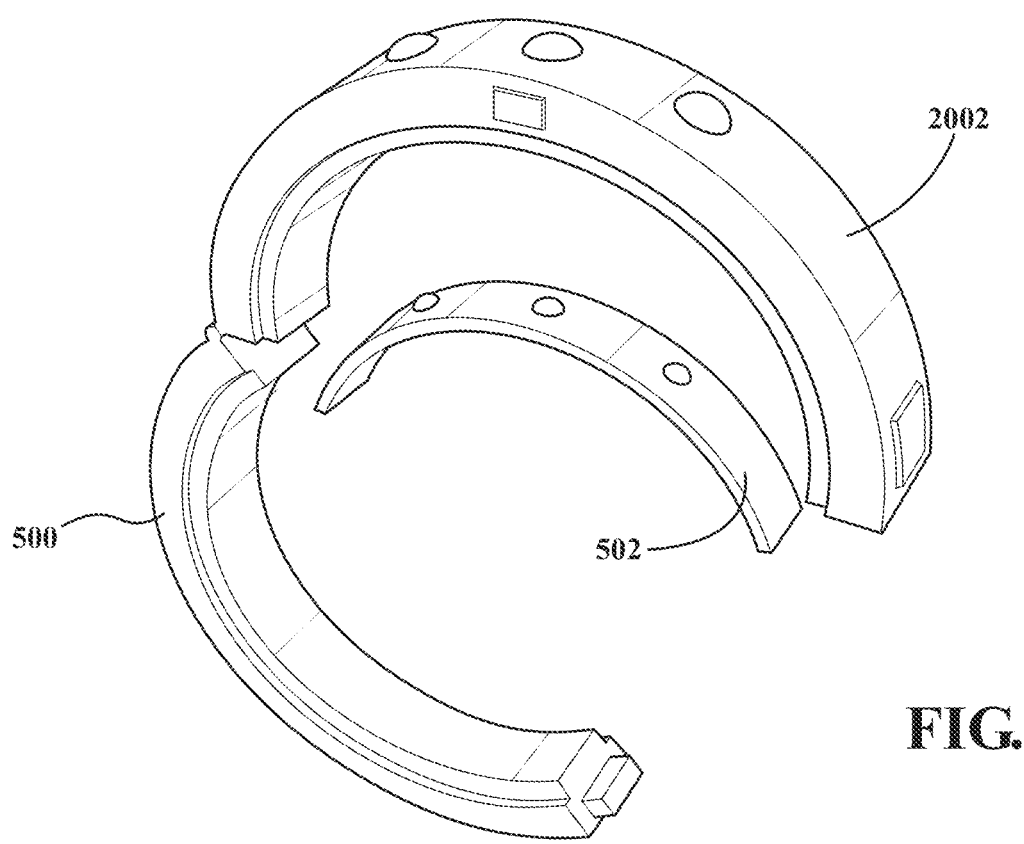
FIG. 5 illustrates a sample embodiment of an angling event sensing device.
Figure 6:
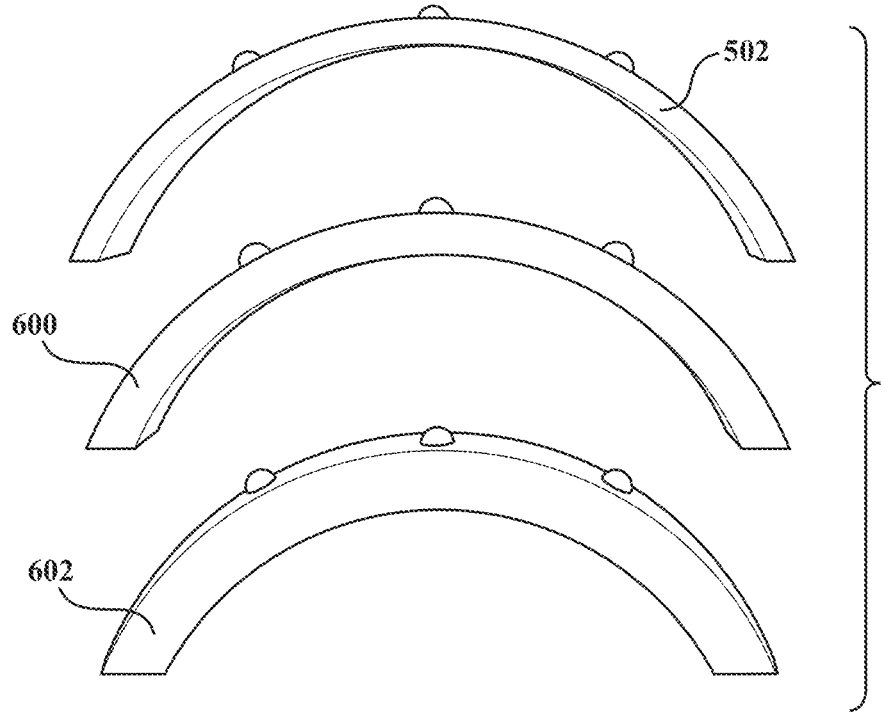
FIG. 6 depicts the rubber inserts of an angling event sensing device.
Figure 7A:
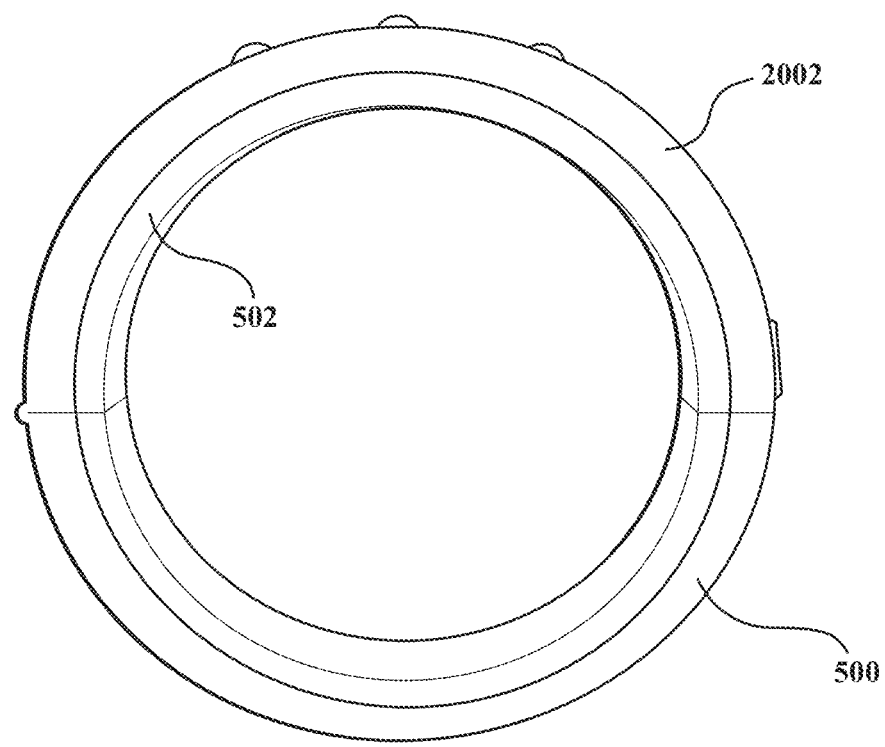
FIGS. 7A and 7B illustrate sample embodiments of an angling event sensing device in a closed position.
Figure 7B:
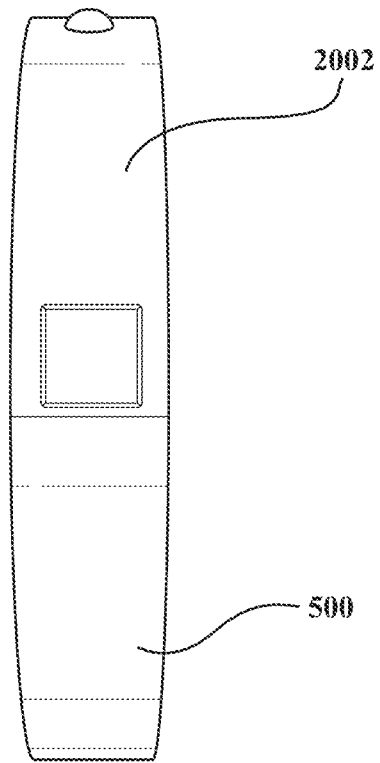

FIG. 5 illustrates a non-limiting example embodiment of an AESD 2002 form factor in a ring-shaped configuration 500. In this embodiment, the ring configuration 500 may be divided into two or more parts, each of which is connected by means of a hinge, such as a c-clamp hinge, or other means that enables the ring configuration 500 to open, as shown in FIG. 5, from a fully closed circular position, as shown in FIGS. 7A and 7B. A clasp may allow the AESD parts to lock into position, for example by joining a male and female-type clasp, and a release button may be depressed in order to disengage the clasp elements. The circumference of the AESD ring may be made of metal, plastic, or some other material. The AESD ring may include a hollow interior in which the sensors 2200, processor 3000, battery, data storage, lighting, electronics and other elements of the AESD may reside. The ring may be sealed so that the interior components are waterproof and lightproof, and capable of floatation. Indicator lights may be provided to indicate a status of the AESD, for example if the AESD's electric power is on, the strength of the remaining battery charge, if the AESD is in communication with the RMP (in which case it may indicate to a user to not turn off power to the AESD or risk interrupting data transmission), or some other type of status. The interior surface of the AESD in the ring configuration may include a rubberized coating, rubber insert 502, or some other type of insert capable of increasing friction between the AESD and the sporting good to which it is affixed. Rubber inserts may be provided in various thicknesses 600, 602 to enable a user to vary the interior diameter of an AESD depending on the exterior diameter of the sporting good aspect to which the AESD is to be affixed (see FIG. 6). FIGS. 7A and 7B illustrate sample embodiments of an AESD in a closed position that may be used to affix to a fishing rod.

An AESD 2002 may contain, or otherwise be in communication with, at least one processor 3000. An angling sensor 2210 may be affixed or otherwise associated with a fishing rod 1100, or accessories 1500 such as fishing net, fishing spear, fishing grapple, gaff, or fishing lure, or some other implement related to angling. "Lure" as used herein is synonymous with artificial lures, flies, and natural baits. The angling sensor 2210 may be within, affixed to, or separate from the AESD 2002. The angling sensor 2210 may be any of the sensors described herein, and may be in communication with AESD 2002 and/or at least one processor 3000. Sensors may be used to detect, register, infer and store data indicating, for example, force and/or direction of cast (and the inferred length of the cast), the event of a fish strike, time of a fish strike, the strength of a strike (and from the strength, or tensile power on the line, infer the weight of a fish), type of fish that has struck, the reel speed, the retrieval speed, the length of the "fight" between the fish strike and the catch, a spit hook or lost fish, or some other event type. In embodiments, an AESD 2002 comprises a location detection device 7000. Alternatively, in some embodiments, the location detection device may be the location detection capabilities present within a mobile device 5000 that is in communication with the AESD 2002.

In an embodiment, an AESD 2002 may employ a three-axis accelerometer to measure precast, cast point flight time, fish on, snag, reel-in time, reel revolutions/sec, fish-fight time, or some other action, as described herein, related to the casting action associated with a rod. Additional sensors may be employed to increase precision of the measurements and provide additional information such as angle of release, number of pre-casts using a three-axis magnetometer (e.g., for fly fishing). For example, the angling sensor 2210 may detect motion related events, such as that associated with a user casting a rod. The motion of a user moving the rod during a cast, for example as indicated by the speed of rod motion, the duration of rod motion, the distance of rod motion, or some other motion related variable, may cause the angling sensor 2210 to transmit the motion data to the application in the AESD 2200 and/or the application 5200 associated with a mobile device 5000. Analytics, as described herein, may then be used to record a casting event, an estimated casting distance, a categorization of the cast (e.g., a successful cast, a failed cast, and so forth), and record metadata associated with the cast event, such as the time the cast occurred, the location, the environmental conditions present at the time of cast, rod type, line type, bait type or some other type of data associated with the cast. In embodiments where an angling sensor 2210 is detecting motion, the angling sensor 2210 may be an accelerometer, gyro, magnetometer, and the like. An angling sensor 2210 may also include a light sensor including, optical sensors, and/or UV sensors. Light sensors may be used to determine, for example, if the environmental conditions at the time of a cast (or other event) were daytime lighting conditions, nighttime, overcast, or some other lighting condition. An angling sensor 2210 may also include a sound sensor, including, but not limited to, a microphone, and/or a decibel meter. Sound data detected by the angling sensor 2210 and transmitted to an application 2400, 5200 may be used to determine and record if, for example, there was boat activity in the area at the time of an event, such as a cast, or if the sound condition present was one of minimal environmental noise. Alternatively, the sound sensor may be used to determine the real speed revolutions per minute, and determine real in speed. Alternatively, the sound sensor may record spoken language, such as a user noting issues of relevance or importance to him at the time that an event is occurring (e.g., "in an area with numerous lily pads present, protected from wind, with still water . . . "). The application 5200 may receive and store this data so that it is added to the record of the trip and may be replayed by the user as a reminder of the noted conditions present during the trip. An angling sensor 2210 may also include environmental sensors such as a thermometer, location sensor, barometer, or some other type of environmental sensor. This may allow the user to record and store the environmental conditions present and altitude at the time, or near the time, of a noteworthy event such as a cast, a fish strike, a fish cast, a long period of no fish activity, or some other event, as described herein. An AESD 2002 may have an LED or LCD display to provide the user with instant feedback, including but not limited to, alerting the user when it is in a record mode, when it is in sleep/inactive mode, and so forth. In embodiments, an AESD 2002 may have a speaker or vibration motor for feedback, and the AESD 2002 may comprise an output facility. The output facility may be a display, a speaker or some other facility. The output facility may be in communication with the processor 3000, application 2400, 5200 and other functionalities of a mobile device 5000 and RMP. The output facility may generate alerts, status updates, or some other communication to a user 9000, to an application 2400, 5200, mobile device 5000, cloud server 4000, database 6000, or some other facility remote to the AESD 2002. For example, if a user leaves the AESD 2002 in record mode for a longer than normal time period, an alert may sound so that the user can turn the device off to preserve battery power.

In embodiments, an AESD 2002 may have an event marker implemented in a tactile switch, capacitive switch, or mechanical switch enabling the user mark or flag events occurring within an event such as a fishing trip. For example, a user may be fishing in an area of a large amount of visible fish activity, such as surfacing or jumping. By using a switch, the user may physically record each sighting upon its occurrence. When this type of data is added to the trip record, the user will be able to have a quantitative measure of the fish activity level in a given location and at a specific time during a trip.

In embodiments, the motion of an AESD 2002 may be measured and these signals analyzed to infer motion signatures. Motion signatures may be interpreted to (a) provide feedback related to the angling event and/or (b) provide feedback that may help a user improve technique, and to improve the user's chances of catching fish. For example, distance of the cast can be determined by the time of flight, using a specific lure (e.g., defined by weight or lure brand), and the length of rod and rod angle at point of release. In embodiments, with a three-axis accelerometer, three-axis gyro, the user and rod may provide motion data related to a casting event. This provides maximum acceleration at the point of release and the angle of release. Knowing the mass of the lure one can determine the velocity of the lure at the point of release and determine the distance the projectile. A three-axis magnetometer will provide the direction of the release. The direction of release combined with weather data (wind speed), can be combined to further correct for the distance taking into account the resistance of the wind. For example, the time of flight can be triggered by both negative and positive indications from the accelerometer. When the accelerometer movements surge, then become minimal, the last surge is the maximum velocity of the rod such as the initiation of motion and cessation of motion as measured by the AESD 2002 and its associated sensors, as described herein. When the lure strikes the water, the accelerometers (in embodiments) may show both positive and negative spikes in a very short window of time. <1 sec. as the angler will then set the bale. The bale release and set may also provide a signal that has a distinct signal wave form from the AESD. For example, once the bale is released, the timer may engage, and the differential engine of a machine learning system, as described below, associated with the RMP may capture via a sum of differential measurements (x-y-z) of the accelerometer. This may enable the processor to increase the processing speed, and the sampling rate for more accuracy in measuring the cast parameters. In embodiments, the time point at which the threshold returns to near-zero can be inferred as the beginning of flight time. In embodiments, the differential engine continues to operate, looking for a smaller threshold as the bale is set. There can be a time filter of, for example, a minimum of 2 seconds. In embodiments, if the differential signal exceeds the near zero threshold it may be determined that the bale is set. If the flight time is less than the minimum of 2 seconds then it can be determined that the first bale release time was false and this is the new bale set time and the differential engine may once again look for the larger cast spike. If bale-set time is detected, the AESD 2002 may then continue the differential engine looking for fish strike, snag, reel-in, or some other action. Each of these provides a unique signal. Distance may be determined by the AESD 2002 as a function of the two components speed in both the horizontal and the vertical direction at the point of release. Integrated accelerometers within the AESD 2002 may provide the release speed. Adding the angle of release if detected may allow the RMP to use classic physics equations as part of inferring actions occurring with a fishing rod.

In embodiments, the RMP may use data relating to flight time, and in doing an integration of the peak acceleration at point of release, calculate speed, where for example: distance=speed×time. Gyros within the AESD 2002 may be used to detect release angle and used to determine cast efficiency (e.g., a cast at 3 o'clock may waste a lot of distance going high, a cast at 9 o'clock may cause a shorter distance cast).

In embodiments, a gyro in the AESD 2002 may help remove false positives, and provide additional information. For example, false positives may include motions related to tying on lures or other terminal tackle, movements in the boat, movements associated with carrying the rod while not fishing, or some other type of movement of the rod that is not a user's cast. The gyro may also provide additional machine learning capabilities in conjunction with the accelerometer. This may provide the angle of the cast at the point of rotation, and may help to differentiate between, for example, a snag on the line or a fish on the line. The angle reaction to a fish on the line may be equal and opposite to the angle of attack of the fish, and may be used by the RMP to identify the species of a fish. For example, in embodiments the AESD 2002 in association with the RMP may be configured to determine the species of the fish that has been caught. There are three primary components to catching a fish, the bite, the hook, and the fight (see FIG. 8D for example cast events and related data and methods). Once a cast has been detected, the AESD 2002 may configure IMUs to become hyper sensitive to sense for reel-speed, snag, fish bite. Reel speed may be detected along a single axis the x, y, or z axis. The crank frequency of the angler may be detected by a simple harmonic motion where the peak motion detected is one revolution, combined with the reel and line information the speed at which the line is being reeled in. In this hypersensitive mode, the gyros during the reel in process are typically steady until a fish-on hooked fish is detected. However, prior to the fish-on being detected, the hypersensitive IMU will detect motions in ax-ay-az and gx-gy-gz.

water. FIGS. 8A through 8C present sample embodiments of casting events and related measures and outcomes. Table 1, below, presents examples of angling events and related measures and outcomes. Some of material presented in Table 1 overlaps with material presented in FIGS. 8A through 8C. Where there is a difference, a skilled artisan will understand that the differences derive from differing embodiments, for example, a different method sensor set or desired results.

TABLE 1

| Sporting event (e.g. an action) | Sensor | User input | Feedback | Desired results |
|---|---|---|---|---|
| Precast | Accelerometer, Hall-effect, gyro, acoustic | Fishing mode, rod type, reel type, line test, bait type | | # of precast swings and frequency, rod swing angle |
| Cast point | Accelerometer, Hall-effect, gyro, acoustic | Fishing mode, rod type, reel type, line test, bait type | | Identifying when the cast happened, rod velocity |
| Flight Time | Accelerometer, Hall-effect, acoustic | Fishing mode, rod type, reel type, line test, bait type | LCD/LED/Speaker | Time of flight of lure from cast point to point at which lure strikes the water |
| Fish On | Accelerometer, Hall-effect, acoustic | Rod type, reel type, line test | LED/LCD/Speaker/ Vibration | Identifying when there is a fish strike |
| Snag | Accelerometer, Hall-effect, gyro, | Rod type, reel type, line test | LED/LCD/Speaker Vibration | Identifying when the lure is snagged on structure or other object (not fish) |
| Reel In | Accelerometer, Hall-effect, acoustic | Reel type, line test | LED/LCD | |
| Revolutions/sec | Accelerometer, Hall-effect, acoustic | Reel type, line test | LED/LCD | |
| Release angle | Accelerometer, gyro, | Rod type, reel type, line test, bait type | LED/LCD | Identifying the coordinates for vertical angle of release (up-horizontal-downward) |
| Direction of flight | Accelerometer, gyro, Hall-effect, acoustic, magnetometer | | LED/LCD | Compass direction of cast |
| Event mark for starting trip, dropping a pin, indicating fish landed | Switch, capacitive touch Haptic input | | LED/LCD/Vibration | To provide user input that something has happened to the RMP. |

When a fish bites, depending on the species, the change in the acceleration direction and the momentum and direction of the gyro may be specific to each species. Once hooked, each species of fish will further identify itself by swimming towards the angler causing a dip in angle of the rod or swimming left to right, or right to left causing large swings in the gyro and magnetometer, or diving causing the angler to move rod east/west on the rod increasing the motion in the z direction and providing a negative momentum on the gyro and quick changes in magnetometer direction. To assist in determining the species of fish on, the AESD and RMP may limit the possibilities of species to those species found in the body of water as determined by the location, water type, or some other characteristic and the specific species that the angler is looking to catch, and the probability of the bait being used with respect to the species found in the body of water.

In another embodiment, a microphone in the AESD 2002 may provide an acoustic signal that, when combined with fishing-line information and reel information, may assist in the determination of both out-going reel speed and incoming reel speed. A microphone can be an accelerometer with an appropriate sampling and filter circuit on the front end as in U.S. Pat. No. 6,336,365, which is incorporated herein by reference in its entirety).

In another embodiment, a magnetometer in the AESD 2002 may indicate the polar direction of the cast. Combining this information with, for example, the wind-speed and direction may improve the accuracy of a machine learning engine of the RMP, as described in greater detail, below. For example, if a user is casting into the wind, the inference engine of the RMP may suggest casting at an angle corresponding to eleven o'clock in order to minimize wind drift.

In another embodiment, a Hall effect sensor may be placed on the outside of a reel with a small magnet on the inside to count rotations of the reel and precise RPMs. If there is separation from the AESD, a super magnet may be preferred. This may connect to the AESD 2002 for instantaneous or near-instantaneous data fusion, or may be transmitted to a cell phone, smart watch or other device for data fusion with the sensor data.

In another embodiment, the AESD 2002 may stream all the information collected to a mobile device 5000, including but not limited to, a smart watch, mobile phone, tablet, personal computer, or some other device type, where the device 5000, and/or applications 2400, 5200 on, or associated with, the device, may implement of the algorithms of the RMP.

In embodiments, the output facility may be in communication with the processor 3000, application 2400, 5200 and other functionalities of a mobile device 5000 and RMP. In another embodiment, the AESD 2002 may send, via the output facility, information back to a rod sensor and provide indications, such as a good cast, a fish on the line, reeling in too fast, a snag alert, or some other indication.

In embodiments, remotely located sensors 2500 may generate data indicative of the environment in proximity to the AESD 2002, and thus the user of the device. The scope of "proximity" may be dynamically adjusted based on the sport event, sporting good and/or the environmental parameter being detected. For example, weather-related conditions in a 10-mile radius of the user may be relevant to the angler user and thus for purposes of this disclosure would be weather-related parameters in proximity to the user and the AESD 2002. In another example, depth and/or current conditions of a body of water that the angler is fishing may be in proximity with reference to the nearest depth and/or current gauge (or a selected number of nearest gauges). In other embodiments, a proximity filter combined with the type of environmental parameter may be implemented. For example, a fly fisherman fishing a Lake Erie tributary for steelhead may be in proximity to Lake Erie, especially at points close to the mouth of the tributary; however, parameters related to the lake are of less interest to such angler than those of the tributary. To such an angler, flow rate, turbidity, depth, and temperature of the stream are more valuable parameters than wind speed or wave height on the lake. This type of proximity/sporting-type of tuning can result in less data needing to be processed and thus computational efficiency can be increased. Moreover, the angler will benefit from being presented with only the environmental data most relevant to him.

The following are illustrative clauses demonstrating non-limiting embodiments of the disclosure described herein:

An angling apparatus to identify angling events, the apparatus comprising:
an angling event sensing device adapted to be secured to a fishing rod and comprising at least one sensor to generate data indicative of a parameter of the rod or reel when the rod or reel is in use; and
at least one processor in communication with the angling event sensing device programmed to identify an angling event based on the data indicative of a parameter of the rod or reel.

The apparatus of any of the preceding clauses, wherein the at least one processor is remotely located from the angling event sensing device.

The apparatus of any of the preceding clauses, wherein the sensor is at least one of a motion sensor, optical sensor, sound sensor, piezo-electric sensor, strain or flex sensor, magnetometer, gyro, accelerometer, GPS, UV sensor, thermometer, barometric pressure sensor, conductivity sensor, or pH sensor.

The apparatus of any of the preceding clauses, wherein the identified angling event is at least one of a strike of a fish, a strike of a certain species of fish, a cast, drag, stripping line in, bale click, initiation of a cast, flight time for lure, snag, fish bump, lure position, line position, retrieve, or fight time.

The apparatus of any of the preceding clauses, wherein the angling event sensing device comprises an output facility.

The apparatus of any of the preceding clauses, wherein the output facility is a display.

The apparatus of any of the preceding clauses, wherein the output facility is a speaker.

The apparatus of any of the preceding clauses, further comprising an output facility in communication with the angling event sensing device.

The apparatus of any of the preceding clauses, wherein the output facility is a display.

The apparatus of any of the preceding clauses, wherein the output facility is a speaker.

The apparatus of any of the preceding clauses, wherein the processor is further programmed to cause the identified angling event to be communicated to a user via the output facility.

The apparatus of any of the preceding clauses, wherein the processor is further programmed to cause the identified angling event to be communicated to a mobile device.

The apparatus of any of the preceding clauses, further comprising a second sensor mounted to the rod The apparatus of any of the preceding clauses, wherein the second sensor is mounted to a tip of the rod.

The apparatus of any of the preceding clauses, wherein the second sensor is a motion sensor.

The apparatus of any of the preceding clauses, wherein the second sensor detects a strike of a fish, a strike of a certain species of fish, a cast, drag, stripping, bale click, initiation of a cast, flight time for lure, snag, fish bump, lure position, line position, retrieve, or flight time.

The apparatus of any of the preceding clauses, wherein the second sensor is mounted to a base of the rod.

The apparatus of any of the preceding clauses, wherein the at least one processor is in communication with at least one remote sensing device.

The apparatus of any of the preceding clauses, wherein the at least one remote sensing device generates data indicative of an environmental parameter in proximity to the angling event sensing device.

The apparatus of any of the preceding clauses, wherein the at least one processor is further programmed to identify the angling event based on the data related to an environmental parameter.

The apparatus of any of the preceding clauses, wherein the at least one processor obtains data related to an environmental parameter in proximity to the angling event sensing device.

The apparatus of any of the preceding clauses, wherein the at least one processor is further programmed to identify the angling event based on the data related to an environmental parameter.

A system for recording and reporting angling-related information from fishing rod or reel and from user input, the system comprising:

an angling event sensing device adapted to be secured to the fishing rod and comprising at least one sensor to generate data indicative of a parameter of the rod or reel when the rod or reel is in use;

at least one processor in communication with the angling event sensing device, the at least one processor programmed to identify an angling event based on the data indicative of a parameter of the rod or reel;

a remote sensor in communication with the at least one processor, the remote sensor generating data indicative of an environmental parameter in proximity to the angling event sensing device; and at least one database in communication with the at least one processor.

The system of the preceding clause, wherein the at least one processor is further programmed to time stamp an angling event identified by the at least one processor.

The system of any of the preceding clauses, wherein the at least one processor is further programmed to time stamp the data indicative of an environmental parameter in proximity to the angling event sensing device.

The system of any of the preceding clauses, wherein the at least one processor is further programmed to cause the time-stamped angling event and the time-stamped data indicative of an environmental parameter in the database.

The system of any of the preceding clauses, wherein the at least one processor is further programmed to associate the time-stamped angling event and the time-stamped data indicative of an environmental parameter.

The system of any of the preceding clauses, wherein the at least one processor is further programmed to cause the associated time-stamped data to be stored in the database.

The system of any of the preceding clauses, wherein the angling sensing device is in communication with a location detection device generating data indicative of the location of the angling sensing device.

The system of any of the preceding clauses, wherein the at least one processor is further programmed to associate the time-stamped angling event and the time-stamped data indicative of an environmental parameter with the data indicative of the location of the angling sensing device.

The system of any of the preceding clauses, wherein the at least one processor is further programmed to generate a recommendation.

The system of any of the preceding clauses, wherein the recommendation is one of (i) location to fish, (ii) fish species to target, (iii) fishing lure to use, or (iv) bait to use.

The system of any of the preceding clauses, further comprising an input device in communication with the at least one processor, the input device or the at least one processor programmed to enable the user to input data related to angling events.

The system of any of the preceding clauses, wherein the at least one processor is further programmed to automatically generate a report comprising identified angling events, corresponding environmental conditions, and inputted data related to angling events.

The system of any of the preceding clauses, wherein the input data related to angling events comprises one of a lure, bait, line property.

The system of any of the preceding clauses, wherein the input data related to angling events comprises one of a caught fish species, a caught fish size, a number of caught fish.

The system of any of the preceding clauses, wherein the report further comprises characteristics or specifications of the rod or reel.

The system of any of the preceding clauses, wherein the at least one processor is further programmed to automatically generate a report comprising identified angling events and corresponding environmental conditions.

The system of any of the preceding clauses, wherein the report further comprises characteristics or specifications of the rod or reel.

The system of any of the preceding clauses, further comprising an output facility in communication with the at least one processor.

The system of any of the preceding clauses, wherein the at least one processor is further programmed to cause the output facility to communicate the report to the user.

A system for recording and reporting angling-related information from a fishing rod or reel, the system comprising:

an angling event sensing device adapted to be secured to the fishing rod and comprising at least one sensor to generate data indicative of a parameter of the rod or reel when the rod or reel is in use;

at least one processor in communication with the angling event sensing device, the at least one processor programmed to identify an angling event based on the data indicative of a parameter of the rod or reel;

a location detection device generating data indicative of the location of the angling event sensing device;

a remote sensor in communication with the at least one processor, the remote sensor generating data indicative of an environmental parameter in proximity to the angling event sensing device; and at least one database in communication with the at least one processor and with a plurality of other angling event sensing devices, wherein the other of said angling event sensing devices each (i) are adapted to be secured to a corresponding fishing rod, (ii) comprise at least one sensor to generate data indicative of a parameter of the corresponding fishing rod or a reel affixed to the corresponding fishing rod, (iii) comprise at least one processor programmed to identify an angling event based on a parameter of the corresponding rod or reel attached to the corresponding rod, and (iv) are in communication with a location detection device generating data indicative of the corresponding angling event sensing device.

The system of the preceding clause, wherein the at least one processor is programmed to generate a recommendation comprising one or more of (i) location to fish, (ii) fish species to target, (iii) fishing lure to use, or (iv) bait to use, the recommendation based on angling related events identified by the angling event sensing device and the plurality of angling event sensing devices and environmental parameters and locations associated with each identified angling event.

A system to generate angling recommendations comprising:

a. a plurality of angling event sensing devices adapted to be mounted to corresponding fishing rods having respective reels and line, each angling event sensing device (i) comprising at least one sensor to generate parameters indicative of the rod, reel, or line, and (ii) in communication with at least one processor, the at least one processor operable determine at least one angling event from data received from the respective sensor of the angling event sensing device;

b. a recreation monitoring platform operable to receive (i) angling event determined by any of plurality of angling event sensing devices, and (ii) angling data input by a user of a respective device, the recreation monitoring platform comprising a recommendation facility operable to make an angling recommendation based on (i) angling event determined by any of plurality of angling event sensing devices, and (ii) angling data input by a user of a respective device.

The system of the preceding clause, wherein the at least one processor is housed within the angling event sensing device.

The system of any of the preceding clauses, wherein the angling event is one of fish on, fish landed, or fish lost.

The system of any of the preceding clauses, wherein the angling event sensing device is operable to determine the species of a fish on, fish landed, or fish lost based on data received from the respective sensor of the angling event sensing device.

The system of any of the preceding clauses, wherein the angling data input by a user includes fish species for fish on, fish landed, or fish lost.

The system of any of the preceding clauses, wherein the angling data input by a user includes fish species for fish on, fish landed, or fish lost.

The system of any of the preceding clauses, wherein the angling recommendation is a location to fish.

The system of any of the preceding clauses, wherein the angling recommendation is a species of fish to target.

The system of any of the preceding clauses, wherein the recreation monitoring platform is operable to receive data of weather or water conditions corresponding to the location of a respective angling event sensing device.

The system of any of the preceding clauses, wherein the recommendation facility is further operable to make the angling recommendation based on i) angling event determined by any of plurality of angling event sensing devices, (ii) angling data input by a user of a respective device, and (iii) the data of weather or water conditions corresponding to the location of a respective angling event sensing device.

The system of any of the preceding clauses, wherein the angling recommendation is a location to fish.

The system of any of the preceding clauses, wherein the angling recommendation is a species of fish to target.

A system to generate angling recommendations comprising:
a. an angling event sensing device adapted to be mounted to a fishing rod having reel and line comprising at least one sensor to generate parameters indicative of the rod, reel, or line;
b. a processor unit; and
c. a mobile device running an application in communication with the angling event sensing device in communication with the processing unit or the at least one sensor,
wherein the processor or the application is operable to determine at least one angling event from data received from the at least one sensor The system of the preceding clause, further comprising a recreation monitoring platform operable to receive (i) the angling event, or (ii) angling data input by a user to the application, the recreation monitoring platform comprising a recommendation facility operable to make an angling recommendation based on (i) the angling event or (ii) angling data input the user.

The system of any of the preceding clauses, wherein the angling event is one of fish on, fish landed, or fish lost.

The system of any of the preceding clauses, wherein the angling event sensing device is operable to determine the species of a fish on, fish landed, or fish lost based on data received from the at least one.

The system of any of the preceding clauses, wherein the angling data input by a user includes fish species for fish on, fish landed, or fish lost.

The system of any of the preceding clauses, wherein the angling data input by a user includes fish species for fish on, fish landed, or fish lost.

The system of any of the preceding clauses, wherein the angling recommendation is a location to fish.

The system of any of the preceding clauses, wherein the angling recommendation is a species of fish to target.

The system of any of the preceding clauses, wherein the angling recommendation is a location to fish.

The system of any of the preceding clauses, wherein the angling recommendation is a species of fish to target.

The system of any of the preceding clauses, wherein the recreation monitoring platform is operable to receive data of weather or water conditions corresponding to the location of a respective angling event sensing device.

The system of any of the preceding clauses, wherein the recommendation facility is further operable to make the angling recommendation based on (i) the angling event or (ii) angling data input the user, and (iii) the data of weather or water conditions corresponding to the location of a respective angling event sensing device.

The system of any of the preceding clauses, wherein the angling recommendation is a location to fish.

The system of any of the preceding clauses, wherein the angling recommendation is a species of fish to target.

An angling event sensing device, comprising:
a. a housing adapted to be mounted to a fishing rod, the rod having a reel and line;
b. at least one sensor within the housing to generate parameters indicative of the rod, reel, or line;
c. a processor within the housing operable to determine if the line is snagged.

The angling event sensing device of the preceding clause, further comprising an output facility in communication with the processor, the processor causing the output facility to output information relating to the snag.

The angling event sensing device of any of the preceding clauses, wherein the output facility is a speaker.

The angling event sensing device of any of the preceding clauses, wherein the output facility is a light emitting diode (LED).

The angling event sensing device of any of the preceding clauses in communication a mobile device running an application, wherein the application displays information relating to the snag.

The angling event sensing device of any of the preceding clauses, wherein the application records the location of the snag.

The angling event sensing device of any of the preceding clauses, wherein the application presents data of the location of the snag.

The angling event sensing device of any of the preceding clauses in communication with a recommendation facility configured to receive data relating to the snag and make an angling recommendation via the application.

The angling event sensing device of any of the preceding clauses, wherein the angling recommendation is to avoid the location of the snag.

The angling event sensing device of any of the preceding clauses, where the location of the snag is output on a map via the application.

An angling event sensing device, comprising:
a. a housing adapted to be mounted to a fishing rod, the rod having a reel and line;
b. at least one sensor within the housing to generate parameters indicative of the rod, reel, or line;

c. a processor within the housing operable to determine that a fish is on the line.

The angling event sensing device of the preceding clause, further comprising an output facility in communication with the processor, the processor causing the output facility to output information relating to the fish on the line.

The angling event sensing device of any of the preceding clauses, wherein the output facility is a speaker.

The angling event sensing device of any of the preceding clauses, wherein the output facility is a light emitting diode (LED).

The angling event sensing device of any of the preceding clauses in communication a mobile device running an application, wherein the application displays information relating to the fish on the line.

The angling event sensing device of any of the preceding clauses, wherein the application records the location of the fish on the line.

The angling event sensing device of any of the preceding clauses, wherein the application presents data of the location of the fish on the line.

The angling event sensing device of any of the preceding clauses in communication with a recommendation facility configured to receive data relating to the fish on the line and make an angling recommendation via the application.

The angling event sensing device of any of the preceding clauses, wherein the angling recommendation is to avoid the location of the fish on the line.

The angling event sensing device of any of the preceding clauses, where the location of the fish on the line is output on a map via the application.

A system to automatically create a fishing journal, the system comprising:
a. an angling event sensing device adapted to be mounted to a fishing rod having reel and line comprising at least one sensor to generate parameters indicative of the rod, reel, or line;
b. at least one processor configured to determine at least one angling event based on the parameters indicative of the rod, reel or line;
c. a mobile device running an application in communication with the processor;
d. a recreational monitoring platform in communication with the mobile device and data sources comprising environmental data;
wherein the at least one processor associates the angling event data with the environmental data at the location of the at least one angling event sensing device and causes the associated data to be stored, and
wherein the application causes the associated data to be displayed on the mobile device.

The system of the preceding clause, wherein the associated data is stored on the recreational monitoring platform.

The system of any of the preceding clauses, wherein the at least one angling event is fish on, fish caught, cast distance, or cast direction.

The system of any of the preceding clauses, wherein the application provides a user interface for the user to enter angling data.

The system of any of the preceding clauses, wherein the angling data entered by the user is data related to angling equipment, lure used, or bait used.

The system of any of the preceding clauses, wherein the at least one processor further associates the angling event data with the angling data entered by the user and causes said associated angling event data and angling data entered by the user to be stored.

The system of any of the preceding clauses, wherein the application caused the associated angling event data and angling data to be displayed on the mobile device.

In embodiments, the RMP collects information, for example, from an SESD 2000 (and/or a plurality of SESDs), such as an AESD 2002, and provides information that when combined with other crowd sourced, weather, geological, or some other type of data, as described herein, may provide a rich picture of the angling environment that users can use to plan trips. As described herein, the AESD 2002 provides for the detection, and combination of events such as cast, cast distance, cast velocity, fish-on-line, reel-in characteristics, cast direction, snag, or some other type of event. Analytic techniques, including but not limited to, machine learning may be used to detect or infer events and their associated conditions, and predict future events and factors associated with such events, such as using a specific lure type in a particular body of water when a given weather condition is present. "Machine learning" as used herein refers to analytic techniques that may include, but are not limited to, Naïve Bayes, Bayes Net, Support Vector Machines, Logistic Regression, Neural Networks, and Decision Trees. These algorithms may be used to produce classifiers, such as algorithms that classify whether or not an event occurred (e.g., a fish strike, fish catch, or snag). In their basic form, the algorithms may return a categorical determination "Event detected=yes" or "Event detected=no" and a score indicating the strength of certainty of the classification. When calibration techniques are applied, a probability estimate of the likelihood of a prediction to be correct may be provided. In embodiments, a computer implemented method of the present invention may comprise applying a plurality of algorithms to predict and track the performance of a plurality of algorithms under a variety of conditions, such as fishing a given body of water under differing environmental conditions (e.g., weather), using different equipment (e.g., lures and bait), under varied fishing techniques (e.g., topwater fishing, underwater trolling) and so forth. Preferred performance conditions for a type of algorithm may be determined, and conditions tracked, and an algorithm may be selected for predicting performance based at least in part on current conditions. In embodiments, "algorithm" as used herein may be a plurality of algorithms. Alternative machine learning algorithms may be trained on the data obtained from an SESD 2000, AESD 2002, application 2400, 5200, or other source. In embodiments, a portion of the data may be saved for a testing phase. This testing portion may be used to measure the prediction performance of each alternative algorithm. Algorithms which are most successful in predicting the outcome of the hold-out training data set may be saved for further use by the application 2400, 5200. Analytic modeling based at least in part on machine learning may include the analysis of historical log data summarizing, for example, a fishing trip. Data used in the machine learning processes of the RMP may include, but is not limited to, data derived from an SESD 2000, an AESD 2002, a sensor 2200, 2500, manually input by a user 9000, input to an application 2400, 5200, or some type of third party data 6000, such as environmental data collected by a governmental organization or private entity, location data, mapping data, or some other type of data suitable for machine learning processes. Machine learning algorithms and other analytic processing may be performed in the SESD 2000, AESD 2002, the processor 3000, the application 2400, 5200, the cloud server 4000 or some other facility associated with the RMP.

Parameter checking and machine learning, as described herein, may use specific parameters detected from the SESD 2000, in this case an AESD 2002, and the environment (e.g., wind speed, water temp, rod style, bait/lure, and so forth). A plurality of methods may be employed to develop the detection algorithms. For example, the system may consist of a cloud unit, such as a server 4000, an SESD 2000, and an AESD 2002. The cloud unit 4000 may collect weather, map data, data regarding water bodies including depth data and data of structure, strobe, noise, pressure sensor data, color, barometric pressure, wind speed, compass information and user characteristics (and combinations thereof), the connectivity device may collect rod, lure and provide geolocation information and additional personal information from the SESD 2000 and or the application 5200. The SESD 2000 may provide additional degrees of freedom information, such as, in an example, three compass readings, three gyros, and three accelerometers. As described above, the SESD 2000 may be equipped with sensors, including but not limited to, GPS, barometric pressure, temperature, or other sensors, as well to provide a mini-weather station to improve on the weather information collected from public Internet, or other data sources.

In embodiments, the various events sensed by the SESD 2000 may not be easily detected by the use of an accelerometer (for example, as in U.S. Pat. No. 7,562,426 to Perkins, which is incorporated herein by reference). This may give the angler an indication of a fish on, but more information would be advantageous to make actionable conclusion. Indicators affixed to the line above the lure to provide an indication of a fish strike. Such indicators include, but not limited to, bobbers, yarn, cork, and the like. According to embodiments of the invention, indicators may be equipped with a sensor 2200. Upon movement, such as that initiated by a fish strike, the sensor in a so-equipped strike indicator 2500 may transmit a signal to the application 2400, 5200 indicating the event's occurrence.

To accurately distinguish that a cast has happened, much of the outside noise must be subtracted from the signals. Noise may include, but is not limited to, movement caused by travel (either on water or off) to angling site, affixing terminal tackle, non-angling body movements, wind-influenced movements, current influenced movement, and more. Using the true casting motion of an angler which can be over hand, side arm, or forearm casting, machine learning techniques in near real time using Kmeans, dbscan, nearest neighbor, affinity propagation methods, on a real time data feed, may produce less than desirable results of 80 to 85 percent accuracy. Doing a full Fast Fourier Transform (FFT) may move the time-correlated data into the frequency domain, which may improve performance, and which may be used especially if there is a limited sensor set (e.g. three-axis accelerometer).

In embodiments, a power calculation may be used across many different rod types, (e.g., light rods-to heavy rods), and a variety of anglers and angler styles (e.g., casting methods). For example, a first pass qualification of all data moving may be used by taking a differential measurement (x2−x1) where one measures the rate of change in the signal, at the same time doing this for (y2−y1),(z2−z1) to yield the rate of change of each of these measures. One may take the absolute value of the addition of these methods to distinguish the energy thresholds in real time. Conducting the same calculations for gyro data may yield similar results. Thus, if one were to sum the absolute value of the rates of change of the three accelerometers in this example, and then recast that to a single vector, and do the same for the gyro data, the two vectors may be amplified and have large rates of change. This translated vector may provide an easier signal to parse and put through machine learning, as described herein, or even threshold analysis. This signal may also be combined with the time probability of an event (e.g., cast, fish-on line, snag, reel-in) to enable a limited microcontroller the ability to real-time detect the event with accuracy. Magnetometer (compass) data may be used to validate detections of, for example, cast, catch and snag. Cast validations using magnetometer may include, but are not limited to:

Side Cast—Magnetometer reading >90 degrees of directional rotation with side cast signal from accel/gyro.

Catch validations using magnetometer may include, but are not limited to:

Fish on: Free Range of 360-degree motion recorded with fish-on signal from accel/gyro.

Snag: Anchor point of 360-degree motion until snag is released.

In embodiments, for calculating the distance and flight time of a spincaster, the hall-effect method may not be practical and one may instead calculate the angular momentum at the point of release using well known physic equations. The angular moment may be calculated using the rod-length as the radius, and the initial angular velocity as the peak values from the IMU at the time of cast. Thus, the angular momentum from the IMU at the mounting point of the AESD may be known. L=Iw, where I is the moment of inertia, and w is the angular velocity. One must solve to the velocity at the end of the fishing rod, which when solved for becomes: v=R1V1/R2, where R1=1, V1 is the angular velocity at AESD, and R2 is the length of the ROD less R1. Understanding V one can then solve for the range of the trajectory or distance (R). R=v**2 sin 2(release angle)/gravity. It should be understood that for very light baits or for very light line that the coefficient of drag significantly degrades the trajectory distance. Thus, using the bait size and weight to determine density, the density of the line type can produce a ratio of drag force. This coefficient of dragforce is less than 1 and may be applied to the trajectory distance to de-rate the distance of the cast.

In embodiments, to be able to further determine an angler's cast profile and type of fishing being done, using the threshold analysis as event points, further analysis may be used on the individual inertial measurements and direction components to understand the efficiencies of the cast, the time of bale click, both open and closed. This may be achieved by combining angler properties such as rod type, reel type, rod length, lure and bait. Further combining the weather conditions as properties may improve the machine learning techniques and provide for separate analytical engines.

Figure 8E:
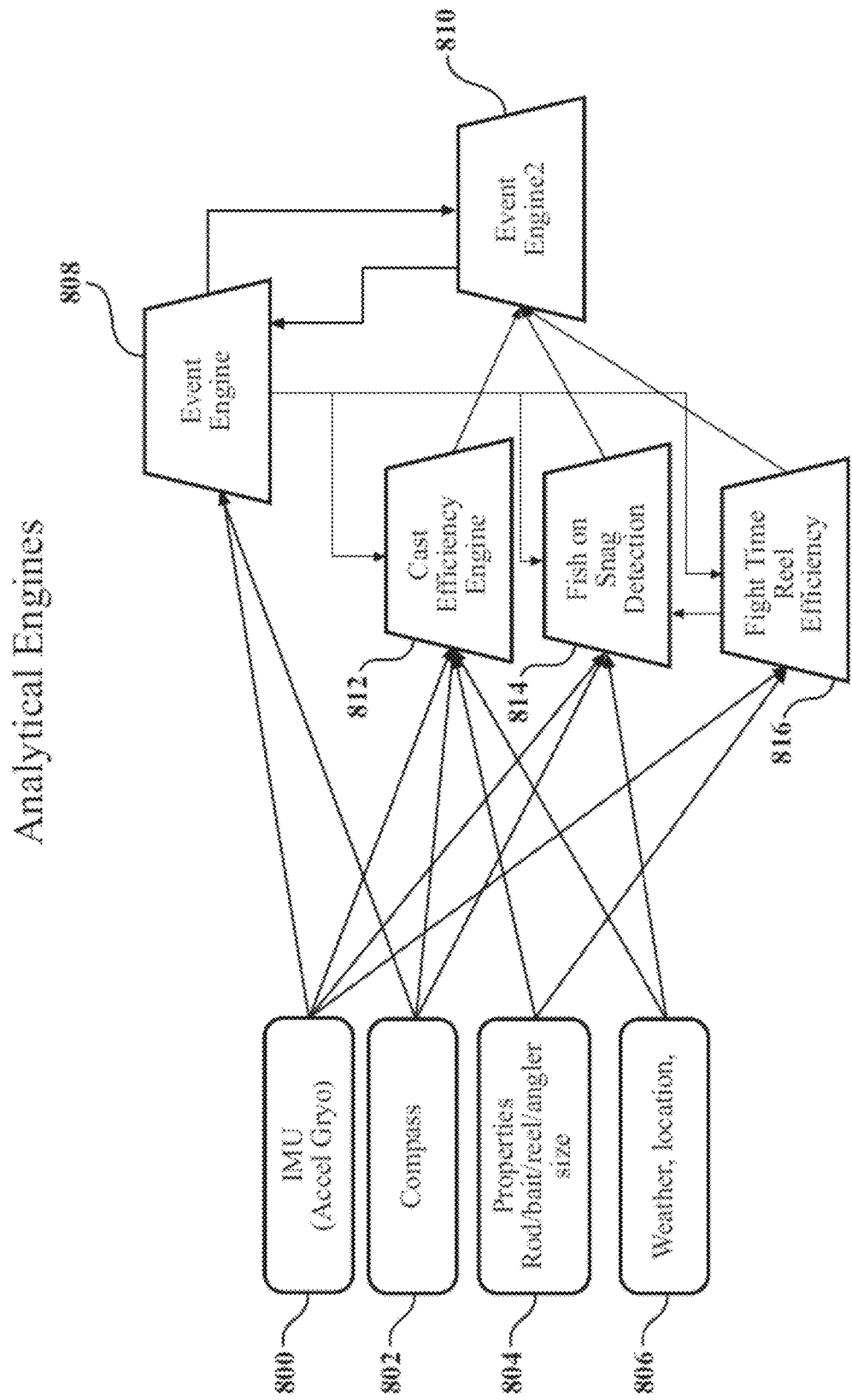
FIG. 8E depicts a simplified view of the components of the analytical engines.
Figure 9A:
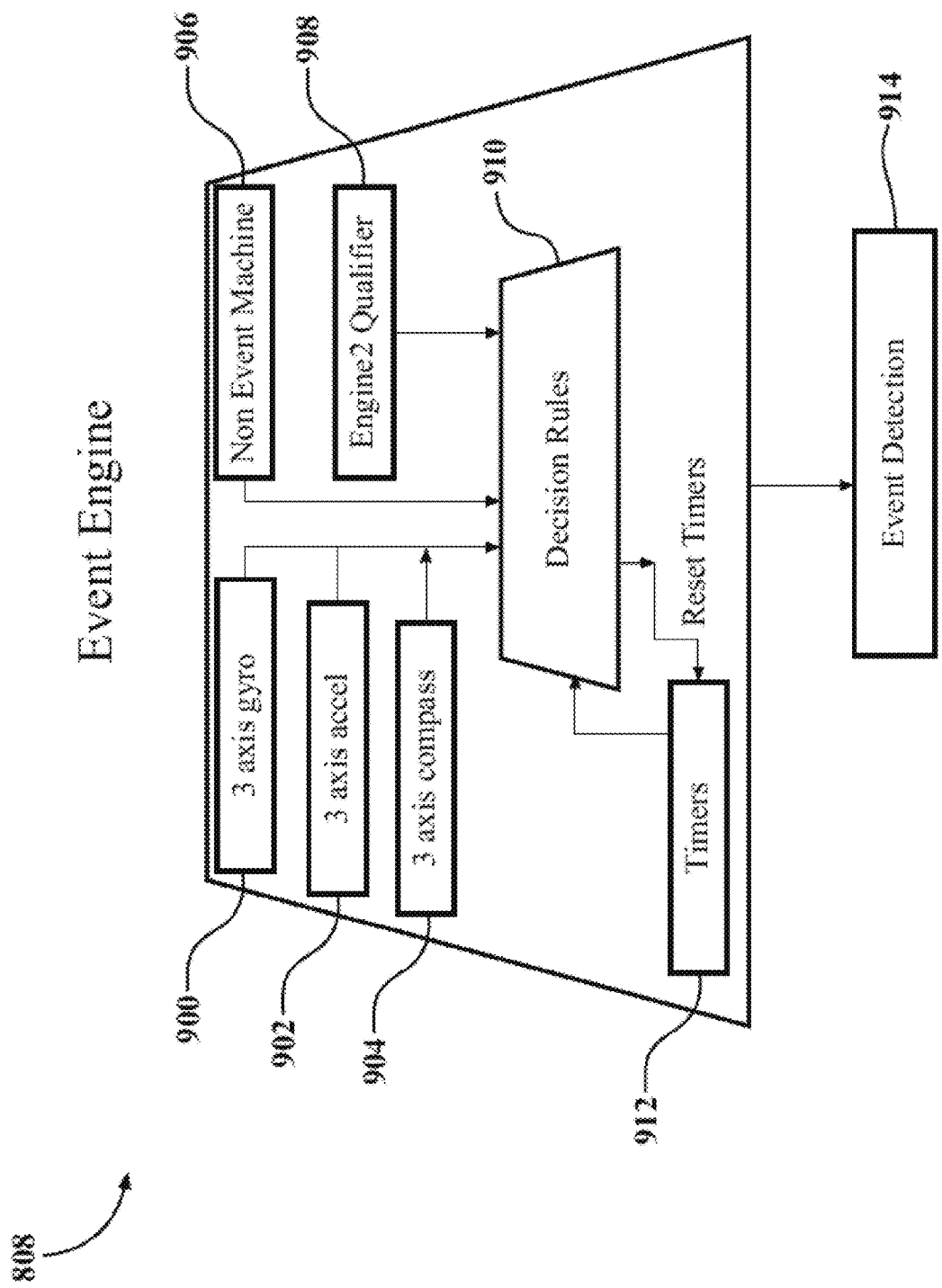
FIG. 9A depicts components of an event engine.

FIG. 8E presents a simplified schematic of an analytic engine and associated facilities of the RMP. Data inputs, including IMU 800, compass data 802, tackle and gear data 804, environmental data 806, including data obtained from third party sources outside of the RMP, such as through a cloud computing environment, may be provided to a first event engine 808, and separate analytic facilities may be provided for calculating items such as cast efficiency 812, event detection (e.g., fish strike or snag) 814, and characteristics such as flight time, and reel characteristics and efficiency 816. In an embodiment, IMU data 800 may be provided directly to the first event engine 808 for preprocessing and all data (including IMU data) subsequently passed to a second event engine 810 for further processing. The second event engine 810, is set up to determine as a result of the first event, using the same data can one predict the second event, cast, catch, bale closure. As shown in FIG. 9A, components of an event engine may include, but are not limited to, decision rules 910 that are based at least in part on data obtained from an accelerometer 902, gyroscope 900, and compass 904. Such data may be used, as described herein, for event detection 914. The non-event-machine 906 analyzes measured non-events that happen after anyone of a number of events happen. For example, after a cast happens a second cast cannot happen, thus jitter, human wobble are subtracted out of the signal looking for the next event. A second cast cannot happen until another event happens. The Engine2 qualifier 908 analyzes the next event to happen. (e.g. after a cast it expects the accelerometer 902 and gyro 900 equations to return to zero, and will qualify the sum of the absolutes for a second level threshold to indicate, for example, 1) reel in, 2) fish on, 3 bale click.

The inertial measurement unit (IMU) may consist of six axes of freedom of the gyro and the accelerometer measurement. As shown in FIGS. 8E and 9A, an event engine may process this data to determine, for example, two primary events such as cast and fish on the line. Typical cast events may be less than 100 ms. Fish-on events may be measured in seconds. When the SESD 2000 is in operational mode, the SESD 2000 may be looking for the major events of cast and fish on the line. The SESD 2000 may be also looking for minor events such as reel efficiency, and may be storing a 2 second FIFO buffer of IMU and compass data. In embodiments, the cast efficiency engine may typically store a 2 second buffer of IMU and compass data, and look for a cast event trigger from the event engine to then perform data fusion of the 9 axis data to determine velocity of cast, angular turnover rate and the direction of the cast. In using the rod size and thickness, bait, reel size and line type, and height of the angler, the cast efficiency engine may improve calculations. Weather information may be used by the cast efficiency engine and may further rate the quality of the final measurements. Outputs of the cast efficiency engine may include, but are not limited to, velocity, distance, angular jitter, and direction of cast. Each measurement may provide a rating. This data may be passed to the event engine 2 for further refinement. The event engine 2 may also provide a feedback loop for real-time machine learning in the detection of events. Detection of fish-on-snag by the detection engine may be idle until a fish-on event happens. Fish-on and snag both may have the same initial signal, and to determine fish-on vs. snag, once there is a fish-on event, the IMU and compass may be used to determine the angular power measurements, and the direction change. The reel efficiency engine may be continually looking at the x-axis movement using a 2× or 4× amplification to determine the reel rotations. The reel efficiency engine may provide feedback to the snag/fish-on detection machine. The combination of this data may provide the snag- and fish-on machine to qualify the fish-on event and provide this information to the event engine 2, which in-turn may provide the information to the event engine 1, as shown in FIG. 8E.

In embodiments, the reel efficiency engine may provide information as to reel-in time, fish fight time, or some other data, and this information may be fed into the event engine 2. The rod, reel and line information may provide additional information that allows the reel efficiency engine to predict the distance of the cast, and how much line was reeled in. A further example of engine 1 is depicted in FIG. 9A. In embodiments, decision rules may be modified and continuously improved as the rest of the SESD 2000 refines the gross fish-on and cast detection rules. By bringing in event engine 2, and non-event markers such as dropped rod, boat running, and the like, the engine may continually modify it's rules. The engine 2 data modification capability may enable the weather data, and the physical properties to help influence the decision of the two primary events. The following table depicts example properties that may be used as part of the machine learning. Any or all of the properties may help in predicting the accuracy of the SESD:

| Property | Units | Comments |
| --- | --- | --- |
| Angler Size | Inches/cm | Predicts the anglers arm length |
| Rod Size | Ft/inches/cm | Will help with tip speed at point of cast |
| Reel type | Inches/cm | Provides the spindle size for reel |
| Line type | Inches/cm | Provides for lengths of line |
| Wind speed | Mph mps | Provides correction factor |
| Wind direction | T | Provides correction factor |
| Bait/lure | Lb/kg | Provides cast distance efficiency |
| Location | River/lake/open water | Provides correction factors for decision engines |
| Type of fishing | Casting, trolling, fly fishing | Provides correction factors for decision engines. |

In embodiments, the SESD 2000 may be associated with predictive analytics, as described herein, that may be used to inform fishermen of fishing conditions and tracking fishing events, telling them where, when, and under what circumstances catching certain species of fish is most likely. The analytic models may be informed by a variety of data sources, both algorithmically detected and user entered and/or communicated from the SESD 2000. These data sources may be combined for internal analyses and made be made available to end users, including availability that is restricted, for example, by membership or some other condition. The data used in analytic models that inform fishermen of optimal fishing strategies may come from both user based sources (e.g., originating from the phone/app and/or SESD) and internal sources (e.g., weather databases, water databases, and other location based data). For example, the following data may be collected:

Algorithms built into the SESD and/or associated equipment may detect casts, cast direction, retrieval patterns, fish strikes, fight time, and catches. This information may be sent from the SESD to a phone (or other computing facility) and from the phone it may be transmitted to servers.

Within an SESD App, users may specify factors including, but not limited to; method (conventional, fly fishing, trolling, or ice fishing), species targeted, and equipment used (rod, reel, line, lure, bait, fly). This information may be transmitted to servers.

While a trip is recording, users' locations may be tracked and coordinates sent to servers whenever the SESD detects a fish has been caught. This data may be mapped with corresponding weather data and water data (current, forecasted, and historic) using time and location identifiers, or some other type of environmental data, including but limited to data collected by the United States Geological Survey (USGS).

In embodiments, the algorithms associated with an SESD 2000 may detect a relevant event (cast or catch), or some other data type as described herein, along with a time stamp, and may be logged and sent to servers. Once data is uploaded onto servers, the data may be used to create, for example, rectangular analyzable data sets. For continuous data (such as rod length, time of day, etc.) as well as categorical data (such as bait type and rod type) a series of dummy variables may be used at various cutoffs for some analyses. For example, time of day may be left continuous for some analyses, but can also be coded as 0 for daylight and 1 for night time, or 0 for morning and 1 for afternoon), and so forth. Location data may be used to match each row of data to a specific body of water and specific weather, or other environmental conditions. Using data that is processed as described herein may permit analyses to help fishermen understand the following aspects of their fishing trips that they have the ability to change and adjust based on their own (and others') data. Regarding the data of "others" as is stated in the previous sentence, the data of a plurality of users of the RMP and/or SESD and/or the app can be used by the analytics engine described herein. Catch data may be analyzed in conjunction with bait type to determine whether bait type is a significant predictor of catches. These analyses may be performed overall and may be performed while controlling for fish species, location, and other malleable factors. If there are significant findings for a given location (body of water), lure type, etc., then when SESD app users are interacting with those settings, push notifications may be sent to them. For example, if it is found that for the Chesapeake Bay area, bloodworms are highly predictive of catching Striper based on data received from users on the RMP, then for users detected in that location, a push notice with this information may be sent. In addition, users may have limited access to aggregated data tables through their devices. This limited access may allow users to select a set of malleable factors and display data from the remaining factor. For example, a user could select their rod type, location, fish species, and time of day, and could view a table indicating the number of fish caught on different baits. Other data may include, but is not limited to:

What equipment is successful (what to use)
 What locations are successful (where to fish)
 What weather or water parameters are successful (when to fish, where to fish)
 What times are successful (when to fish)
 What species are being caught (what to use, where to fish, when to fish)
 What methods are successful (how to fish)

Analyses similar to those described herein for bait success may be performed for the other malleable factors. In addition to analyses using aggregated fishing data (e.g., from all users), individual level data may be available to each fisherman. Individual level analysis may be built into the application 2400, 5200, allowing fishermen to determine their levels of success over time including, but not limited to:

Total casts
 Total catches
 Cast to Catch Ratio (Casts/Catches)
 Total Fishing Trips
 Total time spent fishing
 Total distance traveled while fishing In embodiments, a wide variety of analyses may be used to examine fishing success rates. For aggregated analyses with continuous variables both linear and non-linear parametric models (linear regression, logistic regression, etc.) may be used for data exploration. For analyses including categorical data machine learning models may be used including, but not limited to: SVM, separating hyperplanes, KNN, neural networks, decision trees, and naive-Bayes classifiers for further exploratory analyses.

In embodiments, algorithms may be used to predict an event, such as a cast/catch, and firmware may predict an event/no event at a specified interval, such as at every second. In an example, sensor data may come from 9 axes, such as 3 sensors (Accelerometer, Gyroscope and Magnetometer) and a 3 axis per each sensor. The sampling frequency may be assumed to be, in this example, 25 Hz (i.e., one second may contain 25 sample points/25 readings of all the axis). The features may be engineered using different aggregation times (e.g., 1, 3, 5.10 seconds). This means that, features may be generated using 3 (5 or 10) seconds' data samples and place at it one second resolution. So, the number of samples used will be aggregation seconds*sampling frequency. Continuing the example, the features that may be used may include, but are not limited to:

Mean—The sum of, for example, the 25 sample values when divided 25 gives the mean for 1 second. This becomes the feature. The feature nomenclature may be 'AxisName_Feature_AggregationSecond_sec' in general, for example—'AccX_MEAN 1 sec'.
 Median—The median is the value separating the higher half of the 25 samples from the lower half.
 Min/Max—Minimum/Maximum of 25 sample values gives the Min/Max for 1 second.
 Standard deviation (Stdev)—Standard deviation of the 25 samples gives one more feature
 Sum of Absolute Difference (SAD)—For all the 25 samples, the absolute difference of the current value and the previous value may be considered. These values mat be summed and turned into a 1 second feature.
 Mean of Absolute Difference (MAD)—For all the 25 samples, the absolute difference of the current value and the previous value may be considered. The mean of all these values may be taken and turned into a 1 second feature.
 Percentile 5 (PER 5)—A score that is greater than 5% of the total 25 sample values
 Percentile 95 (PER 95)—A score that is greater than 95% of the total 25 sample values
 Mean Crossings (MC)—A count of how many times within those 25 sample values, a value has crossed the mean of those 25 values.

For aggregation seconds other 1 seconds—All the above features may be calculated for, for example, 3, 5 and 10 seconds in the same fashion as described herein. So, for first value of AccX_MEAN_3_sec feature, a mean may be calculated for 1-75 samples, for second value 26-100, third value 51-125 and so on. These values may be kept at the resolution of 1 second. Similar process may be done for any aggregation seconds, choosing aggregation_seconds*sampling_frequency number of samples. The features may be engineered using different aggregation times (1, 3, 5, 10 seconds). This means that, features may be generated using 3 (5 or 10) seconds' data samples and place it at one-second resolution. Thus, the number of samples used will be aggregation seconds*sampling frequency. Example features include, but are not limited to:

Mean—The sum of all the 25 sample values when divided 25 gives the mean for 1 second. This becomes a feature. The feature nomenclature may be: 'AxisName_Feature_AggregationSecond_sec' in general, for example—'AccX_MEAN 1 sec'.
 Median—The median is the value separating the higher half of the 25 samples from the lower half.
 Min/Max—Minimum/Maximum of 25 sample values gives the Min/Max for 1 second.
 Standard deviation (Stdev)—Standard deviation of the 25 samples gives one more feature Sum of Absolute Difference (SAD)—For all the 25 samples, the absolute difference of the current value and the previous value may be used, and then sum all these values to create a 1 second feature.

Mean of Absolute Difference (MAD)—For all the 25 samples, the absolute difference of the current value and the previous value may be used, then take mean of all these values to create a 1 second feature.

Percentile 5 (PER 5)—The score that is greater than 5% of the total 25 sample values Percentile 95 (PER 95)—The score that is greater than 95% of the total 25 sample values Mean Crossings (MC)—A count of how many times within those 25 sample values, a value has crossed the mean of those 25 values.

Figure 9B:
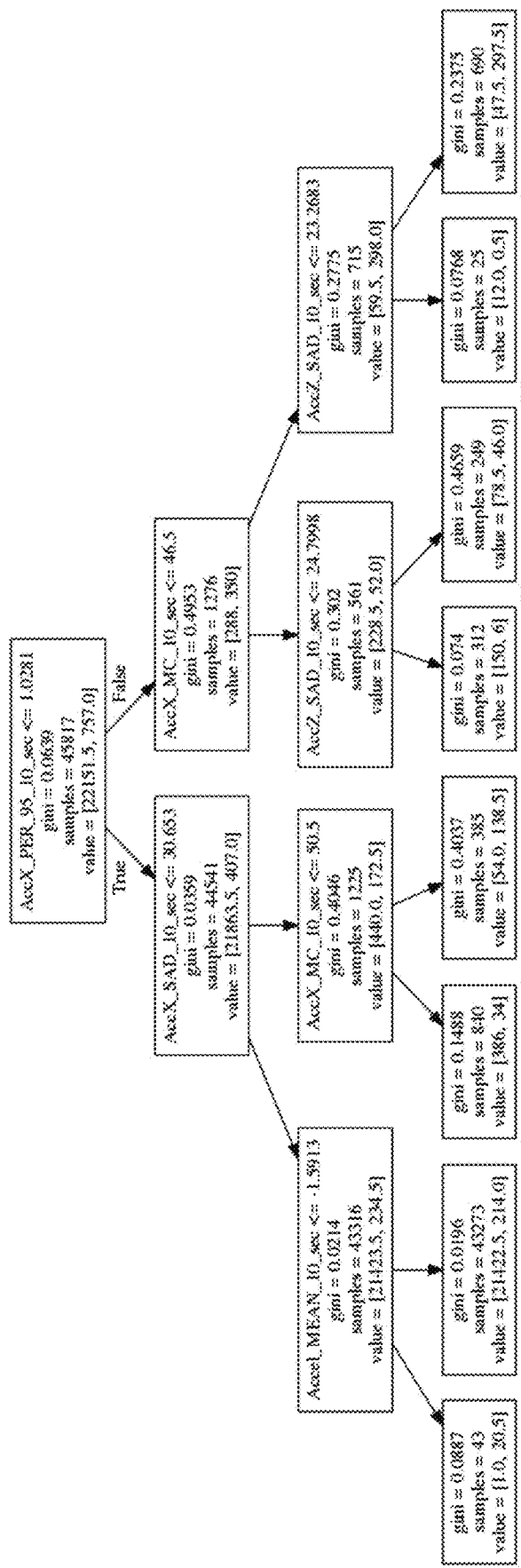
FIGS. 9B through 9EE depict analysis of decision trees for the purpose of detecting specified sporting actions.
Figure 9C:
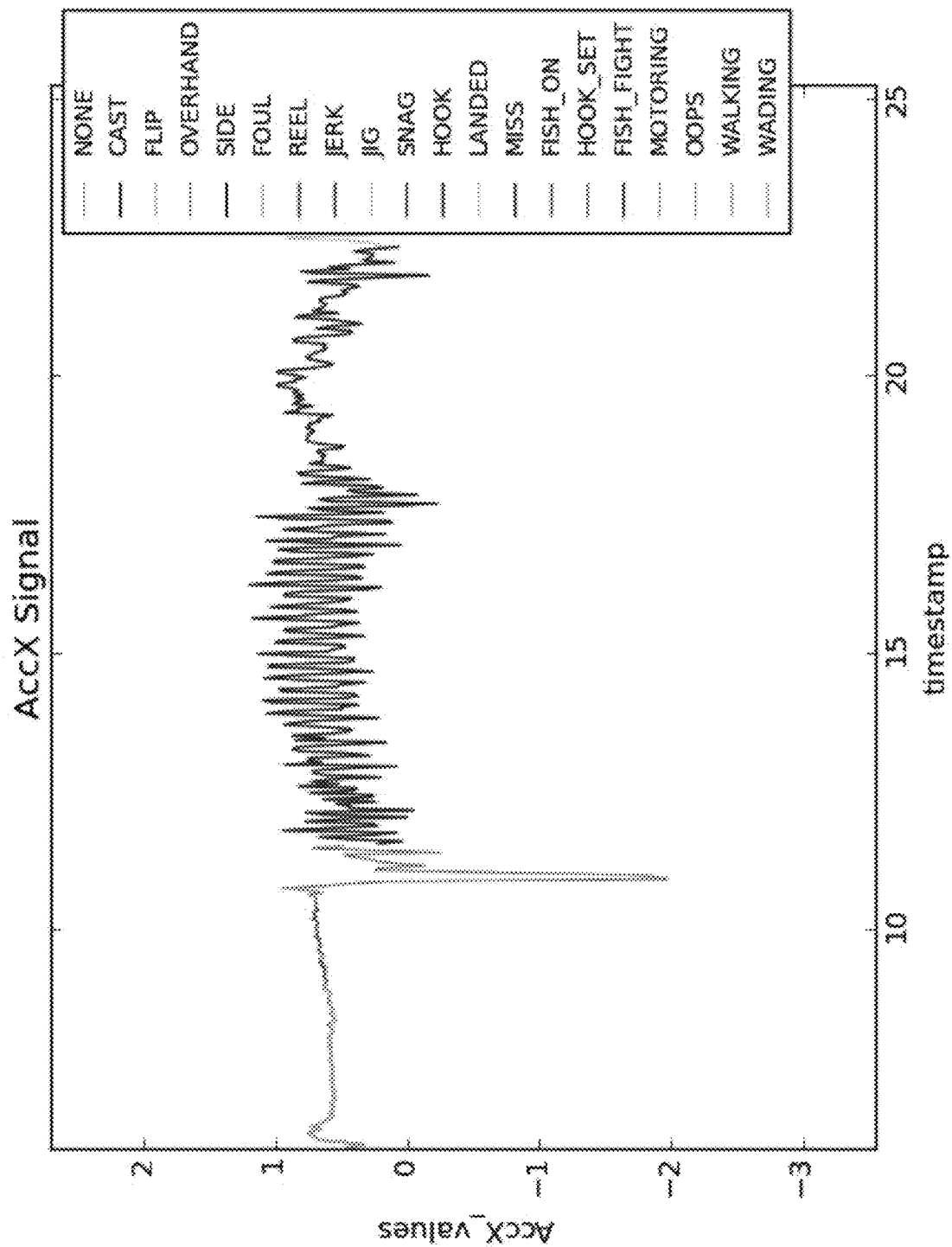
Figure 9D:
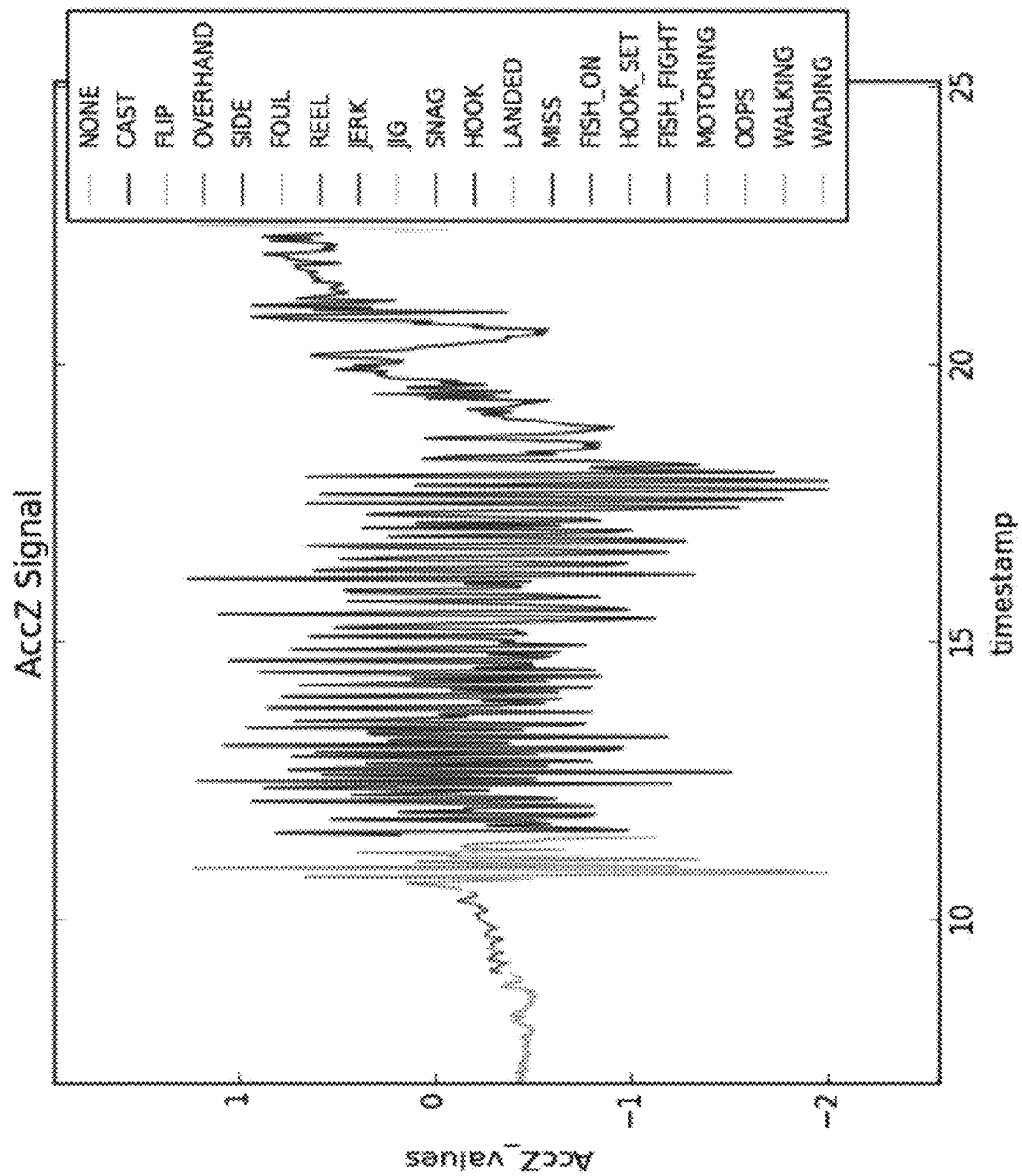
Figure 9E:
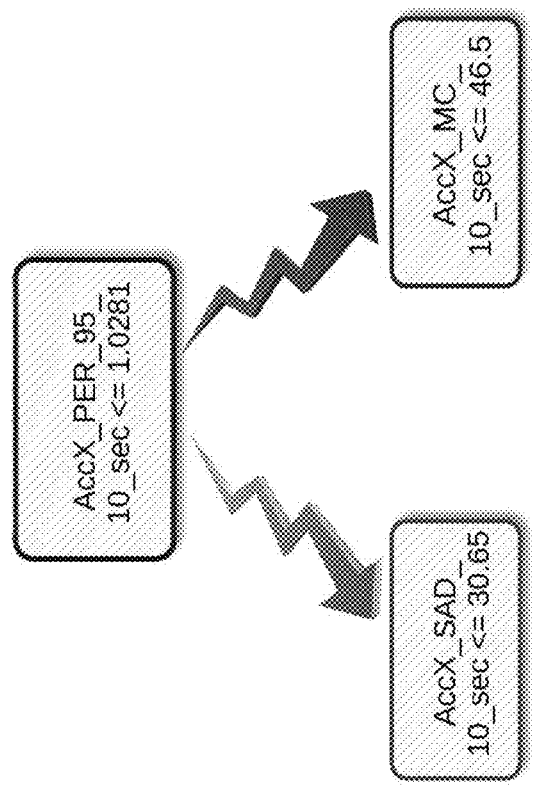
Figure 9F:
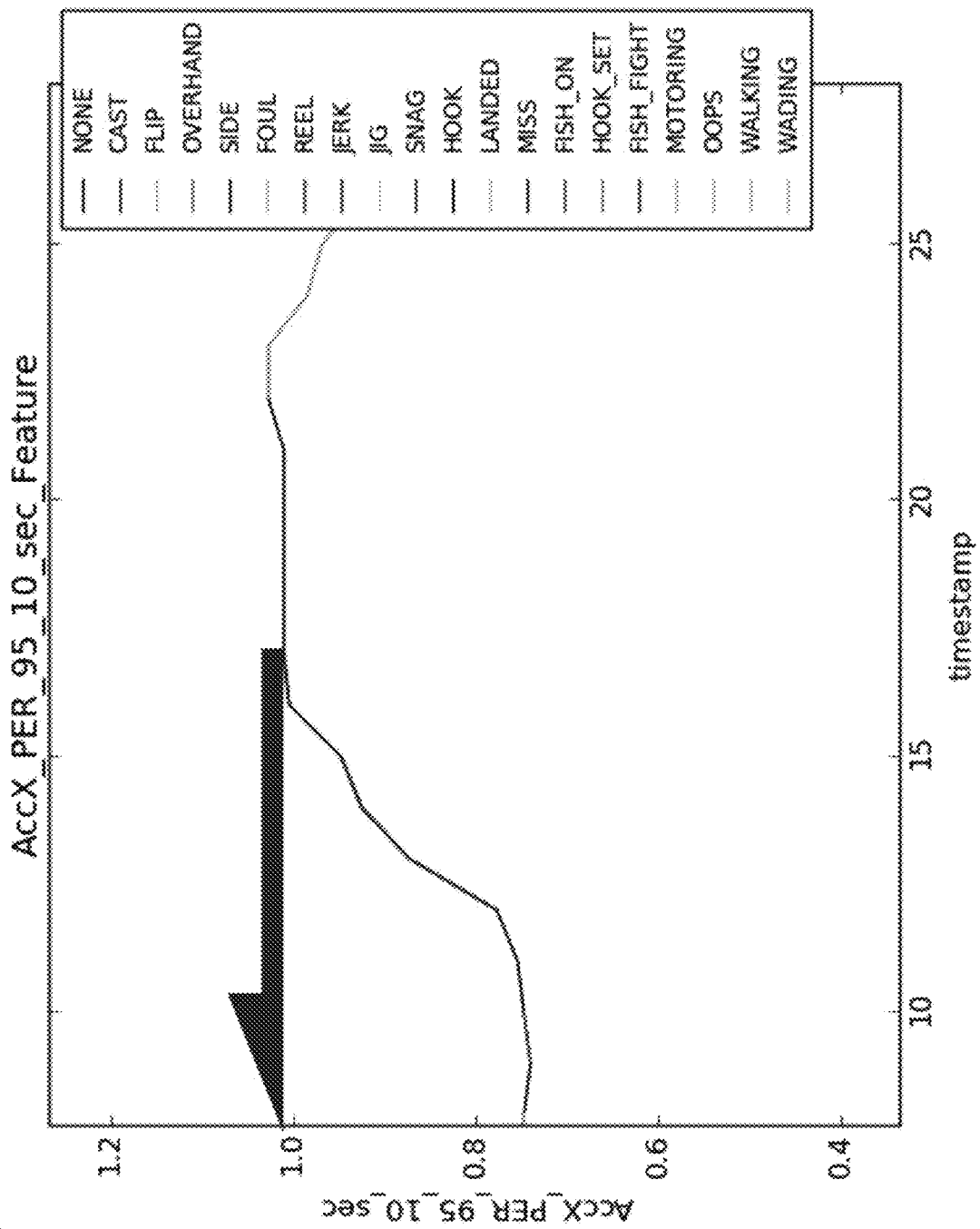
Figure 9G:
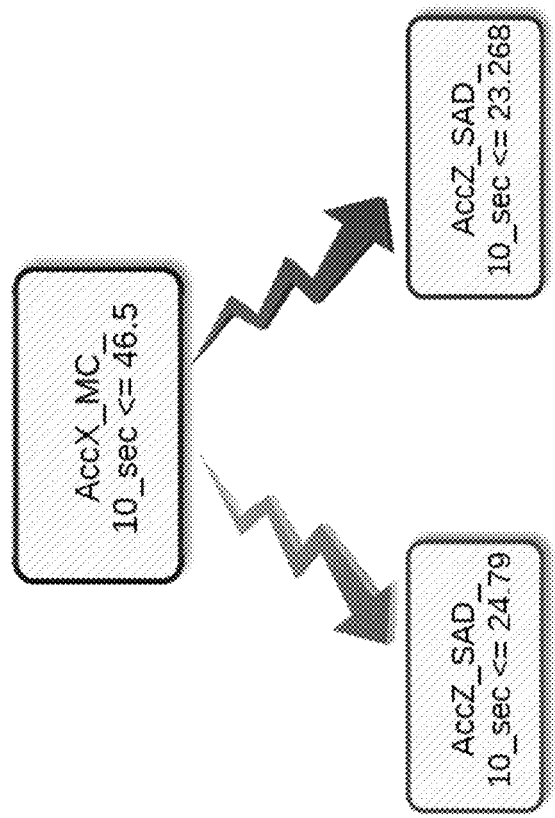
Figure 9H:
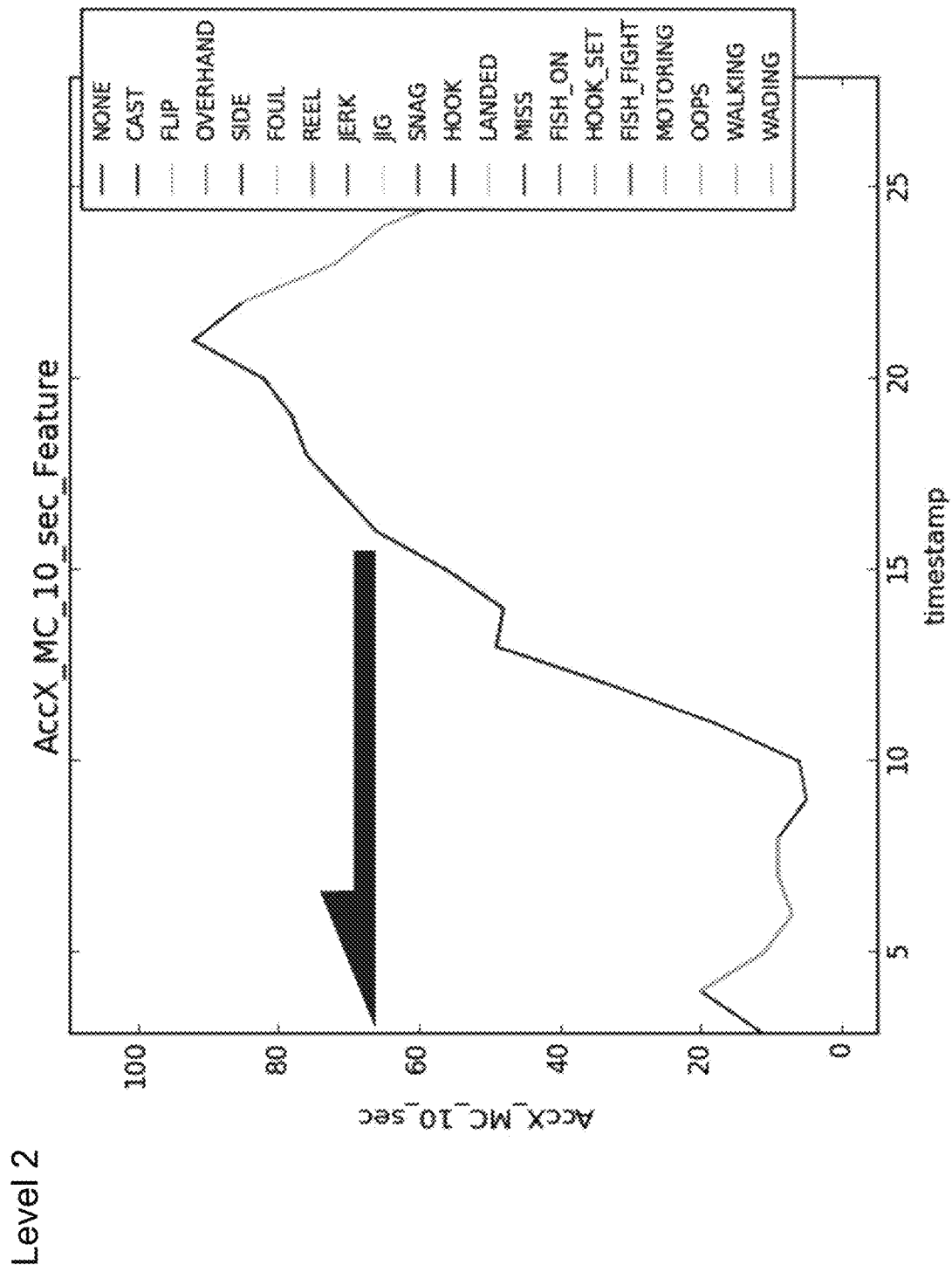
Figure 9I:
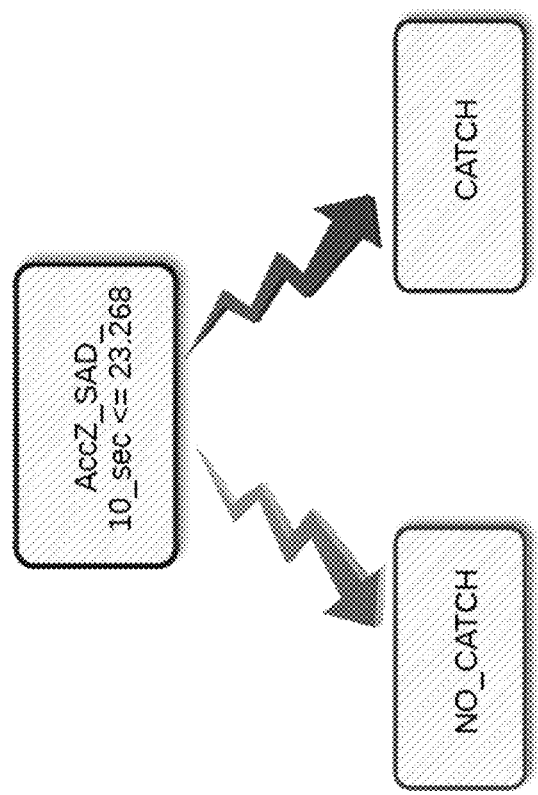
Figure 9J:
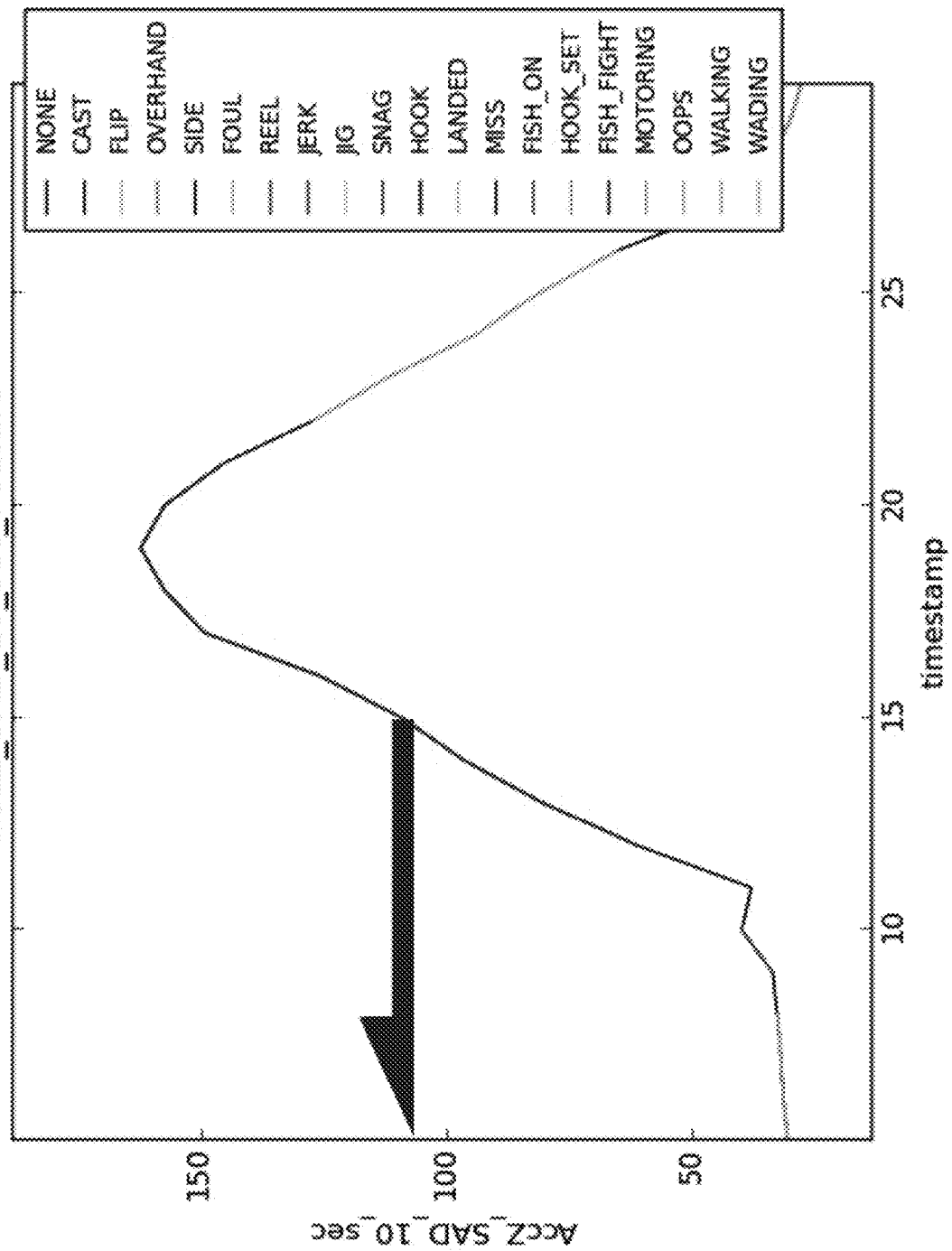

In embodiments, a decision tree and related analysis may be used to detect events such as a fish fighting on the line, a generic cast, a flip cast, or some other type of sporting or angling event, as described herein. The steps followed to understand a decision tree include, but are not limited to testing at every decision tree node and, if the test is passed, the moving to either the right side or left side until the final level is reached. The ultimate decision (e.g., a cast detected) is determined at the final level. For example, FIG. 9B depicts an example of a decision tree that may be used for detecting a fish fighting on the line. As shown in FIGS. 9c and 9D, a fish fight signal between 10-20 seconds is shown, during which time window the RMP would observe and analyze the decision tree. Referring to FIGS. 9E and 9F, in this example it is shown that the path traversed would be to its right since the node feature which is to be tested fails the test (i.e., AccX_PER_95_10_sec>1.0281). Referring to FIGS. 9G and 9H, in this example it is shown that the path traversed would be to its right since the node feature that is to be tested fails the test (i.e., AccX_MC_10_sec>46.5). FIGS. 9I and 9J show that it is clear that the path traversed would be to its right since the node feature that is to be tested fails the test. Hence, the final decision tree outcome would be to indicate a fish catch.

Figure 9K:
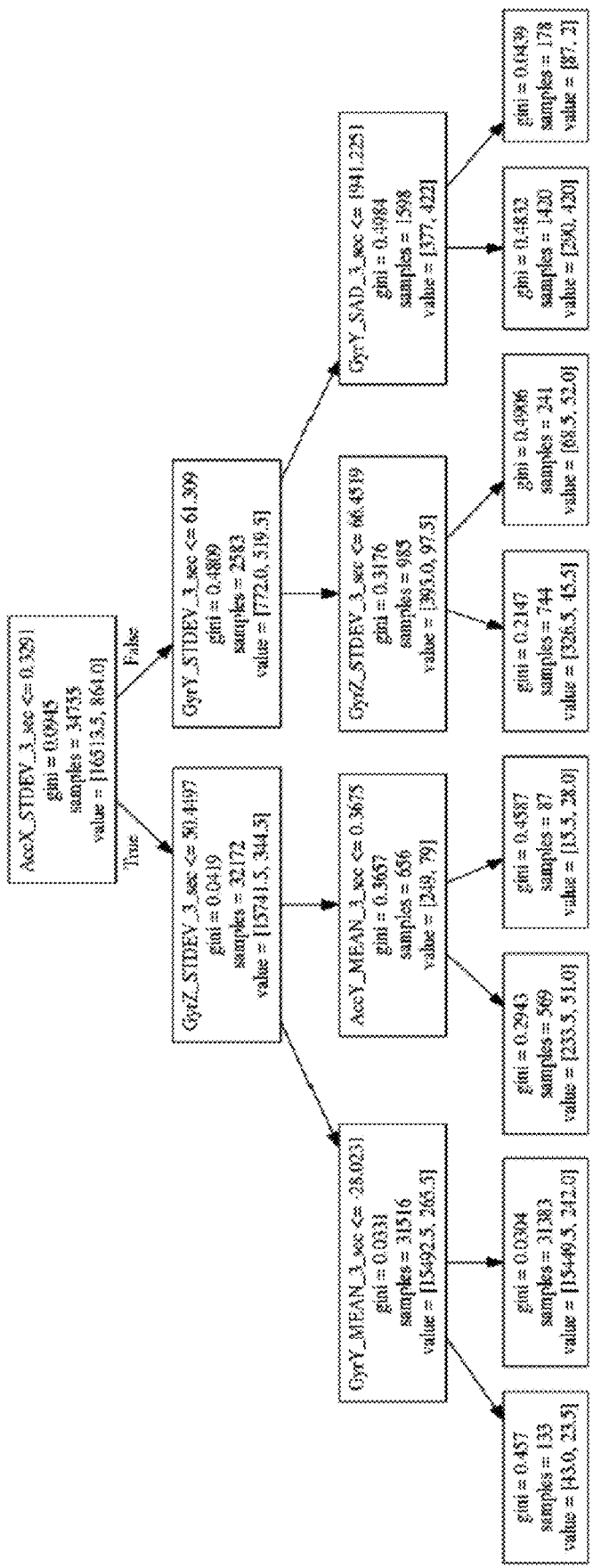
Figure 9L:
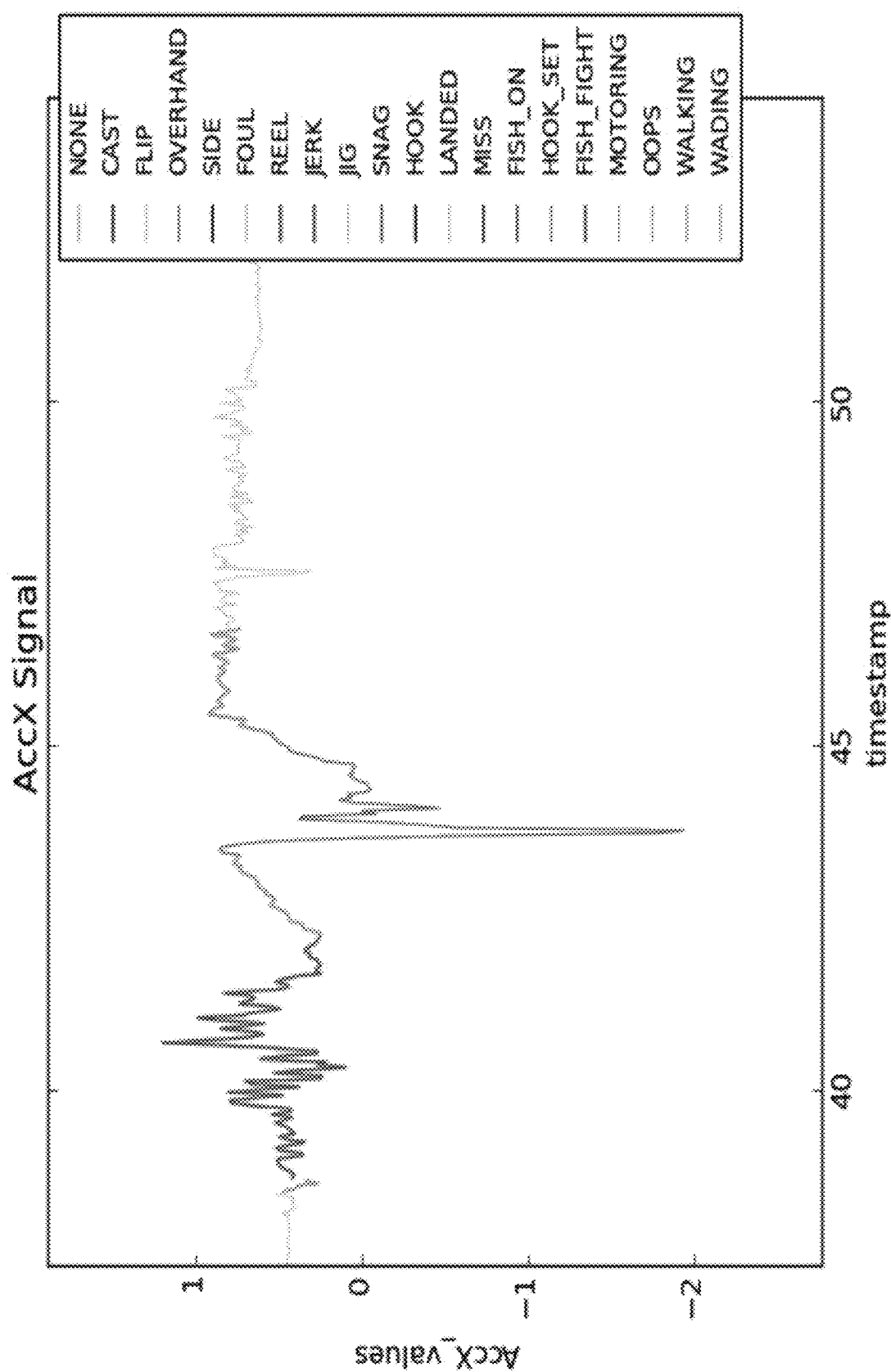
Figure 9M:
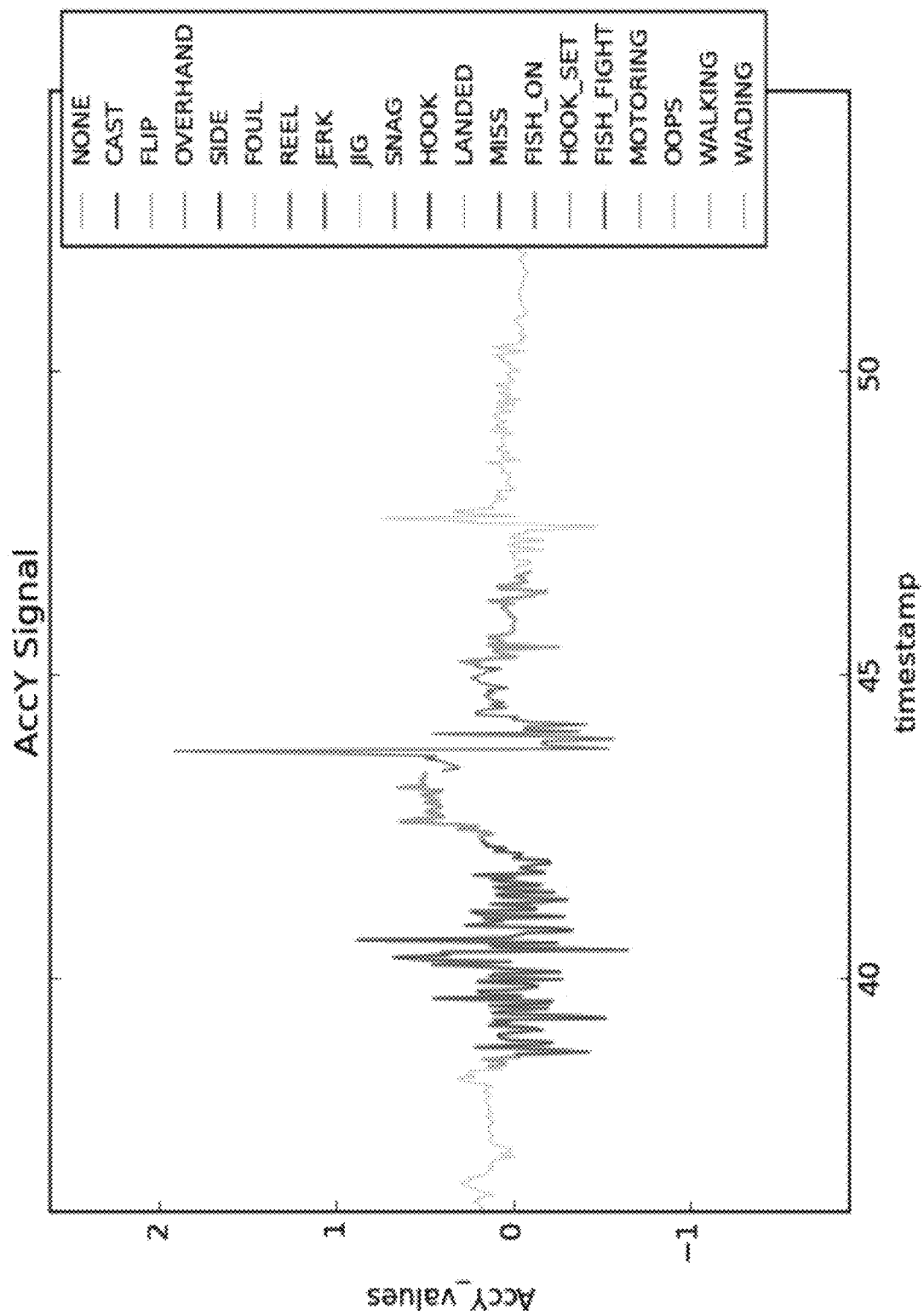
Figure 9N:
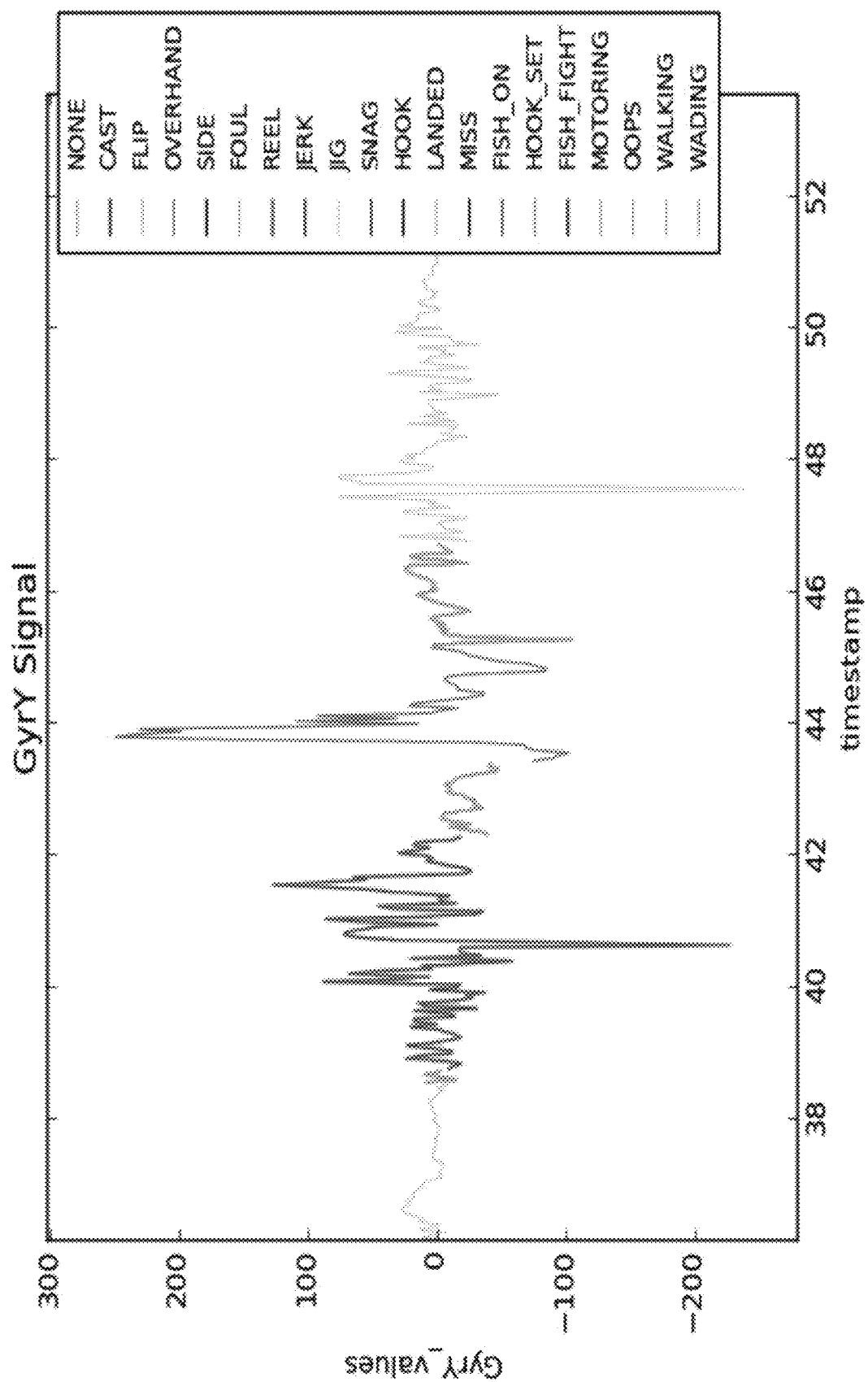
Figure 90:
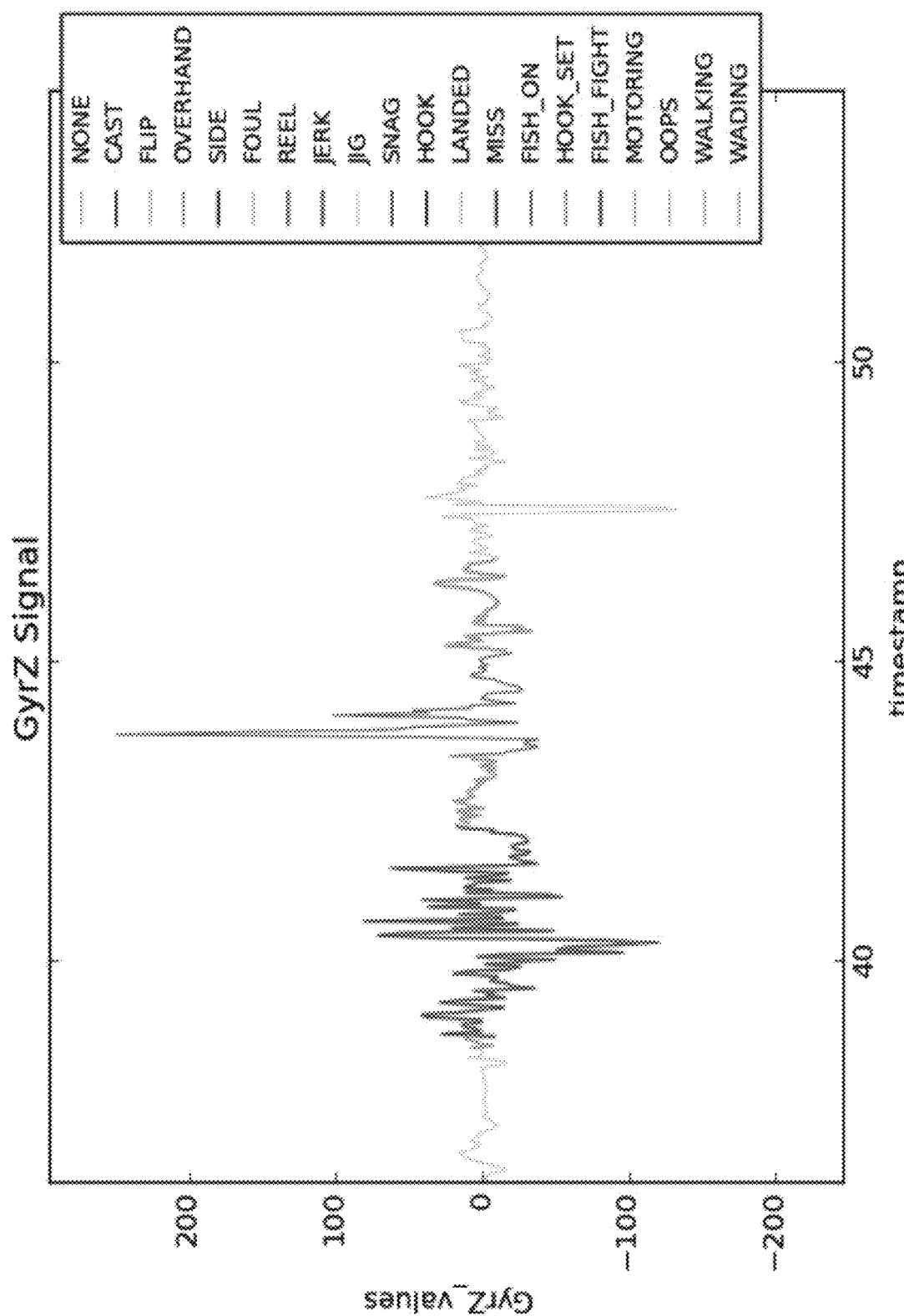
Figure 9P:
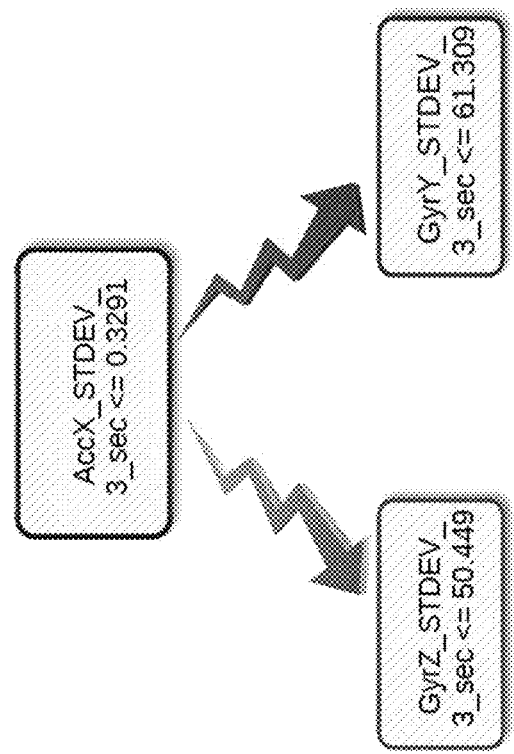
Figure 9Q:
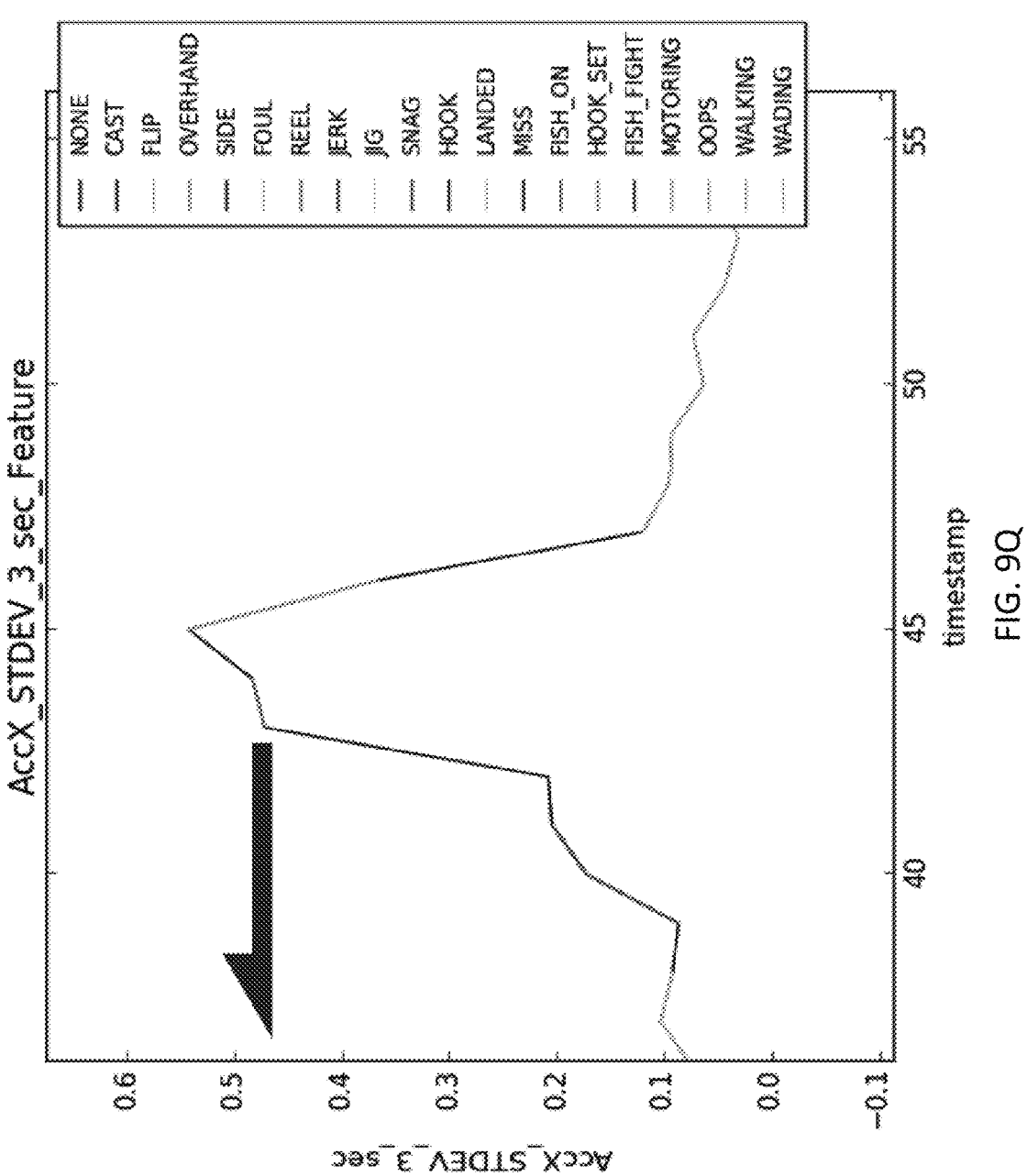
Figure 9R:
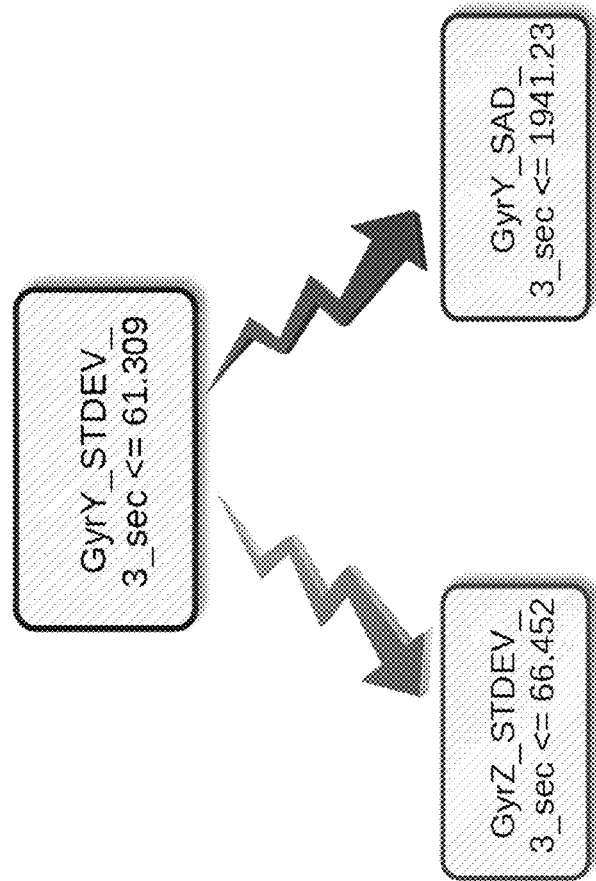
Figure 9S:
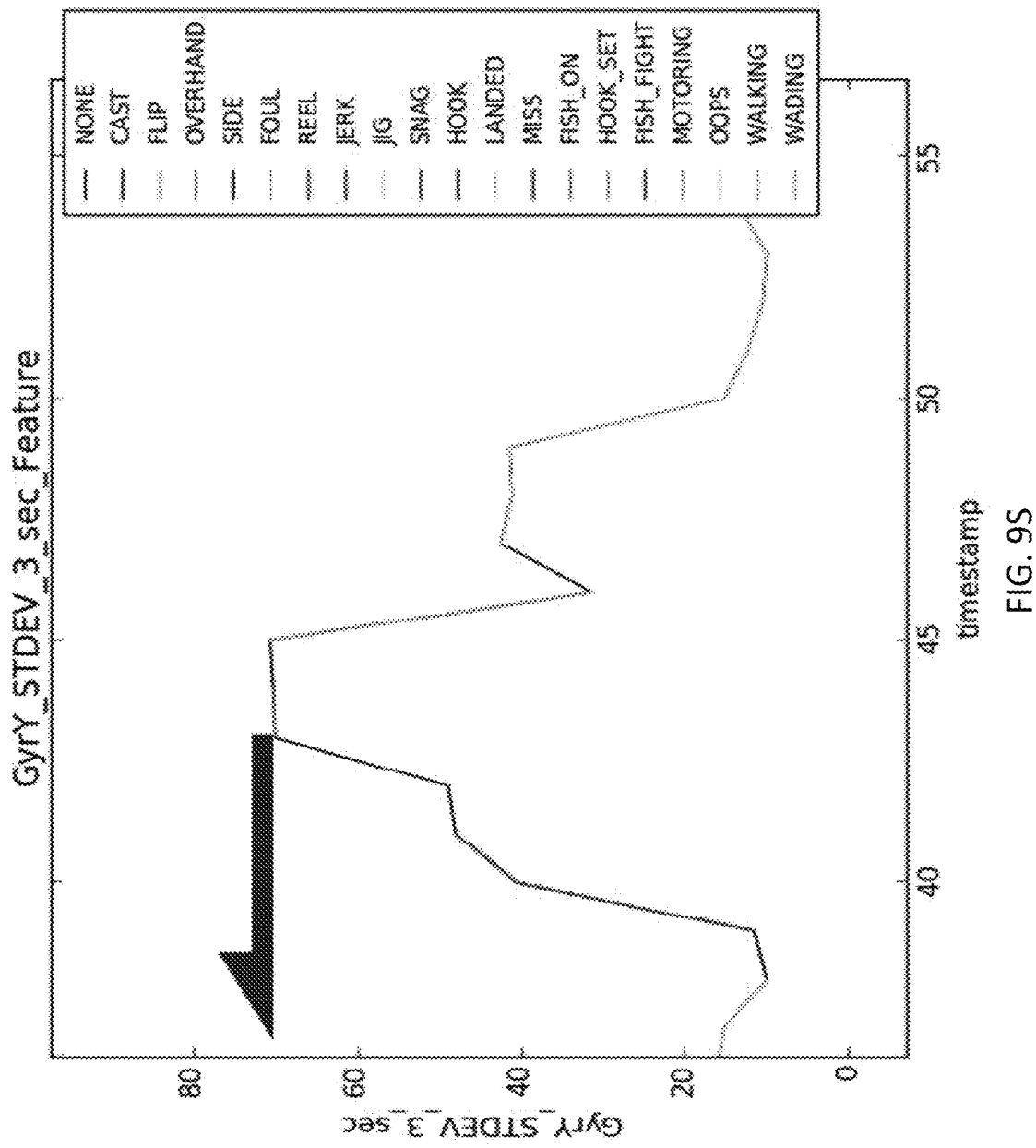
Figure 9T:
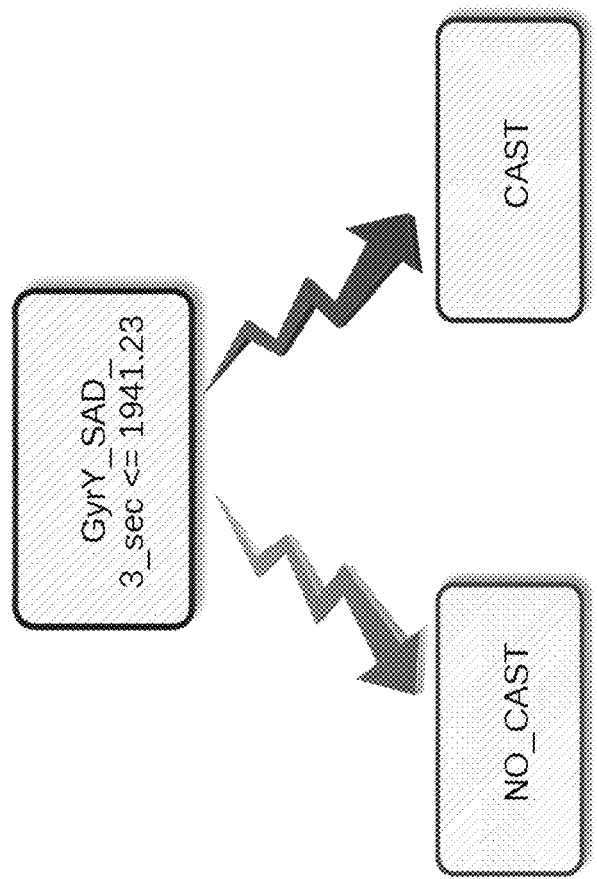
Figure 9U:
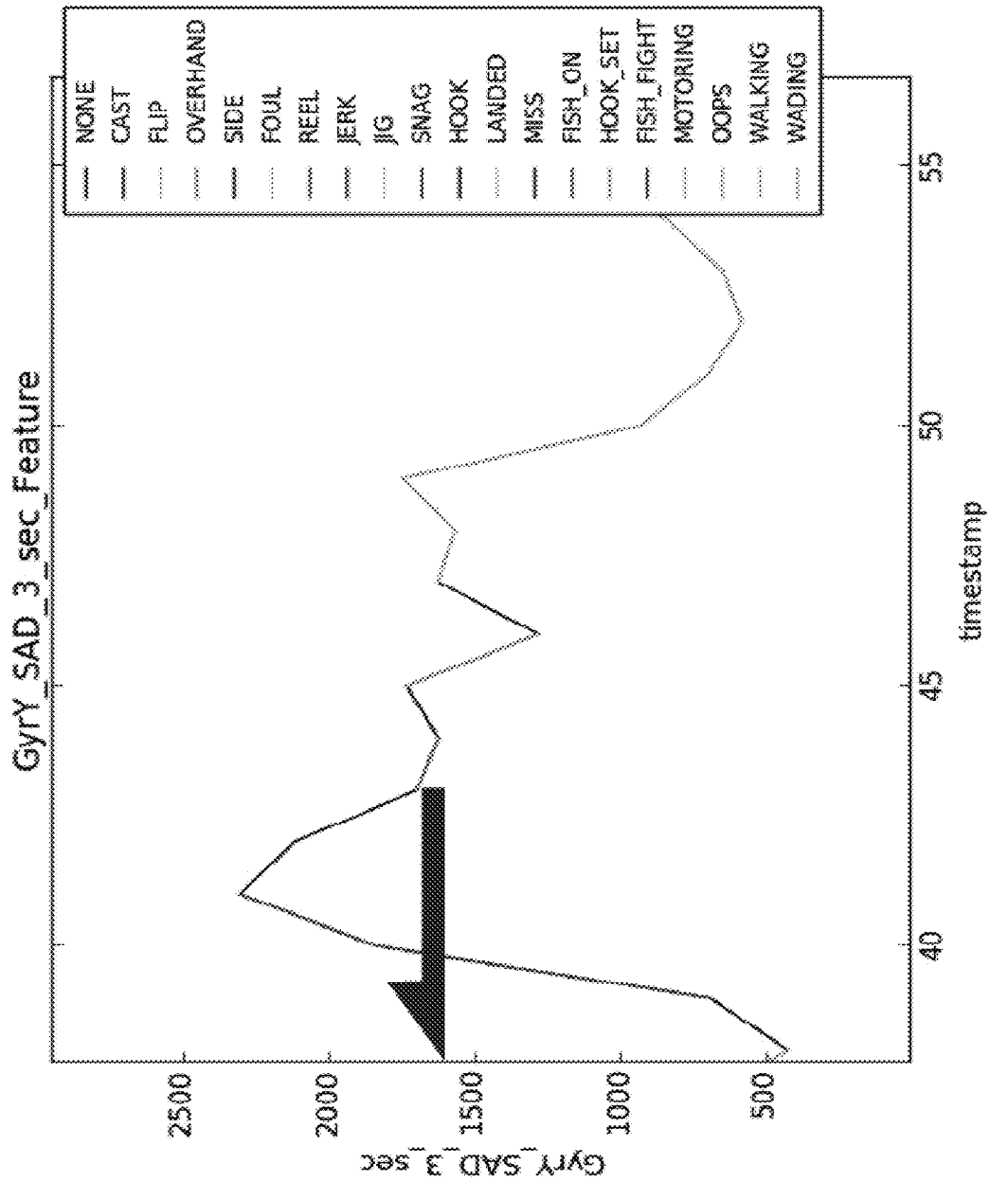

FIG. 9K depicts an example of a decision tree that may be used for detecting a generic cast. As shown in FIGS. 9L through 9O, a cast signal between 40-50 seconds is shown, during which time window the RMP would observe and analyze the decision tree. Referring to FIGS. 9P and 9Q, in this example it is shown that the path traversed would be to its right since the node feature which is to be tested fails the test (i.e., AccX_STDEV_3_sec>0.3291). Referring to FIGS. 9R and 9S, in this example it is shown that the path traversed would be to its right since the node feature which is to be tested fails the test (i.e., GyrY_STDEV_3_sec>61.309). FIGS. 9T and 9U show that it is clear that the path traversed would be to its right since the node feature that is to be tested fails the test. Hence, the final decision tree outcome would be to indicate the occurrence of a cast.

Figure 9V:
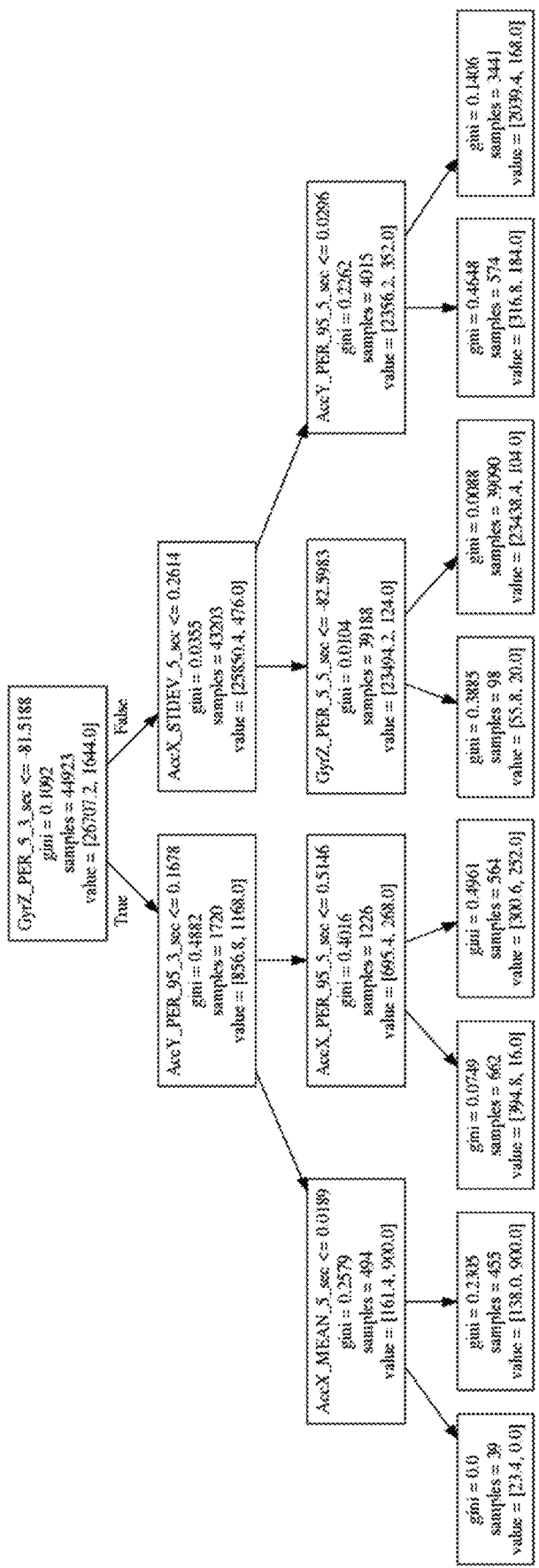
Figure 9W:
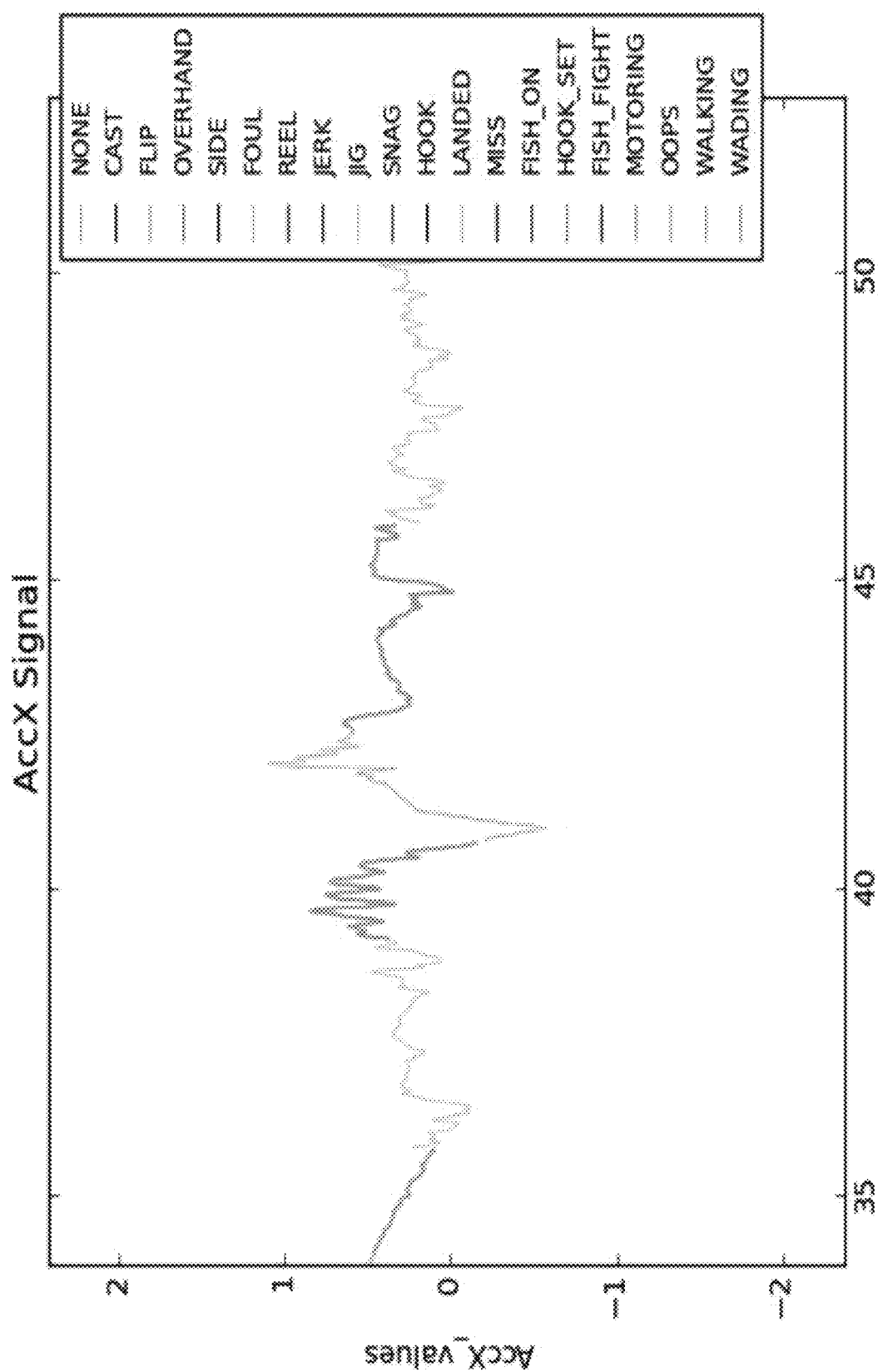
Figure 9X:
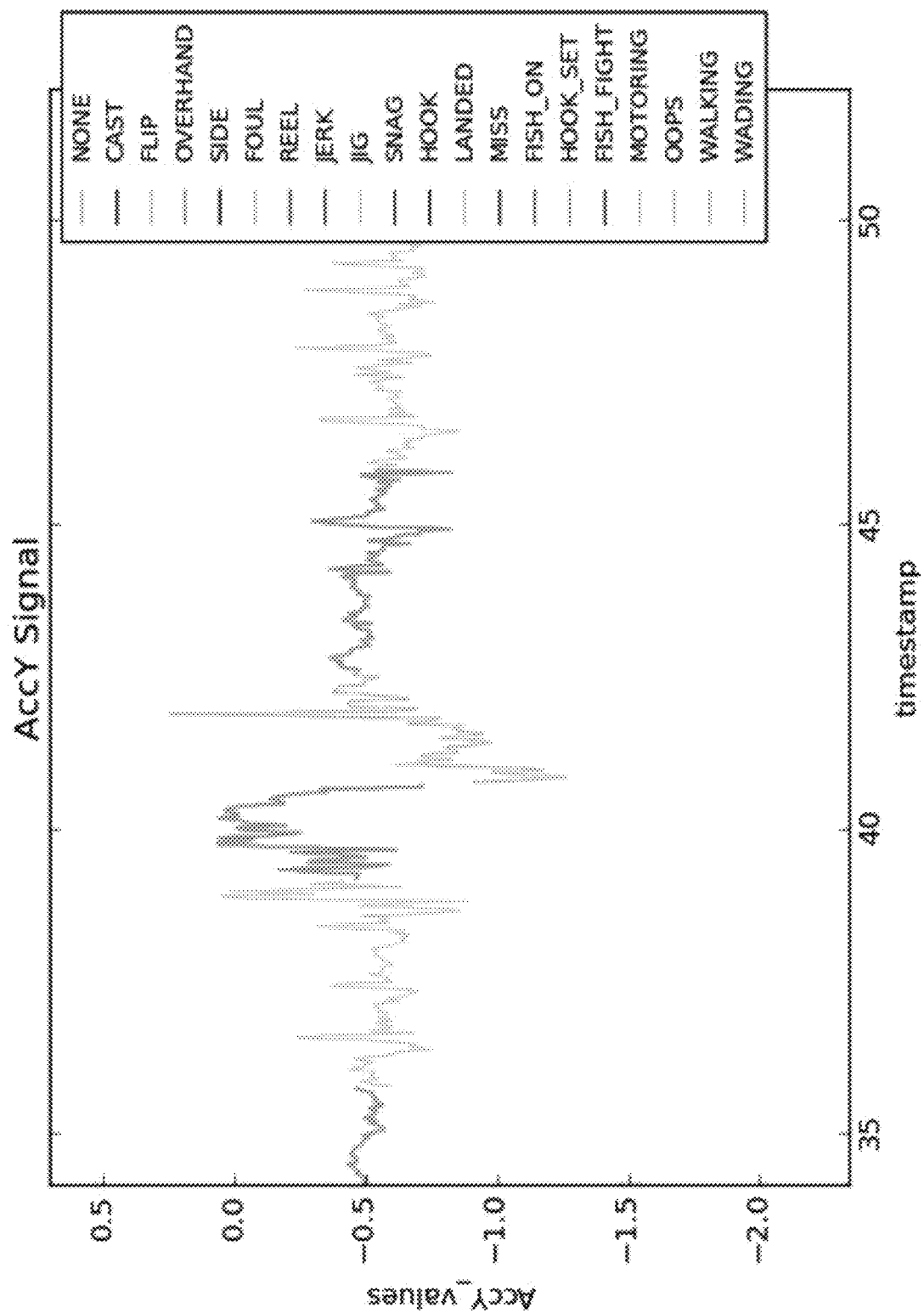
Figure 9Y:
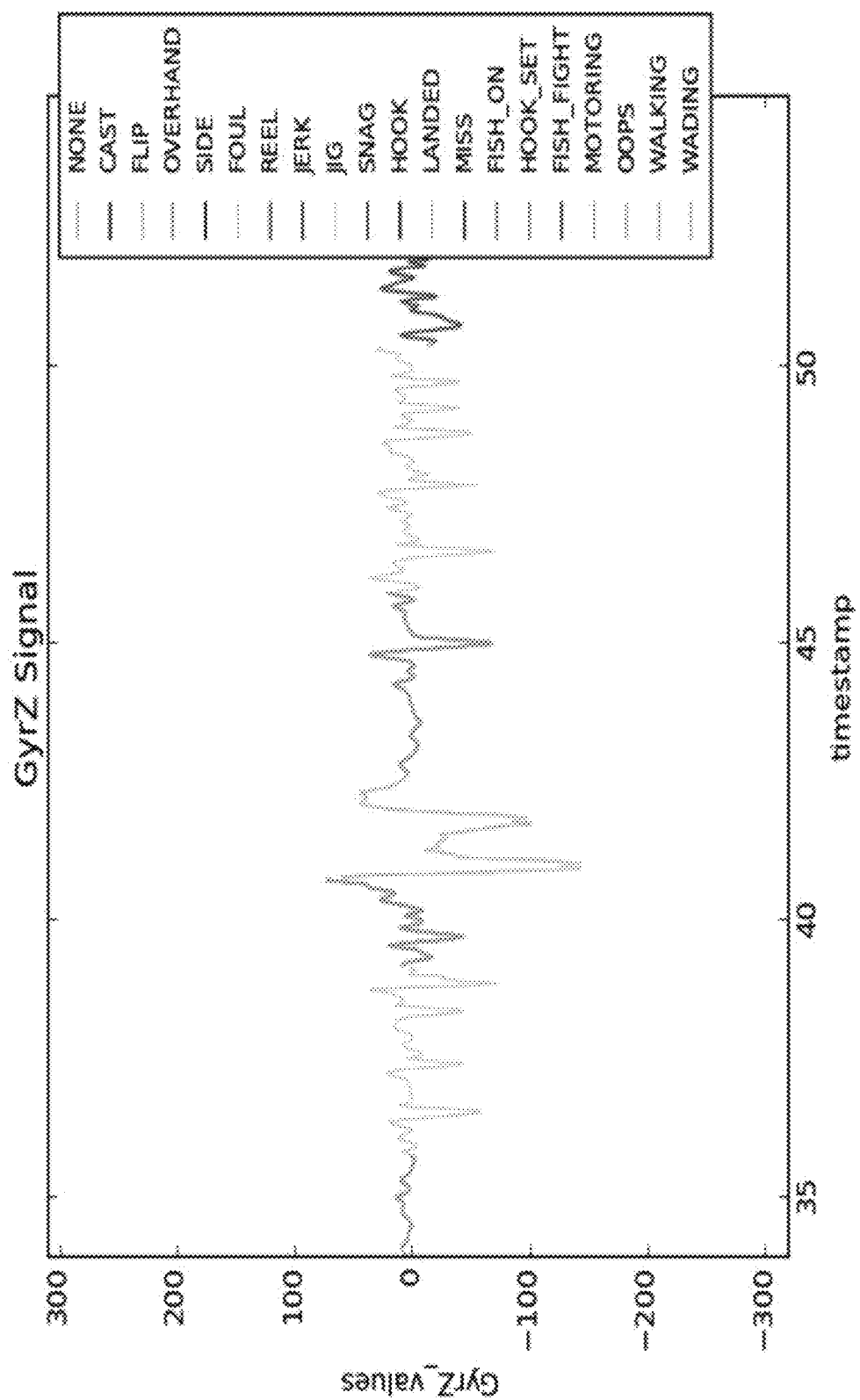
Figure 9Z:
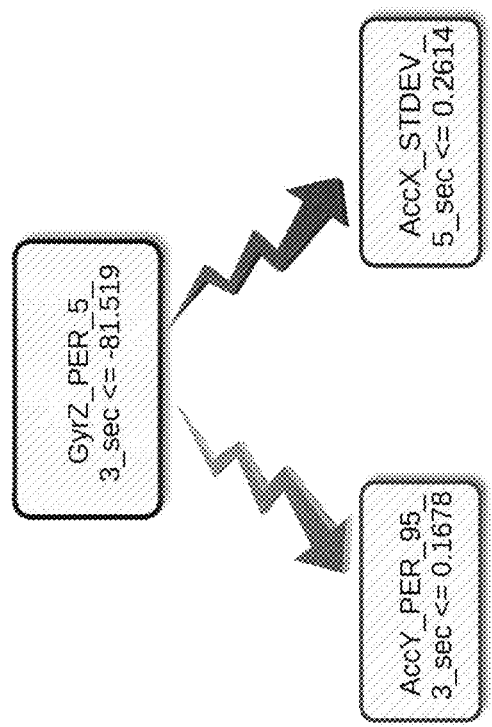
Figure 9A:
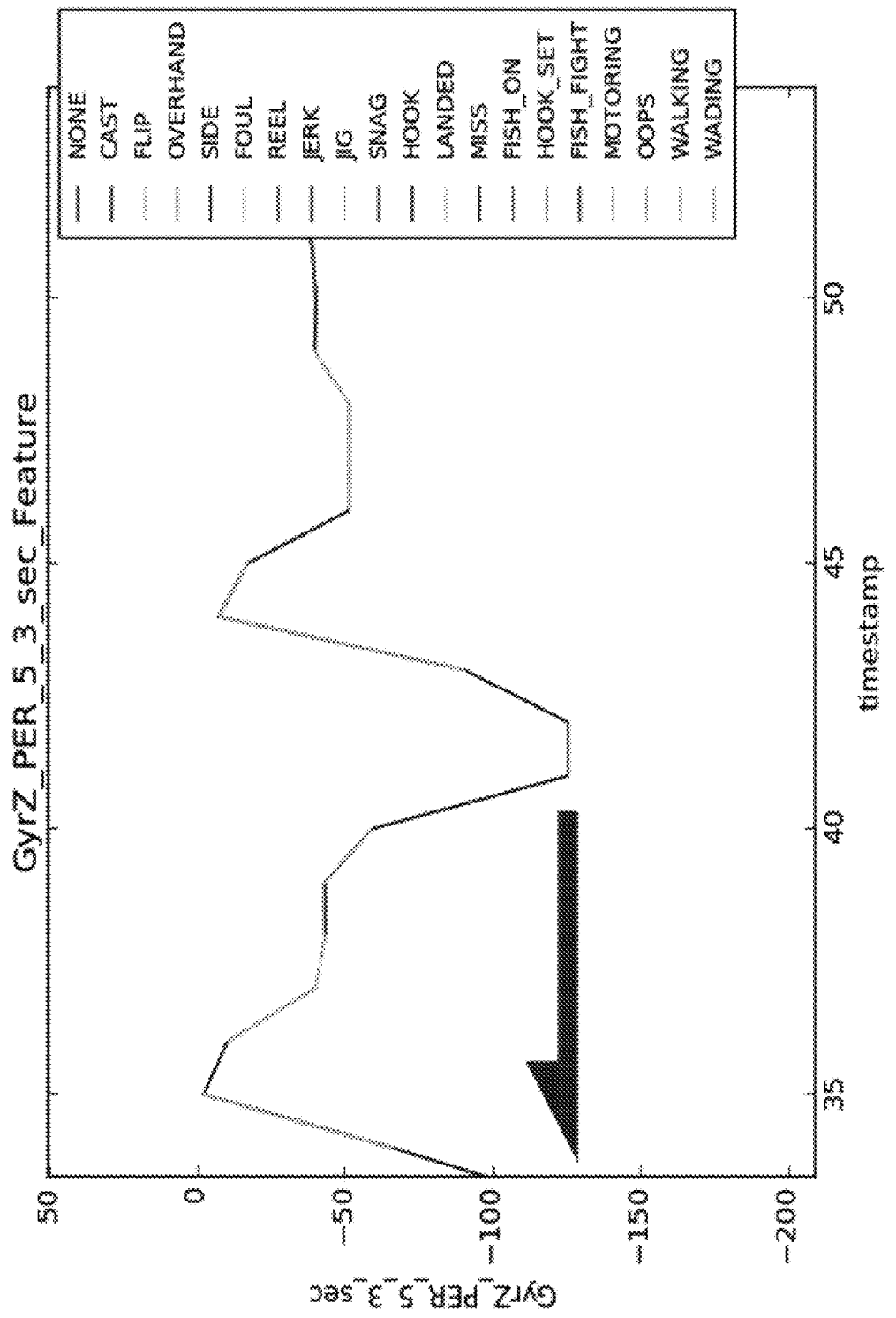
Figure 9B:
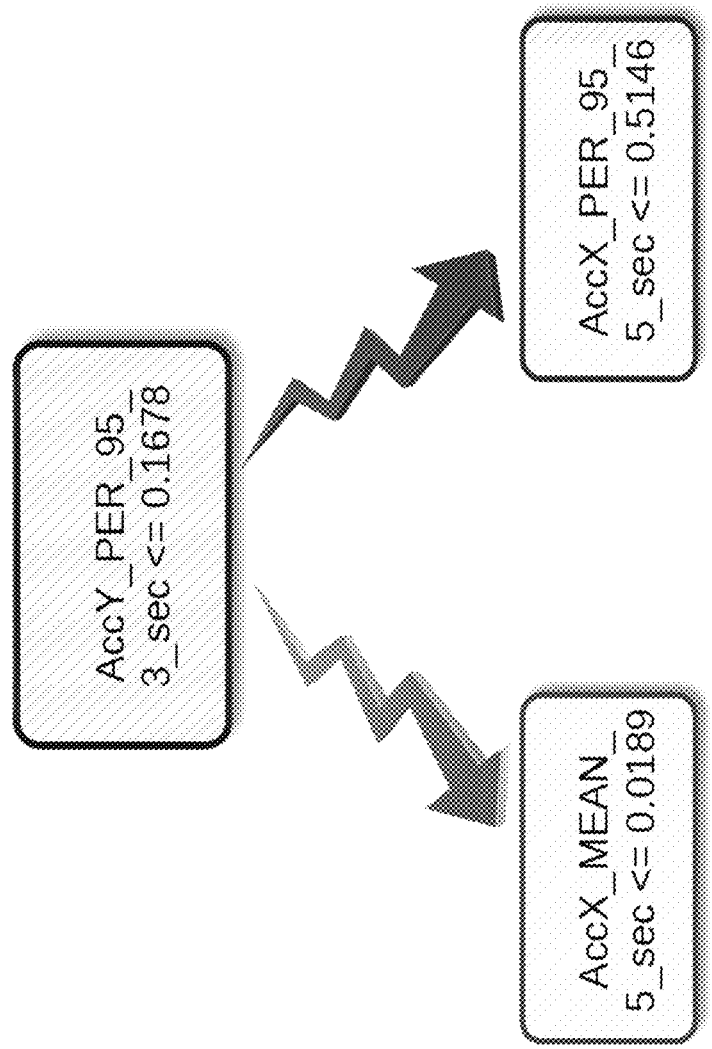
Figure 9C:
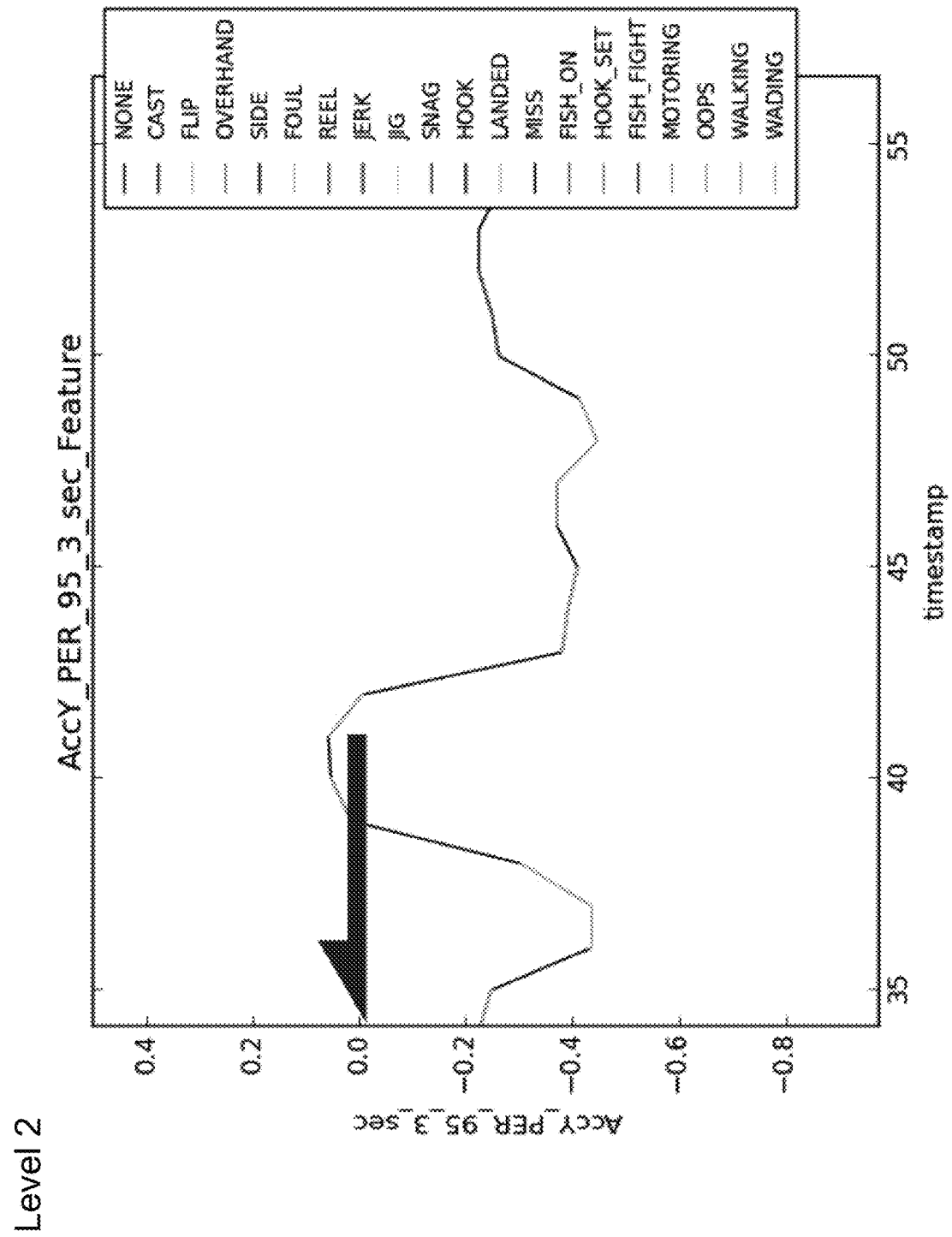
Figure 9D:
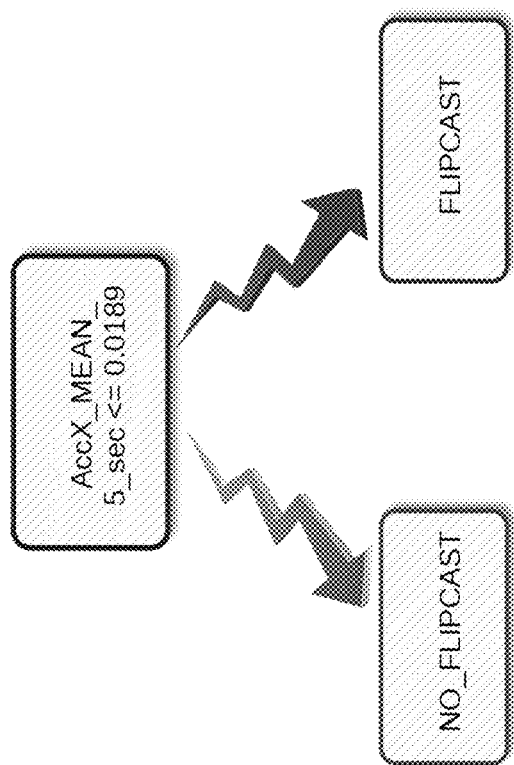
Figure 9E:
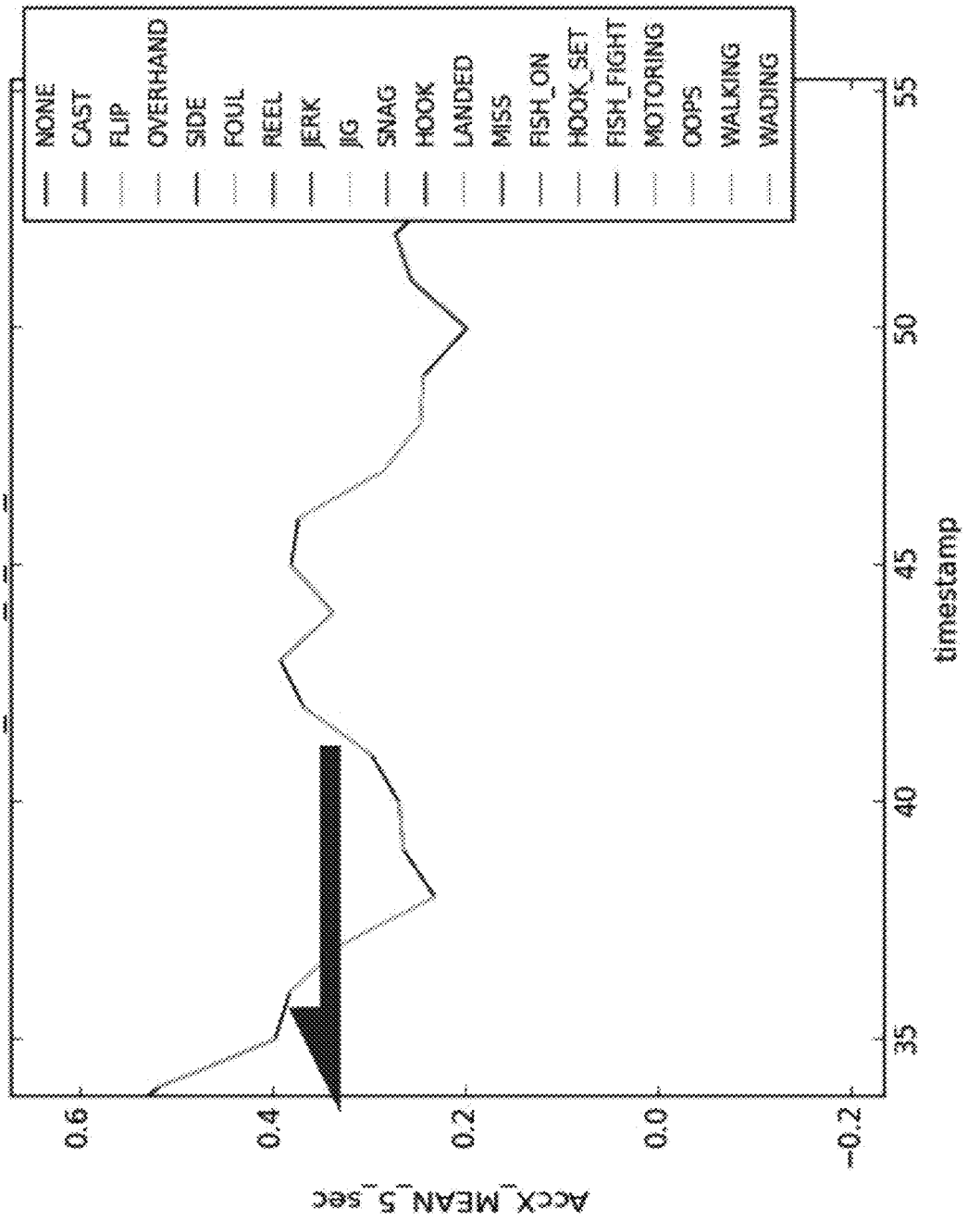

FIG. 9V depicts an example of a decision tree that may be used for detecting a flip cast. As shown in FIGS. 9W through 9Y, a cast signal between 40-50 seconds is shown, during which time window the RMP would observe and analyze the decision tree. Referring to FIGS. 9Z and 9AA, in this example it is shown that the path traversed would be to its left since the node feature which is to be tested passes the test (i.e., (GyrZ_PER_5_3_sec<−81.519). Referring to FIGS. 9BB and 9CC, in this example it is shown that the path traversed would be to its left since the node feature which is to be tested fails the test (i.e., AccY_PER_95_3_sec<0.1678). FIGS. 9DD and 9EE show that it is clear that the path traversed would be to its right since the node feature that is to be tested fails the test. Hence, the final decision tree outcome would be to indicate the occurrence of a flip cast.

The following are illustrative clauses demonstrating non-limiting embodiments of the disclosure described herein:

A system to generate angling recommendations comprising:

a. an angling event sensing device adapted to be mounted to a fishing rod having reel and line comprising at least one sensor to generate parameters indicative of the rod, reel, or line;

b. a processor unit; and c. a mobile device running an application in communication with the angling event sensing device and in communication with the processing unit or the at least one sensor, wherein the processor or the application is operable to determine at least one angling event based on from the at least one sensor d. a recreation monitoring platform operable to receive (i) the angling event and (ii) angling data input by a user to the application, the recreation monitoring platform comprising a recommendation facility.

The system of preceding clause, wherein the recreation monitoring platform is in communication with a second angling event sensing device adapted to be mounted to a fishing rod having reel and line comprising (i) at least one sensor to generate parameters indicative of the rod, reel, or line, (ii) a processor unit; and (iii) being in communication with a mobile device running an application in communication with the second angling event sensing device and in communication with the processing unit of the second angling event sensing device or the at least one sensor of the second angling event sensing device, wherein the processor of the second angling event sensing device or the application of the second angling event sensing device is operable to determine at least one angling event based on data from the at least one sensor of the second angling event sensing device.

The system of any of the preceding clauses, wherein the recommendation facility is operable to make an angling recommendation based on (i) an angling event, (ii) angling data input by the user to the angling event sensing device, (iii) an angling event detected by the second angling event sensing device, or (iv) angling data input by a user to the second angling event sensing device.

The system of any of the preceding clauses, wherein the recreational monitoring platform is operable to receive data of weather or water conditions corresponding to the location of the angling event sensing device or the second angling event sensing device.

The system of any of the preceding clauses, wherein the recommendation facility is further operable to make the angling recommendation based on (i) the angling event of the second angling event sensing device (ii) angling data input the user of the second angling event sensing device, or (iii) the data of weather or water conditions corresponding to the location of the second angling event sensing device.

A system to provide angling data comprising:

a. a first angling event sensing device adapted to be mounted to a first fishing rod having a first reel and first line, the first angling sensing device comprising at least one sensor to generate parameters indicative of the first rod, first reel, or first line;

b. a first processor unit in communication with the at least one sensor of the first angling event sensing device;

c. a recreational monitoring platform comprising at least one server;

d. a first application running on a first mobile device in communication with the processor of the first angling event sensing device and in communication with the recreational monitoring platform, wherein the processor of the first angling event sensing device, the application of the first mobile device, or the recreational monitoring platform determines at least one angling event based data from the at least one sensor of the first angling sensing device, and wherein the recreational monitoring platform receives angling data input by a first user;

e. a second application running on a second mobile device in communication with the recreational monitoring platform, wherein the second application receives from the recreational monitoring platform data generated based on angling data input by the first user or an angling event detected by the first angling device.

The system of the preceding clause, wherein the second application displays the angling data input by a user or the first device or an angling event detected by the first angling event on the second mobile device.

The system of any of the preceding clauses, wherein the recreational monitoring platform is operable to receive data of weather or water conditions corresponding to the locations of (i) angling events of the first angling event sensing device or angling data input by the first user and (ii) the second mobile device.

The system of any of the preceding clauses, wherein the recreational monitoring platform comprises a recommendation facility to generate an angling recommendation.

The system of any of the preceding clauses, wherein the recommendation facility is operable to generate an angling recommendation based on angling data input by the first user or an angling event detected by the first angling device.

The system of any of the preceding clauses, wherein the recommendation facility is further operable to generate an angling recommendation based on weather or water conditions corresponding to the locations (i) angling events of the first angling event sensing device or angling data input by the first user and (ii) the second mobile device.

The system of any of the preceding clauses, the weather or water conditions of the angling events of the first angling event sensing device or angling data input by the first user are similar to weather and water conditions of the second mobile device.

The system of any of the preceding clauses, wherein the at least one angling event of the first angling event sensing device is one of fish on, fish landed, or fish lost.

The system of any of the preceding clauses, wherein the first angling event sensing device is operable to determine the species of a fish on, fish landed, or fish lost based on data received from the at least one sensor.

Figures 11A, 11B, 11C:
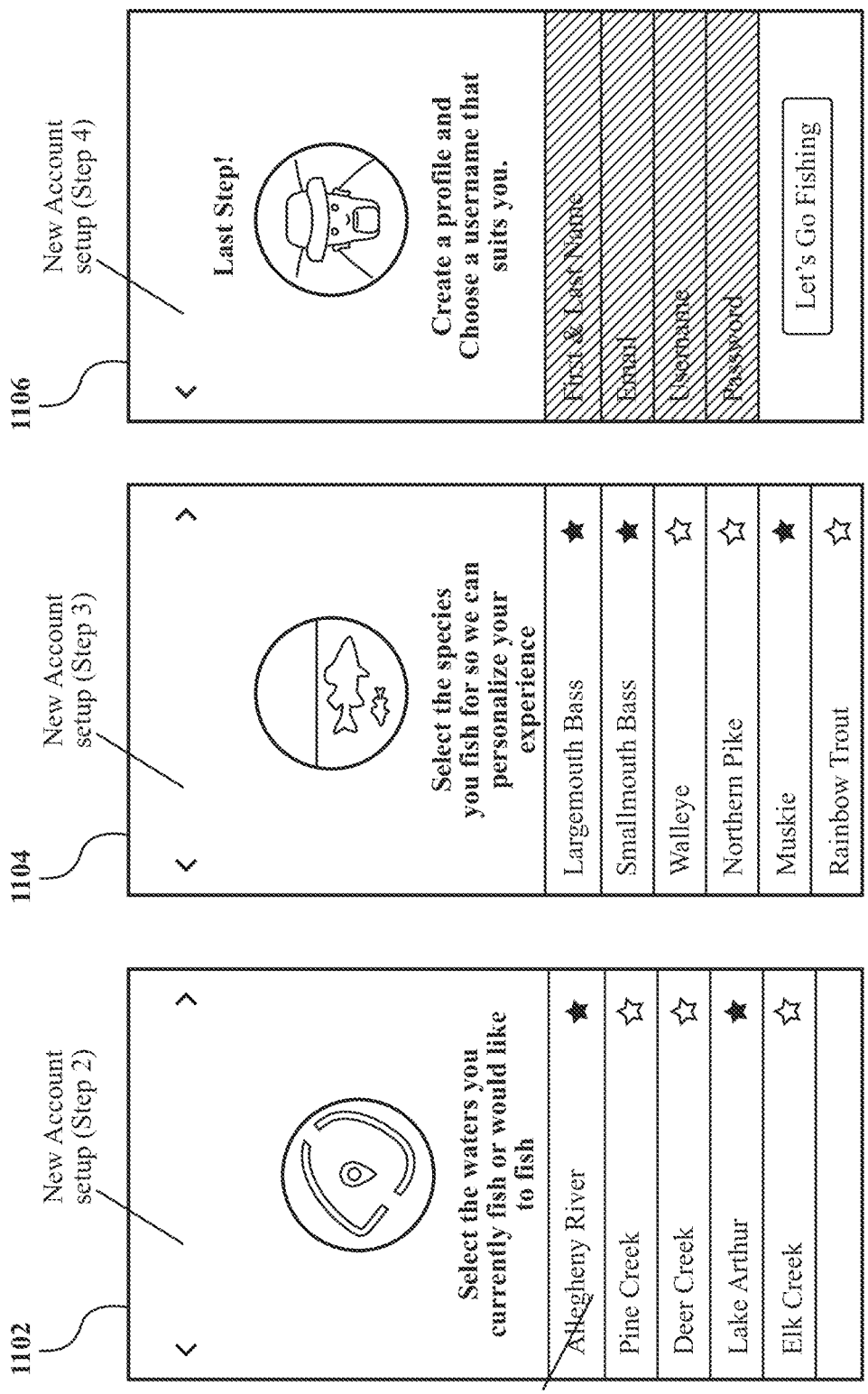
FIGS. 11A through 11C depict an account setup process of the recreation monitoring platform.

The system of any of the preceding clauses, wherein the recommendation facility is further operable to generate an angling recommendation based on one of the angling event of fish on, fish landed, fish lost, species of fish on, species of fish landed or species of fish lost In embodiments, the RMP may include a software application 5200 that may be operated on a mobile device 5000. The present, non-limiting example will discuss the software application 5200 operating on a smart phone, but it should be understood that the software may operate on any mobile device type, as describe herein, and/or machine that is capable of operating software. Referring to FIGS. 10A through 10C and 11A through 11C, the software may provide an application launch screen 1002, 1004, 1006 within the display of the mobile device. For a first time user, the launch screen may guide the user in setting up an account, providing personal information such as name, address, a username to associate with the user's account, or some other type of information relating to the user. Such user data may be provided to, and stored on, a cloud server 4000 as part of a distributed computing network that is associated with the RMP. As part of the account setup process, a user may also associate other accounts, including but not limited to social media accounts like Facebook®, Instagram®, and Flickr®, cellular accounts at which text message may be received by the user, or some other type of account. The account set-up process may also allow the user to enter information about SESDs that the user wishes to associate with the account. Alternatively, an automated process of SESD detection may be launched to enable the association of SESDs with the account. For example, using Bluetooth®, NFC, or some other communication protocol, the application 5200 running on a smart phone may recognize the SESD once in proximity to the phone. The SESD information may then be displayed on the phone for the user to verify and select to associate with the account. As part of the selection, the user may also be provided a means for providing aliases for SESDs, such as "fly fishing rod," "steelhead rod," "salt water rod," or some other name alias referring to a sporting good with which the user intends to associate an SESD. It should be noted that the alias may be changed by the user by updating the user account on the RMP, for example if the user decides he no longer wishes to use an SESD on Rod 1, but instead now place it on Rod 2. Still referring to FIGS. 10A through 10C, once an account is created, a user may be presented a login screen to access the account. Once logged in, the functionalities of the smart phone, such as location detection, may be utilized to provide current data to the user's account, which is stored and maintained at a cloud based server 4000, as described herein. This current data may be kept private, or broadcast to others through the RMP to other RMP users, and/or broadcast through other social media outlets, such as Facebook®. As shown in FIGS. 11A through 11C, as part of the new account set up, a user may be provided with opportunities to search for and select, and/or have the RMP select, local waterways and favorite waterways 1102, the species of fish that the user likes to fish 1104, and a username, profile picture 1106 and other defining characteristics of the user.

Figures 12A, 12B:
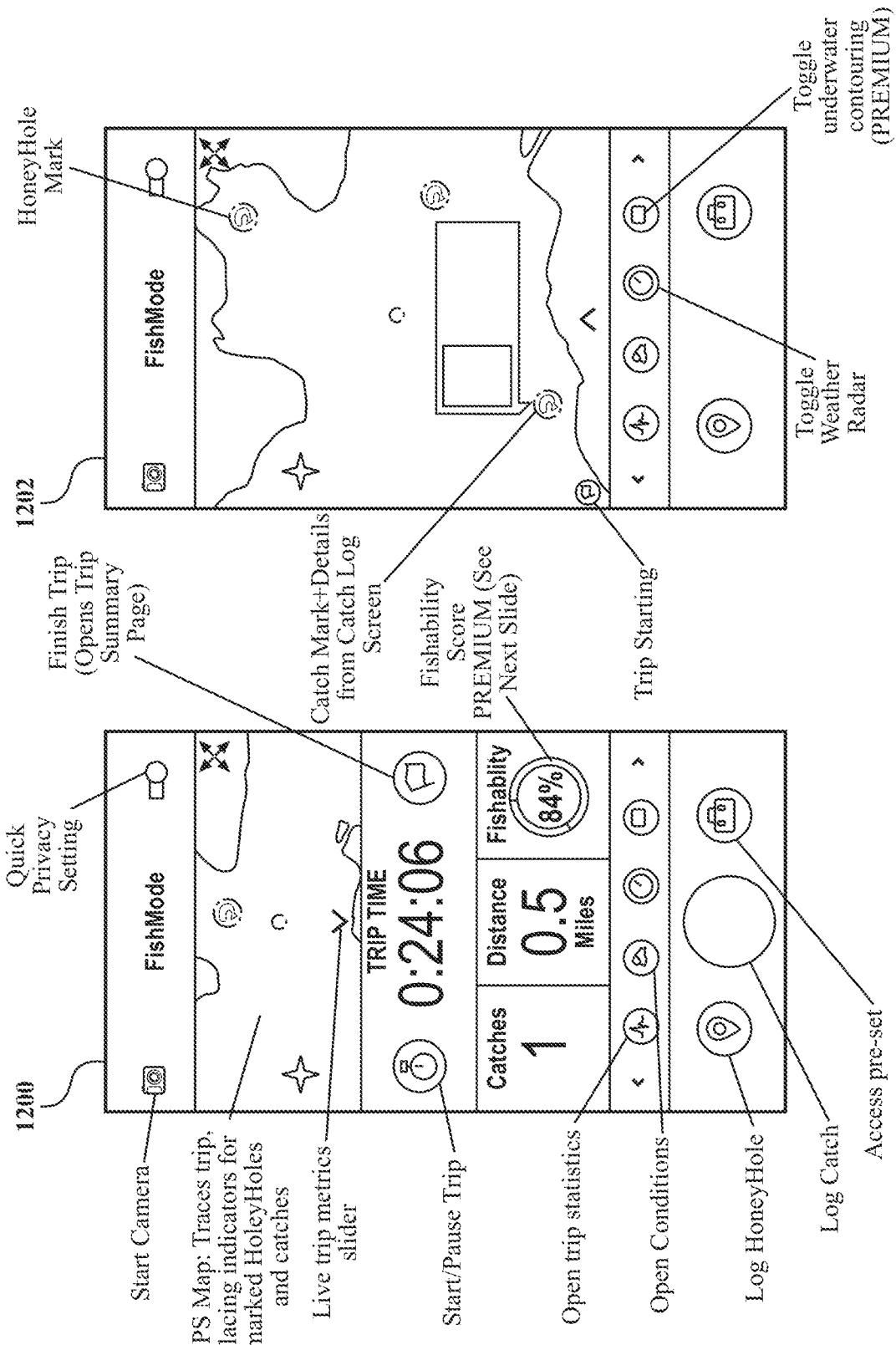

FIGS. 12A through 12C provide a simplified view of a graphic user interface (GUI) that may be provided by the RMP and associated with a plurality of SESDs and/or other sensors. This GUI may be displayed on a mobile device, as described herein, including but not limited to a smart phone. The GUI 1200, 1202, 1204 may provide action buttons, toggles or some other means for choosing what information to publicly share, such as with a social media outline like Facebook®, or to keep private. The GUI may enable a user to turn on and off a camera that is associated with the SESD. In embodiments, the SESD may include a camera or be associated with a camera that is external to the SESD. A camera may be manually used or may automatically take a still photo or begin recording video upon detection of an event of interest, such as a fish strike or fish landed, as described herein. The GUI may display maps, including maps of the current environment in which an SESD and/or a mobile display are located. The GUI may allow a user to initiate and record a trip. A "trip" as the term is used herein may refer to a period of usage of an SESD, such as a fishing trip or other sporting event. For example, the GUI may provide buttons with which a user may start, pause or stop a trip session. Starting a trip session may activate functionalities of the RMP and SESDs, such as tracking the GPS location of an SESD and visually presenting the location within a map that is displayed in the GUI. Environmental conditions from a plurality of sensors, as described herein, that are associated with the SESDs location may also be presented in the GUI. For example, current water temperature, air temperature, and historical data, such as a preferred fishing location (i.e., a "honeyhole"), may also be presented as a reminder or guide to the user to find the location in which he previously had fishing success, including the location of prior fish strikes, fish catches and data relating to such strikes and catches, as described herein, including but not limited to type of tackle used and environmental conditions at the times of the fish strike and fish catch events. Locations that are overfished or very busy may also be flagged as a warning for the user to consider avoiding such locations. Events occurring during the trip, and or that occurred on prior trips, including but not limited to trips made by parties other than the user, may be recorded and/or presented within the GUI. For example, during a trip a user may see that he is currently nearing a cove of a lake. On a prior trip he might have recorded and stored in the RMP the GPS location of an area of the cove in which there was a large amount of fish cover, such as undergrowth, structure, and the like. The user might also have recorded and stored in the RMP that top-water lures, and the Hula-Popper® in particular, were especially effective in this section of the cover in attracting largemouth bass strikes. This historical data may also be found in the RMP by the user by accessing a virtual tackle box. This virtual tackle box may present lures along with summaries with the predicted effectiveness of each lure associated with the current environmental conditions (whether detected by the SESD or external sensors) and/or the species of fish desired to be caught. Lures may also include sensors, as described herein, and detect aspects such as water temperature, depth, water flow, the presence of vegetation, the presence of fish, or some other type of characteristic. Geographic regions (e.g., a lake cove, river section, pier) may be labeled with a "fishability score" in which environmental data, historical fish strike data, and other information is used to calculate and display an indicator of a probability of success in catching fish and/or a fish type (e.g., species, size of fish, etc.). Benchmarking of a body of water may also be provided to the user, for example, indicating the number of fish caught per hour (e.g., by a given user, or by all users who have fished a particular location or body of water), by the hour of the day, season, weather conditions, or some other criteria. An angler may be able to compare his performance to this benchmark during a trip, and share that performance via social media that is associated with the RMP, as described herein. Such functionality of the RMP may provide for the gamification of the RMP, for example, by having rewards and levels assigned to users based at least in part on their fishing performance. Products, promotions, enhanced functionality of the application 5200, or some other enticement may be awarded to users who place high in contests, games and the like. The GUI may be used to access and share data relating to a trip. For example, the user may check weather radar or summaries of other environmental factors that are available both within and outside of RMP resources. A user may choose to share the details of his trip with a social community, including but not limited to a social media community affiliated with the RMP, or a social media community external to the RMP, such as Instagram®. For example, the user may take photos of fish caught and post the photos to a social media outlet, along with data that is associated with each catch, including but not limited to, location, type or lure used, duration of "fight" between fish strike and catch, species of fish, size, and so forth. Alternatively, a user may choose to keep all such trip data private, and store the data in the RMP for only their personal review and use.

Figure 13B:

Referring to FIGS. 13A and 13B, the GUI associated with the application 5200 that may be used to access the RMP, may include functionality to initiate live weather radar tracking 1300. The radar tracking may be associated with the current location of an SESD (such as an SESD that is affixed to a fishing rod during a trip), and/or a mobile device that is used during a trip and associated with an SESD 1302. Such environmental conditions may be recorded and stored by a user as part of a trip, as described herein. Playback of the trip may allow the user to gain insight into the conditions that were associated with fishing success or the lack thereof. Such data may be used by the user and/or the RMP to derive and update fishability scores, as described herein, so that the fishability scores cover a wide range of environmental conditions and are periodically updated to reflect changes over time.

Figure 14A:
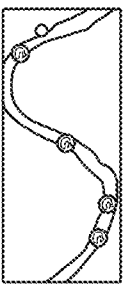
Figures 14B, 15A:
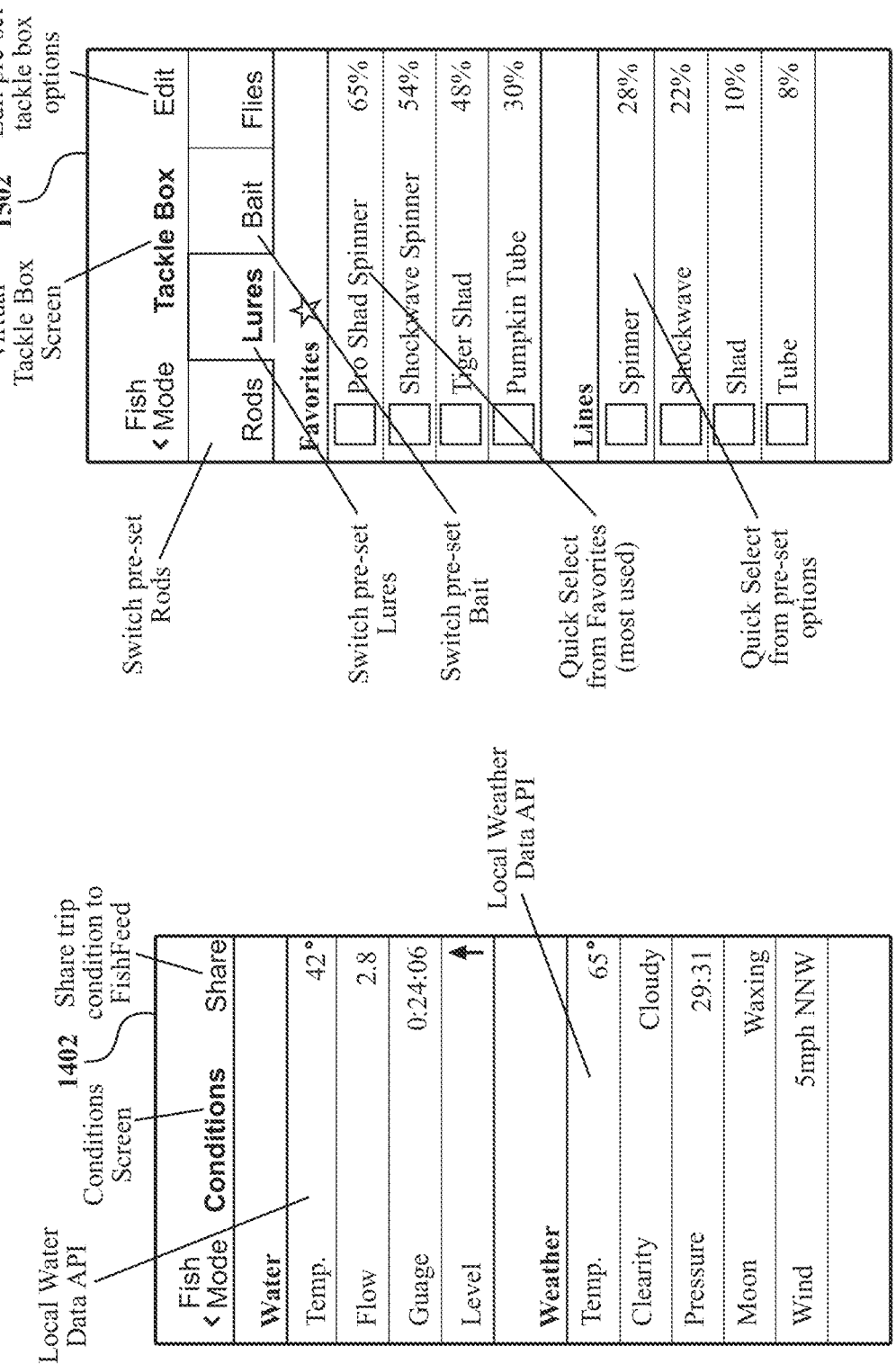

Referring to FIGS. 14A and 14B, the application 5200 may present summary statistics, such as statistics relating to a trip, within the GUI 1400, 1402. For example, a "Fish-Mode" summary screen may be presented in which a user can review data, including but not limited to, the number of fish caught, the number of lures used, the duration of the trip, the distance traveled, the number of preferred fishing locations ("honeyholes") visited, and the environmental conditions that were present during the trip, such as the air temperature, the rate of water flow, the water depth, water clarity, barometric pressure, wind speed, the phase of the moon, or some other type of data. In embodiments, cumulative statistics over a plurality of trips may be presented, for example, the total number of catches during a spring fishing season that involved multiple fishing trips.

Referring to FIGS. 15A through 15C, the application 5200 may include a virtual tackle box mode 1502, 1504. The virtual tackle box (or fly box for fly fishing embodiments) may come with pre-set tackle box items listed, such as commonly used lure types, that may be edited by a user to reflect that user's actual tackle box contents, including but not limited to, fishing rod types, lures, fishing line, weights, nets, or some other type of fishing tackle or fishing related accessory. The virtual tackle box may comprise a database 6000, or plurality of databases 6000, that are associated with the RMP. The databases may store information pertaining to lures, rods, or other tackle, as described herein, and allow a user to select from among the content to populate his personal virtual tackle box (e.g., to match the tackle found in his physical tackle box of material he has available to use while fishing). The databases 6000 may be cloud-based and in communication with the application 2400, 5200. The application 5200 may allow for photos to be taken of equipment, and the photos stored in association with the application 5200. Data may be automatically or manually entered into the application 5200. For example, a user may be able to indicate a sensor type or plurality of SESDs for the application 5200 to automatically track and record data from. Alternatively, the application 5200 may have data manually entered by a user 1506, for example, as events like fish catches occur over the course of a trip.

Figures 16A, 16B:
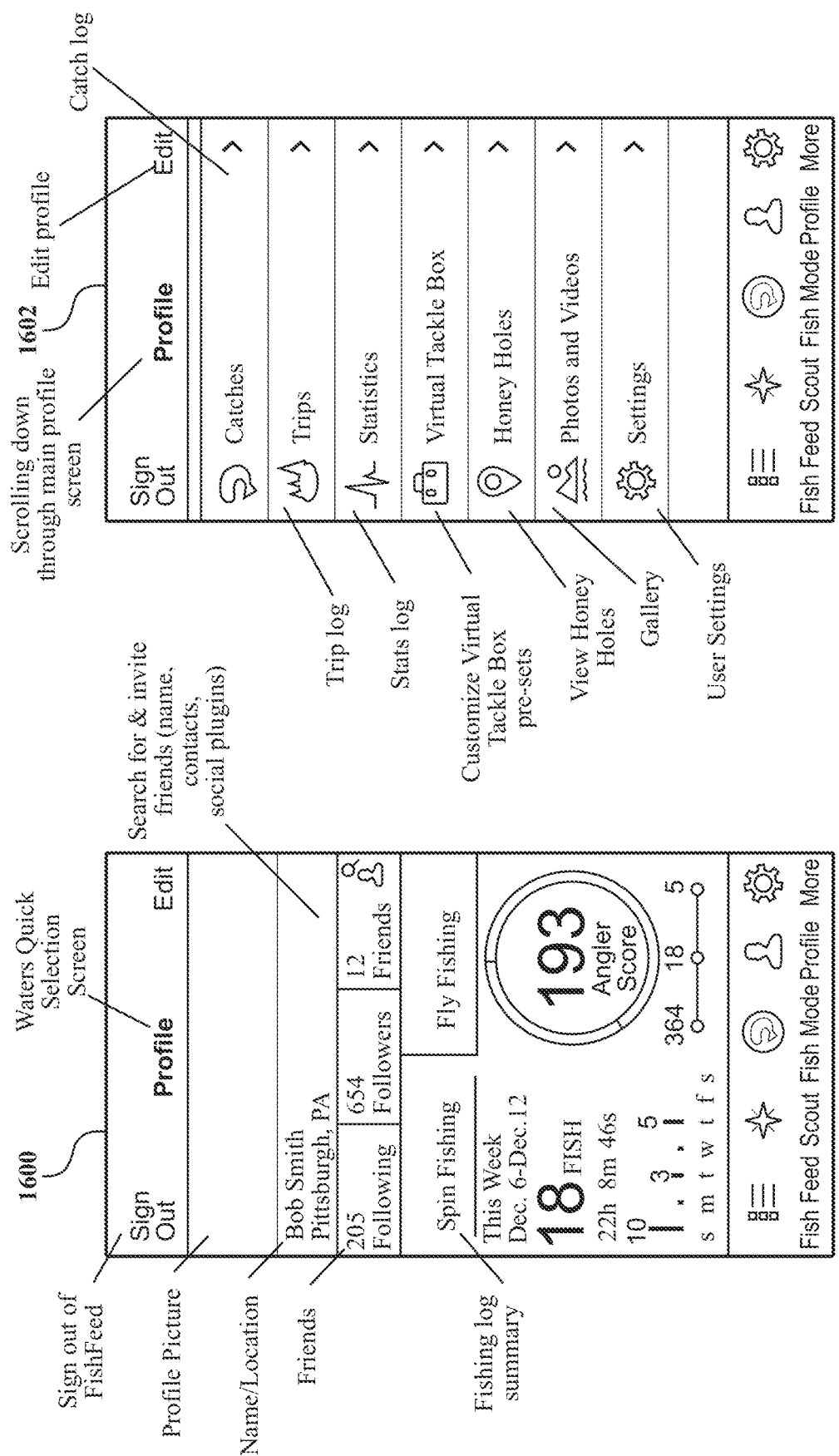
FIGS. 16A and 16B depict a user profile screen of the recreation monitoring platform.
Figure 17A:
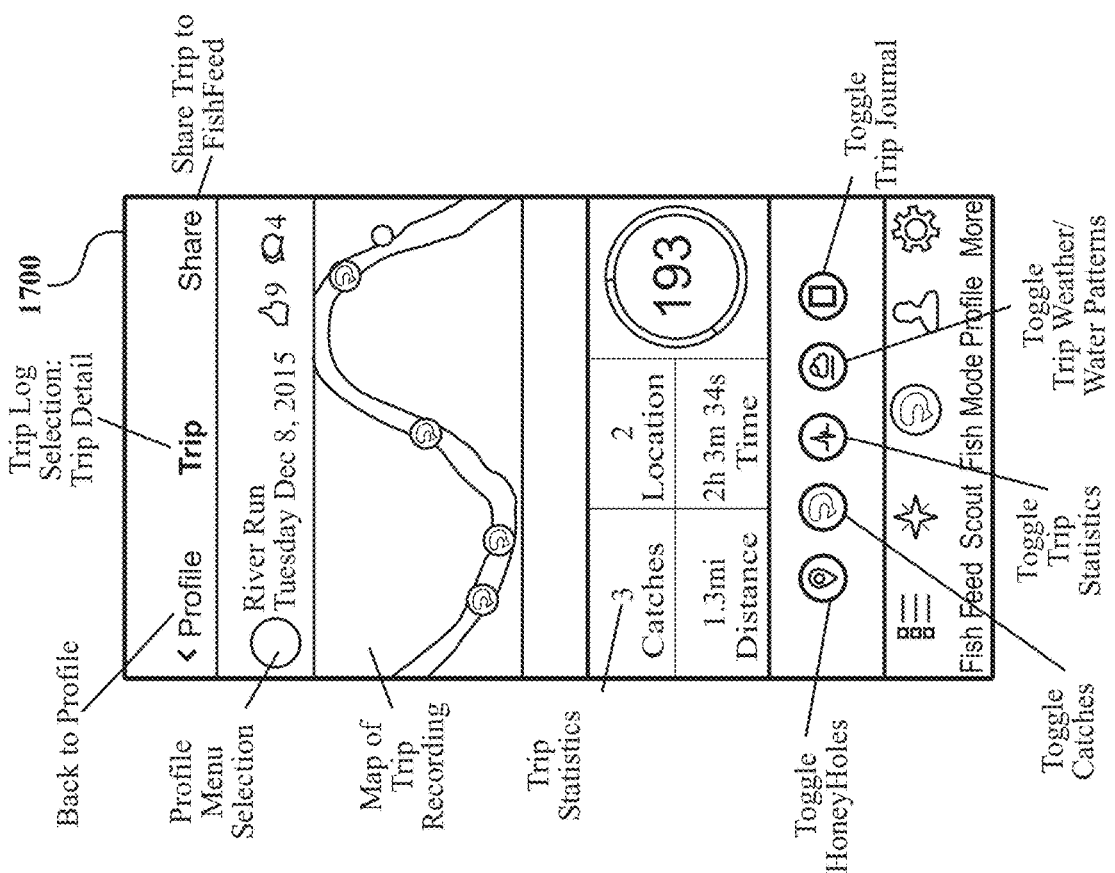
FIGS. 17A through 17C depict a fishing trip user interface of the recreation monitoring platform.
Figure 17B:
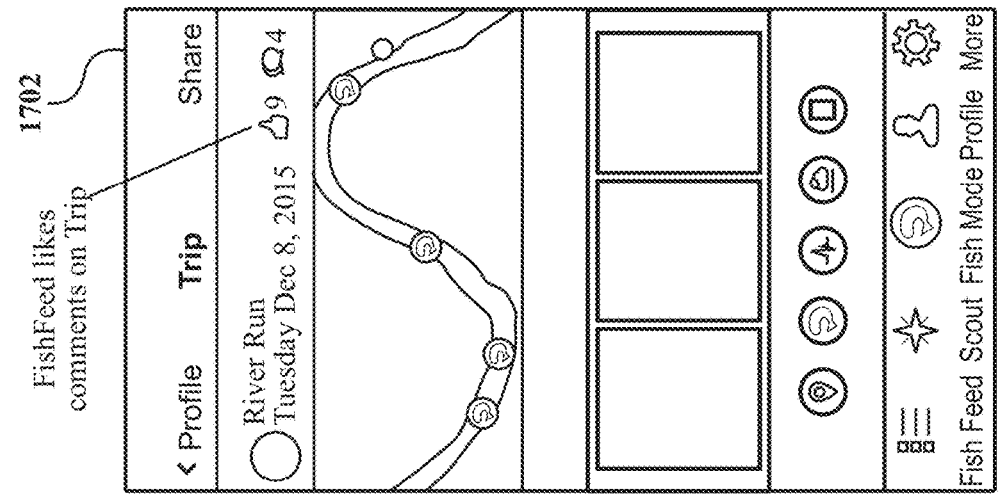
Figures 17C, 18A:
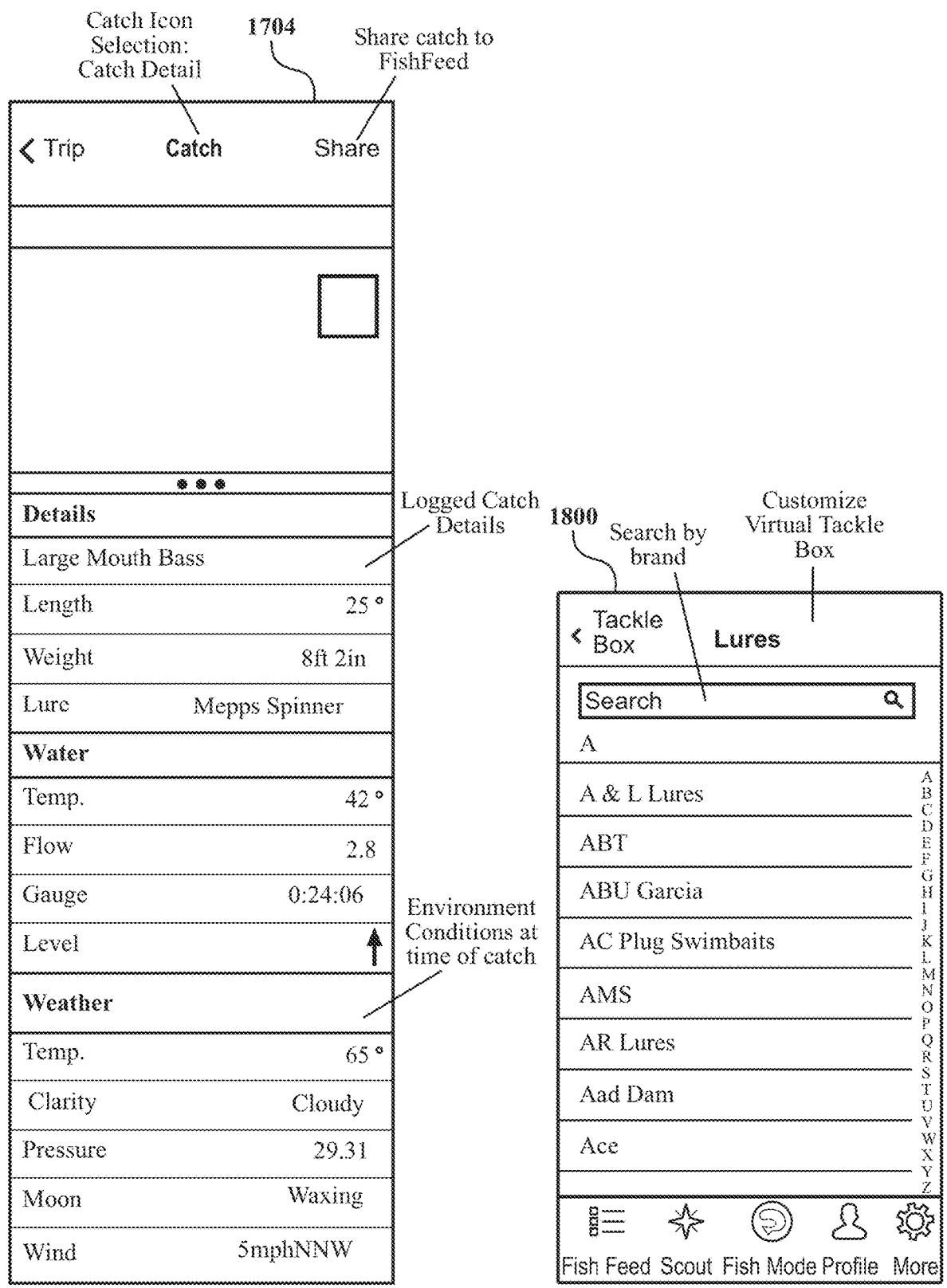
FIGS. 18A through 18C depict virtual tackle box screens of the recreation monitoring platform in which lure information is presented.

The mobile application 5200 associated with the RMP may be further associated with a social media component in which users of the RMP and its application may share information. For example, referring to FIGS. 16A through 16C, a user of the RMP may create a user profile 1600, 1602 using the application. The user profile may include information such as, but not limited to, name, location, friends, photo, and data relating to fishing, such as the content of the user's tackle box, and details regarding past fishing trips and data from those trips, such as the fish caught, the type of tackle used, the environmental conditions during the trip, photos from the trip(s), the location of the trip and/or location or where the fish were caught. Using the settings of the application 5200 a user may choose which elements of the profile and trips to share with the broader RMP community. For example, a user may want to share name and number of fish caught, but keep private the locations in which the fish were caught. In another example, the user profile that is created may also be shared with and/or integrated with other social media platforms, including but not limited to Facebook®, Instragram®, Google+®, or some other social media platform. FIGS. 17A through 17C depict a fishing trip user interface 1700, 1702, 1704 of the recreation monitoring platform.

Figures 18B, 18C, 19A:
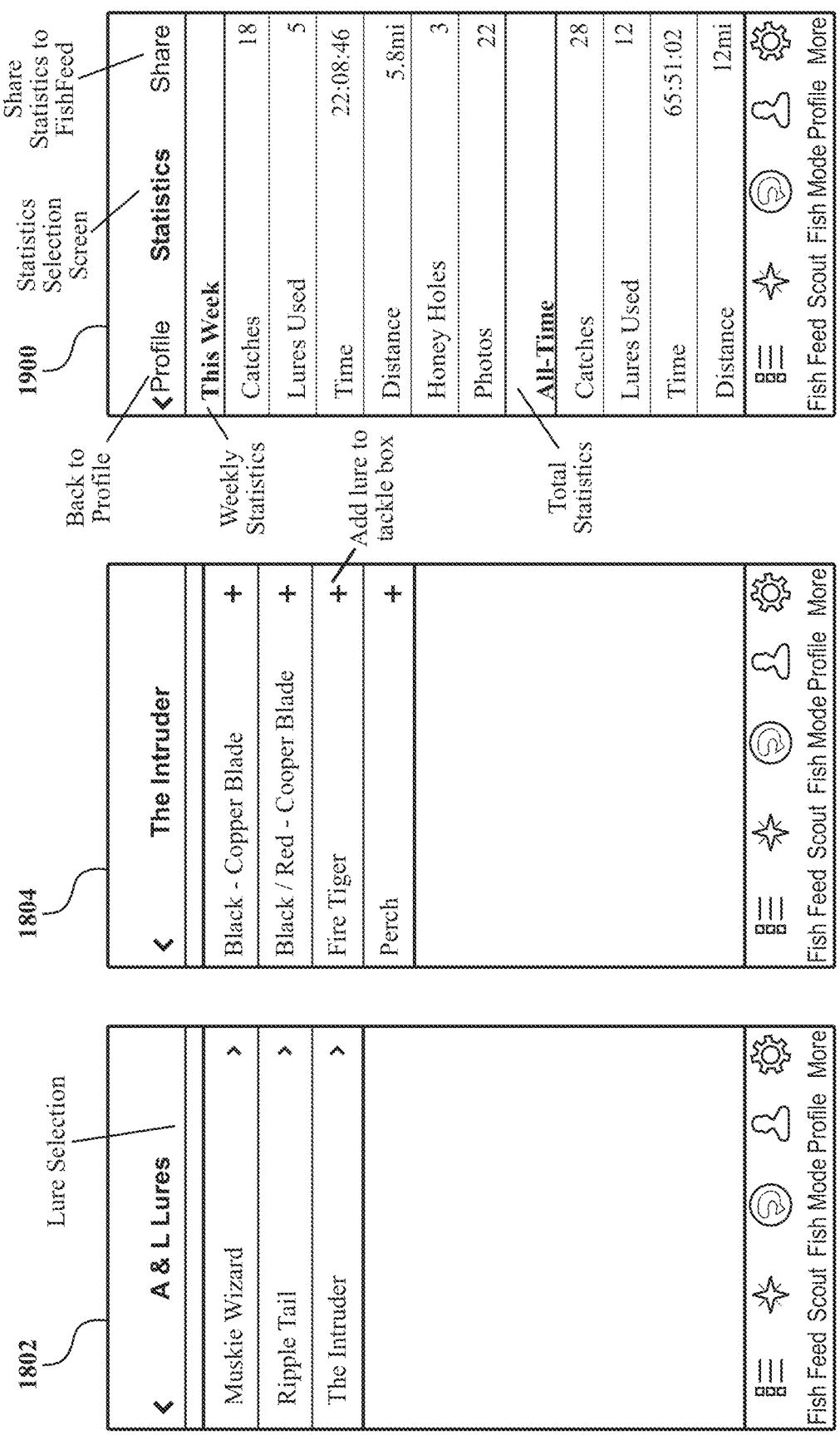
FIGS. 19A and 19B depict summary screens of the recreation monitoring platform in which cumulative fishing data is presented to a user.

Referring to FIGS. 18A through 18C, the application 5200 may allow for a user to search 1800, 1802, 1804 for fishing products, such as fishing tackle, including but not limited to lures, rods, line, nets, or some other type of product. The search may be conducted among data that are stored by the RMP and/or data available from retailers or manufacturers. Once a product is located following a search result and/or manual entry of a product by a user, that product may be added to a virtual tackle box. The tackle box may be organized by lure type, manufacturer or some other characteristic. As a user engages in trips, the items from the tackle box that are used during each trip may be selected from within the user interface of the application 5200 and recorded and stored in association with the trip, along with other data pertaining to the trip, such as fish strikes and catches. For example, after a trip has occurred, this record will allow a user to retrieve and see information related to lures used during a particular fishing trip with which she had success catching a particular type of fish, and other lures with which there was limited success. In this way, the RMP and SESD automatically create a journal of a user's fishing trip.

In embodiments, as part of the virtual tackle box set up and ongoing maintenance, if a found product is intended for purchase, the application 5200 may facilitate that purchase by linking the user to a retailer or manufacture website at which a transaction may be completed. In another example, the application may facilitate the transaction without the user having to visit a website outside of the application 5200. In another example, the application 5200 may enable a phone call to be placed to a location at which the product may be purchased by phone. Transactions that are completed following facilitation by the RMP and the application 5200 associated with the RMP may result in a revenue share to the RMP from the merchant with whom the user has made the transaction.

Figure 19B:
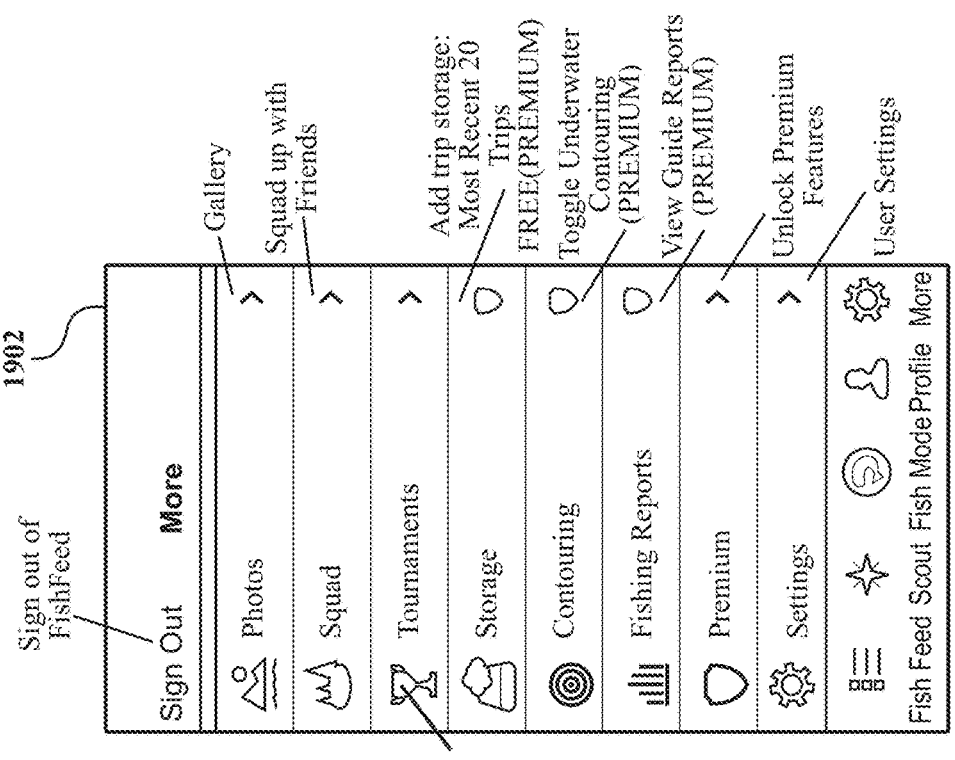

Referring to FIGS. 19A and 19B, the application 5200 may present summary statistics 1900, as discussed herein, as part of a user profile 1902. This profile may be kept private or publicly shared, for example over social media. The application 5200 may allow for a user to form subgroupings of friends ("squads"), for example a particular group of friends that participated in a given fishing trip. There may also be tournaments, including virtual tournaments, in which the anglers record their fishing activity during a trip, such as number of catches and size of fish, and compete on such basis with other anglers. Tournaments in this way may be "virtual" in the sense that the fisherman do not necessarily need to be fishing the same body of water, or fishing at the same time in order to compete.

In embodiments, other options available to the user through the application 5200 may include contouring that enables the user to see the underwater terrain, elevation and the like. Such contouring data may be derived from publicly available materials or proprietary sensors that are associated with the RMP. Fishing reports may also be available to a user through the application. These reports may be third party reports that are created outside of the RMP, or may be reports that are proprietary to the RMP and based on the data among user accounts associated with the RMP.

Figure 20:
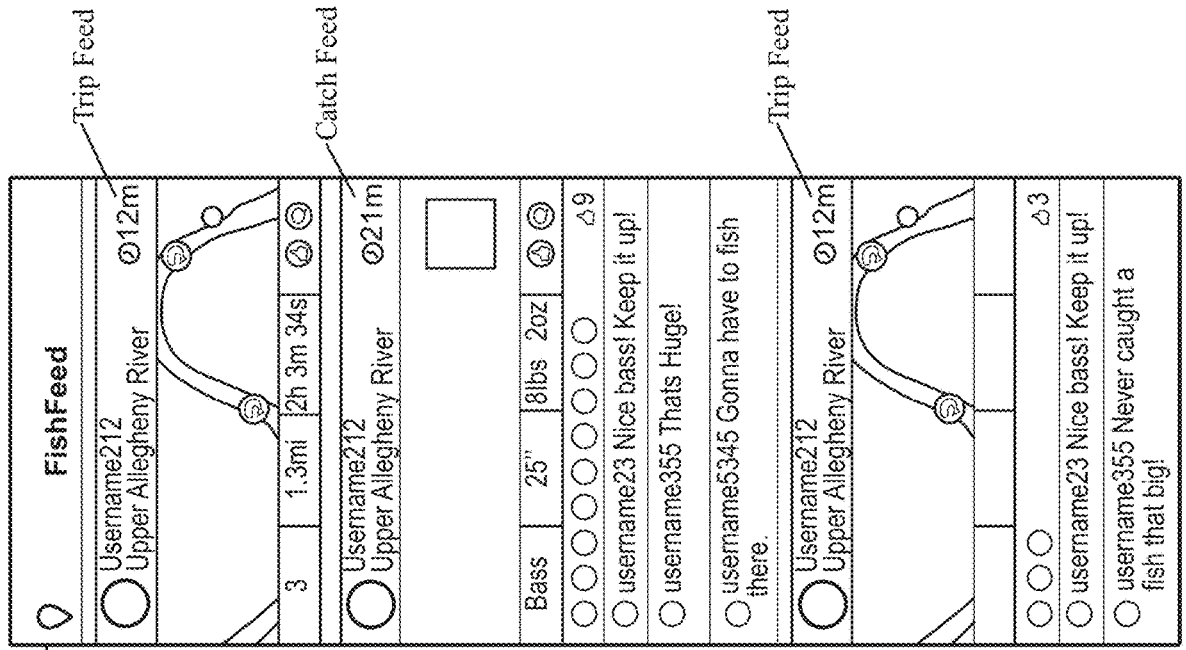
FIG. 20 depicts a social media screen of the recreation monitoring platform in which fishing trip information is shared with the public by a user.
Figures 21A, 21B, 21C:
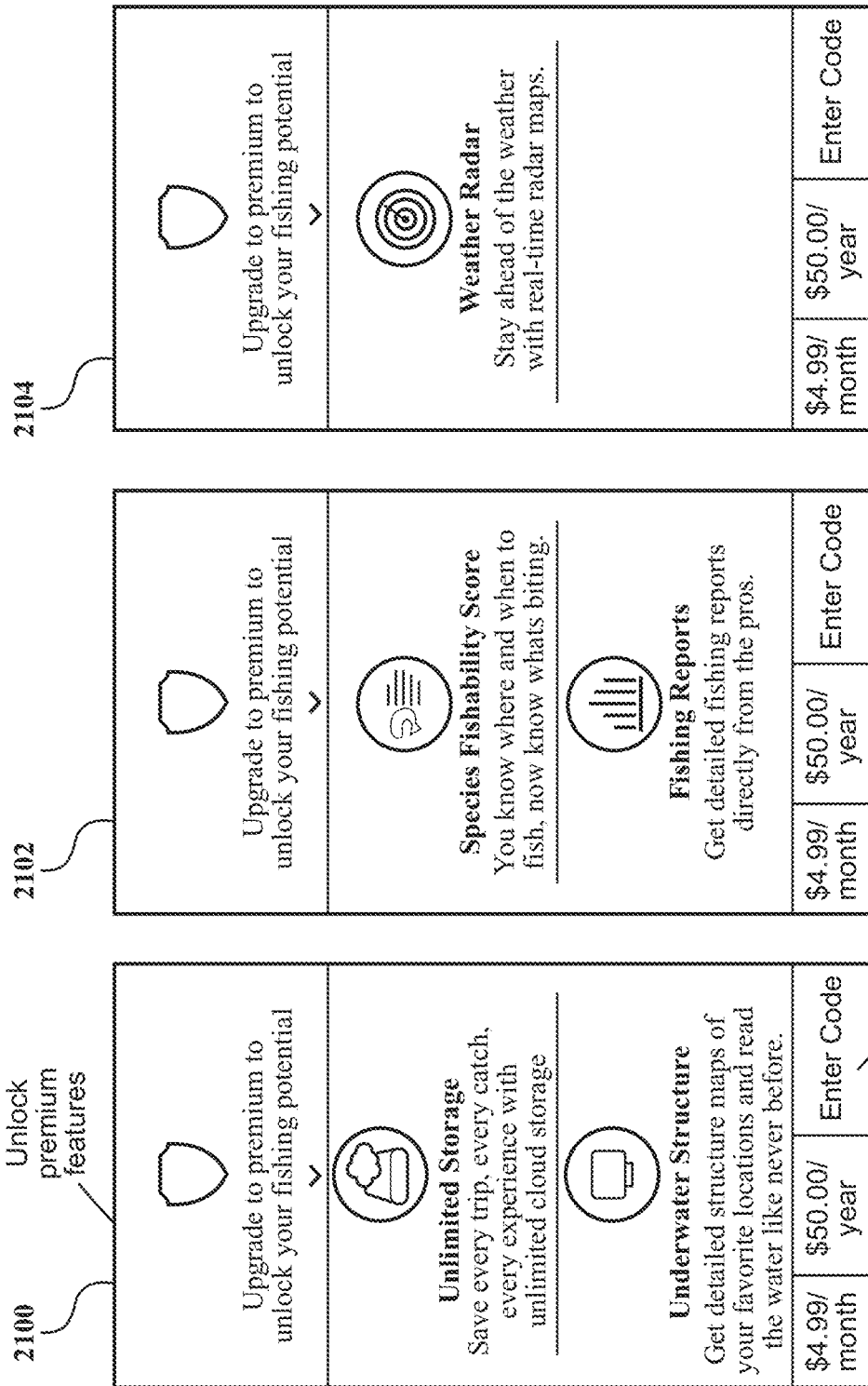
FIGS. 21A through 21C depict tiered membership screens of the recreation monitoring platform.
Figure 23B:
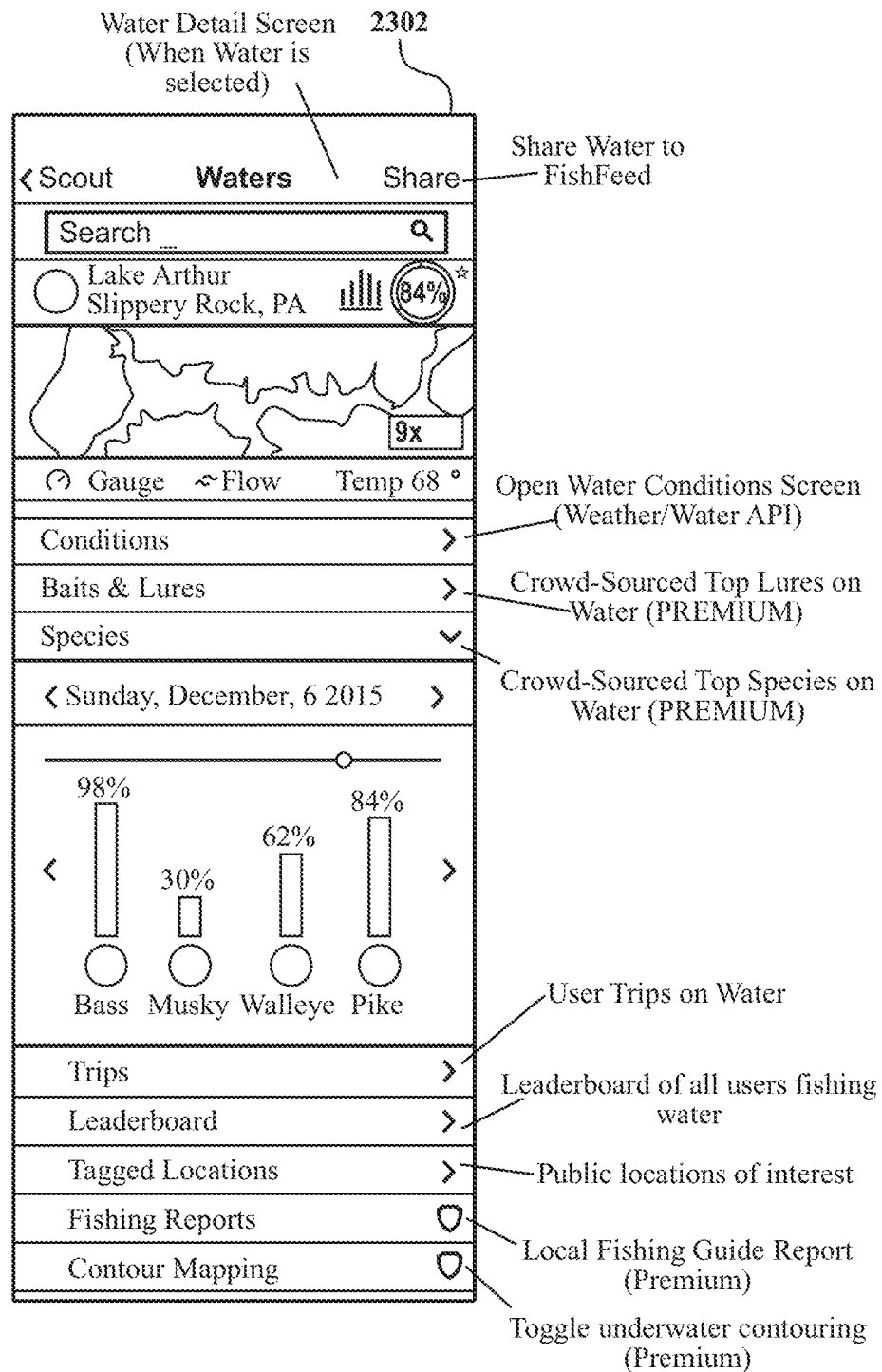
Figures 24A, 24B:
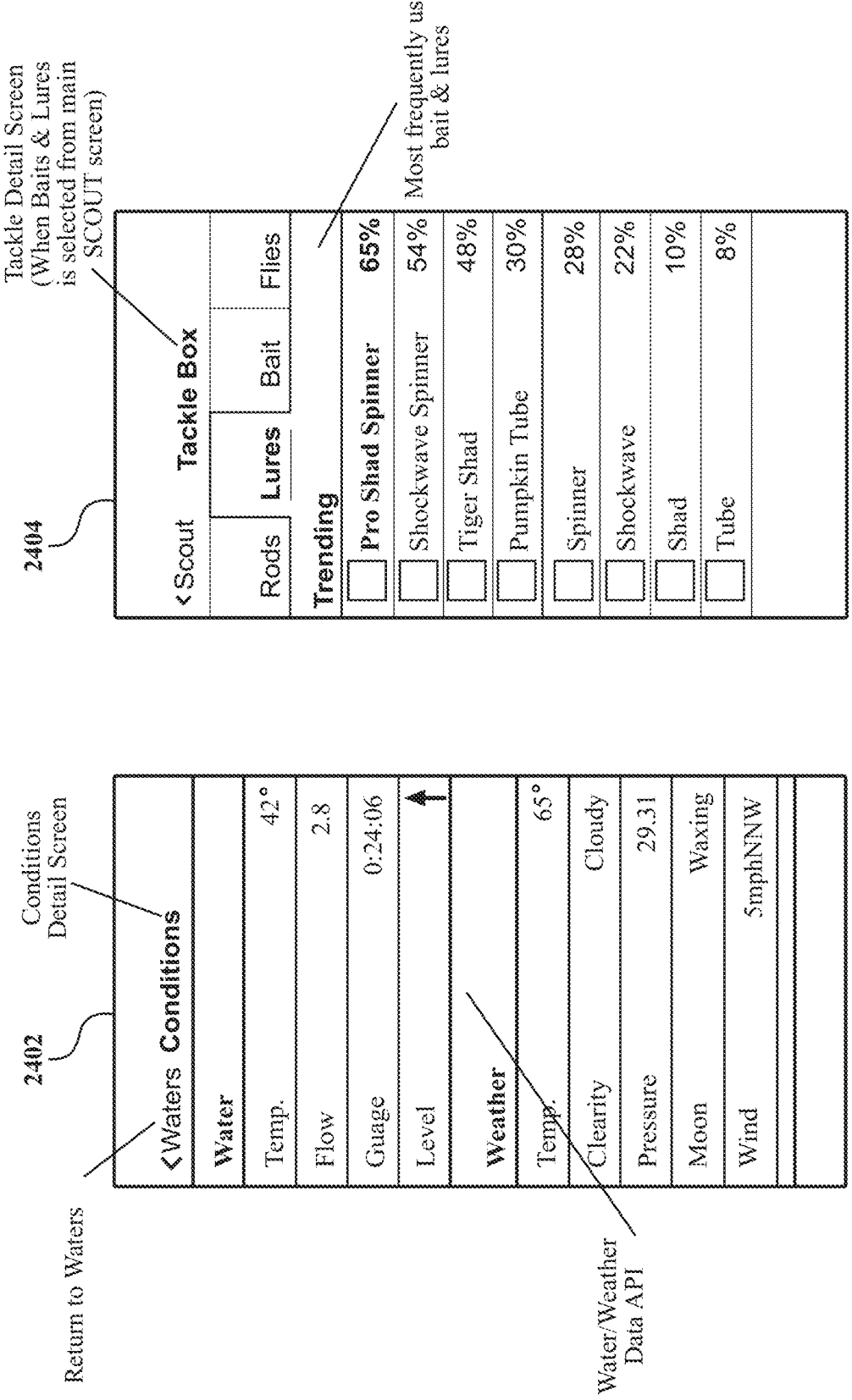
FIGS. 24A and 24B depict an environmental data summary screen and virtual tackle box screen of the recreation monitoring platform.
Figure 25A:
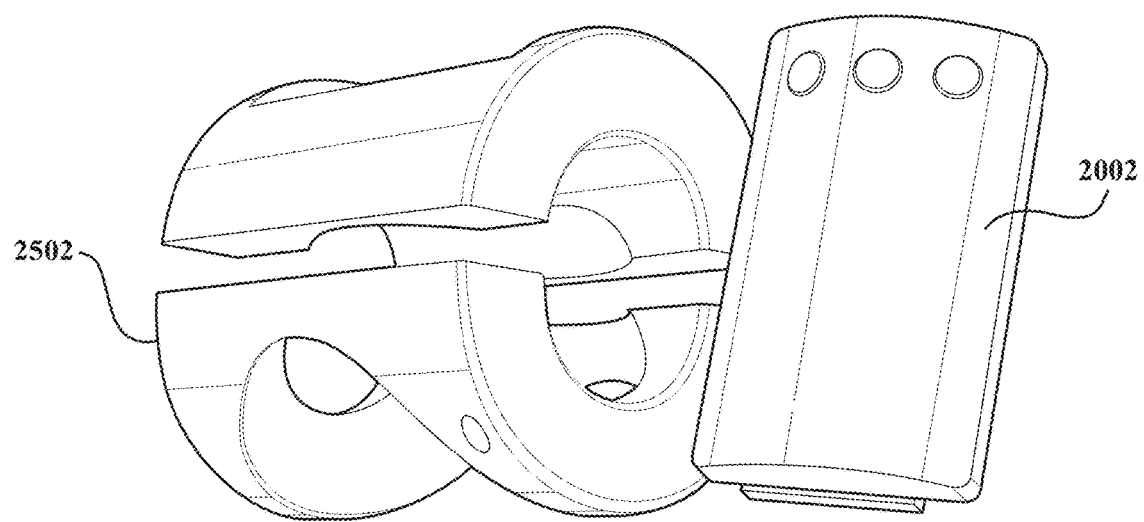
FIGS. 25A and 25B illustrate sample embodiments of an angling event sensing device.
Figure 25B:
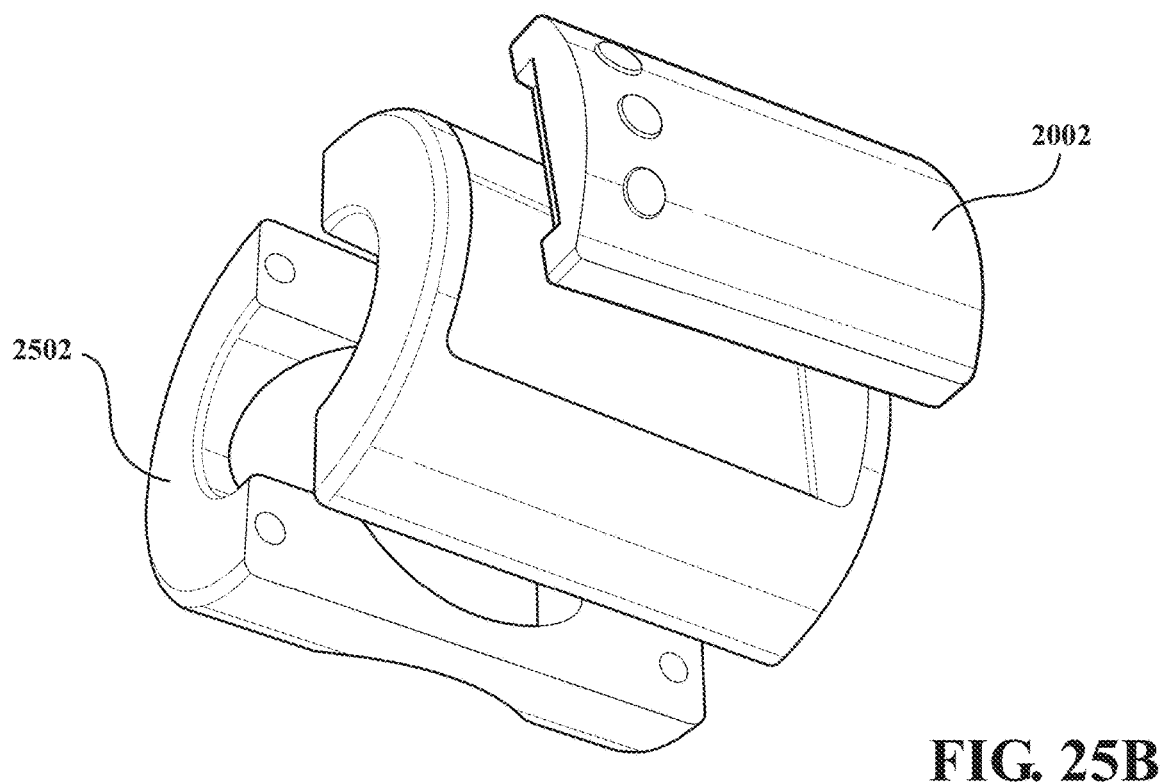

Referring to FIG. 20, a user may use the application 5200 that is associated with the RMP to broadcast a feed 2004 to the public, for example through the Internet, social media outlet or some other broadcast means. A feed may be limited to a particular time interval during which the user catches a fish, or may be of an entire fishing trip. Users broadcasts may be organized as "channels" that are labeled and made public so that anglers can develop a following among viewers, who can search for and receives notices regarding broadcast streams that are available or will become available. Broadcasts in which anglers stream content may be associated with sponsored content that is shown to viewers. The sponsored content may generate revenue for the RMP, a portion of which may be shared with the anglers that are creating the streaming content. As shown in FIGS. 21A through 21C, revenue may be provided back to the anglers in the form of gift codes, storage access, unlocking more advanced features, subscription dues, or some other form of reward 2100, 2102, 2104. Alternatively, such features may be purchased by users using any form of accepted currency, including digital currency, such as Bitcoin®.

Referring to FIGS. 22 through 24B, the application 5200 associated with the RMP may allow a search feature in which potential fishing locations and approaches to fishing in such locations 2202, such as the preferred tackle, may be researched. The search for potential fishing locations may be based on publicly available data, such as conservancy group reports, and/or based on data that is collected and stored by the RMP, such as that from the RMP users' trip data, including events that are identified and stored by the processor 3000 or cloud server 4000 as described herein. Such functionality may allow users to see the environmental characteristics of bodies of water 2300, 2302, 2402, such as depth, flow rate, clarity and the like, the species of fish found there, the species commonly caught, the sizes of catches, the types of tackle used with success 2404, and other types of data and summaries of relevance to a person planning a fishing trip.

The following are illustrative clauses demonstrating non-limiting embodiments of the disclosure described herein:

An on-line multiplayer gaming system comprising:

a. a first angling event sensing device adapted to be mounted to a first player's fishing rod having a first reel and first line, the first angling sensing device comprising at least one sensor to generate parameters indicative of the first rod, first reel, or first line;

b. a first processor unit in communication with the at least one sensor of the first angling event sensing device;

c. a recreational monitoring platform comprising at least one server;

d. a first game application running on a first mobile device in communication with the processor of the first angling event sensing device and in communication with the recreational monitoring platform, wherein the first processor, the game application of the first mobile device, or the recreational monitoring platform determines at least one angling event based on data from the at least one sensor of the first angling event sensing device, and wherein the recreational monitoring platform receives angling data input by the first player;

e. a second angling event sensing device adapted to be mounted to a second player's fishing rod having a second reel and second line, the second angling sensing device comprising at least one sensor to generate parameters indicative of the second rod, second reel, or second line;

f. a second processor unit in communication with the at least one sensor of the second angling event sensing device;

g. a second game application running on a second mobile device in communication with the processor of the second angling event sensing device and in communication with the recreational monitoring platform, wherein the second processor, the game application of the second mobile device, or the recreational monitoring platform determines at least one angling event based on data from the at least one sensor of the second angling event sensing device, and wherein the recreational monitoring platform receives angling data input by the second player;

wherein the recreational monitoring platform calculates a score for the first player based on the at least one angling event determined based on data from the at least one sensor of the first angling event sensing device or angling data input by the first player, and wherein the recreational monitoring platform calculates a score for the second player based on the at least one angling event determined based on data from the at least one sensor of the second angling event sensing device or angling data input by the second player.

The system of the preceding clause, wherein the at least one angling event of the first angling event sensing device and the at least one angling event of the second angling event sensing device is one of fish on, fish landed, or fish lost.

The system of any of the preceding clauses, wherein the fish on, fish landed, or fish lost includes the species of fish on, fish landed, or fish lost respectively.

The system of any of the preceding clauses, wherein the recreational monitoring platform is operable to receive data of weather or water conditions corresponding to the locations of (i) angling events of the first angling event sensing device or angling data input by the first player and (ii) angling events of the second angling event sensing device or angling data input by the second player.

The system of any of the preceding clauses, wherein the recreational monitoring platform further calculates scores for the first player and second player based on weather or water conditions to the locations of (i) angling events of the first angling event sensing device or angling data input by the first player and (ii) angling events of the second angling event sensing device or angling data input by the second player.

The system of any of the preceding clauses, wherein adverse weather or water conditions enhance the score of the player who experienced said adverse weather or water conditions.

The system of any of the preceding clauses, wherein recreational monitoring platform calculates separate scores for fish on, fish landed, or fish lost.

A method to communicate angling related information comprising:

a. determining, with a processor, an angling event based on data from at least one sensor generating data related to a parameter of first user's rod, reel, or line;

b. transmitting the angling event to the first user's mobile device;

c. using the mobile device to transmit the angling event to a recreational monitoring platform comprising a server;

d. providing an application to a second user that allows the second user to select to receive the angling events of the first user; and e. if said selection is made, obtaining the angling event from the recreational monitoring platform and display it via the application.

The method of the preceding clause, wherein the server is a cloud-based server.

The method of any of the preceding clauses, wherein the angling event is one of fish on, fish landed, fish lost.

The method of any of the preceding clauses, further comprising the step of determining the species the fish on, fish landed, or fish lost respectively is based on data from said at least one sensor.

The method of any of the preceding clauses, further comprising obtaining location data for said angling event.

The method of any of the preceding clauses, further comprising obtaining weather or water condition data for the location of said angling event.

The method of any of the preceding clauses, further comprising providing the weather or water condition data for the location of said angling event to the recreational monitoring platform.

The method of any of the preceding clauses, further comprising displaying the weather or water condition data for the location of said angling event via the application.

FIGS. 23A through 26 depict sample form factors and dimensions of an AESD 2002. In FIGS. 25A, 25B and 26 a hemispheric form factor is presented in which the AESD mount may be separated into two components 2502 that are designed to interlock when placed around the shaft of a fishing rod, fully encompassing the diameter of the rod 2600. To this mount the AESD 2002 component containing the electronics may be placed within a removable third facility that locks into place on the mount. This may enable a user to leave the mount on a rod, but remove the AESD 2002 electronics when not in use.

Figure 27A:
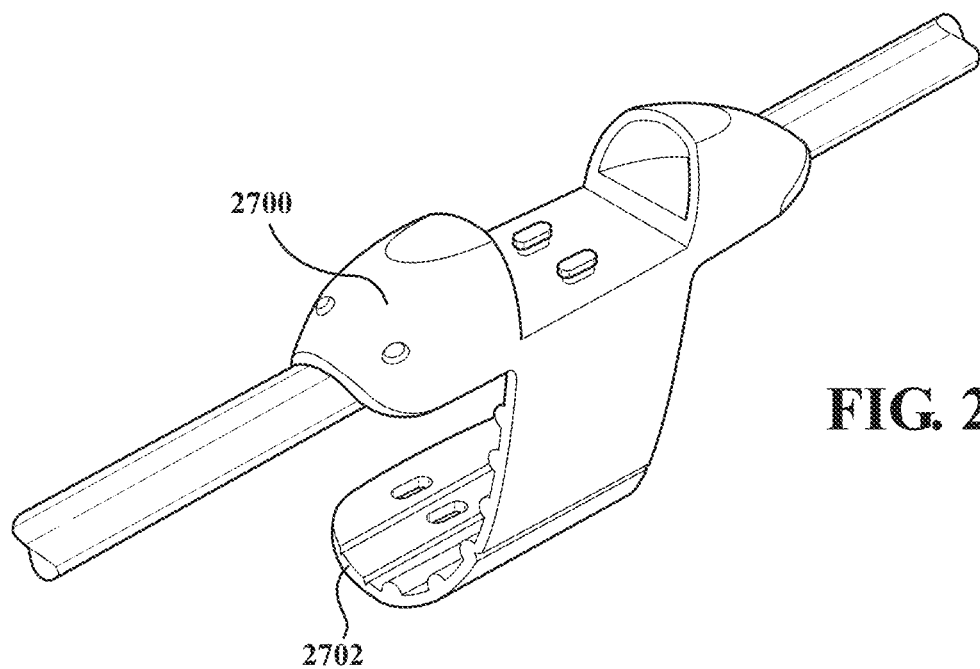
FIGS. 27A through 27B depict a universal mount configuration of an angling event sensing device.
Figure 27B:
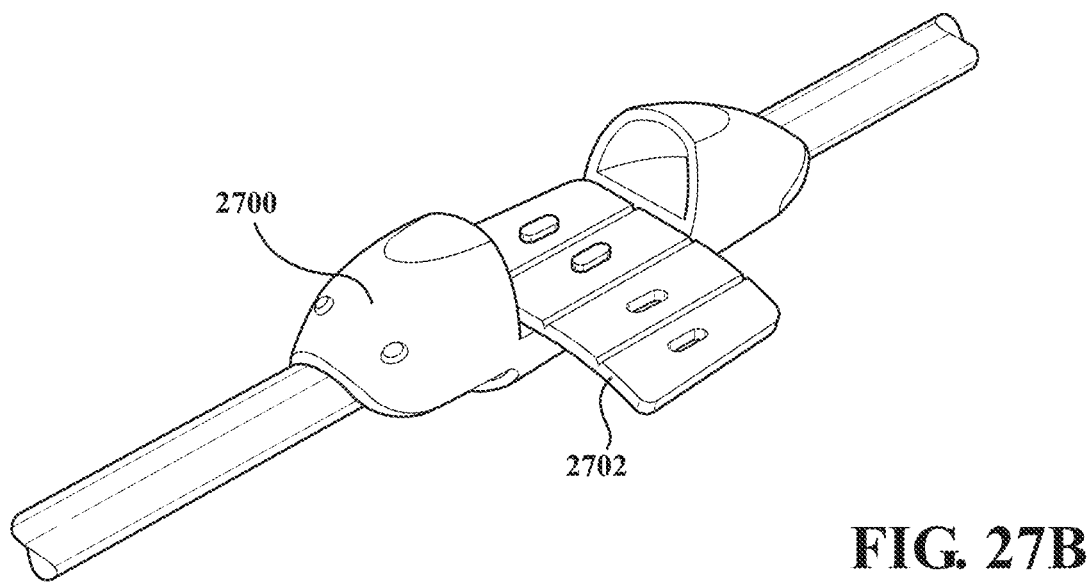
Figure 27C:
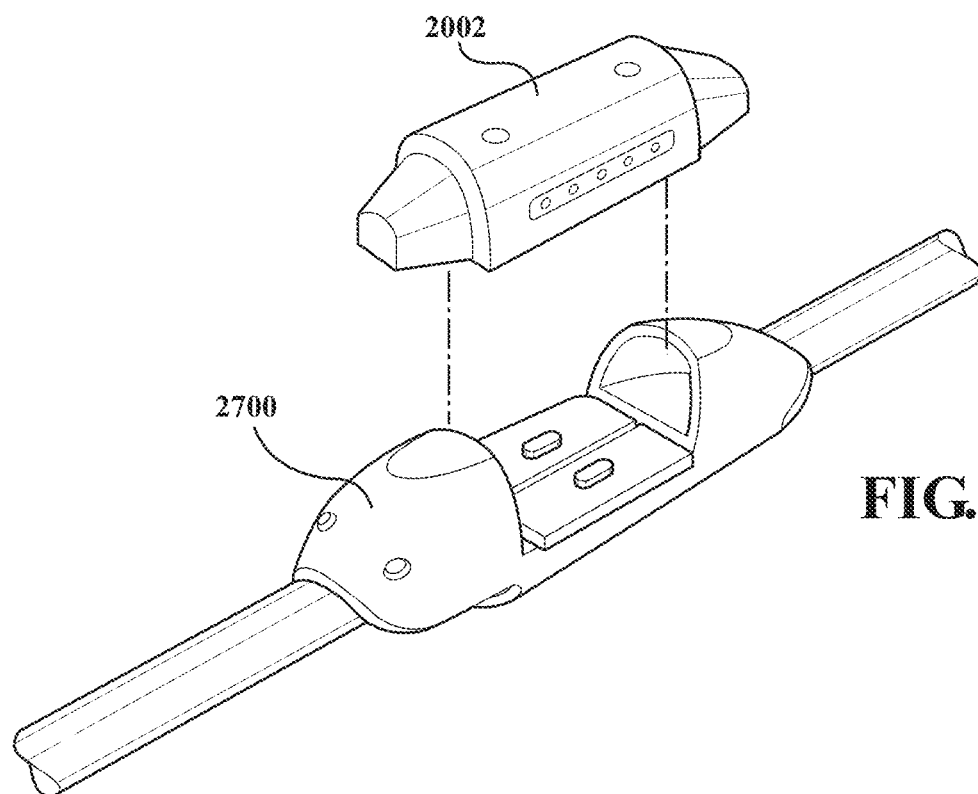
FIGS. 27C through 27D depict a universal mount configuration attached to a rod with an angling event sensing device being fitted into the mount and secured.
Figure 27D:
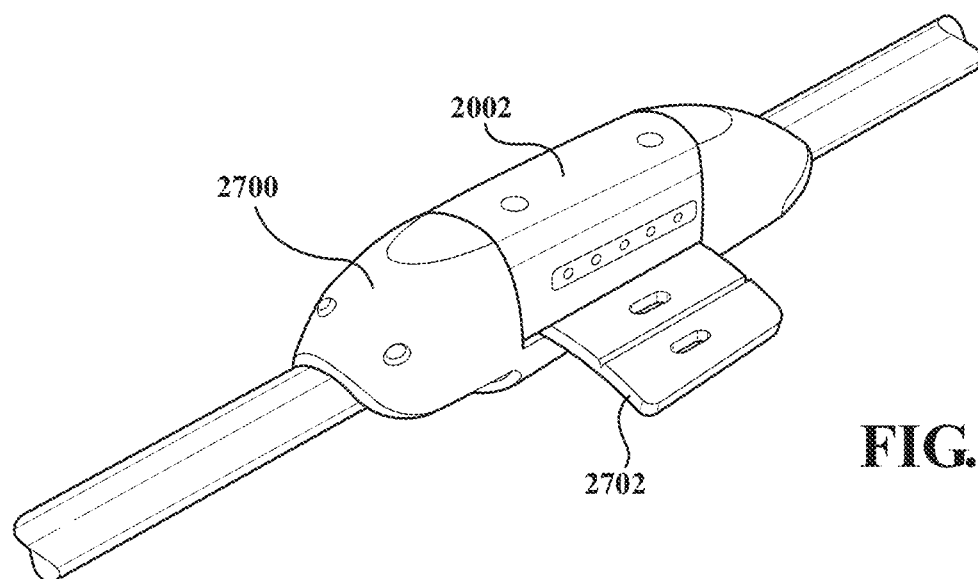
Figure 28E:
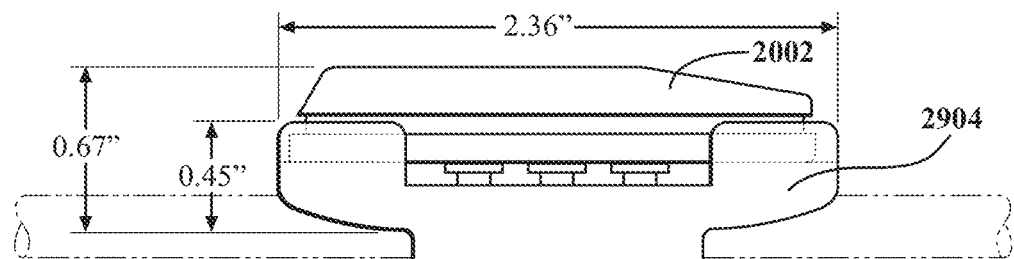
FIG. 28E depicts a side view of a sample configuration of an embodiment of an angling event sensing device, associated rod mount and band with sample measurements.
Figure 28F:
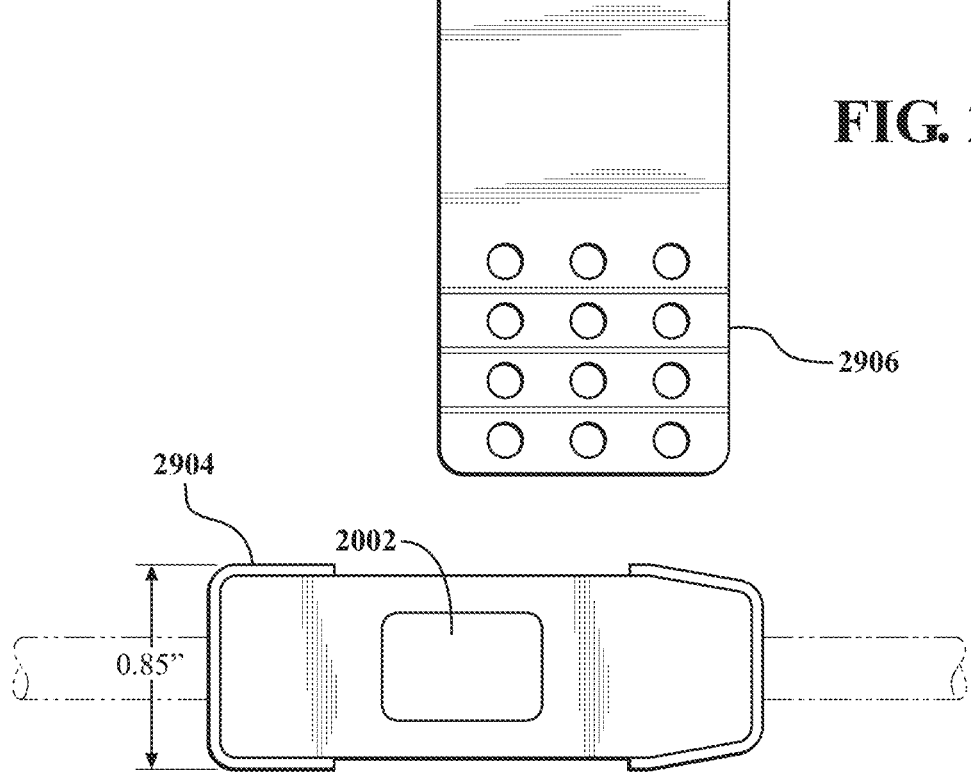
FIG. 28F depicts a top view of a sample configuration of an embodiment of an angling event sensing device and associated rod mount with sample measurements.
Figure 28G:
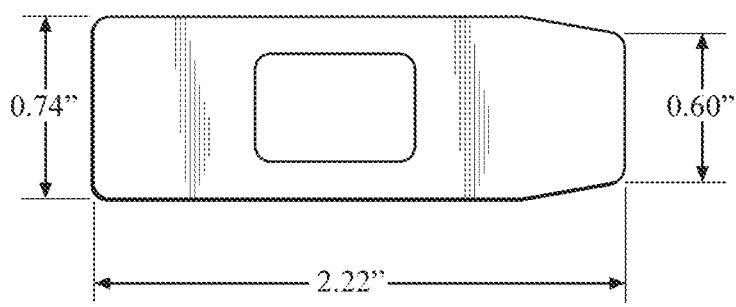
FIG. 28G depicts a top view of a sample configuration of an embodiment of an angling event sensing device with sample measurements.
Figure 28H:
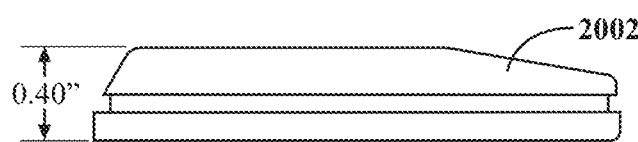
FIG. 28H depicts a side view of an embodiment of angling event sensing device with sample measurements.
Figure 29A:
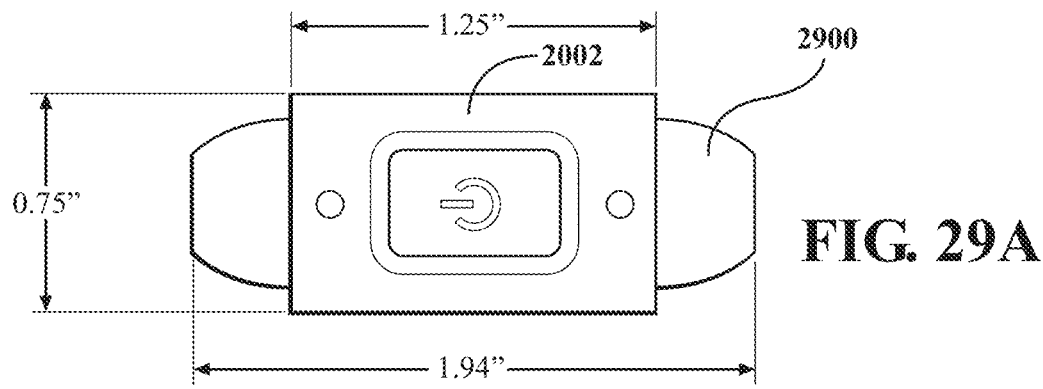
FIG. 29A depicts a top view of a sample configuration of an embodiment of an angling event sensing device and associated mount with sample measurements.
Figure 29B:
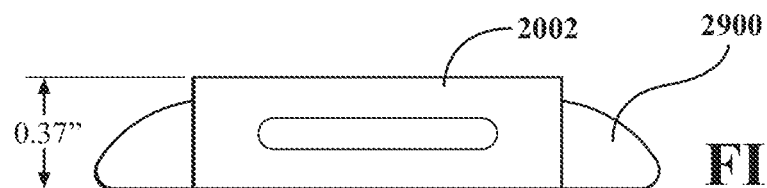
FIG. 29B depicts a side view of a sample configuration of an embodiment of an angling event sensing device and associated mount with sample measurements.
Figure 29C:
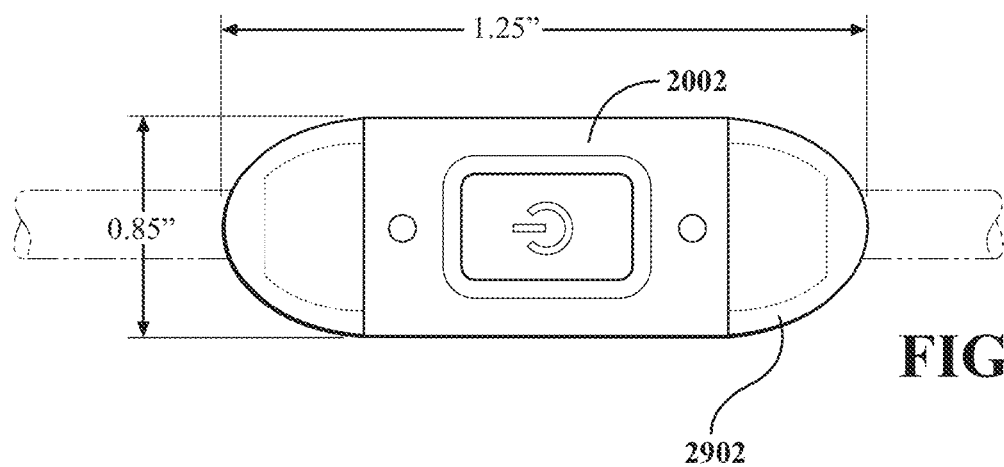
FIG. 29C depicts a top view of a sample configuration of an embodiment of an angling event sensing device and associated mount with sample measurements.
Figure 29D:
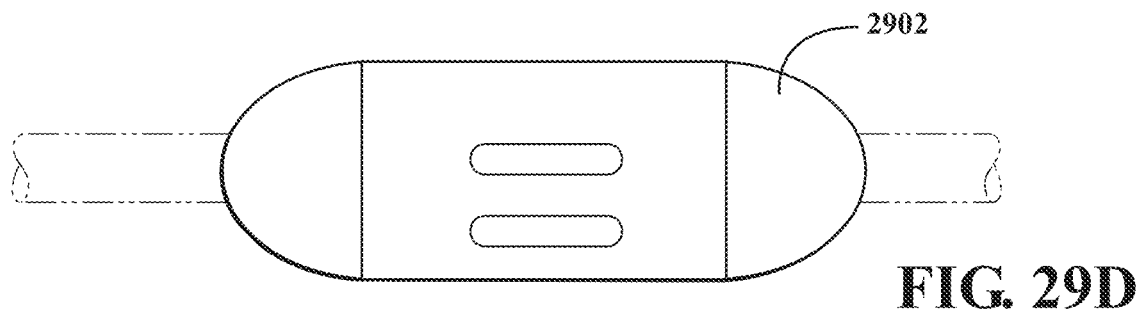
FIG. 29D depicts a bottom view of an embodiment of a mount for an angling event sensing device.

FIGS. 27A through 27D depict a universal mount configuration of an AESD 2002, where the mount consists of a portion 2700 in which an AESD 2002 may be placed and a flexible band 2702 that may be wrapped around the circumference of the fishing rod. Holes in the flexible band 2702 may align with the interior portion of the mount 2700 and allow the band to lock in place and hold the mount securely to the fishing rod. Once the mount 2700 is attached to the rod, the AESD 2002 may be fitted into the mount and secured, as shown in FIGS. 27C and 27D. FIGS. 28A through 28H depict an embodiment of a sensor module configuration and associated rod mount of an AESD 2002, with sample measurements provided and alternate shapes for the mount 2900 and flexible band 2902. FIGS. 29A through 29F depict embodiments of a sensor module configuration of an AESD 2002, with and without, a sensor module configuration in various mount shapes 2900, 2902 and flexible band configurations 2904.

FIGS. 30A and 30B depict a "worm mount" configuration of an AESD 2002 in which a flexible worm mount 3002 extends from each end of the mount in which the AESD 2002 is placed. This worm mount may be wrapped around the fishing rod in order to secure the mount, and the AESD 2002 within the mount. The worm mount may include a shape memory construction. This worm mount may be unwound when the user wishes to remove the AESD 2002 from the rod.

Figure 31A:
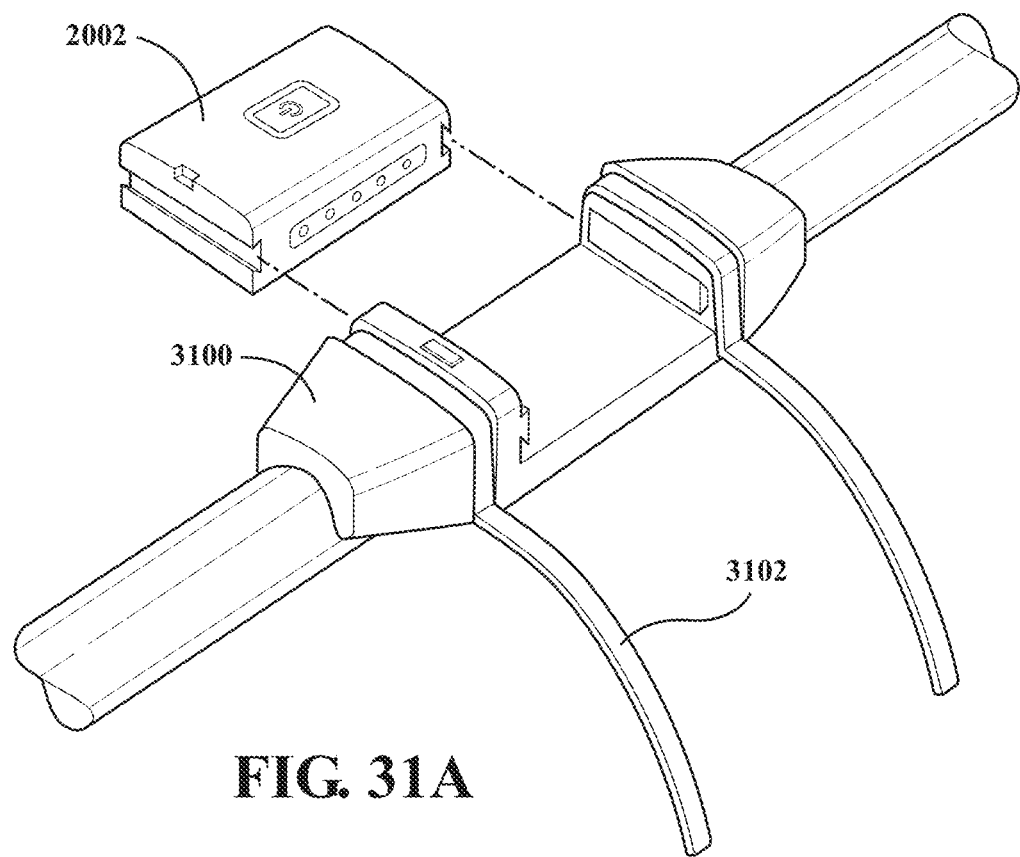
FIG. 31A depicts a wrap mount configuration for insertion of an angling event sensing device.
Figure 31B:
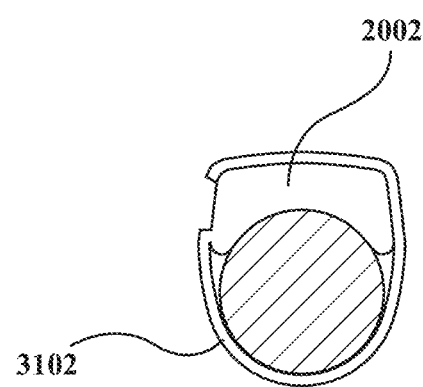
FIG. 31B depicts an edge view of a wrap mount configuration of an angling event sensing device attached to a rod.

FIGS. 31A and 31B depicts a wrap mount configuration of an AESD 2002 in which straps 3102 are affixed to the mount that may be wrapped around the fishing rod to secure the mount to the rod. In this configuration the AESD 2002 may slide into the mount from the side to secure it.

Figure 32:
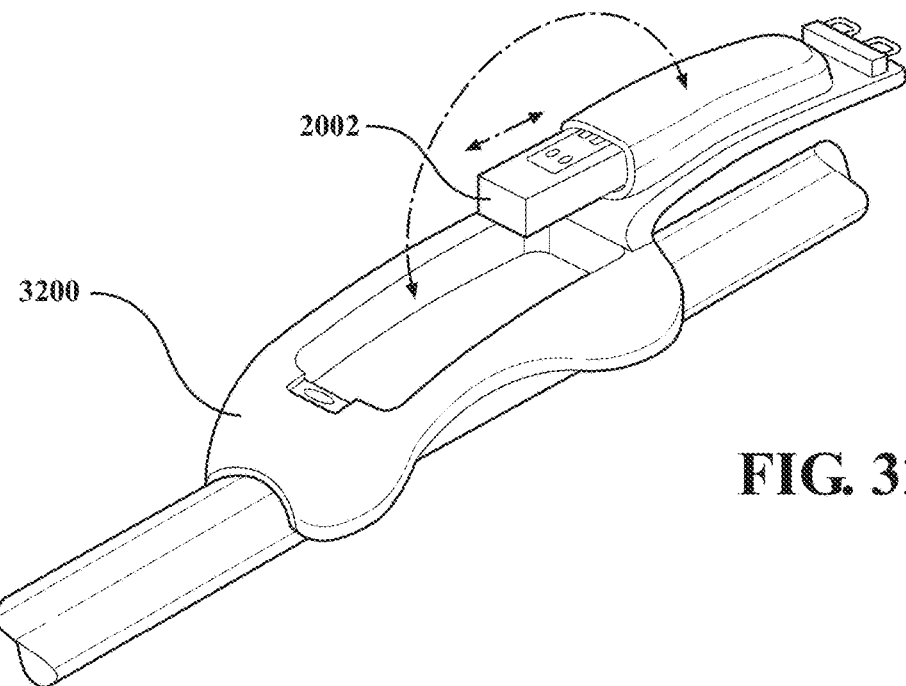
FIG. 32 depicts a rubberize sleeve for sensor insertion within an angling event sensing device.
Figure 33:
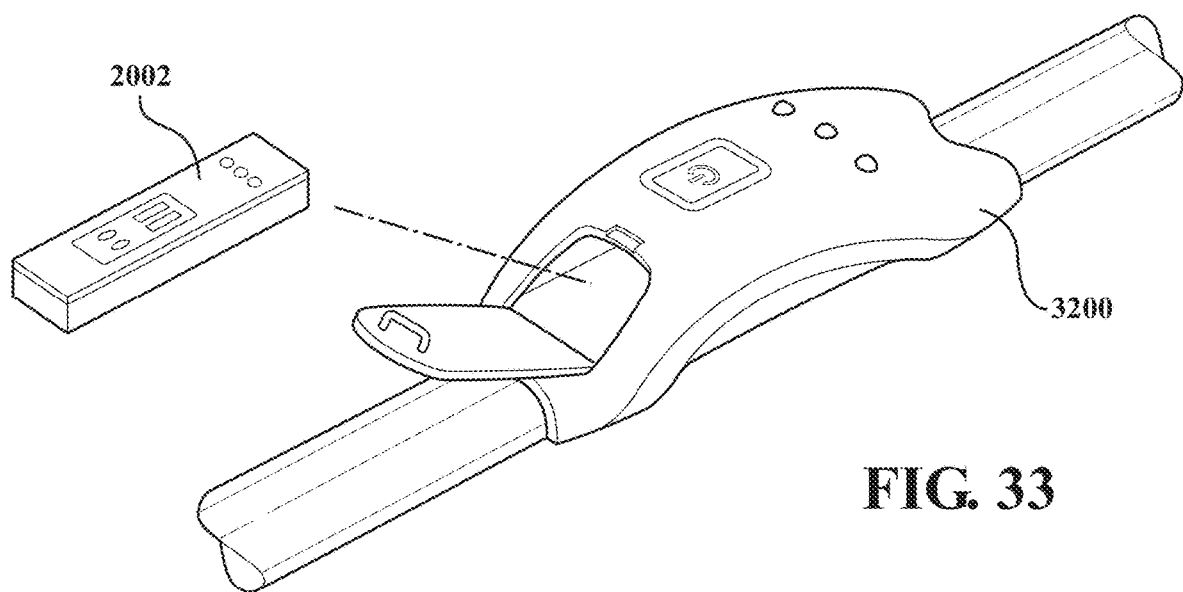
FIG. 33 depicts an embodiment for insertion of a sensor within an angling event sensing device.
Figures 34A, 34B:
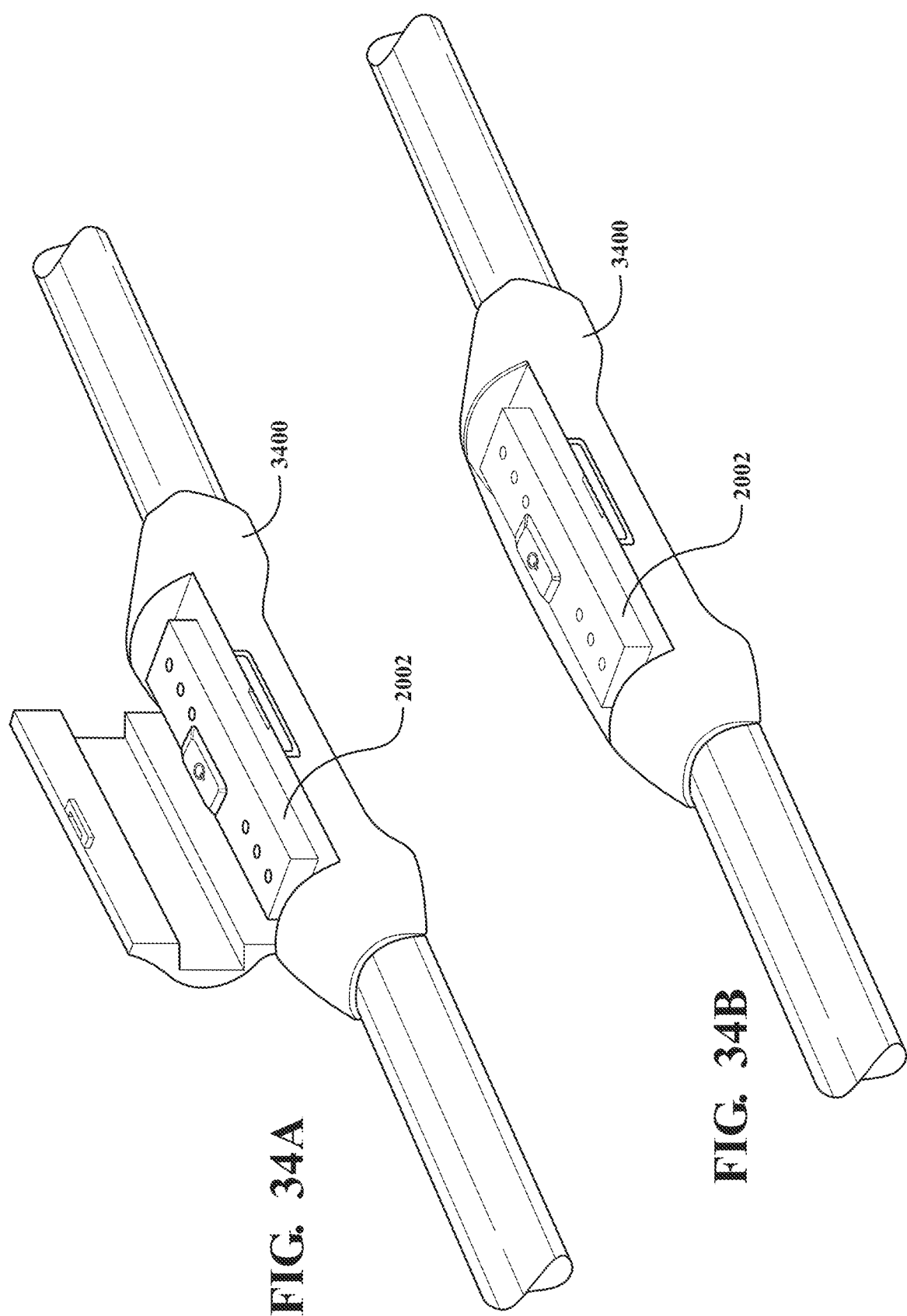
FIGS. 34A and 34B depict a hinged lid configuration of an angling event sensing device.
Figure 35:
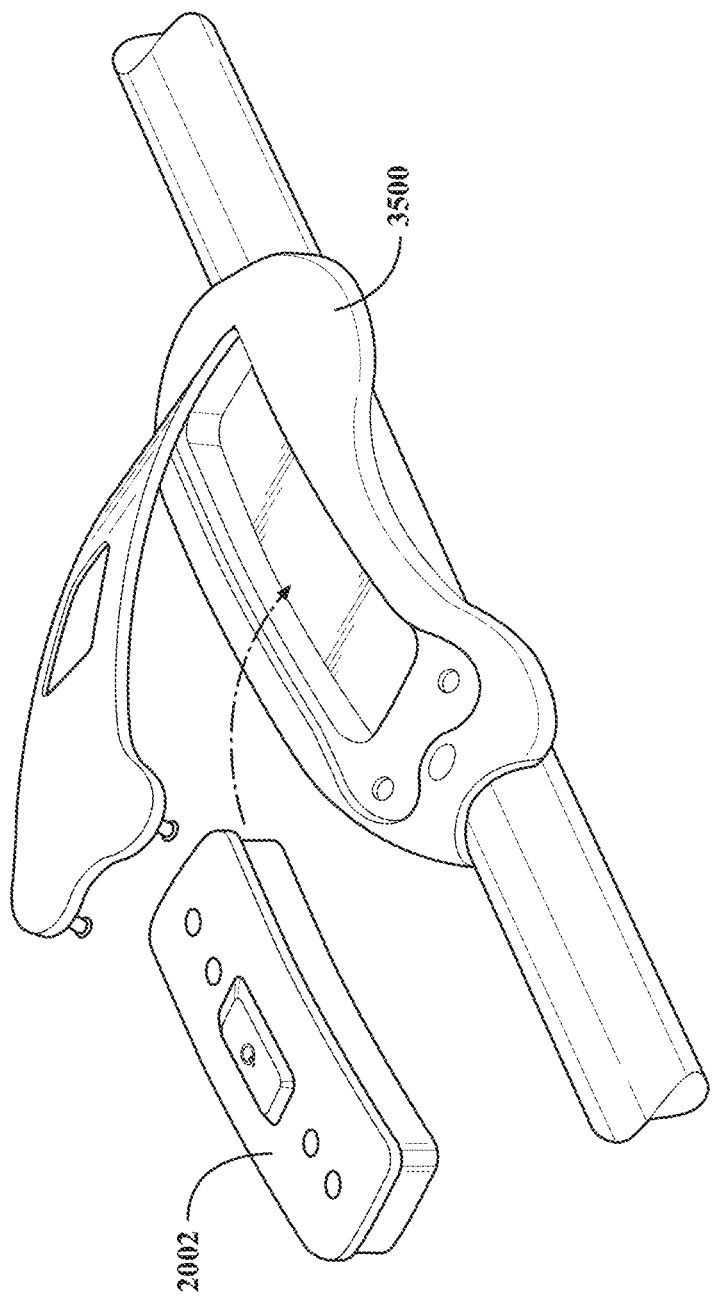
FIG. 35 depicts a clear hinged lid configuration of an angling event sensing device.
Figure 39A:
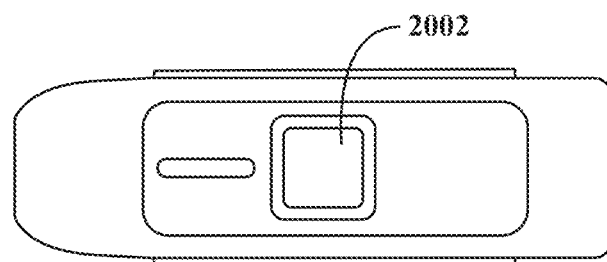
FIGS. 39A and 39B depict a top view and a side view of an embodiment of a mount configuration and sample sensor.
Figure 39B:
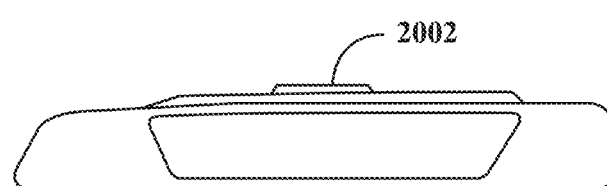
Figure 39C:
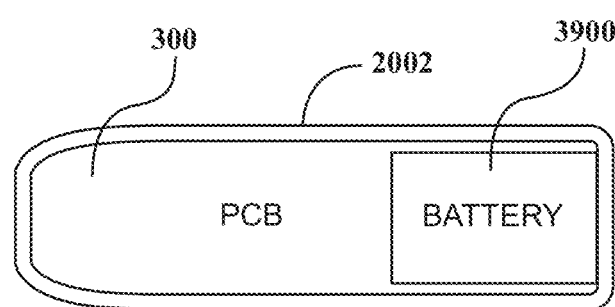
FIGS. 39C and 39D depict a top view and a side view of a sample PCB and battery configuration of an angling event sensing device.
Figure 39D:
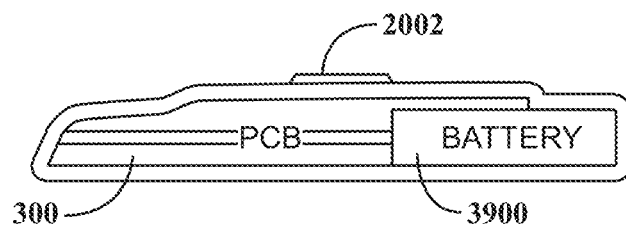
Figure 39E:
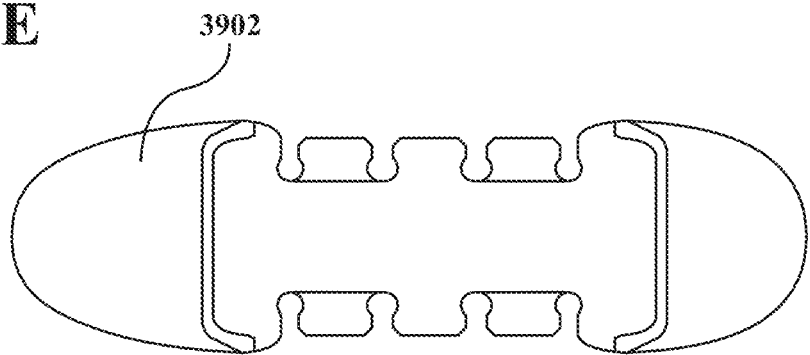
FIGS. 39E and 39F depict a top and a side view of an embodiment of a mount.
Figure 39F:
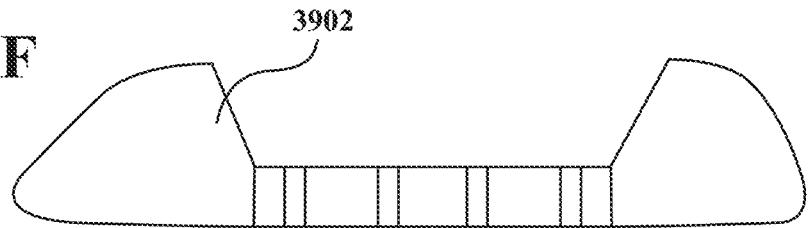
Figure 39G:
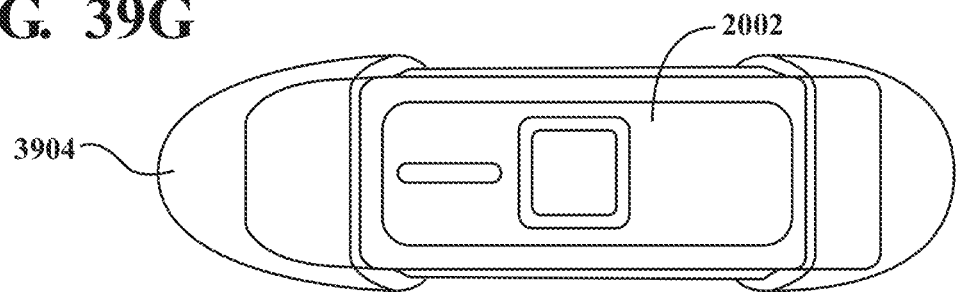
FIGS. 39G and 39H depict a top and a side view of an embodiment of a mount configuration and sample sensor of an angling event sensing device.
Figure 39H:
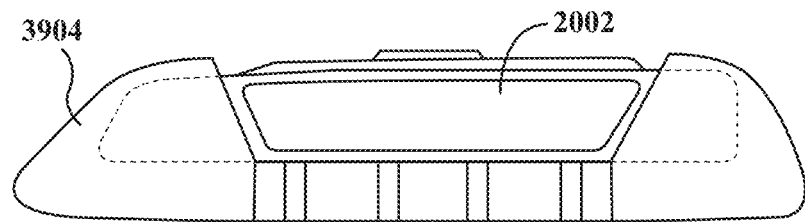
Figure 40A:
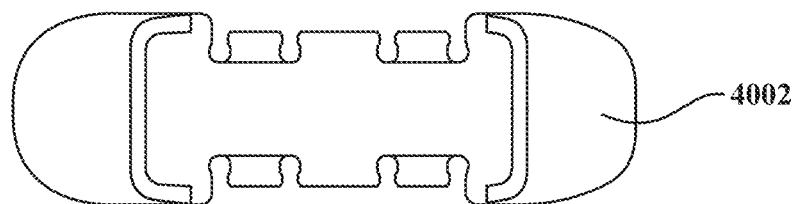
FIGS. 40A through 40C depict a top view, side view and edge view of an embodiment of a mount of an angling event sensing device.
Figure 40B:
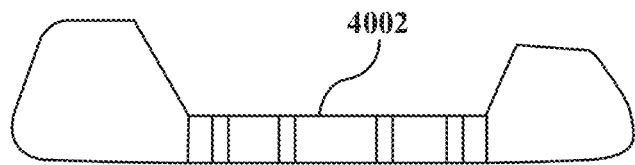
Figure 40C:
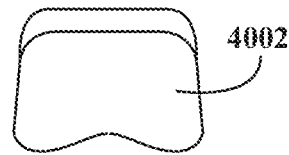
Figure 40D:
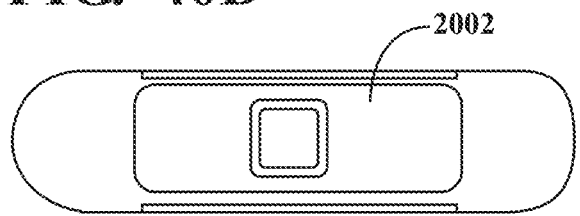
FIGS. 40D through 40F depict a top view, side view and edge view of an embodiment of a mount and sensor configuration of an angling event sensing device.
Figure 40E:
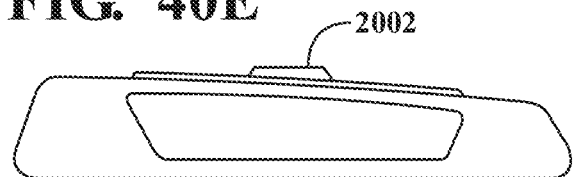
Figure 40F:
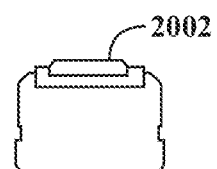

FIGS. 32 and 33 depicts a rubberize sleeve for inserting an AESD 2002 within a mount, in which a hinged door opens to allow insertion of the AESD 2002 and closing the hinged door creates a watertight seal. FIGS. 34A through 35 depict a hinged lid configuration of an AESD 2002, in which the mount 3400 and 3500 has a hinged door on its upper portion that enables a user to insert or remove the AESD 2002 on the mount.

FIGS. 36A through 36D depicts a fish tail configuration of an AESD 2002 in which a mount attachment 3602 may be extended from one side of the mouth 3600, under the fishing rod and affixed to the second side of the mount 3600 in order to secure the mount to the rod. Flanges on both sides of the mount may be configured to accept and hold the mount attachment in place. The mount attachment may be made of a flexible material that allows is to stretch and hold the mount to the rod under pressure.

FIGS. 37A and 37B depict an integrated band configuration of an AESD 2002 in which an integrated band 3700 may be affixed to the side of the mount in which the AESD 2002 is held. This integrated band 3700 may be stretched under the fishing rod on which the mount is placed and affixed to the opposite side of the mount in order to secure the mount to the rod.

FIGS. 38A and 38B depict a strap mount configuration of an AESD 2002 in which a strap 3802 may be affixed to the side of the mount 3800 in which the AESD 2002 is held. This strap 3802 may be stretched under the fishing rod on which the mount is placed and secured to the opposite side of the mount 3800 in order to secure the mount to the rod.

FIGS. 39A through 39H depict a mount configuration, sample sensor, PCB and battery configurations of an AESD 2002. FIGS. 40A through 40F depicts embodiments of a mount and sensor configuration of an angling event sensing device. FIGS. 40A through 40F depicts additional embodiments of a mount and sensor configuration of an AESD 2002. FIGS. 41A through 41F depict lighting elements within an AESD 2002.

Figure 44:
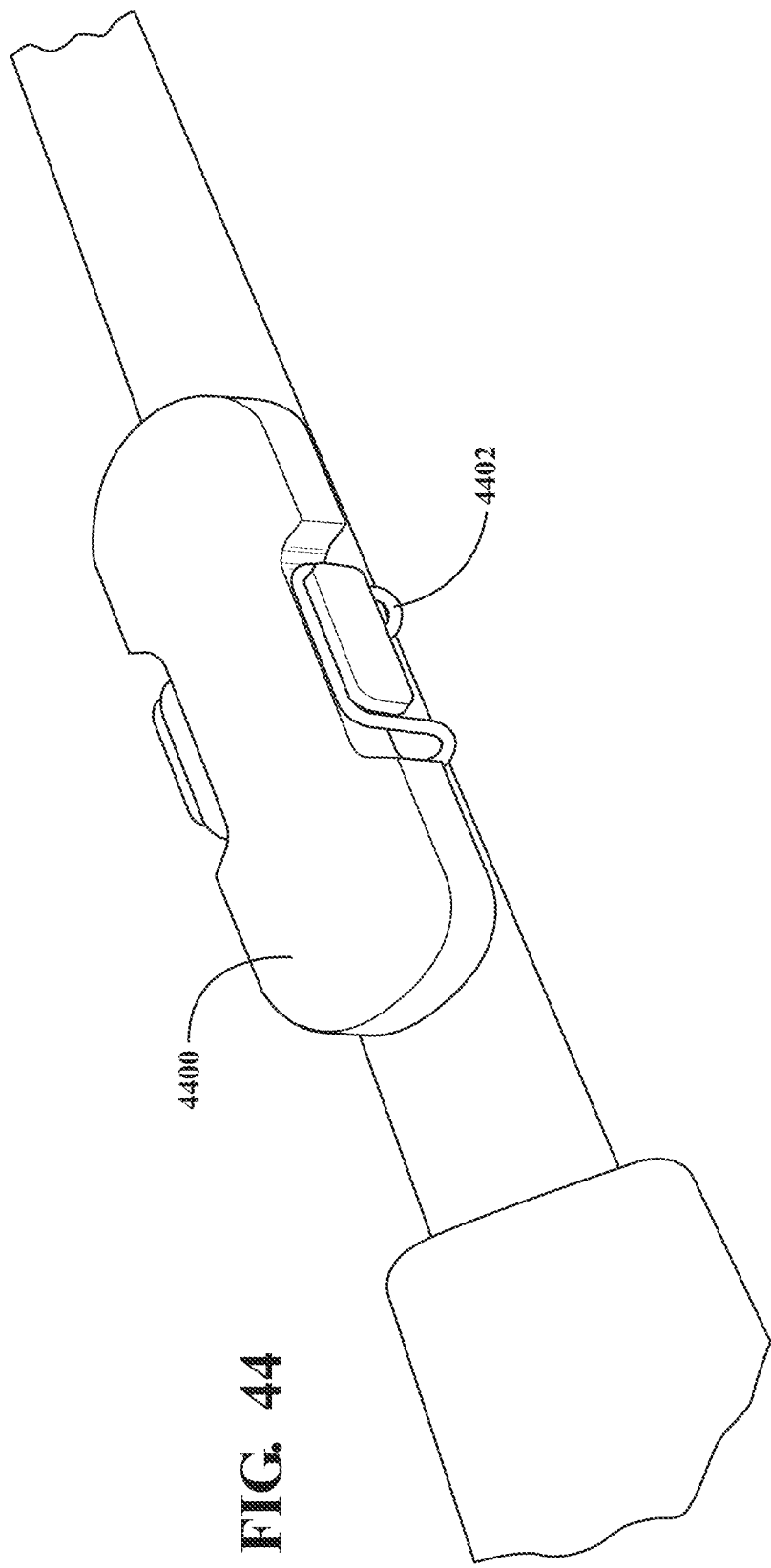
FIG. 44 depicts an embodiment of placement of an angling event sensing device on a rod.
Figure 45:
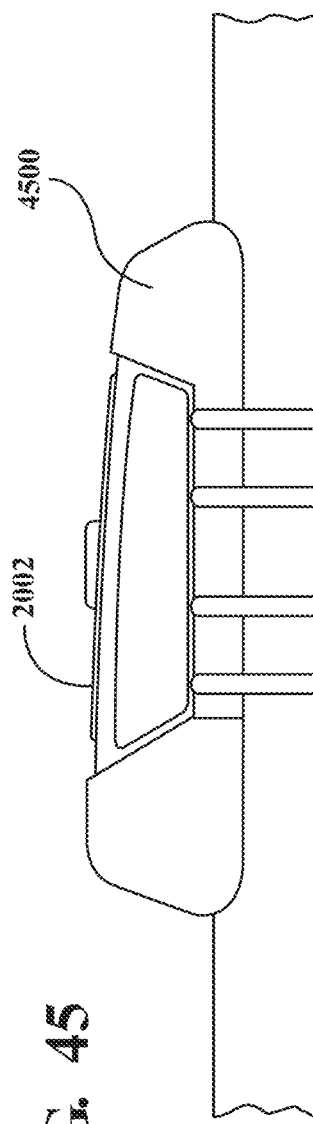
FIG. 45 depicts an embodiment of rubber mount rings of an angling event sensing device as attached to a rod.

FIGS. 42A through 42C depict o-rings and o-ring slots of an AESD 2002 in which an o-ring 4202, 4204 may be affixed to the side of the mount 4200 in which the AESD 2002 is held. This o-ring 4202, 4204 may be stretched under the fishing rod on which the mount is placed and affixed to the opposite side of the mount in order to secure the mount to the rod. O-ring slots on both sides of the mount 4200 may be configured to accept and hold the mount in place. The o-ring 4202, 4204 may be made of a flexible material that allows is to stretch and hold the mount to the rod under pressure. FIG. 43 depicts finger tabs 4300 of an AESD 2002 for sensor insertion. FIG. 44 depicts an alternate embodiment of placement of o-ring attachment 4402 to an AESD 2002 mount on a rod. FIG. 45 depicts an embodiment of rubber mount rings 4500 of an AESD 2002 as attached to a rod.

FIGS. 46A through 49 depict a zip-tie mount configuration of an AESD 2002 in which zip ties 4602 are used to secure an AESD mount to a rod by encircling the fishing rod.

Figure 50:
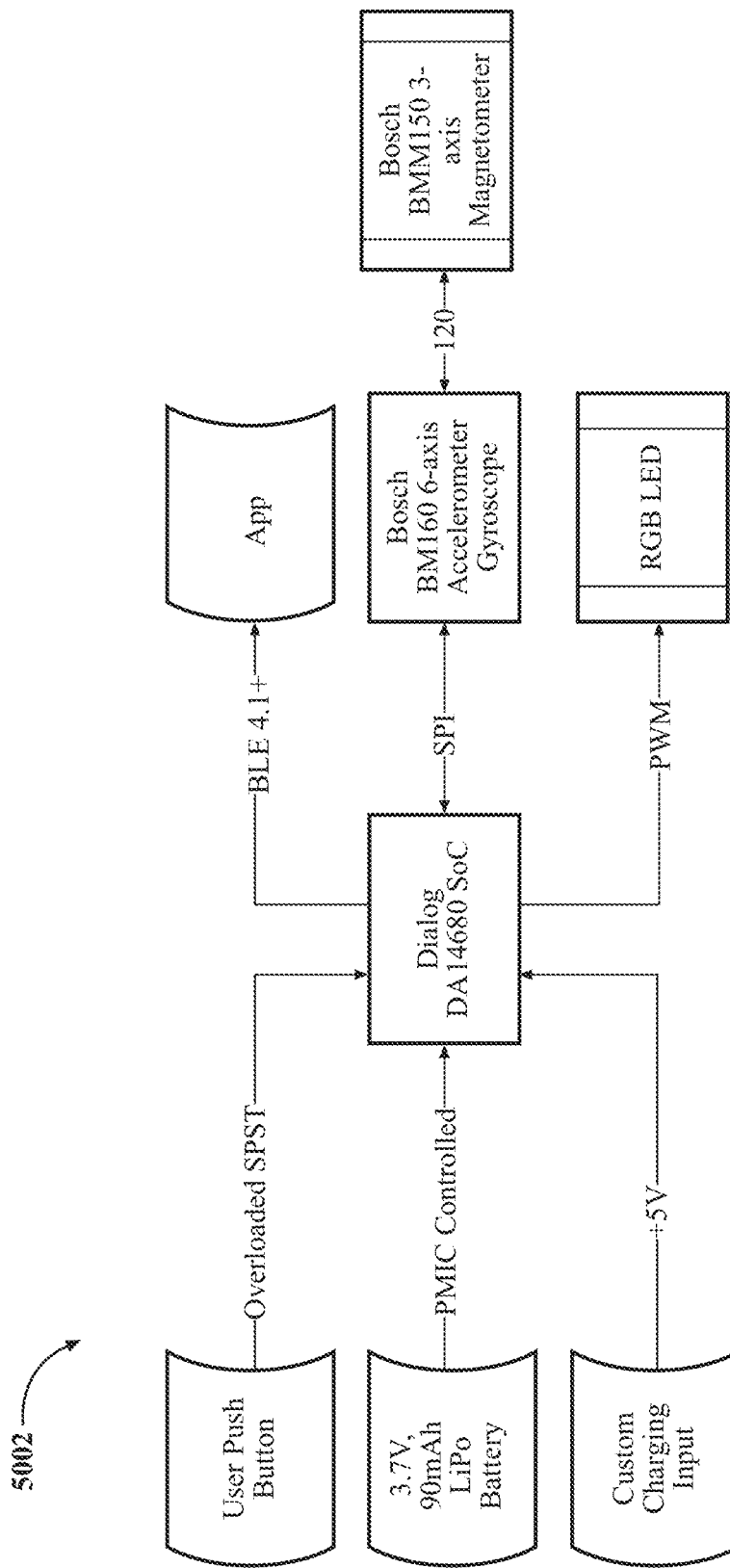
FIG. 50 depicts a system block diagram of the processing associated with an angling event sensing device.

FIG. 50 depicts a system block diagram 5002 of the processing associated with an angling event sensing device.

Figure 51:
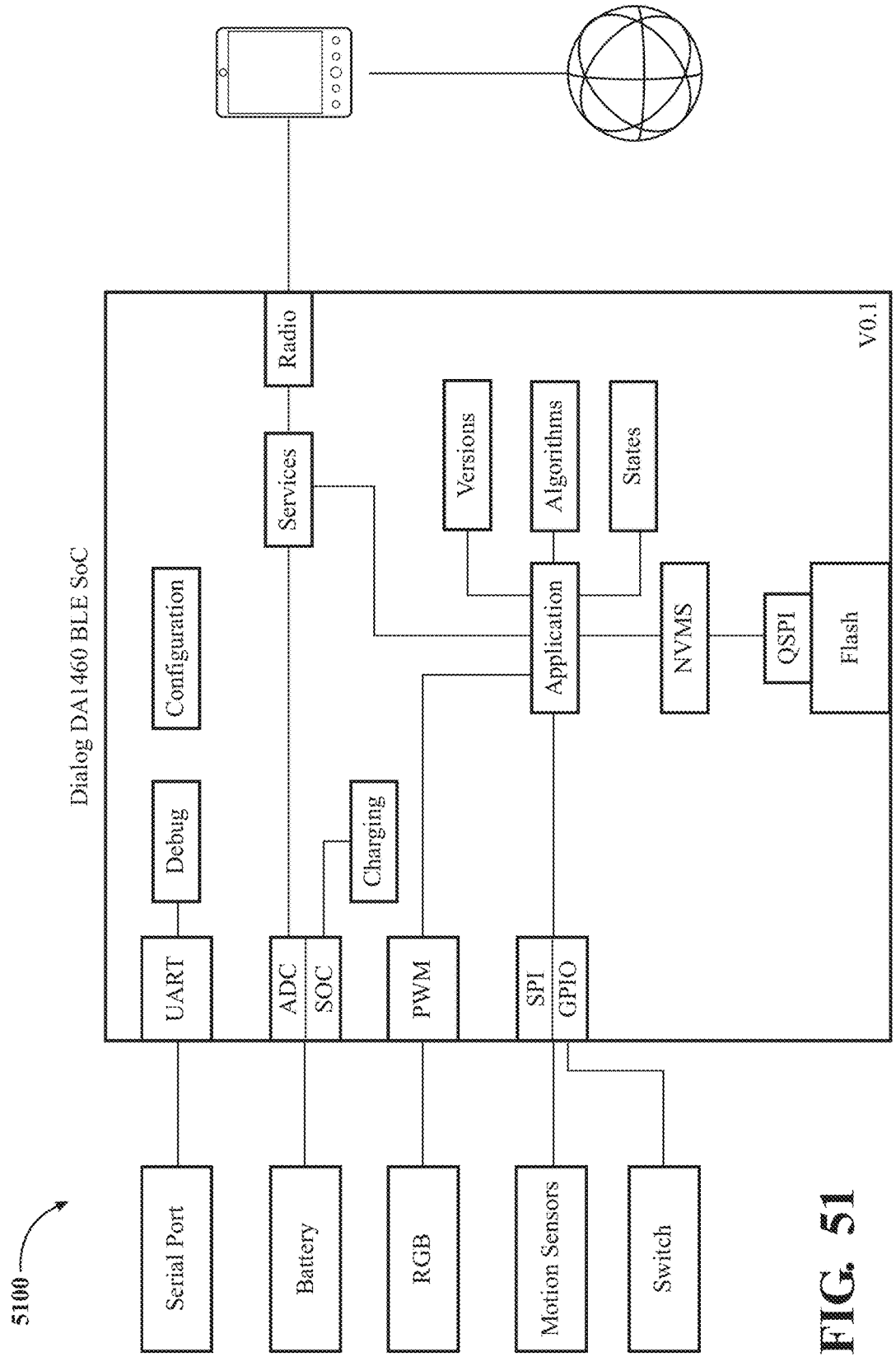
FIG. 51 depicts a software block diagram of the processing associated with an angling event sensing device.

FIG. 51 depicts a software block diagram 5100 of the processing associated with an angling event sensing device.

Figure 52:
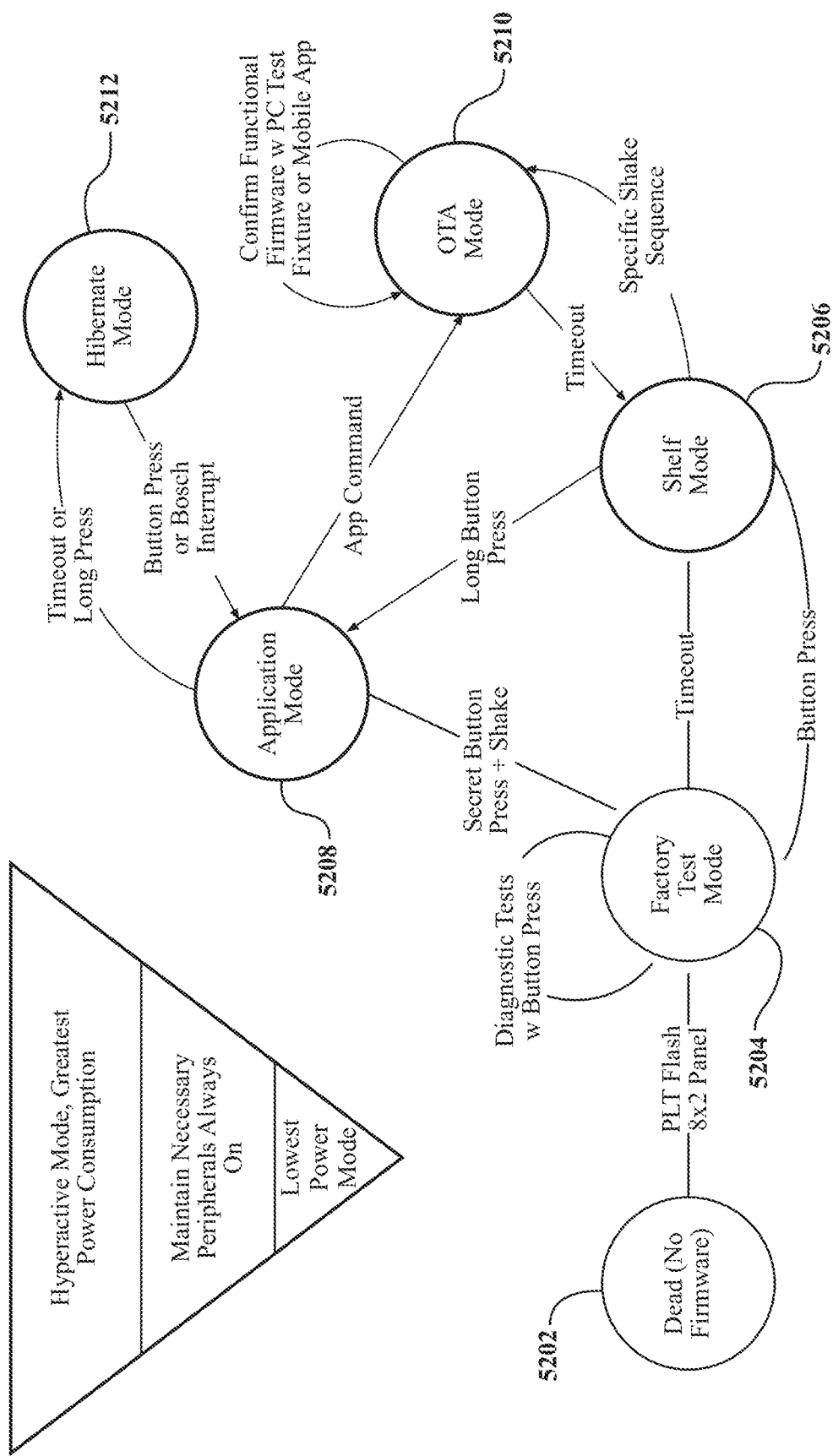
FIG. 52 depicts a power modes block diagram of the processing associated with an angling event sensing device.

Referring to FIGS. 52 through 53B, block diagrams of the processing associated with an AESD 2002 are depicted. Shelf Mode refers to a low power mode for an SESD with interrupts from the IMU sensors being disabled. Application Mode is an active mode for an SESD that can be directly controlled from the SESD. Fish Mode is an active mode for an SESD that may make use of all of the peripherals in the system. The main purpose of this mode is to automatically track the activity of an angler while fishing. Deep Sleep Mode is a low power mode that can still wake up from interrupts sent by the IMU sensors or by a single button press. Light Sleep Mode is a low power mode in which the device is not running algorithms or expecting input from peripherals that needs to be analyzed. While in Light Sleep Mode, an SESD may wake up and enter back into Fish Mode upon sensing movement. While in Light Sleep Mode, an SESD may wake up and enter back into Fish Mode upon a single button press. While in Light Sleep Mode, an SESD may receive and execute commands from the application 2400 associated with the SESD. Advertise Mode is a pairing mode in which the device is looking for a known device running an application 2400 associated with the SESD. An SESD may advertise its BLE radio to look for a previously bonded device. The SESD may fall back into Deep Sleep Mode if it does not find a bonded device after 20 seconds.

Figure 53A:
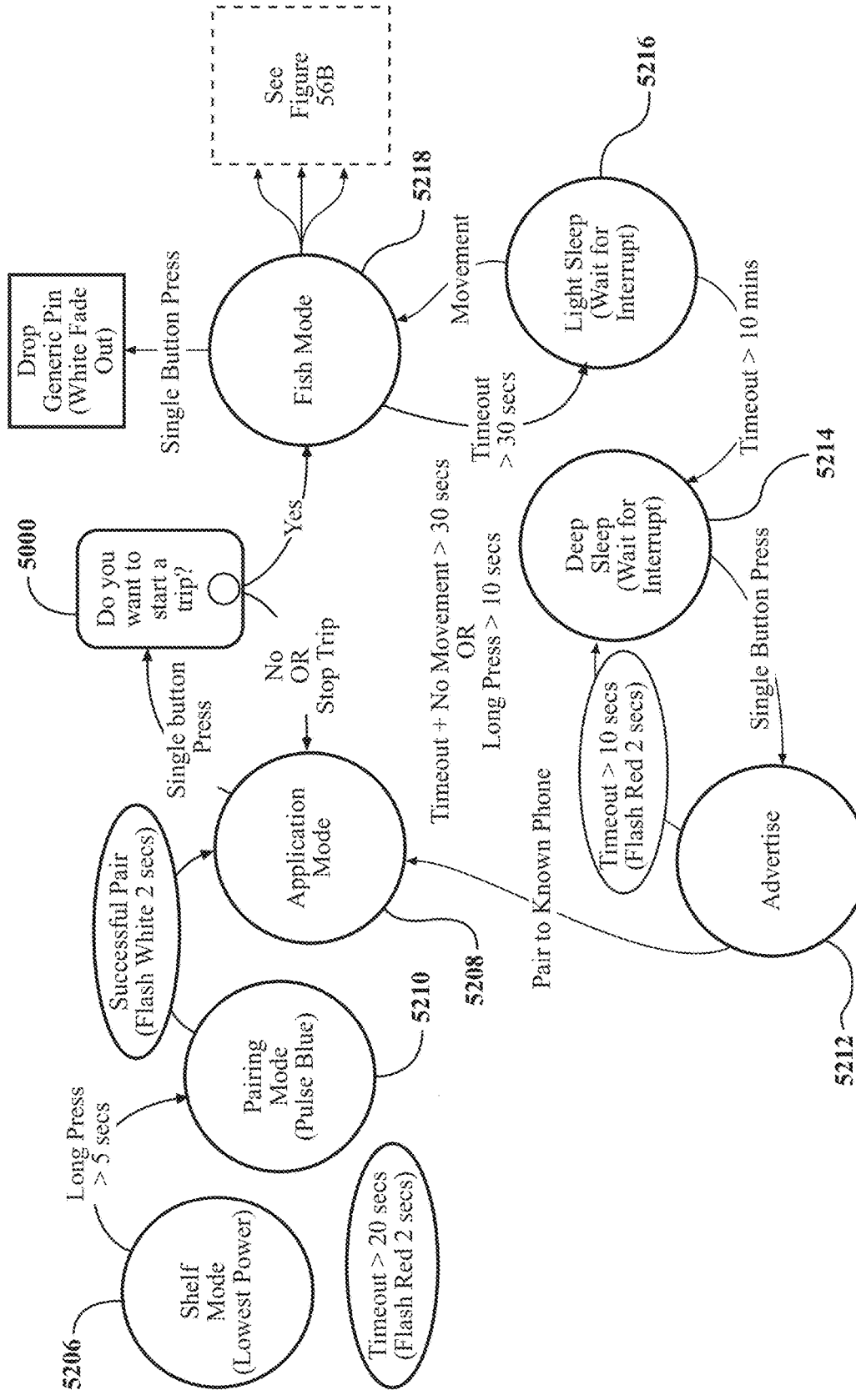

FIGS. 53A and 53B depict a UX Block Diagram of selected angling event sensing device functionalities.

Figure 54:
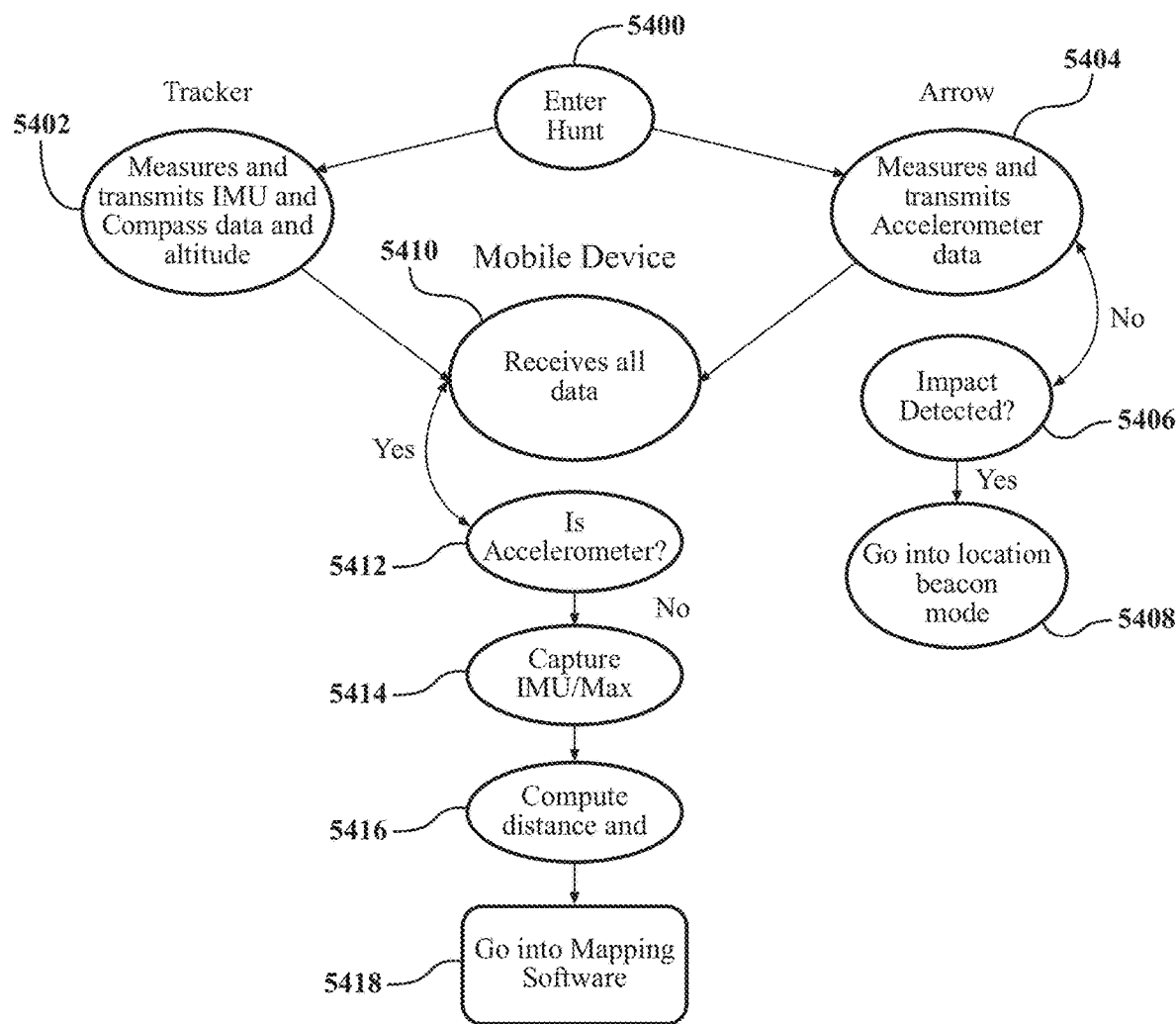
FIG. 54 depicts functionalities of a hunting arrow outfitted with a sporting event sensing device.

The high cost of crossbow bolts and hunting arrows for professionals means there is value in being able to track and locate arrows to prevent loss. Methods of location may combine using a mobile device on the hunter or tracker unit attached to the bow in communication with the arrow. Referring to FIG. 54, an SESD may be configured for placement and activation within a hunting arrow, including but not limited to an archery arrow used in a bow, a crossbow arrow, a spearfishing arrow, or some other arrow type. In embodiments a hunting arrow may include a hollow shaft that has a cavity that will accept an electronic module such as an SESD. The electronic module may include a battery, an inductive charge circuit, a circuit board with a microprocessor, a transceiver circuit and a 9-degree of freedom inertial measurement sensor. The arrow SESD may be further configured with a barometric pressure/altitude sensor, and to transmit a unique data beacon at regular intervals to a computer, mobile device, or a tracker device.

In an embodiment, a hunter may use an application 5200 to initiate a hunt. The arrow SESD may be further configured to turn on IMU sensors from a computer, mobile device and/or tracker device that may record the maximum acceleration, velocity and flight time the arrow. The arrow SESD may be configured to record magnetic earth direction and launch angle and elevation of a hunter. The initiation of a hunt may cause the arrow to begin transmitting accelerometer data and the tracker device to transmit data, including but not limited to IMU, compass data and altitude data. The application 5200 operating on a mobile device 5000 that is remote to the arrow may receive this data from the tracker and arrow, and perform analytics, as described herein, in order to calculate an arrow's speed, distance, location as well as make predictive calculations for determining if an arrow impact has occurred. As part of the analytics, the application 5200 may presenting mapping information to depict the physical location of the arrow. Upon impact of the arrow with an object, a location beacon mode may be initiated so that the arrow may be located and tracked, for example if the impact is with an object that is not stationary, such as a game animal.

In embodiments, a mobile device may be connected to the hunting arrow with GPS mapping software, the software configured to use the accelerometer information from the Arrow at time of flight, synchronizing the data with inertial measurements from the bow; height off the ground, angle of flight, and magnetic compass direction of flight. The information then further processed on mobile device to calculate the speed, and distance and flight path of arrow and plotting the predicted location of the arrow at the end of flight. The mobile device may be further configured to receive time-stamped wind direction and speed data from a sensor in near proximity to further refine the calculations of the flight path of the arrow.

In embodiments a hunting arrow may include a hollow shaft that has a cavity that will accept an electronic module such as an SESD. The electronic module may include a battery, an inductive charge circuit, a circuit board with a microprocessor, a three axis accelerometer, and a transceiver configured to communicate with a tracker on a bow or crossbow. The tracker may consist of a microprocessor, inductive charge circuit, a 9 degrees of freedom inertial measurement unit, a barometric pressure/altitude sensor, a switch or haptic interface, a feedback device and a transceiver for communication with the arrow and a mobile device. Software may be configured to use the accelerometer information from the hunting arrow at the time of flight, synchronizing the data with inertial measurements from the bow, height off the ground, angle of flight, magnetic compass direction of flight, or some other characteristic. The information may then be further processed on a mobile device to calculate the speed, and distance and flight path of arrow and plotting the predicted location of the arrow at the end of flight. The mobile device may be further configured to receive time-stamped wind direction and speed data from a sensor in near proximity to further refine the calculations of the flight path of the arrow.

In embodiments, a tracking device may be affixed to a bow or crossbow, and a mobile device with GPS mapping software may be used to assist in tracking and locating an arrow post flight. The arrow when non-operational may revert to an inactive sleep mode. Movement, including but not limited to tapping the arrow may cause the arrow to send a data beacon that will allow the arrow to communicate with a tracker or a mobile device. Initial communication from a non-configured arrow may be to pair the arrow with the tracker or mobile device. In a hunting scenario arrows may be paired to the tracking device, and the mobile device. Once paired, the electronics may remain paired allowing the arrow to be further configured by the tracker or mobile device to take measurements. The electronics may determine magnetic location, angle of incidence, height from ground, or some other characteristic. The data may be reported back via data beacon. When further configured to go into hunt mode by the tracker or mobile device, the SESD in the arrow may increase the processing rate of the microcontroller, and decrease the RF-latency providing for more frequent streaming communications with the tracker or mobile device. When the arrow leaves the bow, the inertial measurements, height, may be captured at the point of maximum acceleration (g-force), and streamed to the tracker or mobile device. The mathematics may be calculated using classic physic equations for projectiles to solve for flight time, speed of arrow, and distance and direction of flight. This information may be overlaid on a GPS mapping system, and then a travel path to the location of the arrow may guide the hunter to the arrow.

In embodiments, the hunting arrow when it comes to rest may measure the impact of a strike and via data beacon transmit the arrow identity, at regular intervals. A mobile device may be listening for the hunting arrow beacon and use the received signal strength indicator value to help guide the hunter to the arrow using mapping software with a moving arrow (e.g., showing compass headings). The arrow in a minimal configuration may need only a three-axis accelerometer, microcontroller, battery, and inductive charging system. To achieve the same results, the magnetometer and three-axis accelerometer, altitude sensor, may be a separate device (tracker) attached to a bow near the arrow rest or on scope to provide the other needed inertial measurements that happen at the time of flight. This tracker device may be in communication with the hunting arrow and in communication with the mobile device. To further enhance accuracy, a wind direction and wind speed sensor may be placed nearby a hunter's perch and may provide information to the tracker and/or the mobile device. The electronics in the hunting arrow at time of manufacture may store the weight, shaft and arrow head information that can be modified as the hunter from time to time may modify the arrow. Data that is associated with the hunting arrow may be time stamped. A hunter may press a button on the tracker or on a mobile device when preparing to hunt. This may cause the devices to stream the data to mobile device waiting for the maximum acceleration speed to lock in all the data values at the precise time of flight.

In an example embodiment, a hunting arrow SESD may consist of a tracker, an arrow with three-axis accelerometer and mobile device. Both the tracker and the arrow when put into hunt mode may send data to the mobile device where the mobile device will process the data to calculate the maximum acceleration vector from the arrow, and may time stamp the data needed for processing projectile velocity, angle of flight, time of flight and distance of travel.

In an embodiment, horizontal direction may be computed in the following manner:

$$x = x_0 + v_0 xt + \tfrac{1}{2} a_x t^2$$

$$x = 0 + (v \cos \theta) t + 0$$

$$x_{final} = (v \cos \theta) t_{final}$$

In an embodiment, vertical direction may be used to determine the time in the air, and be calculated in the following manner:

$$y = y_0 + v_{0y} t + 1/2 a_y t^2$$

$$y = y_0 + (v \sin \theta) t - 1/2 g t^2$$

$$0 = 0 + (v \sin \theta) t_{final} - 1/2 g t_{final}^2$$

$$t_{final} = \frac{2(v \sin \theta)}{g}$$

The combination of these two equations may yield the distance traveled by a hunting arrow:

$$x_{final} = (v \cos \theta) \frac{2(v \sin \theta)}{g}$$

-continued $$x_{final} = \frac{v^2 \sin 2\theta}{g}$$

$$x_{max} =$$

Once the distance is computed, and then combined with the direction of flight from the magnetometer at point of maximum acceleration, one can predict where the hunting arrow has landed. This may be mapped on the mobile device to give the hunter a visual plot of where the arrow is and where to retrieve the arrow.

The following are illustrative clauses demonstrating non-limiting embodiments of the disclosure described herein:

An apparatus to identify archery events, the apparatus comprising:
an arrow sensing device adapted to be secured to an arrow and comprising at least one sensor to generate data indicative of a parameter of the arrow when the arrow is in use; and
at least one processor in communication with the arrow sensing device programmed to identify an archery event based on the data indicative of a parameter of the arrow.

The apparatus of the preceding clause, wherein the at least one processor is remotely located from the arrow sensing device.

The apparatus of any of the preceding clauses, wherein the sensor is at least one of a motion sensor, optical sensor, sound sensor, piezo-electric sensor, strain or flex sensor, magnetometer, gyro, accelerometer, GPS, UV sensor, thermometer, barometric pressure sensor, conductivity sensor, or pH sensor.

The apparatus of any of the preceding clauses, wherein the sensor is a plurality of sensors.

The apparatus as described in any one of the preceding clauses, wherein the arrow sensing device comprises an output facility.

The apparatus of any of the preceding clauses, wherein the output facility is a display.

The apparatus of any of the preceding clauses, wherein the output facility is a speaker.

The apparatus of any of the preceding clauses, further comprising an output facility in communication with the arrow sensing device.

The apparatus of any of the preceding clauses, wherein the output facility is a display.

The apparatus of any of the preceding clauses, wherein the output facility is a speaker.

The apparatus of any of the preceding clauses, wherein the processor is further programmed to cause the identified archery event to be communicated to a user via the output facility.

The apparatus of any of the preceding clauses, wherein the processor is further programmed to cause the identified archery event to be communicated to a mobile device.

The apparatus of any of the preceding clauses, further comprising a second sensor mounted to the arrow.

The apparatus of any of the preceding clauses, wherein the second sensor is mounted within the arrow.

The apparatus of any of the preceding clauses, wherein the second sensor is a motion sensor.

The apparatus of any of the preceding clauses, wherein the second sensor detects movement of the arrow.

The apparatus of any of the preceding clauses, wherein the second sensor detects location of the arrow.

The apparatus of any of the preceding clauses, wherein the at least one processor is in communication with at least one remote sensing device.

The apparatus of any of the preceding clauses, wherein the at least one remote sensing device generates data indicative of an environmental parameter in proximity to the arrow sensing device.

The apparatus of any of the preceding clauses, wherein the at least one processor is further programmed to identify the archery event based on the data related to an environmental parameter.

The apparatus of any of the preceding clauses, wherein the at least one processor obtains data related to an environmental parameter in proximity to the arrow sensing device.

The apparatus of any of the preceding clauses, wherein the at least one processor is further programmed to identify the archery event based on the data related to an environmental parameter.

A system to generate archery event recommendations comprising:
a. an arrow sensing device adapted to be mounted to an arrow having at least one sensor to generate parameters indicative of the arrow;
b. a processor unit; and
c. a mobile device running an application in communication with the arrow sensing device in communication with the processing unit or the at least one sensor,
wherein the processor or the application is operable to determine at least one archery event from data received from the at least one sensor.

The methods and systems described herein may be deployed in part or in whole through a machine that executes computer software, program codes, and/or instructions on a processor. References to a "processor," "processing unit," "processing facility," "microprocessor," "co-processor" or the like are meant to also encompass more that one of such items being used together. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be or include a frequency division multiple access (FDMA) network or a code division multiple access (CDMA) network. The cellular network may include mobile devices, cell sites, base stations, repeaters, antennas, towers, and the like. The cell network may be one or more of GSM, GPRS, 3G, EVDO, mesh, or other network types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. An on-line multiplayer gaming system comprising:
   a. a first angling event sensing device adapted to be mounted to a first player's fishing rod having a first reel and a first line, the first angling event sensing device comprising at least one sensor to generate parameters indicative of the first player's fishing rod, the first reel, or the first line, wherein a sensitivity of the first angling event sensing device is increased in response to detecting a cast event;
   b. a first processor unit in communication with the at least one sensor of the first angling event sensing device;
   c. a recreation monitoring platform comprising at least one server;
   d. a first game application running on a first mobile device in communication with the first processor unit of the first angling event sensing device and in communication with the recreation monitoring platform, wherein the first processor unit, the first game application of the first mobile device, or the recreation monitoring platform determines at least one angling event based on the parameters from the at least one sensor of the first angling event sensing device, and wherein the recreation monitoring platform receives angling data input by a first player;
   e. a second angling event sensing device adapted to be mounted to a second player's fishing rod having a second reel and a second line, the second angling event sensing device comprising at least one sensor to generate parameters indicative of the second player's fishing rod, the second reel, or the second line;

f. a second processor unit in communication with the at least one sensor of the second angling event sensing device;

g. a second game application running on a second mobile device in communication with the second processor unit of the second angling event sensing device and in communication with the recreation monitoring platform, wherein the second processor unit, the second game application of the second mobile device, or the recreation monitoring platform determines at least one angling event based on the parameters from the at least one sensor of the second angling event sensing device, and wherein the recreation monitoring platform receives angling data input by a second player;

wherein the recreation monitoring platform calculates a score for the first player based on the at least one angling event determined based on the parameters from the at least one sensor of the first angling event sensing device, and wherein the recreation monitoring platform calculates a score for the second player based on the at least one angling event determined based on the parameters from the at least one sensor of the second angling event sensing device.

2. The system of claim 1, wherein the at least one angling event of the first angling event sensing device and the at least one angling event of the second angling event sensing device are each one of a fish on, a fish landed, or a fish lost.

3. The system of claim 2, wherein the fish on, the fish landed, or the fish lost includes a species of fish on, a species of fish landed, or a species of fish lost respectively.

4. The system of claim 1, wherein the recreation monitoring platform is operable to receive data of weather or water conditions corresponding to a location of an angling event of the first angling event sensing device and a location of an angling event of the second angling event sensing device.

5. The system of claim 4, wherein the recreation monitoring platform further calculates scores for the first player and the second player based on weather or water conditions at the locations of (i) the angling event of the first angling event sensing device and (ii) the angling event of the second angling event sensing device.

6. The system of claim 5, wherein adverse weather or water conditions enhance the score of the player who experienced said adverse weather or water conditions.

7. The system of claim 1, wherein data indicative of the parameters of the first reel or the second reel comprises at least one of reel speed, number of revolutions of the reel, or reel-in time.

8. The system of claim 1, wherein data indicative of the parameters of the first player's fishing rod or the second player's fishing rod comprises at least one of speed of rod motion, duration of rod motion, or a distance of rod motion.

9. The system of claim 8, wherein the data indicative of the parameters of the first player's fishing rod causes the first angling event sensing device to transmit motion data to the first game application.

10. A method of scoring in an on-line gaming system comprising:

receiving sensor data of a first angling event from a sensing device adapted to be mounted to a first player's fishing rod;

generating parameters indicative of the first player's fishing rod;

determining a cast event based on the parameters from the sensing device;

increasing sensitivity of the sensing device in response to detecting the cast event;

detecting at least one angling event based on the parameters from the sensing device, wherein the sensing device is operating with increased sensitivity during the detecting; and calculating a score for a first player based on the at least one angling event determined based on the parameters from the sensing device;

wherein the at least one angling event is one of a fish on, a fish landed, or a fish lost.

11. The method of claim 10, further comprising determining angle reaction of the first player's fishing rod during the at least one angling event; and determining species of fish from the angle reaction.

* * * * *